(12) United States Patent
ChoFleming et al.

(10) Patent No.: US 10,915,471 B2
(45) Date of Patent: Feb. 9, 2021

(54) APPARATUSES, METHODS, AND SYSTEMS FOR MEMORY INTERFACE CIRCUIT ALLOCATION IN A CONFIGURABLE SPATIAL ACCELERATOR

(71) Applicant: Intel Corporation, Santa Clara, CA (US)

(72) Inventors: Kermin ChoFleming, Hudson, MA (US); Yu Bai, Shrewsbury, MA (US); Simon C. Steely, Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/370,928

(22) Filed: Mar. 30, 2019

(65) Prior Publication Data

US 2020/0310994 A1 Oct. 1, 2020

(51) Int. Cl.
*G06F 13/16* (2006.01)
*G06F 16/901* (2019.01)
*G06F 12/0806* (2016.01)

(52) U.S. Cl.
CPC ...... *G06F 13/1668* (2013.01); *G06F 12/0806* (2013.01); *G06F 16/9024* (2019.01); *G06F 2212/1041* (2013.01)

(58) Field of Classification Search
None
See application file for complete search history.

(56) References Cited

U.S. PATENT DOCUMENTS

| 672,177 A | 4/1901 | William |
| 4,965,716 A | 10/1990 | Sweeney |
| 5,093,920 A | 3/1992 | Agrawal et al. |
| 5,141,747 A | 8/1992 | Scholz |
| 5,239,634 A | 8/1993 | Buch et al. |
| 5,241,635 A | 8/1993 | Papadopoulos et al. |
| 5,314,503 A | 5/1994 | Bobrove et al. |

(Continued)

FOREIGN PATENT DOCUMENTS

| EP | 0410777 A2 | 1/1991 |
| EP | 2317446 A1 | 5/2011 |

(Continued)

OTHER PUBLICATIONS

Final Office Action from U.S. Appl. No. 15/396,038, dated Mar. 11, 2019, 36 pages.

(Continued)

*Primary Examiner* — Farley Abad
*Assistant Examiner* — Dayton Lewis-Taylor
(74) *Attorney, Agent, or Firm* — Nicholson De Vos Webster & Elliott LLP

(57) ABSTRACT

Systems, methods, and apparatuses relating to memory interface circuit allocation in a configurable spatial accelerator are described. In one embodiment, a configurable spatial accelerator (CSA) includes a plurality of processing elements; a plurality of request address file (RAF) circuits, and a circuit switched interconnect network between the plurality of processing elements and the RAF circuits. As a dataflow architecture, embodiments of CSA have a unique memory architecture where memory accesses are decoupled into an explicit request and response phase allowing pipelining through memory. Certain embodiments herein provide for an improved memory sub-system design via the improvements to allocation discussed herein.

24 Claims, 89 Drawing Sheets

(56) References Cited

U.S. PATENT DOCUMENTS

| | | |
|---|---|---|
| 5,393,454 A | 2/1995 | Mondin et al. |
| 5,393,536 A | 2/1995 | Brandt et al. |
| 5,410,722 A | 4/1995 | Cornaby |
| 5,465,368 A | 11/1995 | Davidson et al. |
| 5,502,661 A | 3/1996 | Glunz |
| 5,560,032 A | 9/1996 | Nguyen et al. |
| 5,574,944 A | 11/1996 | Stager |
| 5,581,767 A | 12/1996 | Katsuki et al. |
| 5,604,120 A | 2/1997 | Yano et al. |
| 5,625,630 A | 4/1997 | Abramovici et al. |
| 5,655,096 A | 8/1997 | Branigin |
| 5,689,719 A | 11/1997 | Miura et al. |
| 5,725,364 A | 3/1998 | Mirazita |
| 5,787,029 A | 7/1998 | De Angel |
| 5,790,821 A | 8/1998 | Pflum |
| 5,805,827 A | 9/1998 | Chau et al. |
| 5,925,099 A | 7/1999 | Futral et al. |
| 5,930,484 A | 7/1999 | Tran et al. |
| 5,933,429 A | 8/1999 | Bubenik et al. |
| 5,948,081 A | 9/1999 | Foster |
| 6,020,139 A | 2/2000 | Schwartz et al. |
| 6,088,780 A | 7/2000 | Yamada et al. |
| 6,141,747 A | 10/2000 | Witt |
| 6,205,533 B1 | 3/2001 | Margolus et al. |
| 6,247,064 B1 | 6/2001 | Alferness et al. |
| 6,314,503 B1 | 11/2001 | D'Errico et al. |
| 6,393,454 B1 | 5/2002 | Chu |
| 6,393,536 B1 | 5/2002 | Hughes et al. |
| 6,460,131 B1 | 10/2002 | Trimberger |
| 6,507,947 B1 | 1/2003 | Schreiber et al. |
| 6,515,333 B1 | 2/2003 | Riccobene |
| 6,553,448 B1 | 4/2003 | Mannion |
| 6,553,482 B1 | 4/2003 | Witt |
| 6,604,120 B1 | 8/2003 | De |
| 6,615,333 B1 | 9/2003 | Hoogerbrugge et al. |
| 6,640,267 B1 | 10/2003 | Raza |
| 6,721,774 B1 | 4/2004 | Lee et al. |
| 6,725,364 B1 | 4/2004 | Crabill |
| 6,728,945 B1 | 4/2004 | Wang |
| 6,886,085 B1 | 4/2005 | Shuf et al. |
| 6,947,416 B1 | 9/2005 | Nee et al. |
| 7,000,072 B1 | 2/2006 | Aisaka et al. |
| 7,058,785 B1 | 6/2006 | Dchotta Emil S |
| 7,181,578 B1 | 2/2007 | Guha et al. |
| 7,200,137 B2 | 4/2007 | Dorr et al. |
| 7,203,936 B2 | 4/2007 | Gillies et al. |
| 7,257,665 B2 | 8/2007 | Niell et al. |
| 7,290,096 B2 | 10/2007 | Jeter, Jr. et al. |
| 7,308,514 B1 | 12/2007 | Hewitt et al. |
| 7,379,067 B2 | 5/2008 | Deering et al. |
| 7,380,108 B1 | 5/2008 | Uht et al. |
| 7,486,678 B1 | 2/2009 | Devanagondi et al. |
| 7,509,484 B1 | 3/2009 | Golla et al. |
| 7,546,331 B2 | 6/2009 | Islam et al. |
| 7,630,324 B2 | 12/2009 | Li et al. |
| 7,647,435 B2 | 1/2010 | Check et al. |
| 7,660,911 B2 | 2/2010 | McDaniel |
| 7,724,740 B1 | 5/2010 | Wang et al. |
| 7,817,652 B1 | 10/2010 | MacAdam et al. |
| 7,911,960 B1 | 3/2011 | Aydemir et al. |
| 7,936,753 B1 | 5/2011 | Colloff et al. |
| 7,987,479 B1 | 7/2011 | Day |
| 8,001,510 B1 | 8/2011 | Miller et al. |
| 8,010,766 B2 | 8/2011 | Bhattacharjee et al. |
| 8,051,227 B1 | 11/2011 | Gewirtz et al. |
| 8,055,880 B2 | 11/2011 | Fujisawa et al. |
| 8,115,659 B2 | 2/2012 | Hurley et al. |
| 8,156,284 B2 | 4/2012 | Vorbach et al. |
| 8,160,975 B2 | 4/2012 | Tang et al. |
| 8,225,073 B2 | 7/2012 | Master et al. |
| 8,332,597 B1 | 12/2012 | Bennett |
| 8,356,162 B2 | 1/2013 | Muff et al. |
| 8,495,341 B2 | 7/2013 | Busaba et al. |
| 8,561,194 B2 | 10/2013 | Lee |
| 8,578,117 B2 | 11/2013 | Burda et al. |
| 8,619,800 B1 | 12/2013 | Finney et al. |
| 8,806,248 B2 | 8/2014 | Allarey et al. |
| 8,812,820 B2 | 8/2014 | Vorbach et al. |
| 8,924,596 B1 | 12/2014 | Beeson et al. |
| 8,935,515 B2 | 1/2015 | Colavin et al. |
| 8,966,457 B2 | 2/2015 | Ebcioglu et al. |
| 8,990,452 B2 | 3/2015 | Branson et al. |
| 9,009,712 B2 | 4/2015 | Schmit et al. |
| 9,026,705 B2 | 5/2015 | Feehrer et al. |
| 9,026,769 B1 | 5/2015 | Jamil et al. |
| 9,052,890 B2 | 6/2015 | Phillips et al. |
| 9,104,474 B2 | 8/2015 | Kaul et al. |
| 9,110,846 B2 | 8/2015 | Buchheit et al. |
| 9,135,057 B2 | 9/2015 | Branson et al. |
| 9,170,846 B2 | 10/2015 | Delling et al. |
| 9,213,571 B2 | 12/2015 | Ristovski et al. |
| 9,268,528 B2 | 2/2016 | Tannenbaum et al. |
| 9,268,704 B2 | 2/2016 | Fleischer et al. |
| 9,285,860 B2 | 3/2016 | Hofmann |
| 9,429,983 B1 | 8/2016 | Chall et al. |
| 9,473,144 B1 | 10/2016 | Thiagarajan et al. |
| 9,520,876 B1 | 12/2016 | Chadwick et al. |
| 9,594,521 B2 | 3/2017 | Blagodurov et al. |
| 9,658,676 B1 | 5/2017 | Witek et al. |
| 9,696,928 B2 | 7/2017 | Cain, III et al. |
| 9,753,658 B2 | 9/2017 | Beeson et al. |
| 9,760,291 B2 | 9/2017 | Beale et al. |
| 9,762,563 B2 | 9/2017 | Davis et al. |
| 9,847,783 B1 | 12/2017 | Teh et al. |
| 9,886,072 B1 | 2/2018 | Venkataraman |
| 9,923,905 B2 | 3/2018 | Amiri et al. |
| 9,946,718 B2 | 4/2018 | Bowman et al. |
| 10,108,417 B2 | 10/2018 | Krishna et al. |
| 10,187,467 B2 | 1/2019 | Nagai |
| 10,331,583 B2 | 6/2019 | Ahsan et al. |
| 10,467,183 B2 | 11/2019 | Fleming et al. |
| 2001/0001325 A1 | 5/2001 | Fujimoto et al. |
| 2002/0026493 A1 | 2/2002 | Scardamalia et al. |
| 2002/0090751 A1 | 7/2002 | Grigg et al. |
| 2002/0103943 A1 | 8/2002 | Lo et al. |
| 2002/0178285 A1 | 11/2002 | Donaldson et al. |
| 2002/0184291 A1 | 12/2002 | Hogenauer |
| 2003/0023830 A1 | 1/2003 | Hogenauer |
| 2003/0028750 A1 | 2/2003 | Hogenauer |
| 2003/0120802 A1 | 6/2003 | Kohno |
| 2003/0126233 A1 | 7/2003 | Bryers et al. |
| 2003/0163649 A1 | 8/2003 | Kapur et al. |
| 2003/0177320 A1 | 9/2003 | Sah et al. |
| 2003/0212726 A1 | 11/2003 | Luick |
| 2003/0225814 A1 | 12/2003 | Saito et al. |
| 2003/0233643 A1 | 12/2003 | Thompson et al. |
| 2004/0001458 A1 | 1/2004 | Dorenbosch et al. |
| 2004/0017807 A1 | 1/2004 | Dorr et al. |
| 2004/0017820 A1 | 1/2004 | Garinger et al. |
| 2004/0022094 A1 | 2/2004 | Radhakrishnan et al. |
| 2004/0022107 A1 | 2/2004 | Zaidi et al. |
| 2004/0044877 A1 | 3/2004 | Myers |
| 2004/0054818 A1 | 3/2004 | Kirsch |
| 2004/0103230 A1 | 5/2004 | Emerson et al. |
| 2004/0124877 A1 | 7/2004 | Parkes |
| 2004/0128401 A1 | 7/2004 | Fallon et al. |
| 2004/0230849 A1 | 11/2004 | Dhong et al. |
| 2004/0263524 A1 | 12/2004 | Lippincott |
| 2005/0025120 A1 | 2/2005 | O'Toole et al. |
| 2005/0076187 A1 | 4/2005 | Claydon |
| 2005/0108776 A1 | 5/2005 | Carver et al. |
| 2005/0134308 A1 | 6/2005 | Okada et al. |
| 2005/0138323 A1 | 6/2005 | Snyder |
| 2005/0166038 A1 | 7/2005 | Wang et al. |
| 2005/0172103 A1 | 8/2005 | Inuo et al. |
| 2005/0223131 A1 | 10/2005 | Goekjian et al. |
| 2006/0026359 A1 | 2/2006 | Ross et al. |
| 2006/0041872 A1 | 2/2006 | Poznanovic et al. |
| 2006/0101237 A1 | 5/2006 | Mohl et al. |
| 2006/0130030 A1 | 6/2006 | Kwiat et al. |
| 2006/0179255 A1 | 8/2006 | Yamazaki |
| 2006/0179429 A1 | 8/2006 | Eggers et al. |
| 2006/0200647 A1 | 9/2006 | Cohen |
| 2006/0221931 A1 | 10/2006 | Apostol et al. |

(56) References Cited

U.S. PATENT DOCUMENTS

| | | |
|---|---|---|
| 2006/0236008 A1 | 10/2006 | Asano et al. |
| 2007/0011436 A1 | 1/2007 | Bittner, Jr. et al. |
| 2007/0033369 A1 | 2/2007 | Kasama et al. |
| 2007/0074014 A1 | 3/2007 | Musoll et al. |
| 2007/0079036 A1 | 4/2007 | Mukherjee |
| 2007/0118332 A1 | 5/2007 | Meyers et al. |
| 2007/0143546 A1 | 6/2007 | Narad |
| 2007/0180315 A1 | 8/2007 | Aizawa et al. |
| 2007/0203967 A1 | 8/2007 | Dockser et al. |
| 2007/0204137 A1 | 8/2007 | Tran |
| 2007/0226458 A1 | 9/2007 | Stuttard et al. |
| 2007/0266223 A1 | 11/2007 | Nguyen |
| 2007/0276976 A1 | 11/2007 | Gower et al. |
| 2007/0299980 A1 | 12/2007 | Amini et al. |
| 2008/0005392 A1 | 1/2008 | Amini et al. |
| 2008/0072113 A1 | 3/2008 | Tsang et al. |
| 2008/0082794 A1 | 4/2008 | Yu et al. |
| 2008/0133889 A1 | 6/2008 | Glew |
| 2008/0133895 A1 | 6/2008 | Sivtsov et al. |
| 2008/0155135 A1 | 6/2008 | Garg et al. |
| 2008/0184255 A1 | 7/2008 | Watanabe et al. |
| 2008/0218203 A1 | 9/2008 | Arriens et al. |
| 2008/0263330 A1 | 10/2008 | May et al. |
| 2008/0270689 A1 | 10/2008 | Gotoh |
| 2008/0307258 A1 | 12/2008 | Challenger et al. |
| 2009/0013329 A1 | 1/2009 | May et al. |
| 2009/0037697 A1 | 2/2009 | Ramani et al. |
| 2009/0055624 A1 | 2/2009 | Kirsch |
| 2009/0063665 A1 | 3/2009 | Bagepalli et al. |
| 2009/0113169 A1 | 4/2009 | Yang et al. |
| 2009/0119456 A1 | 5/2009 | Park, II et al. |
| 2009/0133023 A1 | 5/2009 | Li et al. |
| 2009/0144522 A1 | 6/2009 | Vorbach et al. |
| 2009/0175444 A1 | 7/2009 | Douglis et al. |
| 2009/0182993 A1 | 7/2009 | Fant |
| 2009/0222252 A1 | 9/2009 | Chen et al. |
| 2009/0228682 A1 | 9/2009 | Mejdrich et al. |
| 2009/0300324 A1 | 12/2009 | Inuo |
| 2009/0300325 A1 | 12/2009 | Paver et al. |
| 2009/0300388 A1 | 12/2009 | Mantor et al. |
| 2009/0309884 A1 | 12/2009 | Lippincott et al. |
| 2009/0328048 A1 | 12/2009 | Khan et al. |
| 2010/0017761 A1 | 1/2010 | Higuchi et al. |
| 2010/0115168 A1 | 5/2010 | Bekooij |
| 2010/0180105 A1 | 7/2010 | Asnaashari |
| 2010/0191911 A1 | 7/2010 | Heddes et al. |
| 2010/0217915 A1 | 8/2010 | O'Connor et al. |
| 2010/0228885 A1 | 9/2010 | McDaniel et al. |
| 2010/0228925 A1 | 9/2010 | Doerr et al. |
| 2010/0254262 A1 | 10/2010 | Kantawala et al. |
| 2010/0262721 A1 | 10/2010 | Asnaashari et al. |
| 2010/0302946 A1 | 12/2010 | Yang et al. |
| 2011/0004742 A1 | 1/2011 | Hassan |
| 2011/0008300 A1 | 1/2011 | Wouters et al. |
| 2011/0040822 A1 | 2/2011 | Eichenberger et al. |
| 2011/0083000 A1 | 4/2011 | Rhoades et al. |
| 2011/0099295 A1 | 4/2011 | Wegener |
| 2011/0107337 A1 | 5/2011 | Cambonie et al. |
| 2011/0133825 A1 | 6/2011 | Jones et al. |
| 2011/0202747 A1 | 8/2011 | Busaba et al. |
| 2011/0292708 A1 | 12/2011 | Kang et al. |
| 2011/0302358 A1 | 12/2011 | Yu et al. |
| 2011/0314238 A1 | 12/2011 | Finkler et al. |
| 2011/0320724 A1 | 12/2011 | Mejdrich et al. |
| 2012/0017066 A1 | 1/2012 | Vorbach et al. |
| 2012/0066483 A1 | 3/2012 | Boury et al. |
| 2012/0079168 A1 | 3/2012 | Chou et al. |
| 2012/0089812 A1 | 4/2012 | Smith |
| 2012/0124117 A1 | 5/2012 | Yu et al. |
| 2012/0126850 A1 | 5/2012 | Inasson et al. |
| 2012/0126851 A1 | 5/2012 | Kelem et al. |
| 2012/0128107 A1 | 5/2012 | Oren |
| 2012/0131288 A1 | 5/2012 | Box et al. |
| 2012/0144126 A1 | 6/2012 | Nimmala et al. |
| 2012/0174118 A1 | 7/2012 | Watanabe et al. |
| 2012/0239853 A1 | 9/2012 | Moshayedi |
| 2012/0260239 A1 | 10/2012 | Martinez et al. |
| 2012/0278543 A1 | 11/2012 | Yu et al. |
| 2012/0278587 A1 | 11/2012 | Caufield et al. |
| 2012/0303932 A1 | 11/2012 | Farabet et al. |
| 2012/0303933 A1 | 11/2012 | Manet et al. |
| 2012/0317388 A1 | 12/2012 | Driever et al. |
| 2012/0324180 A1 | 12/2012 | Asnaashari et al. |
| 2012/0330701 A1 | 12/2012 | Hyder et al. |
| 2013/0021058 A1 | 1/2013 | Huang et al. |
| 2013/0024875 A1 | 1/2013 | Wang et al. |
| 2013/0036287 A1 | 2/2013 | Chu et al. |
| 2013/0067138 A1 | 3/2013 | Schuette et al. |
| 2013/0067203 A1 | 3/2013 | Chung et al. |
| 2013/0080652 A1 | 3/2013 | Cradick et al. |
| 2013/0080993 A1 | 3/2013 | Stravers et al. |
| 2013/0081042 A1 | 3/2013 | Branson et al. |
| 2013/0125127 A1 | 5/2013 | Mital et al. |
| 2013/0145203 A1 | 6/2013 | Fawcett et al. |
| 2013/0147515 A1 | 6/2013 | Wasson et al. |
| 2013/0151919 A1 | 6/2013 | Huynh |
| 2013/0160028 A1 | 6/2013 | Black |
| 2013/0166879 A1 | 6/2013 | Sun et al. |
| 2013/0315211 A1 | 11/2013 | Balan et al. |
| 2014/0032860 A1 | 1/2014 | Yamada et al. |
| 2014/0052955 A1 | 2/2014 | Moll et al. |
| 2014/0098890 A1 | 4/2014 | Sermadevi et al. |
| 2014/0115300 A1 | 4/2014 | Bodine |
| 2014/0143564 A1 | 5/2014 | Tannenbaum et al. |
| 2014/0188968 A1 | 7/2014 | Kaul et al. |
| 2014/0215189 A1 | 7/2014 | Airaud et al. |
| 2014/0281409 A1 | 9/2014 | Abdallah et al. |
| 2014/0380024 A1 | 12/2014 | Spadini et al. |
| 2015/0007182 A1 | 1/2015 | Rossbach et al. |
| 2015/0026434 A1 | 1/2015 | Basant et al. |
| 2015/0033001 A1 | 1/2015 | Ivanov et al. |
| 2015/0067305 A1 | 3/2015 | Olson et al. |
| 2015/0067368 A1 | 3/2015 | Henry et al. |
| 2015/0082011 A1 | 3/2015 | Mellinger et al. |
| 2015/0082075 A1 | 3/2015 | Denman et al. |
| 2015/0089162 A1 | 3/2015 | Ahsan et al. |
| 2015/0089186 A1 | 3/2015 | Kim et al. |
| 2015/0100757 A1 | 4/2015 | Burger et al. |
| 2015/0106596 A1 | 4/2015 | Vorbach et al. |
| 2015/0113184 A1 | 4/2015 | Stanford-Jason et al. |
| 2015/0188847 A1 | 7/2015 | Chopra et al. |
| 2015/0220345 A1 | 8/2015 | Corbal et al. |
| 2015/0261528 A1 | 9/2015 | Ho et al. |
| 2015/0268963 A1 | 9/2015 | Etsion et al. |
| 2015/0278097 A1 | 10/2015 | Kelm et al. |
| 2015/0317134 A1 | 11/2015 | Kim et al. |
| 2015/0378731 A1 | 12/2015 | Lai et al. |
| 2015/0379670 A1 | 12/2015 | Koker et al. |
| 2016/0077568 A1 | 3/2016 | Kandula et al. |
| 2016/0098279 A1 | 4/2016 | Glew |
| 2016/0098420 A1 | 4/2016 | Dickie et al. |
| 2016/0239265 A1 | 8/2016 | Duong et al. |
| 2016/0364364 A1 | 12/2016 | Fleischer et al. |
| 2016/0381431 A1 | 12/2016 | Patterson et al. |
| 2017/0013495 A1 | 1/2017 | Chae et al. |
| 2017/0031866 A1 | 2/2017 | Nowatzki et al. |
| 2017/0062075 A1 | 3/2017 | Barber et al. |
| 2017/0083313 A1 | 3/2017 | Sankaralingam et al. |
| 2017/0092371 A1 | 3/2017 | Harari |
| 2017/0116154 A1 | 4/2017 | Palmer et al. |
| 2017/0163543 A1 | 6/2017 | Wang et al. |
| 2017/0255414 A1 | 9/2017 | Gerhart et al. |
| 2017/0262383 A1 | 9/2017 | Lee et al. |
| 2017/0286169 A1 | 10/2017 | Ravindran et al. |
| 2017/0293766 A1 | 10/2017 | Schnjakin et al. |
| 2017/0315815 A1 | 11/2017 | Smith et al. |
| 2017/0315978 A1 | 11/2017 | Boucher et al. |
| 2017/0325124 A1 | 11/2017 | Mitra et al. |
| 2017/0371836 A1 | 12/2017 | Langhammer |
| 2018/0081806 A1 | 3/2018 | Kothinti et al. |
| 2018/0081834 A1 | 3/2018 | Wang et al. |
| 2018/0088647 A1 | 3/2018 | Suryanarayanan et al. |
| 2018/0095728 A1 | 4/2018 | Hasenplaugh et al. |
| 2018/0101502 A1 | 4/2018 | Massif et al. |

(56) References Cited

U.S. PATENT DOCUMENTS

| | | |
|---|---|---|
| 2018/0113797 A1 | 4/2018 | Breslow et al. |
| 2018/0188983 A1 | 7/2018 | Fleming, Jr. et al. |
| 2018/0188997 A1 | 7/2018 | Fleming, Jr. et al. |
| 2018/0189063 A1 | 7/2018 | Fleming et al. |
| 2018/0189231 A1 | 7/2018 | Fleming, Jr. et al. |
| 2018/0189239 A1 | 7/2018 | Nurvitadhi et al. |
| 2018/0189675 A1 | 7/2018 | Nurvitadhi et al. |
| 2018/0210730 A1 | 7/2018 | Sankaralingam et al. |
| 2018/0218767 A1 | 8/2018 | Wolff |
| 2018/0225403 A1 | 8/2018 | Nicol et al. |
| 2018/0248994 A1 | 8/2018 | Lee et al. |
| 2018/0285385 A1 | 10/2018 | West et al. |
| 2018/0293162 A1 | 10/2018 | Tsai et al. |
| 2018/0300181 A1 | 10/2018 | Hetzel et al. |
| 2018/0316760 A1 | 11/2018 | Chernin et al. |
| 2018/0332342 A1 | 11/2018 | Wu et al. |
| 2018/0365181 A1 | 12/2018 | Cottam et al. |
| 2018/0373509 A1 | 12/2018 | Zhang et al. |
| 2019/0004878 A1 | 1/2019 | Adler et al. |
| 2019/0004945 A1 | 1/2019 | Fleming et al. |
| 2019/0004955 A1 | 1/2019 | Adler et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0026237 A1 | 1/2019 | Bannon et al. |
| 2019/0042217 A1 | 2/2019 | Glossop et al. |
| 2019/0042218 A1 | 2/2019 | Zhang |
| 2019/0042513 A1 | 2/2019 | Fleming, Jr. et al. |
| 2019/0089354 A1 | 3/2019 | Venugopal et al. |
| 2019/0095369 A1 | 3/2019 | Fleming et al. |
| 2019/0095383 A1 | 3/2019 | Fleming et al. |
| 2019/0101952 A1 | 4/2019 | Diamond et al. |
| 2019/0102179 A1 | 4/2019 | Fleming et al. |
| 2019/0102338 A1 | 4/2019 | Tang et al. |
| 2019/0129720 A1 | 5/2019 | Ivanov |
| 2019/0205263 A1 | 7/2019 | Fleming et al. |
| 2019/0205269 A1 | 7/2019 | Fleming, Jr. et al. |
| 2019/0205284 A1 | 7/2019 | Fleming et al. |
| 2019/0258919 A1 | 8/2019 | Lie et al. |
| 2019/0303153 A1 | 10/2019 | Halpern et al. |
| 2019/0303168 A1 | 10/2019 | Fleming et al. |
| 2019/0303263 A1 | 10/2019 | Fleming et al. |
| 2019/0303297 A1 | 10/2019 | Fleming et al. |
| 2019/0303312 A1 | 10/2019 | Ahsan et al. |
| 2019/0377688 A1 | 12/2019 | Basu et al. |

FOREIGN PATENT DOCUMENTS

| | | |
|---|---|---|
| EP | 2660716 A1 | 11/2013 |
| EP | 2854026 A1 | 4/2015 |
| RU | 2374684 C1 | 11/2009 |
| WO | 89/01203 A1 | 2/1989 |
| WO | 20031100602 A2 | 12/2003 |
| WO | 2007031696 A1 | 3/2007 |
| WO | 2014035449 A1 | 3/2014 |
| WO | 20151044696 A2 | 4/2015 |
| WO | 20151196343 A1 | 12/2015 |

OTHER PUBLICATIONS

Final Office Action from U.S. Appl. No. 15/396,049, dated Dec. 27, 2018, 38 pages.
Final Office Action from U.S. Appl. No. 15/396,402, dated May 17, 2019, 85 pages.
Final Office Action from U.S. Appl. No. 15/721,809, dated Dec. 26, 2018, 46 pages.
Final Office Action from U.S. Appl. No. 15/859,473, dated Feb. 26, 2019, 13 pages.
Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Fleming et al., U.S. Appl. No. 15/396,038, titled "Memory Ordering in Acceleration Hardware," 81 pages, filed Dec. 30, 2016.
Fleming et al., U.S. Appl. No. 15/396,049, titled "Runtime Address Disambiguation in Acceleration Hardware," filed Dec. 30, 2016, 97 pages.
"Full Day Tutorial Held at MICRO-49," Oct. 15-19, 2016, retrieved from https://www.microarch.org/micro49/ on Feb. 14, 2019, 2 pages.
Govindaraju et al.,"DySER: Unifying Functionality and Parallelism Specialization for Energy-Efficient Computing," Published by the IEEE Computer Society, Sep./Oct. 2012, pp. 38-51.
Govindaraju V., et al., "Dynamically Specialized Datapaths for Energy Efficient Computing," 2011, In Proceedings of the 17th International Conference on High Performance Computer Architecture, 12 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Hauser J.R., et al., "Garp: a MIPS processor with a Reconfigurable Coprocessor," Proceedings of the 5th Annual IEEE Symposium on Field-Programmable Custom Computing Machines, 1997, 10 pages.
Hoogerbrugge J., et al., "Transport-Triggering vs. Operation-Triggering," 1994, In Compiler Construction, Lecture Notes in Computer Science, vol. 786, Springer, pp. 435-449.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Ibrahim Eng., Walaa Abd El Aziz, "Binary Floating Point Fused Multiply Add Unit", Faculty of Engineering, Cairo University Giza, Egypt, 2012, 100 Pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, Updated—May 18, 2018, 19 pages.
International Preliminary Report on Patentability for Application No. PCT/RU2011/001049, dated Jul. 10, 2014, 6 pages.
International Preliminary Report on Patentability for Application No. PCT/US2017/050663, dated Apr. 11, 2019, 11 pages.
International Search Report and Written Opinion for Application No. PCT/RU2011/001049, dated Sep. 20, 2012, 6 pages.
International Search Report and Written Opinion for Application No. PCT/US2019/020243, dated Jun. 19, 2019, 11 pages.
International Search Report and Written Opinion for Application No. PCT/US2019/020270, dated Jun. 14, 2019, 11 pages.
International Search Report and Written Opinion received for PCT Patent Application No. PCT/US2017/050663, dated Dec. 28, 2017, 14 pages.
International Search Report and Written Opinion for Application No. PCT/US2019/019965, dated Jun. 13, 2019, 9 pages.
International Search Report and Written Opinion for Application No. PCT/US2019/020287, dated Jun. 12, 2019, 9 pages.
Kalte H., et al., "Context Saving and Restoring for Multitasking in Reconfigurable Systems," International Conference on Field Programmable Logic and Applications, Aug. 2005, pp. 223-228.
Kim et al., "Energy-Efficient and High Performance CGRA-based Multi-Core Architecture," Journal of Semiconductor Technology and Science, vol. 14 (3), Jun. 2014, 16 pages.
King M., et al., "Automatic Generation of Hardware/Software Interfaces," Proceedings of the 17th International Conference on Architectural Support for Programming Languages and Operating Systems, ASPLOS'12, Mar. 2012, 12 pages.

(56) References Cited

OTHER PUBLICATIONS

Knuth D.E., et al., "Fast Pattern Matching in Strings," Jun. 1977, SIAM Journal of Computing, vol. 6(2), pp. 323-350.
Lee T., et al., "Hardware Context-Switch Methodology for Dynamically Partially Reconfigurable Systems," Journal of Information Science and Engineering, vol. 26, Jul. 2010, pp. 1289-1305.
Li S., et al., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.
McCalpin J.D., "Memory Bandwidth and Machine Balance in Current High Performance Computers," IEEE Computer Society Technical Committee on Computer Architecture (TCCA) Newsletter, Dec. 1995, 7 pages.
McCalpin J.D., "STREAM: Sustainable memory bandwidth in high performance computers," 2016, 4 pages.
Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.
Natalie E.J., et al., "On-Chip Networks," Synthesis Lectures on Computer Architecture, Morgan and Claypool Publishers, 2009, 148 pages.
Non-Final Office Action from U.S. Appl. No. 14/037,468, dated Oct. 19, 2017, 19 pages.
Non-Final Office Action from U.S. Appl. No. 15/396,402, dated Nov. 1, 2018, 22 pages.
Non-Final Office Action from U.S. Appl. No. 15/640,540, dated Oct. 26, 2018, 8 pages.
Non-Final Office Action from U.S. Appl. No. 15/640,543, dated Jan. 2, 2019, 46 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 7, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/283,295, dated Apr. 30, 2018, 18 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/640,541, dated Apr. 12, 2019, 61 pages.
Non-Final Office Action from U.S. Appl. No. 15/640,542, dated Apr. 2, 2019, 59 pages.
Non-Final Office Action from U.S. Appl. No. 15/719,285, dated Feb. 25, 2019, 47 pages.
Non-Final Office Action from U.S. Appl. No. 15/721,802, dated Mar. 8, 2018, 8 pages.
Non-Final Office Action from U.S. Appl. No. 15/721,809, dated Jun. 14, 2018, 12 pages.
Non-Final Office Action from U.S. Appl. No. 15/855,964, dated Dec. 13, 2018, 13 pages.
Notice of Allowance from U.S. Appl. No. 15/283,295, dated Jan. 3, 2019, 7 pages.
Notice of Allowance from U.S. Appl. No. 15/640,534, dated Jan. 4, 2019, 37 pages.
Notice of Allowance from U.S. Appl. No. 15/640,534, dated May 31, 2019, 9 pages.
Notice of Allowance from U.S. Appl. No. 15/640,535, dated Jun. 21, 2019, 8 pages.
Notice of Allowance from U.S. Appl. No. 15/721,802, dated Nov. 30, 2018, 30 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 14/037,468, dated Mar. 7, 2019, 51 pages.
Notice of Allowance from U.S. Appl. No. 15/283,295, dated Apr. 10, 2019, 49 pages.
Notice of Allowance from U.S. Appl. No. 15/396,395, dated Dec. 28, 2018, 36 pages.
Notice of Allowance from U.S. Appl. No. 15/396,395, dated May 15, 2019, 23 pages.
Notice of Allowance from U.S. Appl. No. 15/640,533, dated Feb. 14, 2019, 43 pages.
Notice of Allowance from U.S. Appl. No. 15/640,533, dated May 22, 2019, 19 pages.
Notice of Allowance from U.S. Appl. No. 15/640,534, dated Apr. 2, 2019, 9 pages.
Notice of Allowance from U.S. Appl. No. 15/640,534, dated Sep. 12, 2018, 7 pages.
Notice of Allowance from U.S. Appl. No. 15/640,535, dated Feb. 6, 2019, 38 pages.
Notice of Allowance from U.S. Appl. No. 15/640,535, dated May 24, 2019, 19 pages.
Notice of Allowance from U.S. Appl. No. 15/640,540, dated Mar. 14, 2019, 39 pages.
Notice of Allowance from U.S. Appl. No. 15/719,281, dated Jan. 24, 2019, 36 pages.
Notice of Allowance from U.S. Appl. No. 15/721,802, dated Jul. 31, 2018, 6 pages.
Notice of Allowance from U.S. Appl. No. 15/721,802, dated Mar. 18, 2019, 23 pages.
Notice of Allowance from U.S. Appl. No. 15/721,809, dated Jun. 6, 2019, 32 pages.
Notice of Allowance from U.S. Appl. No. 15/855,964, dated Apr. 24, 2019, 15 pages.
Notice of Allowance from U.S. Appl. No. 15/859,454, dated Jun. 7, 2019, 55 pages.
Notice of Allowance from U.S. Appl. No. 15/859,466, dated May 17, 2019, 56 pages.
Notice of Allowance from U.S. Appl. No. 16/024,801, dated Jun. 5, 2019, 64 pages.
Notice of Allowance from U.S. Appl. No. 15/396,049, dated Jul. 2, 2019, 70 pages.
Notice of Allowance from U.S. Appl. No. 15/640,538, dated Jul. 3, 2019, 76 pages.

(56) References Cited

OTHER PUBLICATIONS

Notice of Allowance from U.S. Appl. No. 15/640,540, dated Jul. 1, 2019, 36 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE MICRO, vol. 34 (3), Mar. 10, 2014, pp. 120-137.
Final office action from U.S. Appl. No. 15/640,542, dated Aug. 7, 2019, 46 pages.
Non-Final office action from U.S. Appl. No. 16/443,717, dated Sep. 30, 2019, 25 pages.
Non-Final office action from U.S. Appl. No. 16/236,423, dated Aug. 21, 2019, 75 pages.
Notice of Allowance from U.S. Appl. No. 15/396,395, dated Aug. 7, 2019, 12 pages.
Notice of Allowance from U.S. Appl. No. 15/640,535, dated Aug. 21, 2019, 13 pages.
Notice of Allowance from U.S. Appl. No. 15/640,541, dated Aug. 13, 2019, 19 pages.
Notice of Allowance from U.S. Appl. No. 15/396,402, dated Sep. 16, 2019, 15 pages.
Notice of Allowance from U.S. Appl. No. 15/640,533, dated Sep. 12, 2019, 16 pages.
Notice of Allowance from U.S. Appl. No. 15/721,809, dated Sep. 5, 2019, 8 pages.
Notice of Allowance from U.S. Appl. No. 15/859,454, dated Sep. 12, 2019, 8 pages.
Notice of Allowance from U.S. Appl. No. 15/859,473, dated Sep. 24, 2019, 65 pages.
Notice of Allowance from U.S. Appl. No. 15/944,761, dated Sep. 12, 2019, 75 pages.
Notice of Allowance from U.S. Appl. No. 16/024,801, dated Sep. 12, 2019, 10 pages.
Notice of Allowance from U.S. Appl. No. 15/640,538, dated Sep. 20, 2019, 8 pages.
Notice of Allowance from U.S. Appl. No. 15/640,543, dated Jul. 29, 2019, 43 pages.
Notice of Allowance from U.S. Appl. No. 15/719,285, dated Jul. 23, 2019, 26 pages.
Parashar et al., "LEAP: A Virtual Platform Architecture for FPGAs," Intel Corporation, 2010, 6 pages.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schmit H., et al., "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference , Jan. 2011, 6 pages.
Smith A., et al., "Compiling for EDGE Architectures," Appears in the Proceedings of the 4th International Symposium on code Generation and Optimization, 2006, 11 pages.
Smith A., et al., "Dataflow Predication," 2006, In Proceedings of the 39th Annual IEEE/ACM International Symposium on Microarchitecture, 12 pages.
Suleiman A., et al., "Towards Closing the Energy Gap Between HOG and CNN Features for Embedded Vision," IEEE International Symposium of Circuits and Systems (ISCAS), May 2017, 4 pages.
Swanson S., et al., "The WaveScalar Architecture," May 2007, ACM Transactions on Computer Systems, vol. 25 (2), Article No. 4, 35 pages.
Sze V., "Designing Efficient Deep Learning Systems," in Mountain View, CA, Mar. 27-28, 2019, retrieved from https://professional.mit.edu/programs/short-programs/designing-efficient-deep-learning-systems-OC on Feb. 14, 2019, 2 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
Taylor M.B., et al., "The Raw Microprocessor: A Computational Fabric for Software Circuits and General-Purpose Programs," 2002, IEEE Micro, vol. 22 (2), pp. 25-35.
"The LLVM Compiler Infrastructure," retrieved from http://www.llvm.org/, on May 1, 2018, maintained by the llvm-admin team, 4 pages.
Truong D.N., et al., "A 167-Processor Computational Platform in 65 nm CMOS," IEEE Journal of Solid-State Circuits, Apr. 2009, vol. 44 (4), pp. 1130-1144.
"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Van De Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, The Free Encyclopedia, "Priority encoder," https://en.wikipedia.org/w/index.php?Title=Priority_encoder&oldid=746908667, revised Oct. 30, 2016, 2 pages.
Wikipedia, The Free Encyclopedia, "Truth table," Logical Implication Table, https://enwikipedia.org/wiki/Truth_table#Logical_implication, revised Nov. 18, 2016, 1 page.
Wikipedia, "TRIPS Architecture," retrieved from https://en.wikipedia.org/wiki/TRIPS_architecture on Oct. 14, 2018, 4 pages.
Williston, Roving Reporter, Intel® Embedded Alliance, "Roving Reporter: FPGA+Intel® Atom TM=Configurable Processor," Dec. 2010, 5 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al ., "A Method to Estimate the Energy Consumption of Deep Neural Networks," Asilomar Conference on Signals, Systems and Computers, Oct. 2017, 5 pages.
Yang T., et al ., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "NetAdapt: Platform-Aware Neural Network Adaptation for Mobile Applications," European Conference on Computer Vision (ECCV), Version 2, Sep. 28, 2018, 16 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.

(56) References Cited

OTHER PUBLICATIONS

Yu Z., et al., "An Asynchronous Array of Simple Processors for DSP Applications," IEEE International Solid-State Circuits Conference, ISSCC'06, Feb. 8, 2006, 10 pages.
Abandonment from U.S. Appl. No. 15/640,544, dated Mar. 20, 2018, 2 pages.
Advisory Action from U.S. Appl. No. 14/037,468, dated Aug. 11, 2017, 3 pages.
Arvind., et al., "Executing a Program on the MIT Tagged-Token Dataflow Architecture," March 1990, IEEE Transactions on Computers, vol. 39 (3), pp. 300-318.
Asanovic K., et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.
Ball T., "What's in a Region? or Computing Control Dependence Regions in Near-Linear Time for Reducible Control Flow," Dec. 1993, ACM Letters on Programming Languages and Systems, 2(1-4):1-16, 24 pages.
"Benchmarking DNN Processors," Nov. 2016, 2 pages.
Bluespec, "Bluespec System Verilog Reference Guide," Jun. 16, 2010, Bluespec, Inc, 453 pages.
Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.
Burger D., et al., "Scaling to the End of Silicon with EDGE Architectures," Jul. 12, 2004, vol. 37 (7), pp. 44-55.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Carloni L.P., et al., "The Theory of Latency Insensitive Design," Sep. 2001, IEEE Transactions on Computer-Aided Design of Integrated Circuits and Systems, vol. 20 (9), 18 pages.
Chandy K.M., et al., "Parallel Program Design: A Foundation," Addison-Wesley Publishing Company, Aug. 1988, 552 pages.
Chen Y., et al., "Eyeriss: A Spacial Architecture for Energy-Efficient Dataflow for Convolutional Neural Networks," Jun. 2016, 53 pages.
Chen Y., et al., "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.
Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.
Compton K., et al., "Reconfigurable Computing: A Survey of Systems and Software," ACM Computing Surveys, Jun. 2002, vol. 34 (2), pp. 171-210.

Cong J., et al., "Supporting Address Translation for Accelerator-Centric Architectures," Feb. 2017, IEEE International Symposium on High Performance Computer Architecture (HPCA), 12 pages.
"Coral Collaboration: Oak Ridge, Argonne, Livermore," Benchmark codes, downloaded from https://asc.llnl.gov/CORAL-benchmarks/ on Nov. 16, 2018, 6 pages.
Corrected Notice of Allowance from U.S. Appl. No. 14/037,468, dated Apr. 1, 2019, 10 pages.
Corrected Notice of Allowance from U.S. Appl. No. 14/037,468, dated May 29, 2019, 12 pages.
Corrected Notice of Allowance from U.S. Appl. No. 15/396,395, dated Jun. 7, 2019, 8 pages.
Corrected Notice of Allowance from U.S. Appl. No. 15/640,534, dated Apr. 26, 2019, 21 pages.
Corrected Notice of Allowance from U.S. Appl. No. 15/640,535, dated Feb. 13, 2019, 7 pages.
Corrected Notice of Allowance from U.S. Appl. No. 15/721,802, dated Dec. 18, 2018, 8 pages.
Corrected Notice of Allowance from U.S. Appl. No. 15/721,802, dated Jun. 12, 2019, 11 pages.
Corrected Notice of Allowance from U.S. Appl. No. 15/855,964, dated Jun. 25, 2019, 7 pages.
Corrected Notice of Allowance from U.S. Appl. No. 15/640,534, dated Jul. 2, 2019, 12 pages.
Dally W.J., et al., "Principles and Practices of Interconnection Networks," Morgan Kaufmann, 2003, 584 pages.
Dennis J.B., et al., "A Preliminary Architecture for a Basic Data-Flow Processor," 1975, In Proceedings of the 2nd Annual Symposium on Computer Architecture, pp. 125-131.
Dijkstra E.W., "Guarded Commands, Nondeterminacy and Formal Derivation of Programs," Aug. 1975, Communications of the ACM, vol. 18 (8), pp. 453-457.
Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework," Feb. 2002, Computer, vol. 35 (2), pp. 68-76.
Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at MICRO-49 Tutorial," Oct. 16, 2016, 300 pages.
Emer J., et al., "Tutorial on Hardware Architectures for Deep Neural Networks," Nov. 2016, 8 pages.
Emer J.S., et al., "A Characterization of Processor Performance in the VAX-11/780," In Proceedings of the 11th Annual International Symposium on Computer Architecture, Jun. 1984, vol. 12 (3), pp. 274-283.
Extended European Search Report for Application No. 17207172.2, dated Oct. 1, 2018, 14 pages.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
Applicant Initiated Interview Summary, U.S. Appl. No. 15/721,816, dated Mar. 10, 2020, 3 pages.
Chen Y., et al., "Eyeriss: An Energy-Efficient Reconfigurable Accelerator for Deep Convolutional Neural Networks," IEEE Journal of Solid State Circuits (JSSC), ISSCC Special Issue, Jan. 2017, vol. 52 (1), pp. 127-138.
Corrected Notice of Allowability, U.S. Appl. No. 161236,423, dated May 7, 2020, 2 pages.
Davidson, Allan, "The Intel(Registered) HyperFlex(Trademark) FPGA Architecture meets the Performance Requirements of Next-

(56) References Cited

OTHER PUBLICATIONS

Generation Systems", White Paper, A New FPGA Architecture and Leading-Edge FinFET Process Technology Promise to Meet Next-Generation System Requirements, 6 pages.
Examiner initialed interview summary, U.S. Appl. No. 16/024,802, dated Mar. 19, 2020, 1 page.
Examiner initiated interview summary, U.S. Appl. No. 16/024,802, dated Mar. 19, 2020, 1 page.
Extended European Search Report and Search Opinion, EP App. No. 17857177.4, dated Mar. 30, 2020, 7 pages.
Final Office Action, U.S. Appl. No. 15/721,816, dated Jun. 12, 2020, 15 pages.
Final Office Action, U.S. Appl. No. 15/944,546, dated May 1, 2020, 17 pages.
Final Office Action, U.S. Appl. No. 16/024,849, dated Apr. 8, 2020, 9 pages.
Final Office Action, U.S. Appl. No. 16/024,854, dated Jul. 22, 2020, 11 pages.
Final Office Action, U.S. Appl. No. 16/443,717, dated Apr. 15, 2020, 4 pages.
Hans., et al., "EIE: Efficient Inference Engine on Compressed Deep Neural Network," ISCA, May 2016, 12 pages.
International Preliminary Report on Patentability, PCT App. No. PCT/US2017/055849, dated Apr. 25, 2019, 6 pages.
International Search Report and Written Opinion, PCT App. No. PCT/US2017/055849, dated Dec. 26, 2017, 8 pages.
International Search Report and Written Opinion, PCT App. No. PCT/US2019/034358, dated Sep. 18, 2019, 10 pages.
International Search Report and Written Opinion, PCT App. No. PCT/US2019/034400, dated Sep. 19, 2019, 11 pages.
International Search Report and Written Opinion, PCT App. No. PCT/US2019/034433, dated Sep. 20, 2019, 10 pages.
International Search Report and Written Opinion, PCT App. No. PCT/US2019/034,111, dated Sep. 23, 2019, 10 pages.
Lewis D., et al., "The Stratillm 10 Highly Pipelined Fpga Architecture," FPGA'16, ACM, Feb. 21-23, 2016, pp. 159-168.
Non-Final Office Action, U.S. Appl. No. 15/640,542, dated Mar. 4, 2020, 26 pages.
Non-Final Office Action, U.S. Appl. No. 15/721,802, dated Mar. 8, 2018, 8 pages.
Non-Final Office Action, U.S. Appl. No. 15/721,816, dated Dec. 5, 2019, 20 pages.
Non-Final Office Action, U.S. Appl. No. 15/943,608, dated Mar. 12, 2020, 8 pages.
Non-Final Office Action, U.S. Appl. No. 15/944,546, dated Nov. 25, 2019, 22 pages.
Non-Final Office Action, U.S. Appl. No. 16/024,849, dated Nov. 29, 2019, 10 pages.
Non-Final Office Action, U.S. Appl. No. 16/024,854, dated Jan. 13, 2020, 10 pages.
Non-Final Office Action, U.S. Appl. No. 16/221,379, dated Mar. 31, 2020, 9 pages.
Non-Final Office Action, U.S. Appl. No. 16/458,032, dated Jul. 24, 2020, 9 pages.
Notice of Allowance, U.S. Appl. No. 15/396,038, dated Dec. 10, 2019, 2 pages.
Notice of Allowance, U.S. Appl. No. 15/396,038, dated Jan. 23, 2020, 2 pages.
Notice of Allowance, U.S. Appl. No. 15/396,038, dated Oct. 2, 2019, 9 pages.
Notice of Allowance, U.S. Appl. No. 15/396,049, dated Oct. 16, 2019, 2 pages.
Notice of Allowance, U.S. Appl. No. 15/396,402, dated Jan. 8, 2020, 2 pages.
Notice of Allowance, U.S. Appl. No. 15/396,402, dated Sep. 16, 2019, 5 pages.
Notice of Allowance, U.S. Appl. No. 15/640,533, dated Sep. 12, 2019, 2 pages.
Notice of Allowance, U.S. Appl. No. 15/640,538, dated Sep. 5, 2019, 8 pages.
Notice of Allowance, U.S. Appl. No. 15/640,543, dated Jul. 29, 2019, 6 pages.
Notice of Allowance, U.S. Appl. No. 15/719,281, dated Apr. 21, 2020, 5 pages.
Notice of Allowance, U.S. Appl. No. 15/859,454, dated Sep. 12, 2019, 2 pages.
Notice of Allowance, U.S. Appl. No. 15/944,761, dated Jan. 8, 2020, 2 pages.
Notice of Allowance, U.S. Appl. No. 15/944,761, dated Nov. 1, 2019, 2 pages.
Notice of Allowance, U.S. Appl. No. 15/944,761, dated Sep. 12, 2019, 10 pages.
Notice of Allowance, U.S. Appl. No. 16/024,849, dated Jul. 7, 2020, 8 pages.
Notice of Allowance, U.S. Appl. No. 16/236,423, dated Feb. 6, 2020, 8 pages.
Notice of Allowance, U.S. App. No. 16/370,915, dated Jun. 11, 2020, 12 pages.
Notice of Allowance, U.S. Appl. No. 16/443,717, Jul. 8, 2020, 7 pages.
Requirement for Restriction/Election, U.S. Appl. No. 16/024,802, dated Mar. 19, 2020, 8 pages.
Schauser et al., "Compiler-Controlled Multithreading for Lenient Parallel Languages", Aug. 1991, pp. 1-21.
Sze V., et al., "Efficient Processing of Deep Neural Networks: A Tutorial and Survey," Mar. 2017, 32 pages.
Yang T., et al., "Designing Energy-Efficient Convolutional Neural Networks using Energy-Aware Pruning," IEEE Cvpr, Mar. 2017, 6 pages.
Final Office Action, U.S. Appl. No. 15/640,542, dated Aug. 24, 2020, 31 pages.
Corrected Notice of Allowability, U.S. Appl. No. 16/024,802, dated Nov. 5, 2020, 7 pages.
Corrected Notice of Allowability, U.S. Appl. No. 16/024,802, dated Oct. 1, 2020, 2 pages.
Corrected Notice of Allowability, U.S. Appl. No. 16/024,849, dated Oct. 19, 2020, 5 pages.
Notice of Allowance, U.S. Appl. No. 15/941,888, dated Sep. 8, 2020, 9 pages.
Notice of Allowance, U.S. Appl. No. 15/943,608, dated Oct. 16, 2020, 8 pages.
Notice of Allowance, U.S. Appl. No. 16/024,802, dated Aug. 28, 2020, 11 pages.
Notice of Allowance, U.S. Appl. No. 16/221,379, dated Oct. 28, 2020, 7 pages.
Supplemental Notice of Allowability, U.S. Appl. No. 16/370,915, dated Sep. 23, 2020 4 pages.
European Search Report and Search Opinion, EP App. No. 20157807.7, dated Aug. 25, 2020, 6 pages.
European Search Report and Search Opinion, EP App. No. 201578093, dated Sep. 17, 2020, 7 pages.
European Search Report and Search Opinion, EP App. No. 20164075.2, dated Sep. 14, 2020, 6 pages.
International Preliminary Report on Patentability, PCT App. No. PCT/US2019/019965, dated Oct. 15, 2020, 6 pages.
International Preliminary Report on Patentability, PCT App. No. PCT/US2019/020243, dated Oct. 15, 2020, 7 pages.
International Preliminary Report on Patentability, PCT App. No. PCT/US2019/020270, dated Oct. 15, 2020, 7 pages.
International Preliminary Report on Patentability, PCT App. No. PCT/US2019/020287, dated Oct. 15, 2020, 6 pages.

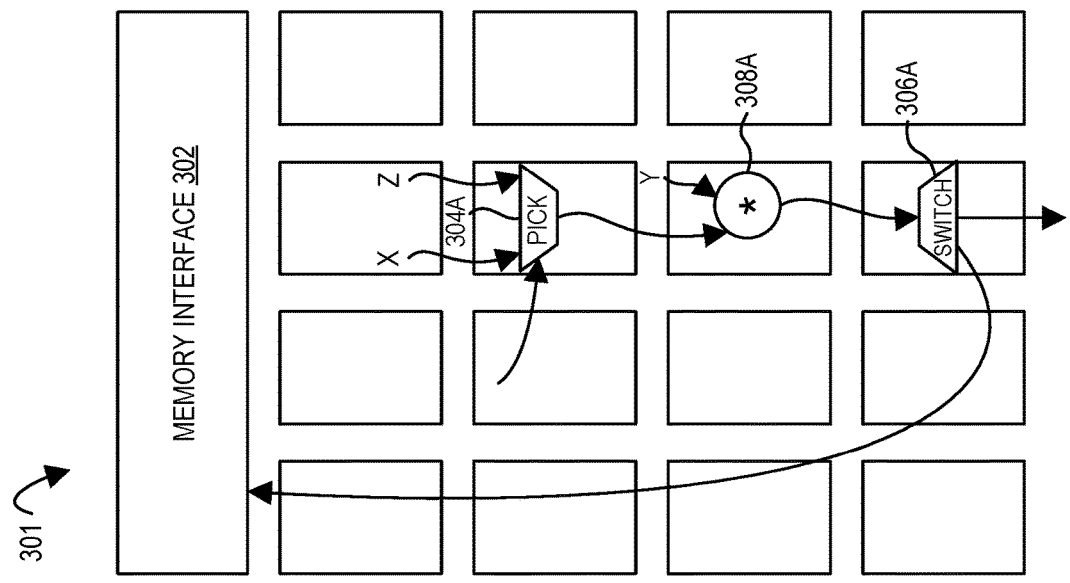
CONFIGURED CSA
FIG. 3C
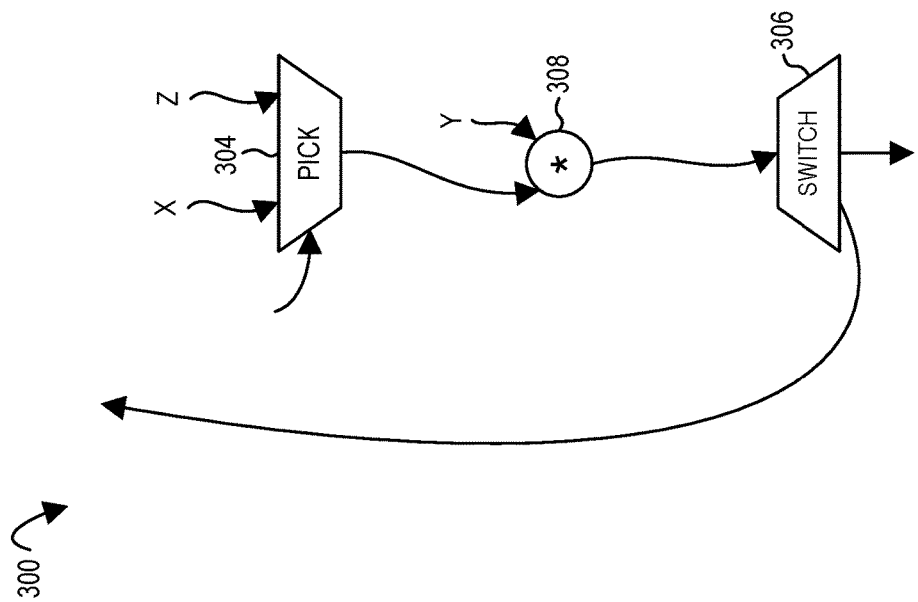
DATAFLOW GRAPH
FIG. 3B
```
void func (int x,y) {
    x = x * y;
    return x;
}
```
PROGRAM SOURCE
FIG. 3A

```
void memcpy(void *A, void *B, int N) {
    for(int index = 0; index < N; index++) {
        a[index] = b[index]
    }
}
```

1500

1502
COUPLING A SPATIAL ARRAY OF PROCESSING ELEMENTS TO A FIRST MEMORY INTERFACE CIRCUIT COMPRISING A FIRST PORT INTO A CACHE, A FIRST PLURALITY OF INPUT QUEUES TO STORE DATA FOR MEMORY REQUESTS FROM THE SPATIAL ARRAY OF PROCESSING ELEMENTS, AND A FIRST MEMORY OPERATION REGISTER, AND TO A SECOND MEMORY INTERFACE CIRCUIT COMPRISING A SECOND PORT INTO THE CACHE, A SECOND PLURALITY OF INPUT QUEUES TO STORE DATA FOR MEMORY REQUESTS FROM THE SPATIAL ARRAY OF PROCESSING ELEMENTS, AND A SECOND MEMORY OPERATION REGISTER

1504
SETTING RESPECTIVE FIRST VALUES INTO THE FIRST MEMORY OPERATION REGISTER AND THE SECOND MEMORY OPERATION REGISTER ACCORDING TO A FIRST ALLOCATION MODE TO COUPLE THE FIRST PORT TO A FIRST INPUT QUEUE OF THE FIRST PLURALITY OF INPUT QUEUES THAT STORES DATA FOR MEMORY REQUESTS FROM A FIRST PROCESSING ELEMENT OF THE SPATIAL ARRAY OF PROCESSING ELEMENTS, COUPLE THE SECOND PORT TO A FIRST INPUT QUEUE OF THE SECOND PLURALITY OF INPUT QUEUES THAT STORES DATA FOR MEMORY REQUESTS FROM A SECOND PROCESSING ELEMENT OF THE SPATIAL ARRAY OF PROCESSING ELEMENTS, AND COUPLE THE FIRST PORT TO A SECOND INPUT QUEUE OF THE FIRST PLURALITY OF INPUT QUEUES THAT STORES DATA FOR MEMORY REQUESTS FROM A THIRD PROCESSING ELEMENT OF THE SPATIAL ARRAY OF PROCESSING ELEMENTS

1506
SETTING RESPECTIVE SECOND VALUES INTO THE FIRST MEMORY OPERATION REGISTER AND THE SECOND MEMORY OPERATION REGISTER ACCORDING TO A SECOND ALLOCATION MODE TO COUPLE THE FIRST PORT TO THE FIRST INPUT QUEUE OF THE FIRST PLURALITY OF INPUT QUEUES THAT STORES DATA FOR MEMORY REQUESTS FROM THE FIRST PROCESSING ELEMENT OF THE SPATIAL ARRAY OF PROCESSING ELEMENTS, COUPLE THE SECOND PORT TO THE FIRST INPUT QUEUE OF THE SECOND PLURALITY OF INPUT QUEUES THAT STORES DATA FOR MEMORY REQUESTS FROM THE SECOND PROCESSING ELEMENT OF THE SPATIAL ARRAY OF PROCESSING ELEMENTS, AND COUPLE THE SECOND PORT TO A SECOND INPUT QUEUE OF THE SECOND PLURALITY OF INPUT QUEUES THAT STORES DATA FOR MEMORY REQUESTS FROM THE THIRD PROCESSING ELEMENT OF THE SPATIAL ARRAY OF PROCESSING ELEMENTS

FIG. 15

BASIC NETWORK CONFIGURATION

SEND: | DEST 2302A | CHANNEL 2302B | DEST 2302C | ~2302

RECV: | OUTPUTS 2304 | ~2304

NETWORK PACKET FORMAT

SEND: | TYPE 2402A | DESTINATION 2402B | CHANNEL 2402C | INPUT (E.G., PAYLOAD) 2402D | ~2402

HIGH-RADIX CONFIGURATION

SEND (E.G., SWITCH): | DEST 2502A | CHANNEL 2502B | INPUT(S) 2502C | OP 2502D | ~2502

RECV (E.G., PICK): | OUTPUT(S) 2504A | INPUT(S) 2504B | OP 2504C | ~2504

```
ld32 Rdata, Raddr
ld32 Rdata2, Raddr2
mul32 Rv0, Rdata, 17
mul32 Rv1, Rdata2, Rdata2
add32 Rres, Rv0, Rv1
st32 Raddr, Rres
ld32 Rdata3, Raddr3
```

SEQUENTIAL ASSEMBLY 4302

FIG. 43A

```
.lic .i32 data;  .lic .i64 addr;
.lic .i32 data2; .lic .i64 addr2;
.lic .i32 data3; .lic .i64 addr3;
.lic .i32 v0;    .lic .i32 v1;    .lic .i32 res
ld32 data, addr
ld32 data2, addr2
mul32 v0, data, 17
mul32 v1, data2, data2
add32 res, v0, v1
st32 addr, res, done, %ign
ld32 data3, addr3, %ign, done
```

DATAFLOW ASSEMBLY 4304

FIG. 43B

DATAFLOW GRAPH 4306

```
if (i < n)
    y = x + a;
else
    y = i + x;
```

C SOURCE CODE 4402

FIG. 44A

```
.lic .i1 test
cmplts32 test, i, n
switch32 %ign, aT, test, a
switch32 iF, %ign, test, i
switch32 xF, xT, test, x
add32 yT, xT, aT        # True path
add32 yF, iF, xF        # False path
pick32 y, test, yF, yT
add32 z, y, 1
```

DATAFLOW ASSEMBLY 4404

FIG. 44B

DATAFLOW GRAPH 4406

```
int i = 0;
int sum = 0;
do {
    sum = sum + i;
    i = i + 1;
} while (i < n);
return sum;
```

C SOURCE CODE 4502

FIG. 45A

```
# Loop control channels.
.lic .il picker
.lic .il switcher

# Offset values in picker with an initial 0.
.curr picker; .value 0; .avail 0

# Generate value of i for each loop iteration.
pick32 top_i, picker, init_i, loopback_i
add32 bottom_i, top_i, 1
switch32 %ign, loopback_i, switcher, bottom_i

# Repeat value of n for each execution of the loop.
pick32 loop_n, picker, init_n, loopback_n
switch32 %ign, loopback_n, switcher, loop_n

# Comparison at the bottom of the loop.
cmplts32 switcher, bottom_i, loop_n
mov1 picker, switcher

# Add up the sum around the loop iteration.
pick32 top_sum, picker, init_sum, loopback_sum
add32 bottom_sum, top_sum, top_i
switch32 out_sum, loopback_sum, switcher, bottom_sum
```

DATAFLOW ASSEMBLY 4504

FIG. 45B

| | INPUT QUEUE ID | OUTPUT QUEUE ID | DEPENDENCY QUEUE ID | MEMOP |
|---|---|---|---|---|
| LOGICAL | CHANNEL 0 5810 | COMPL. CHAN. 1 5820 | DEPLN: CHANNEL B0 DEPOUT: COUNTER C0 5830 | LOAD 5840 |
| BINARY (PROVISIONAL) | 001 | 010 | 1000/0001 | 00 |

| LOGICAL | INPUT QUEUE ID | OUTPUT QUEUE ID | DEPENDENCY QUEUE ID | OPERATION TYPE |
|---|---|---|---|---|
| | CHANNEL 0 | COMPL. CHAN. 1 | DEPLN: COUNTER C0<br>DEPOUT: COUNTER C1 | LOAD |

↑ 7102

| LOGICAL | | | | |
|---|---|---|---|---|
| | CHANNEL 1<br>CHANNEL 2 | NONE | DEPLN: COUNTER C1<br>DEPOUT: COUNTER C0 | STORE |

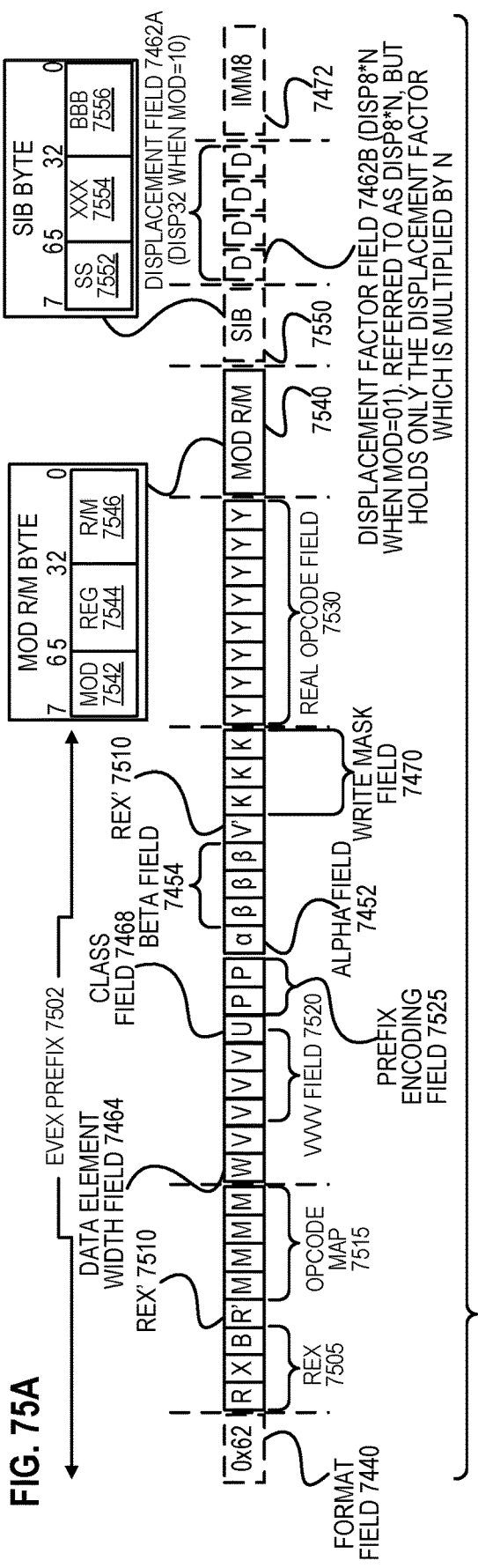
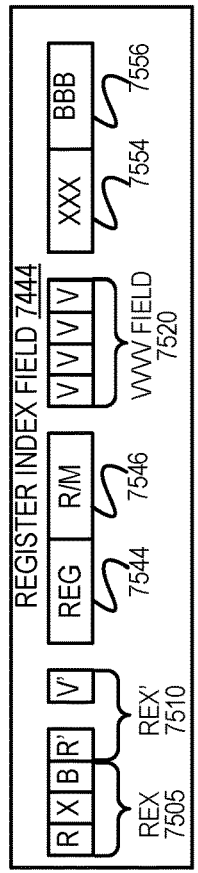
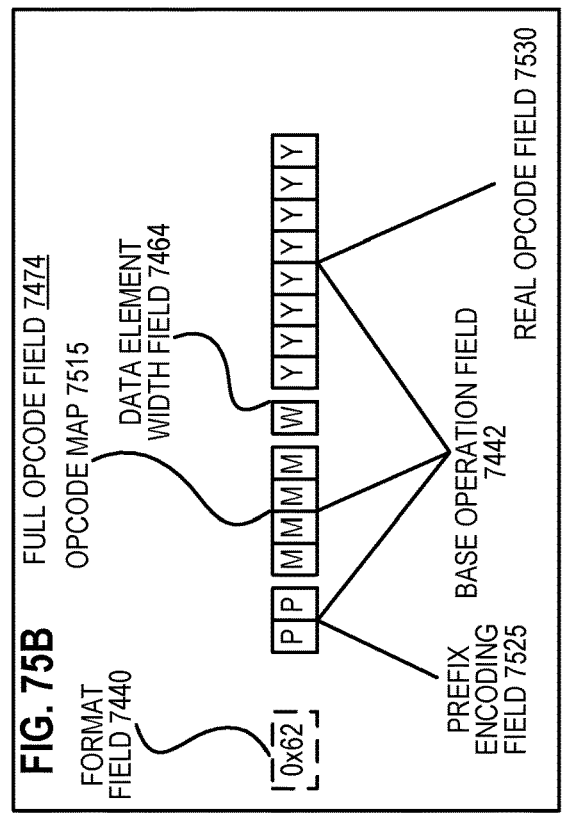
FIG. 75A
FIG. 75B
FIG. 75C

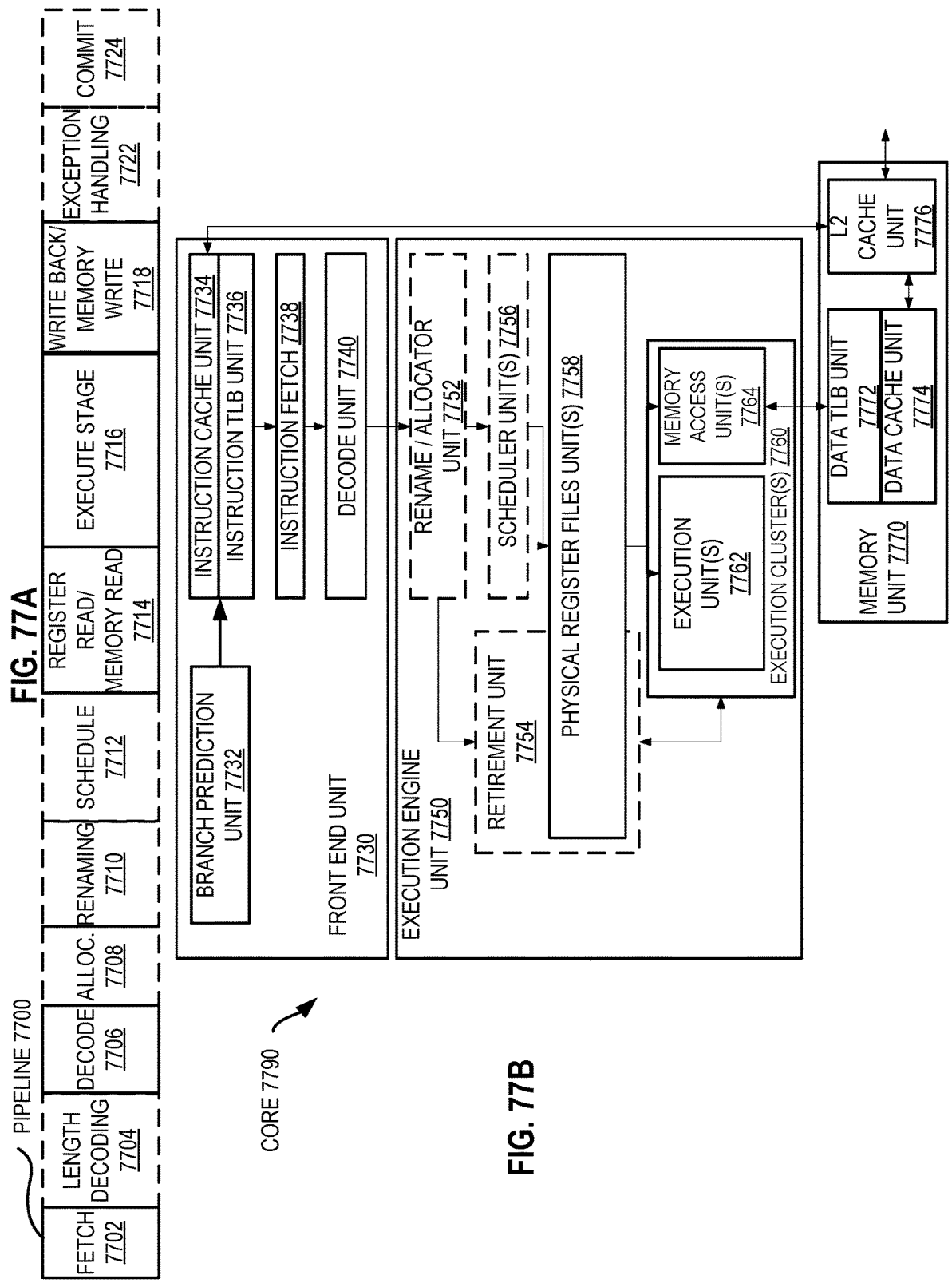

APPARATUSES, METHODS, AND SYSTEMS FOR MEMORY INTERFACE CIRCUIT ALLOCATION IN A CONFIGURABLE SPATIAL ACCELERATOR

STATEMENT REGARDING FEDERALLY SPONSORED RESEARCH AND DEVELOPMENT

This invention was made with Government support under contract number H98230-13-D-0124 awarded by the Department of Defense. The Government has certain rights in this invention.

TECHNICAL FIELD

The disclosure relates generally to electronics, and, more specifically, an embodiment of the disclosure relates to allocation circuitry for memory interface circuits of a configurable spatial accelerator.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3A illustrates a program source according to embodiments of the disclosure.

FIG. 3B illustrates a dataflow graph for the program source of FIG. 3A according to embodiments of the disclosure.

FIG. 3C illustrates an accelerator with a plurality of processing elements configured to execute the dataflow graph of FIG. 3B according to embodiments of the disclosure.

FIG. 15 illustrates a flow diagram according to embodiments of the disclosure.

FIG. 43A illustrates sequential assembly code according to embodiments of the disclosure.

FIG. 43B illustrates dataflow assembly code for the sequential assembly code of FIG. 43A according to embodiments of the disclosure.

FIG. 44A illustrates C source code according to embodiments of the disclosure.

FIG. 44B illustrates dataflow assembly code for the C source code of FIG. 44A according to embodiments of the disclosure.

FIG. 45A illustrates C source code according to embodiments of the disclosure.

FIG. 45B illustrates dataflow assembly code for the C source code of FIG. 45A according to embodiments of the disclosure.

FIG. 69 is a block diagram of an exemplary load operation, both logical and in binary according to embodiments of the disclosure.

FIG. 71A is a block diagram of exemplary memory arguments for a load operation and for a store operation according to embodiments of the disclosure.

FIG. 75A is a block diagram illustrating fields for the generic vector friendly instruction formats in FIGS. 74A and 74B according to embodiments of the disclosure.

FIG. 75B is a block diagram illustrating the fields of the specific vector friendly instruction format in FIG. 75A that make up a full opcode field according to one embodiment of the disclosure.

FIG. 75C is a block diagram illustrating the fields of the specific vector friendly instruction format in FIG. 75A that make up a register index field according to one embodiment of the disclosure.

FIG. 77A is a block diagram illustrating both an exemplary in-order pipeline and an exemplary register renaming, out-of-order issue/execution pipeline according to embodiments of the disclosure.

FIG. 77B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
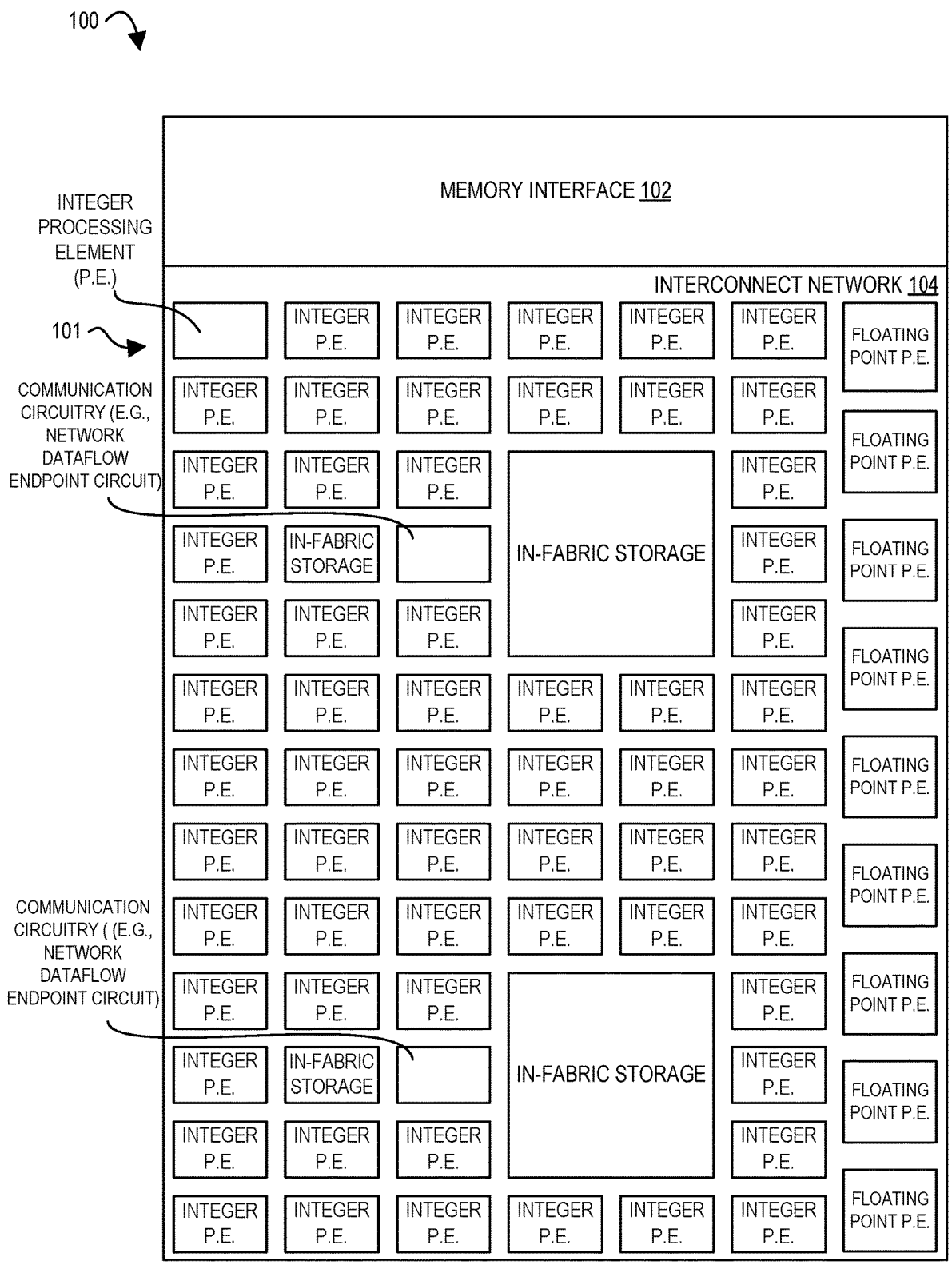
FIG. 1 illustrates an accelerator tile according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a blend operation to input a plurality of vectors elements and output a vector with a blended plurality of elements. In certain embodiments, multiple operations are accomplished with the execution of a single instruction.

Exascale performance, e.g., as defined by the Department of Energy, may require system-level floating point performance to exceed $10^{18}$ floating point operations per second (exaFLOPs) or more within a given (e.g., 20 MW) power budget. Certain embodiments herein are directed to a spatial array of processing elements (e.g., a configurable spatial accelerator (CSA)) that targets high performance computing (HPC), for example, of a processor. Certain embodiments herein of a spatial array of processing elements (e.g., a CSA) target the direct execution of a dataflow graph to yield a computationally dense yet energy-efficient spatial microarchitecture which far exceeds conventional roadmap architectures. Certain embodiments herein overlay (e.g., high-radix) dataflow operations on a communications network, e.g., in addition to the communications network's routing of data between the processing elements, memory, etc. and/or the communications network performing other communications (e.g., not data processing) operations. Certain embodiments herein are directed to a communications network (e.g., a packet switched network) of a (e.g., coupled to) spatial array of processing elements (e.g., a CSA) to perform certain dataflow operations, e.g., in addition to the communications network routing data between the processing elements, memory, etc. or the communications network performing other communications operations. Certain embodiments herein are directed to network dataflow endpoint circuits that (e.g., each) perform (e.g., a portion or all) a dataflow operation or operations, for example, a pick or switch dataflow operation, e.g., of a dataflow graph. Certain embodiments herein include augmented network endpoints (e.g., network dataflow endpoint circuits) to support the control for (e.g., a plurality of or a subset of) dataflow operation(s), e.g., utilizing the network endpoints to perform a (e.g., dataflow) operation instead of a processing element (e.g., core) or arithmetic-logic unit (e.g. to perform arithmetic and logic operations) performing that (e.g., dataflow) operation. In one embodiment, a network dataflow endpoint circuit is separate from a spatial array (e.g. an interconnect or fabric thereof) and/or processing elements.

Below also includes a description of the architectural philosophy of embodiments of a spatial array of processing elements (e.g., a CSA) and certain features thereof. As with any revolutionary architecture, programmability may be a risk. To mitigate this issue, embodiments of the CSA architecture have been co-designed with a compilation tool chain, which is also discussed below.

INTRODUCTION

Exascale computing goals may require enormous system-level floating point performance (e.g., 1 ExaFLOPs) within an aggressive power budget (e.g., 20 MW). However, simultaneously improving the performance and energy efficiency of program execution with classical von Neumann architectures has become difficult: out-of-order scheduling, simultaneous multi-threading, complex register files, and other structures provide performance, but at high energy cost. Certain embodiments herein achieve performance and energy requirements simultaneously. Exascale computing power-performance targets may demand both high throughput and low energy consumption per operation. Certain embodiments herein provide this by providing for large numbers of low-complexity, energy-efficient processing (e.g., computational) elements which largely eliminate the control overheads of previous processor designs. Guided by this observation, certain embodiments herein include a spatial array of processing elements, for example, a configurable spatial accelerator (CSA), e.g., comprising an array of processing elements (PEs) connected by a set of lightweight, back-pressured (e.g., communication) networks. One example of a CSA tile is depicted in FIG. 1. Certain embodiments of processing (e.g., compute) elements are dataflow operators, e.g., multiple of a dataflow operator that only processes input data when both (i) the input data has arrived at the dataflow operator and (ii) there is space available for storing the output data, e.g., otherwise no processing is occurring. Certain embodiments (e.g., of an accelerator or CSA) do not utilize a triggered instruction.

FIG. 1 illustrates an accelerator tile 100 embodiment of a spatial array of processing elements according to embodiments of the disclosure. Accelerator tile 100 may be a portion of a larger tile. Accelerator tile 100 executes a dataflow graph or graphs. A dataflow graph may generally refer to an explicitly parallel program description which arises in the compilation of sequential codes. Certain embodiments herein (e.g., CSAs) allow dataflow graphs to be directly configured onto the CSA array, for example, rather than being transformed into sequential instruction streams. Certain embodiments herein allow a first (e.g., type of) dataflow operation to be performed by one or more processing elements (PEs) of the spatial array and, additionally or alternatively, a second (e.g., different, type of) dataflow operation to be performed by one or more of the network communication circuits (e.g., endpoints) of the spatial array.

The derivation of a dataflow graph from a sequential compilation flow allows embodiments of a CSA to support familiar programming models and to directly (e.g., without using a table of work) execute existing high performance computing (HPC) code. CSA processing elements (PEs) may be energy efficient. In FIG. 1, memory interface 102 may couple to a memory (e.g., memory 202 in FIG. 2) to allow accelerator tile 100 to access (e.g., load and/store) data to the (e.g., off die) memory. Depicted accelerator tile 100 is a heterogeneous array comprised of several kinds of PEs coupled together via an interconnect network 104. Accelerator tile 100 may include one or more of integer arithmetic PEs, floating point arithmetic PEs, communication circuitry (e.g., network dataflow endpoint circuits), and in-fabric storage, e.g., as part of spatial array of processing elements 101. Dataflow graphs (e.g., compiled dataflow graphs) may be overlaid on the accelerator tile 100 for execution. In one embodiment, for a particular dataflow graph, each PE handles only one or two (e.g., dataflow) operations of the graph. The array of PEs may be heterogeneous, e.g., such that no PE supports the full CSA dataflow architecture and/or one or more PEs are programmed (e.g., customized) to perform only a few, but highly efficient operations. Certain embodiments herein thus yield a processor or accelerator having an array of processing elements that is computationally dense compared to roadmap architectures and yet achieves approximately an order-of-magnitude gain in energy efficiency and performance relative to existing HPC offerings.

Certain embodiments herein provide for performance increases from parallel execution within a (e.g., dense) spatial array of processing elements (e.g., CSA) where each PE and/or network dataflow endpoint circuit utilized may perform its operations simultaneously, e.g., if input data is available. Efficiency increases may result from the efficiency of each PE and/or network dataflow endpoint circuit, e.g., where each PE's operation (e.g., behavior) is fixed once per configuration (e.g., mapping) step and execution occurs on local data arrival at the PE, e.g., without considering other fabric activity, and/or where each network dataflow endpoint circuit's operation (e.g., behavior) is variable (e.g., not fixed) when configured (e.g., mapped). In certain embodiments, a PE and/or network dataflow endpoint circuit is (e.g., each a single) dataflow operator, for example, a dataflow operator that only operates on input data when both (i) the input data has arrived at the dataflow operator and (ii) there is space available for storing the output data, e.g., otherwise no operation is occurring.

Certain embodiments herein include a spatial array of processing elements as an energy-efficient and high-performance way of accelerating user applications. In one embodiment, applications are mapped in an extremely parallel manner. For example, inner loops may be unrolled multiple times to improve parallelism. This approach may provide high performance, e.g., when the occupancy (e.g., use) of the unrolled code is high. However, if there are less used code paths in the loop body unrolled (for example, an exceptional code path like floating point de-normalized mode) then (e.g., fabric area of) the spatial array of processing elements may be wasted and throughput consequently lost.

One embodiment herein to reduce pressure on (e.g., fabric area of) the spatial array of processing elements (e.g., in the case of underutilized code segments) is time multiplexing. In this mode, a single instance of the less used (e.g., colder) code may be shared among several loop bodies, for example, analogous to a function call in a shared library. In one embodiment, spatial arrays (e.g., of processing elements) support the direct implementation of multiplexed codes. However, e.g., when multiplexing or demultiplexing in a spatial array involves choosing among many and distant targets (e.g., sharers), a direct implementation using dataflow operators (e.g., using the processing elements) may be inefficient in terms of latency, throughput, implementation area, and/or energy. Certain embodiments herein describe hardware mechanisms (e.g., network circuitry) supporting (e.g., high-radix) multiplexing or demultiplexing. Certain embodiments herein (e.g., of network dataflow endpoint circuits) permit the aggregation of many targets (e.g., sharers) with little hardware overhead or performance impact. Certain embodiments herein allow for compiling of (e.g., legacy) sequential codes to parallel architectures in a spatial array.

In one embodiment, a plurality of network dataflow endpoint circuits combine as a single dataflow operator, for example, as discussed in reference to FIG. 21 below. As non-limiting examples, certain (for example, high (e.g., 4-6) radix) dataflow operators are listed below.

An embodiment of a "Pick" dataflow operator is to select data (e.g., a token) from a plurality of input channels and provide that data as its (e.g., single) output according to control data. Control data for a Pick may include an input selector value. In one embodiment, the selected input channel is to have its data (e.g., token) removed (e.g., discarded), for example, to complete the performance of that dataflow operation (or its portion of a dataflow operation). In one embodiment, additionally, those non-selected input channels are also to have their data (e.g., token) removed (e.g., discarded), for example, to complete the performance of that dataflow operation (or its portion of a dataflow operation).

An embodiment of a "PickSingleLeg" dataflow operator is to select data (e.g., a token) from a plurality of input channels and provide that data as its (e.g., single) output according to control data, but in certain embodiments, the non-selected input channels are ignored, e.g., those non-selected input channels are not to have their data (e.g., token) removed (e.g., discarded), for example, to complete the performance of that dataflow operation (or its portion of a dataflow operation). Control data for a PickSingleLeg may include an input selector value. In one embodiment, the selected input channel is also to have its data (e.g., token) removed (e.g., discarded), for example, to complete the performance of that dataflow operation (or its portion of a dataflow operation).

An embodiment of a "PickAny" dataflow operator is to select the first available (e.g., to the circuit performing the operation) data (e.g., a token) from a plurality of input channels and provide that data as its (e.g., single) output. In one embodiment, PickSingleLeg is also to output the index (e.g., indicating which of the plurality of input channels) had its data selected. In one embodiment, the selected input channel is to have its data (e.g., token) removed (e.g., discarded), for example, to complete the performance of that dataflow operation (or its portion of a dataflow operation). In certain embodiments, the non-selected input channels (e.g., with or without input data) are ignored, e.g., those non-selected input channels are not to have their data (e.g., token) removed (e.g., discarded), for example, to complete the performance of that dataflow operation (or its portion of a dataflow operation). Control data for a PickAny may include a value corresponding to the PickAny, e.g., without an input selector value.

An embodiment of a "Switch" dataflow operator is to steer (e.g., single) input data (e.g., a token) so as to provide that input data to one or a plurality of (e.g., less than all) outputs according to control data. Control data for a Switch may include an output(s) selector value or values. In one embodiment, the input data (e.g., from an input channel) is to have its data (e.g., token) removed (e.g., discarded), for example, to complete the performance of that dataflow operation (or its portion of a dataflow operation).

An embodiment of a "SwitchAny" dataflow operator is to steer (e.g., single) input data (e.g., a token) so as to provide that input data to one or a plurality of (e.g., less than all) outputs that may receive that data, e.g., according to control data. In one embodiment, SwitchAny may provide the input data to any coupled output channel that has availability (e.g., available storage space) in its ingress buffer, e.g., network ingress buffer in FIG. 22. Control data for a SwitchAny may include a value corresponding to the SwitchAny, e.g., without an output(s) selector value or values. In one embodiment, the input data (e.g., from an input channel) is to have its data (e.g., token) removed (e.g., discarded), for example, to complete the performance of that dataflow operation (or its portion of a dataflow operation). In one embodiment, SwitchAny is also to output the index (e.g., indicating which of the plurality of output channels) that it provided (e.g., sent) the input data to. SwitchAny may be utilized to manage replicated sub-graphs in a spatial array, for example, an unrolled loop.

Certain embodiments herein thus provide paradigm-shifting levels of performance and tremendous improvements in energy efficiency across a broad class of existing single-stream and parallel programs, e.g., all while preserving familiar HPC programming models. Certain embodiments herein may target HPC such that floating point energy efficiency is extremely important. Certain embodiments herein not only deliver compelling improvements in performance and reductions in energy, they also deliver these gains to existing HPC programs written in mainstream HPC languages and for mainstream HPC frameworks. Certain embodiments of the architecture herein (e.g., with compilation in mind) provide several extensions in direct support of the control-dataflow internal representations generated by modern compilers. Certain embodiments herein are direct to a CSA dataflow compiler, e.g., which can accept C, C++, and Fortran programming languages, to target a CSA architecture.

Figure 2:
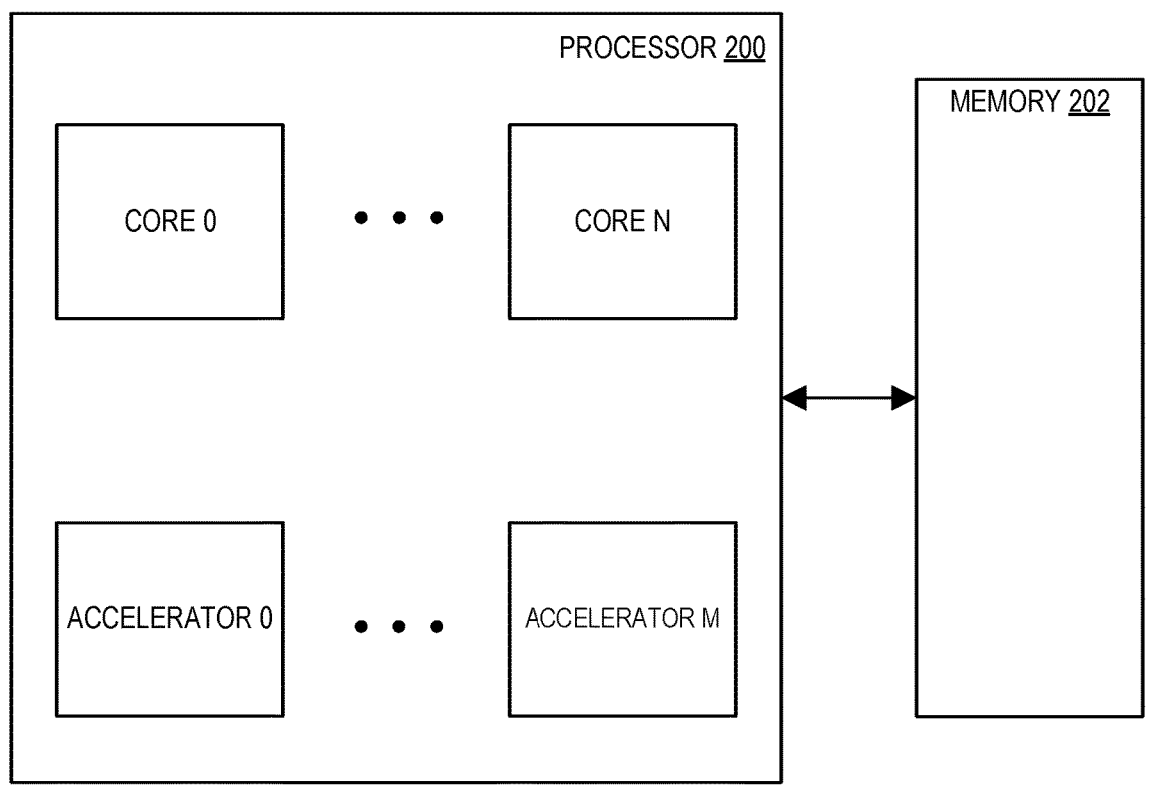
FIG. 2 illustrates a hardware processor coupled to a memory according to embodiments of the disclosure.

FIG. 2 illustrates a hardware processor 200 coupled to (e.g., connected to) a memory 202 according to embodiments of the disclosure. In one embodiment, hardware processor 200 and memory 202 are a computing system 201. In certain embodiments, one or more of accelerators is a CSA according to this disclosure. In certain embodiments, one or more of the cores in a processor are those cores disclosed herein. Hardware processor 200 (e.g., each core thereof) may include a hardware decoder (e.g., decode unit) and a hardware execution unit. Hardware processor 200 may include registers. Note that the figures herein may not depict all data communication couplings (e.g., connections). One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. Depicted hardware processor 200 includes a plurality of cores (O to N, where N may be 1 or more) and hardware accelerators (O to M, where M may be 1 or more) according to embodiments of the disclosure. Hardware processor 200 (e.g., accelerator(s) and/or core(s) thereof) may be coupled to memory 202 (e.g., data storage device). Hardware decoder (e.g., of core) may receive an (e.g., single) instruction (e.g., macro-instruction) and decode the instruction, e.g., into micro-instructions and/or micro-operations. Hardware execution unit (e.g., of core) may execute the decoded instruction (e.g., macro-instruction) to perform an operation or operations.

Section 1 below discloses embodiments of CSA architecture. In particular, novel embodiments of integrating memory within the dataflow execution model are disclosed. Section 2 delves into the microarchitectural details of embodiments of a CSA. In one embodiment, the main goal of a CSA is to support compiler produced programs. Section 3 below examines embodiments of a CSA compilation tool chain. The advantages of embodiments of a CSA are compared to other architectures in the execution of compiled codes in Section 4. Finally the performance of embodiments of a CSA microarchitecture is discussed in Section 5, further CSA details are discussed in Section 6, and a summary is provided in Section 7.

1. CSA Architecture

The goal of certain embodiments of a CSA is to rapidly and efficiently execute programs, e.g., programs produced by compilers. Certain embodiments of the CSA architecture provide programming abstractions that support the needs of compiler technologies and programming paradigms. Embodiments of the CSA execute dataflow graphs, e.g., a program manifestation that closely resembles the compiler's own internal representation (IR) of compiled programs. In this model, a program is represented as a dataflow graph comprised of nodes (e.g., vertices) drawn from a set of architecturally-defined dataflow operators (e.g., that encompass both computation and control operations) and edges which represent the transfer of data between dataflow operators. Execution may proceed by injecting dataflow tokens (e.g., that are or represent data values) into the dataflow graph. Tokens may flow between and be transformed at each node (e.g., vertex), for example, forming a complete computation. A sample dataflow graph and its derivation from high-level source code is shown in FIGS. 3A-3C, and FIG. 5 shows an example of the execution of a dataflow graph.

Embodiments of the CSA are configured for dataflow graph execution by providing exactly those dataflow-graph-execution supports required by compilers. In one embodiment, the CSA is an accelerator (e.g., an accelerator in FIG. 2) and it does not seek to provide some of the necessary but infrequently used mechanisms available on general purpose processing cores (e.g., a core in FIG. 2), such as system calls. Therefore, in this embodiment, the CSA can execute many codes, but not all codes. In exchange, the CSA gains significant performance and energy advantages. To enable the acceleration of code written in commonly used sequential languages, embodiments herein also introduce several novel architectural features to assist the compiler. One particular novelty is CSA's treatment of memory, a subject which has been ignored or poorly addressed previously. Embodiments of the CSA are also unique in the use of dataflow operators, e.g., as opposed to lookup tables (LUTs), as their fundamental architectural interface.

Turning to embodiments of the CSA, dataflow operators are discussed next.

1.1 Dataflow Operators

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a "switch" operator, e.g., which operates as a channel demultiplexor (e.g., outputting a single channel from two or more logical input channels). These operators may enable a compiler to implement control paradigms such as conditional expressions. Certain embodiments of a CSA may include a limited dataflow operator set (e.g., to relatively small number of operations) to yield dense and energy efficient PE microarchitectures. Certain embodiments may include dataflow operators for complex operations that are common in HPC code. The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

FIG. 3A illustrates a program source according to embodiments of the disclosure. Program source code includes a multiplication function (func). FIG. 3B illustrates a dataflow graph 300 for the program source of FIG. 3A according to embodiments of the disclosure. Dataflow graph 300 includes a pick node 304, switch node 306, and multiplication node 308. A buffer may optionally be included along one or more of the communication paths. Depicted dataflow graph 300 may perform an operation of selecting input X with pick node 304, multiplying X by Y (e.g., multiplication node 308), and then outputting the result from the left output of the switch node 306. FIG. 3C illustrates an accelerator (e.g., CSA) with a plurality of processing elements 301 configured to execute the dataflow graph of FIG. 3B according to embodiments of the disclosure. More particularly, the dataflow graph 300 is overlaid into the array of processing elements 301 (e.g., and the (e.g., interconnect) network(s) therebetween), for example, such that each node of the dataflow graph 300 is represented as a dataflow operator in the array of processing elements 301. For example, certain dataflow operations may be achieved with a processing element and/or certain dataflow operations may be achieved with a communications network (e.g., a network dataflow endpoint circuit thereof). For example, a Pick, PickSingleLeg, PickAny, Switch, and/or SwitchAny operation may be achieved with one or more components of a communications network (e.g., a network dataflow endpoint circuit thereof), e.g., in contrast to a processing element.

In one embodiment, one or more of the processing elements in the array of processing elements 301 is to access memory through memory interface 302. In one embodiment, pick node 304 of dataflow graph 300 thus corresponds (e.g., is represented by) to pick operator 304A, switch node 306 of dataflow graph 300 thus corresponds (e.g., is represented by) to switch operator 306A, and multiplier node 308 of dataflow graph 300 thus corresponds (e.g., is represented by) to multiplier operator 308A. Another processing element and/or a flow control path network may provide the control signals (e.g., control tokens) to the pick operator 304A and switch operator 306A to perform the operation in FIG. 3A. In one embodiment, array of processing elements 301 is configured to execute the dataflow graph 300 of FIG. 3B before execution begins. In one embodiment, compiler performs the conversion from FIG. 3A-3B. In one embodiment, the input of the dataflow graph nodes into the array of processing elements logically embeds the dataflow graph into the array of processing elements, e.g., as discussed further below, such that the input/output paths are configured to produce the desired result.

1.2 Latency Insensitive Channels

Communications arcs are the second major component of the dataflow graph. Certain embodiments of a CSA describes these arcs as latency insensitive channels, for example, in-order, back-pressured (e.g., not producing or sending output until there is a place to store the output), point-to-point communications channels. As with dataflow operators, latency insensitive channels are fundamentally asynchronous, giving the freedom to compose many types of networks to implement the channels of a particular graph. Latency insensitive channels may have arbitrarily long latencies and still faithfully implement the CSA architecture. However, in certain embodiments there is strong incentive in terms of performance and energy to make latencies as small as possible. Section 2.2 herein discloses a network microarchitecture in which dataflow graph channels are implemented in a pipelined fashion with no more than one cycle of latency. Embodiments of latency-insensitive channels provide a critical abstraction layer which may be leveraged with the CSA architecture to provide a number of runtime services to the applications programmer. For example, a CSA may leverage latency-insensitive channels in the implementation of the CSA configuration (the loading of a program onto the CSA array).

Figure 4:
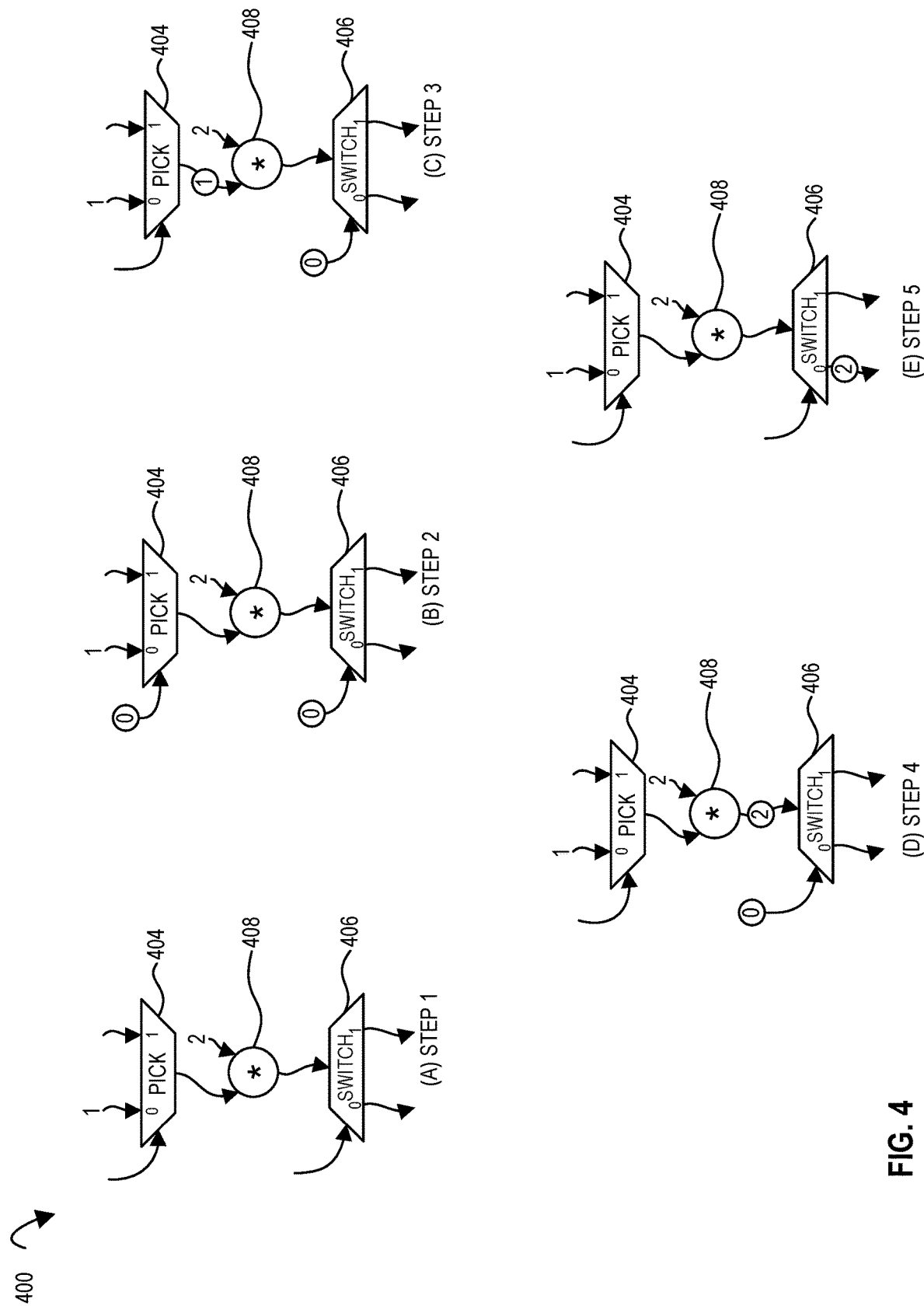
FIG. 4 illustrates an example execution of a dataflow graph according to embodiments of the disclosure.

FIG. 4 illustrates an example execution of a dataflow graph 400 according to embodiments of the disclosure. At step 1, input values (e.g., 1 for X in FIG. 3B and 2 for Y in FIG. 3B) may be loaded in dataflow graph 400 to perform a 1*2 multiplication operation. One or more of the data input values may be static (e.g., constant) in the operation (e.g., 1 for X and 2 for Y in reference to FIG. 3B) or updated during the operation. At step 2, a processing element (e.g., on a flow control path network) or other circuit outputs a zero to control input (e.g., multiplexer control signal) of pick node 404 (e.g., to source a one from port "0" to its output) and outputs a zero to control input (e.g., multiplexer control signal) of switch node 406 (e.g., to provide its input out of port "0" to a destination (e.g., a downstream processing element). At step 3, the data value of 1 is output from pick node 404 (e.g., and consumes its control signal "0" at the pick node 404) to multiplier node 408 to be multiplied with the data value of 2 at step 4. At step 4, the output of multiplier node 408 arrives at switch node 406, e.g., which causes switch node 406 to consume a control signal "0" to output the value of 2 from port "0" of switch node 406 at step 5. The operation is then complete. A CSA may thus be programmed accordingly such that a corresponding dataflow operator for each node performs the operations in FIG. 4. Although execution is serialized in this example, in principle all dataflow operations may execute in parallel. Steps are used in FIG. 4 to differentiate dataflow execution from any physical microarchitectural manifestation. In one embodiment a downstream processing element is to send a signal (or not send a ready signal) (for example, on a flow control path network) to the switch 406 to stall the output from the switch 406, e.g., until the downstream processing element is ready (e.g., has storage room) for the output.

1.3 Memory

Dataflow architectures generally focus on communication and data manipulation with less attention paid to state. However, enabling real software, especially programs written in legacy sequential languages, requires significant attention to interfacing with memory. Certain embodiments of a CSA use architectural memory operations as their primary interface to (e.g., large) stateful storage. From the perspective of the dataflow graph, memory operations are similar to other dataflow operations, except that they have the side effect of updating a shared store. In particular, memory operations of certain embodiments herein have the same semantics as every other dataflow operator, for example, they "execute" when their operands, e.g., an address, are available and, after some latency, a response is produced. Certain embodiments herein explicitly decouple the operand input and result output such that memory operators are naturally pipelined and have the potential to produce many simultaneous outstanding requests, e.g., making them exceptionally well suited to the latency and bandwidth characteristics of a memory subsystem. Embodiments of a CSA provide basic memory operations such as load, which takes an address channel and populates a response channel with the values corresponding to the addresses, and a store. Embodiments of a CSA may also provide more advanced operations such as in-memory atomics and consistency operators. These operations may have similar semantics to their von Neumann counterparts. Embodiments of a CSA may accelerate existing programs described using sequential languages such as C and Fortran. A consequence of supporting these language models is addressing program memory order, e.g., the serial ordering of memory operations typically prescribed by these languages.

Figure 5:
FIG. 5 illustrates a program source according to embodiments of the disclosure.

FIG. 5 illustrates a program source (e.g., C code) 500 according to embodiments of the disclosure. According to the memory semantics of the C programming language, memory copy (memcpy) should be serialized. However, memcpy may be parallelized with an embodiment of the CSA if arrays A and B are known to be disjoint. FIG. 5 further illustrates the problem of program order. In general, compilers cannot prove that array A is different from array B, e.g., either for the same value of index or different values of index across loop bodies. This is known as pointer or memory aliasing. Since compilers are to generate statically correct code, they are usually forced to serialize memory accesses. Typically, compilers targeting sequential von Neumann architectures use instruction ordering as a natural means of enforcing program order. However, embodiments of the CSA have no notion of instruction or instruction-based program ordering as defined by a program counter. In certain embodiments, incoming dependency tokens, e.g., which contain no architecturally visible information, are like all other dataflow tokens and memory operations may not execute until they have received a dependency token. In certain embodiments, memory operations produce an outgoing dependency token once their operation is visible to all logically subsequent, dependent memory operations. In certain embodiments, dependency tokens are similar to other dataflow tokens in a dataflow graph. For example, since memory operations occur in conditional contexts, dependency tokens may also be manipulated using control operators described in Section 1.1, e.g., like any other tokens. Dependency tokens may have the effect of serializing memory accesses, e.g., providing the compiler a means of architecturally defining the order of memory accesses.

1.4 Runtime Services

A primary architectural considerations of embodiments of the CSA involve the actual execution of user-level programs, but it may also be desirable to provide several support mechanisms which underpin this execution. Chief among these are configuration (in which a dataflow graph is loaded into the CSA), extraction (in which the state of an executing graph is moved to memory), and exceptions (in which mathematical, soft, and other types of errors in the fabric are detected and handled, possibly by an external entity). Section 2.9 below discusses the properties of a latency-insensitive dataflow architecture of an embodiment of a CSA to yield efficient, largely pipelined implementations of these functions. Conceptually, configuration may load the state of a dataflow graph into the interconnect (and/or communications network (e.g., a network dataflow endpoint circuit thereof)) and processing elements (e.g., fabric), e.g., generally from memory. During this step, all structures in the CSA may be loaded with a new dataflow graph and any dataflow tokens live in that graph, for example, as a consequence of a context switch. The latency-insensitive semantics of a CSA may permit a distributed, asynchronous initialization of the fabric, e.g., as soon as PEs are configured, they may begin execution immediately. Unconfigured PEs may backpressure their channels until they are configured, e.g., preventing communications between configured and unconfigured elements. The CSA configuration may be partitioned into privileged and user-level state. Such a two-level partitioning may enable primary configuration of the fabric to occur without invoking the operating system. During one embodiment of extraction, a logical view of the dataflow graph is captured and committed into memory, e.g., including all live control and dataflow tokens and state in the graph.

Extraction may also play a role in providing reliability guarantees through the creation of fabric checkpoints. Exceptions in a CSA may generally be caused by the same events that cause exceptions in processors, such as illegal operator arguments or reliability, availability, and serviceability (RAS) events. In certain embodiments, exceptions are detected at the level of dataflow operators, for example, checking argument values or through modular arithmetic schemes. Upon detecting an exception, a dataflow operator (e.g., circuit) may halt and emit an exception message, e.g., which contains both an operation identifier and some details of the nature of the problem that has occurred. In one embodiment, the dataflow operator will remain halted until it has been reconfigured. The exception message may then be communicated to an associated processor (e.g., core) for service, e.g., which may include extracting the graph for software analysis.

1.5 Tile-Level Architecture

Figure 6:
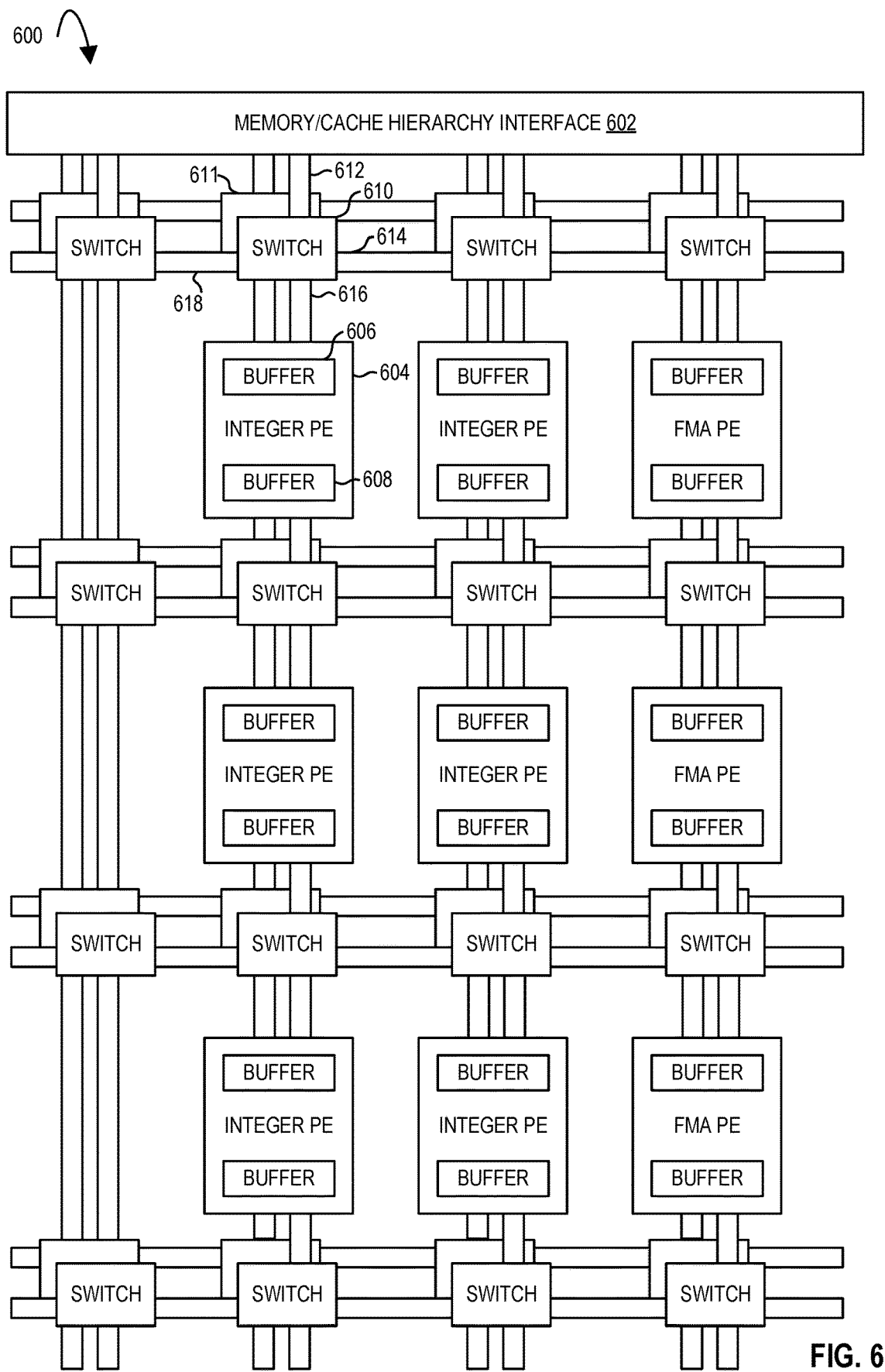
FIG. 6 illustrates an accelerator tile comprising an array of processing elements according to embodiments of the disclosure.
Figure 9:
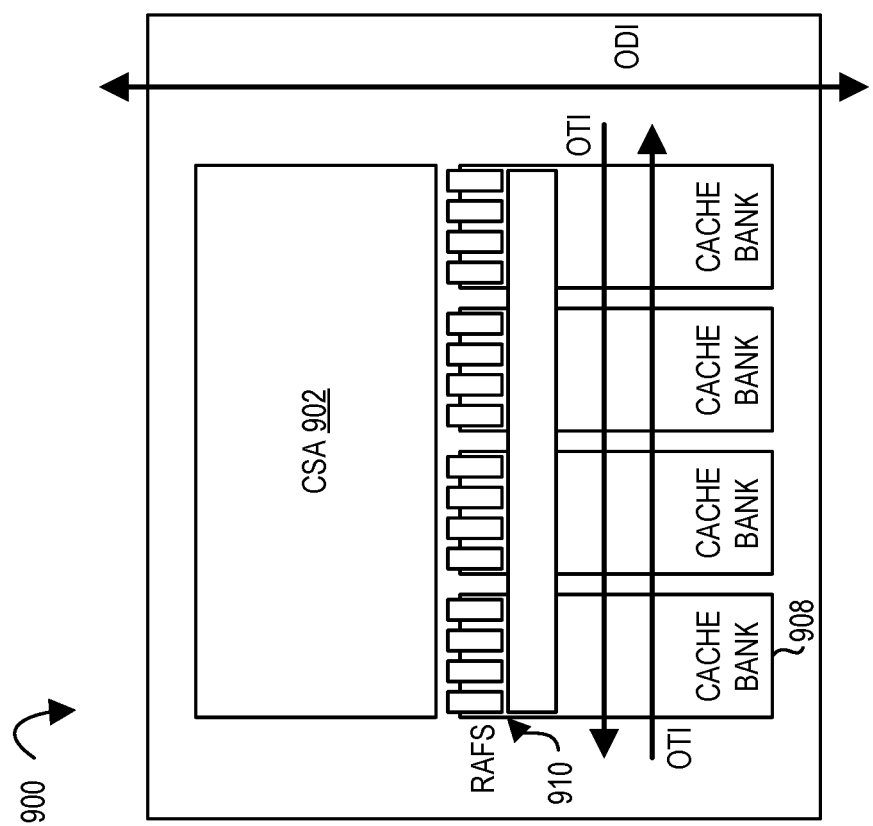
FIG. 9 illustrates a hardware processor tile comprising an accelerator according to embodiments of the disclosure.

Embodiments of the CSA computer architectures (e.g., targeting HPC and datacenter uses) are tiled. FIGS. 6 and 9 show tile-level deployments of a CSA. FIG. 9 shows a full-tile implementation of a CSA, e.g., which may be an accelerator of a processor with a core. A main advantage of this architecture is may be reduced design risk, e.g., such that the CSA and core are completely decoupled in manufacturing. In addition to allowing better component reuse, this may allow the design of components like the CSA Cache to consider only the CSA, e.g., rather than needing to incorporate the stricter latency requirements of the core. Finally, separate tiles may allow for the integration of CSA with small or large cores. One embodiment of the CSA captures most vector-parallel workloads such that most vector-style workloads run directly on the CSA, but in certain embodiments vector-style instructions in the core may be included, e.g., to support legacy binaries.

2. Microarchitecture

In one embodiment, the goal of the CSA microarchitecture is to provide a high quality implementation of each dataflow operator specified by the CSA architecture. Embodiments of the CSA microarchitecture provide that each processing element (and/or communications network (e.g., a network dataflow endpoint circuit thereof)) of the microarchitecture corresponds to approximately one node (e.g., entity) in the architectural dataflow graph. In one embodiment, a node in the dataflow graph is distributed in multiple network dataflow endpoint circuits. In certain embodiments, this results in microarchitectural elements that are not only compact, resulting in a dense computation array, but also energy efficient, for example, where processing elements (PEs) are both simple and largely unmultiplexed, e.g., executing a single dataflow operator for a configuration (e.g., programming) of the CSA. To further reduce energy and implementation area, a CSA may include a configurable, heterogeneous fabric style in which each PE thereof implements only a subset of dataflow operators (e.g., with a separate subset of dataflow operators implemented with network dataflow endpoint circuit(s)). Peripheral and support subsystems, such as the CSA cache, may be provisioned to support the distributed parallelism incumbent in the main CSA processing fabric itself. Implementation of CSA microarchitectures may utilize dataflow and latency-insensitive communications abstractions present in the architecture. In certain embodiments, there is (e.g., substantially) a one-to-one correspondence between nodes in the compiler generated graph and the dataflow operators (e.g., dataflow operator compute elements) in a CSA.

Below is a discussion of an example CSA, followed by a more detailed discussion of the microarchitecture. Certain embodiments herein provide a CSA that allows for easy compilation, e.g., in contrast to an existing FPGA compilers that handle a small subset of a programming language (e.g., C or C++) and require many hours to compile even small programs.

Certain embodiments of a CSA architecture admits of heterogeneous coarse-grained operations, like double precision floating point. Programs may be expressed in fewer coarse grained operations, e.g., such that the disclosed compiler runs faster than traditional spatial compilers. Certain embodiments include a fabric with new processing elements to support sequential concepts like program ordered memory accesses. Certain embodiments implement hardware to support coarse-grained dataflow-style communication channels. This communication model is abstract, and very close to the control-dataflow representation used by the compiler. Certain embodiments herein include a network implementation that supports single-cycle latency communications, e.g., utilizing (e.g., small) PEs which support single control-dataflow operations. In certain embodiments, not only does this improve energy efficiency and performance, it simplifies compilation because the compiler makes a one-to-one mapping between high-level dataflow constructs and the fabric. Certain embodiments herein thus simplify the task of compiling existing (e.g., C, C++, or Fortran) programs to a CSA (e.g., fabric).

Energy efficiency may be a first order concern in modern computer systems. Certain embodiments herein provide a new schema of energy-efficient spatial architectures. In certain embodiments, these architectures form a fabric with a unique composition of a heterogeneous mix of small, energy-efficient, data-flow oriented processing elements (PEs) (and/or a packet switched communications network (e.g., a network dataflow endpoint circuit thereof)) with a lightweight circuit switched communications network (e.g., interconnect), e.g., with hardened support for flow control. Due to the energy advantages of each, the combination of these components may form a spatial accelerator (e.g., as part of a computer) suitable for executing compiler-generated parallel programs in an extremely energy efficient manner. Since this fabric is heterogeneous, certain embodiments may be customized for different application domains by introducing new domain-specific PEs. For example, a fabric for high-performance computing might include some customization for double-precision, fused multiply-add, while a fabric targeting deep neural networks might include low-precision floating point operations.

An embodiment of a spatial architecture schema, e.g., as exemplified in FIG. 6, is the composition of light-weight processing elements (PE) connected by an inter-PE network. Generally, PEs may comprise dataflow operators, e.g., where once (e.g., all) input operands arrive at the dataflow operator, some operation (e.g., micro-instruction or set of micro-instructions) is executed, and the results are forwarded to downstream operators. Control, scheduling, and data storage may therefore be distributed amongst the PEs, e.g., removing the overhead of the centralized structures that dominate classical processors.

Programs may be converted to dataflow graphs that are mapped onto the architecture by configuring PEs and the network to express the control-dataflow graph of the program. Communication channels may be flow-controlled and fully back-pressured, e.g., such that PEs will stall if either source communication channels have no data or destination communication channels are full. In one embodiment, at runtime, data flow through the PEs and channels that have been configured to implement the operation (e.g., an accelerated algorithm). For example, data may be streamed in from memory, through the fabric, and then back out to memory.

Embodiments of such an architecture may achieve remarkable performance efficiency relative to traditional multicore processors: compute (e.g., in the form of PEs) may be simpler, more energy efficient, and more plentiful than in larger cores, and communications may be direct and mostly short-haul, e.g., as opposed to occurring over a wide, full-chip network as in typical multicore processors. Moreover, because embodiments of the architecture are extremely parallel, a number of powerful circuit and device level optimizations are possible without seriously impacting throughput, e.g., low leakage devices and low operating voltage. These lower-level optimizations may enable even greater performance advantages relative to traditional cores. The combination of efficiency at the architectural, circuit, and device levels yields of these embodiments are compelling. Embodiments of this architecture may enable larger active areas as transistor density continues to increase.

Embodiments herein offer a unique combination of dataflow support and circuit switching to enable the fabric to be smaller, more energy-efficient, and provide higher aggregate performance as compared to previous architectures. FPGAs are generally tuned towards fine-grained bit manipulation, whereas embodiments herein are tuned toward the double-precision floating point operations found in HPC applications. Certain embodiments herein may include a FPGA in addition to a CSA according to this disclosure.

Certain embodiments herein combine a light-weight network with energy efficient dataflow processing elements (and/or communications network (e.g., a network dataflow endpoint circuit thereof)) to form a high-throughput, low-latency, energy-efficient HPC fabric. This low-latency network may enable the building of processing elements (and/or communications network (e.g., a network dataflow endpoint circuit thereof)) with fewer functionalities, for example, only one or two instructions and perhaps one architecturally visible register, since it is efficient to gang multiple PEs together to form a complete program.

Relative to a processor core, CSA embodiments herein may provide for more computational density and energy efficiency. For example, when PEs are very small (e.g., compared to a core), the CSA may perform many more operations and have much more computational parallelism than a core, e.g., perhaps as many as 16 times the number of FMAs as a vector processing unit (VPU). To utilize all of these computational elements, the energy per operation is very low in certain embodiments.

The energy advantages our embodiments of this dataflow architecture are many. Parallelism is explicit in dataflow graphs and embodiments of the CSA architecture spend no or minimal energy to extract it, e.g., unlike out-of-order processors which must re-discover parallelism each time an instruction is executed. Since each PE is responsible for a single operation in one embodiment, the register files and ports counts may be small, e.g., often only one, and therefore use less energy than their counterparts in core. Certain CSAs include many PEs, each of which holds live program values, giving the aggregate effect of a huge register file in a traditional architecture, which dramatically reduces memory accesses. In embodiments where the memory is multi-ported and distributed, a CSA may sustain many more outstanding memory requests and utilize more bandwidth than a core. These advantages may combine to yield an energy level per watt that is only a small percentage over the cost of the bare arithmetic circuitry. For example, in the case of an integer multiply, a CSA may consume no more than 25% more energy than the underlying multiplication circuit. Relative to one embodiment of a core, an integer operation in that CSA fabric consumes less than 1/30th of the energy per integer operation.

From a programming perspective, the application-specific malleability of embodiments of the CSA architecture yields significant advantages over a vector processing unit (VPU). In traditional, inflexible architectures, the number of functional units, like floating divide or the various transcendental mathematical functions, must be chosen at design time based on some expected use case. In embodiments of the CSA architecture, such functions may be configured (e.g., by a user and not a manufacturer) into the fabric based on the requirement of each application. Application throughput may thereby be further increased. Simultaneously, the compute density of embodiments of the CSA improves by avoiding hardening such functions, and instead provision more instances of primitive functions like floating multiplication. These advantages may be significant in HPC workloads, some of which spend 75% of floating execution time in transcendental functions.

Certain embodiments of the CSA represents a significant advance as a dataflow-oriented spatial architectures, e.g., the PEs of this disclosure may be smaller, but also more energy-efficient. These improvements may directly result from the combination of dataflow-oriented PEs with a lightweight, circuit switched interconnect, for example, which has single-cycle latency, e.g., in contrast to a packet switched network (e.g., with, at a minimum, a 300% higher latency). Certain embodiments of PEs support 32-bit or 64-bit operation. Certain embodiments herein permit the introduction of new application-specific PEs, for example, for machine learning or security, and not merely a homogeneous combination. Certain embodiments herein combine lightweight dataflow-oriented processing elements with a lightweight, low-latency network to form an energy efficient computational fabric.

In order for certain spatial architectures to be successful, programmers are to configure them with relatively little effort, e.g., while obtaining significant power and performance superiority over sequential cores. Certain embodiments herein provide for a CSA (e.g., spatial fabric) that is easily programmed (e.g., by a compiler), power efficient, and highly parallel. Certain embodiments herein provide for a (e.g., interconnect) network that achieves these three goals. From a programmability perspective, certain embodiments of the network provide flow controlled channels, e.g., which correspond to the control-dataflow graph (CDFG) model of execution used in compilers. Certain network embodiments utilize dedicated, circuit switched links, such that program performance is easier to reason about, both by a human and a compiler, because performance is predictable. Certain network embodiments offer both high bandwidth and low latency. Certain network embodiments (e.g., static, circuit switching) provides a latency of 0 to 1 cycle (e.g., depending on the transmission distance.) Certain network embodiments provide for a high bandwidth by laying out several networks in parallel, e.g., and in low-level metals. Certain network embodiments communicate in low-level metals and over short distances, and thus are very power efficient.

Certain embodiments of networks include architectural support for flow control. For example, in spatial accelerators composed of small processing elements (PEs), communications latency and bandwidth may be critical to overall program performance. Certain embodiments herein provide for a light-weight, circuit switched network which facilitates communication between PEs in spatial processing arrays, such as the spatial array shown in FIG. 6, and the micro-architectural control features necessary to support this network. Certain embodiments of a network enable the construction of point-to-point, flow controlled communications channels which support the communications of the dataflow oriented processing elements (PEs). In addition to point-to-point communications, certain networks herein also support multicast communications. Communications channels may be formed by statically configuring the network to from virtual circuits between PEs. Circuit switching techniques herein may decrease communications latency and commensurately minimize network buffering, e.g., resulting in both high performance and high energy efficiency. In certain embodiments of a network, inter-PE latency may be as low as a zero cycles, meaning that the downstream PE may operate on data in the cycle after it is produced. To obtain even higher bandwidth, and to admit more programs, multiple networks may be laid out in parallel, e.g., as shown in FIG. 6.

Spatial architectures, such as the one shown in FIG. 6, may be the composition of lightweight processing elements connected by an inter-PE network (and/or communications network (e.g., a network dataflow endpoint circuit thereof)). Programs, viewed as dataflow graphs, may be mapped onto the architecture by configuring PEs and the network. Generally, PEs may be configured as dataflow operators, and once (e.g., all) input operands arrive at the PE, some operation may then occur, and the result are forwarded to the desired downstream PEs. PEs may communicate over dedicated virtual circuits which are formed by statically configuring a circuit switched communications network. These virtual circuits may be flow controlled and fully backpressured, e.g., such that PEs will stall if either the source has no data or the destination is full. At runtime, data may flow through the PEs implementing the mapped algorithm. For example, data may be streamed in from memory, through the fabric, and then back out to memory. Embodiments of this architecture may achieve remarkable performance efficiency relative to traditional multicore processors: for example, where compute, in the form of PEs, is simpler and more numerous than larger cores and communication are direct, e.g., as opposed to an extension of the memory system.

FIG. 6 illustrates an accelerator tile 600 comprising an array of processing elements (PEs) according to embodiments of the disclosure. The interconnect network is depicted as circuit switched, statically configured communications channels. For example, a set of channels coupled together by a switch (e.g., switch 610 in a first network and switch 611 in a second network). The first network and second network may be separate or coupled together. For example, switch 610 may couple one or more of the four data paths (612, 614, 616, 618) together, e.g., as configured to perform an operation according to a dataflow graph. In one embodiment, the number of data paths is any plurality. Processing element (e.g., processing element 604) may be as disclosed herein, for example, as in FIG. 10. Accelerator tile 600 includes a memory/cache hierarchy interface 602, e.g., to interface the accelerator tile 600 with a memory and/or cache. A data path (e.g., 618) may extend to another tile or terminate, e.g., at the edge of a tile. A processing element may include an input buffer (e.g., buffer 606) and an output buffer (e.g., buffer 608).

Figure 10:
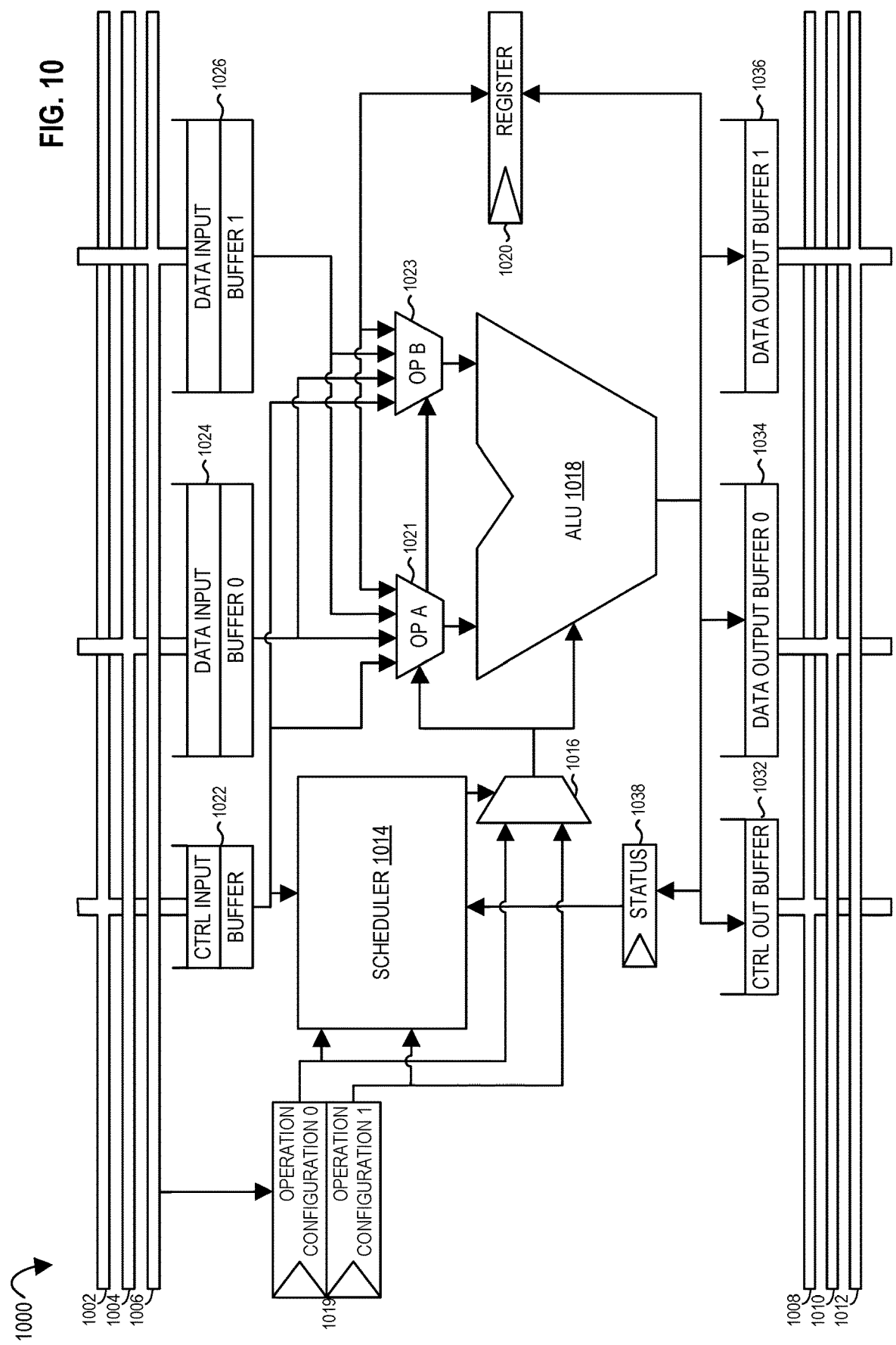
FIG. 10 illustrates a processing element according to embodiments of the disclosure.

Operations may be executed based on the availability of their inputs and the status of the PE. A PE may obtain operands from input channels and write results to output channels, although internal register state may also be used. Certain embodiments herein include a configurable dataflow-friendly PE. FIG. 10 shows a detailed block diagram of one such PE: the integer PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

FIG. 10 represents one example configuration of a processing element, e.g., in which all architectural elements are minimally sized. In other embodiments, each of the components of a processing element is independently scaled to produce new PEs. For example, to handle more complicated programs, a larger number of instructions that are executable by a PE may be introduced. A second dimension of configurability is in the function of the PE arithmetic logic unit (ALU). In FIG. 10, an integer PE is depicted which may support addition, subtraction, and various logic operations. Other kinds of PEs may be created by substituting different kinds of functional units into the PE. An integer multiplication PE, for example, might have no registers, a single instruction, and a single output buffer. Certain embodiments of a PE decompose a fused multiply add (FMA) into separate, but tightly coupled floating multiply and floating add units to improve support for multiply-add-heavy workloads. PEs are discussed further below.

Figure 7A:
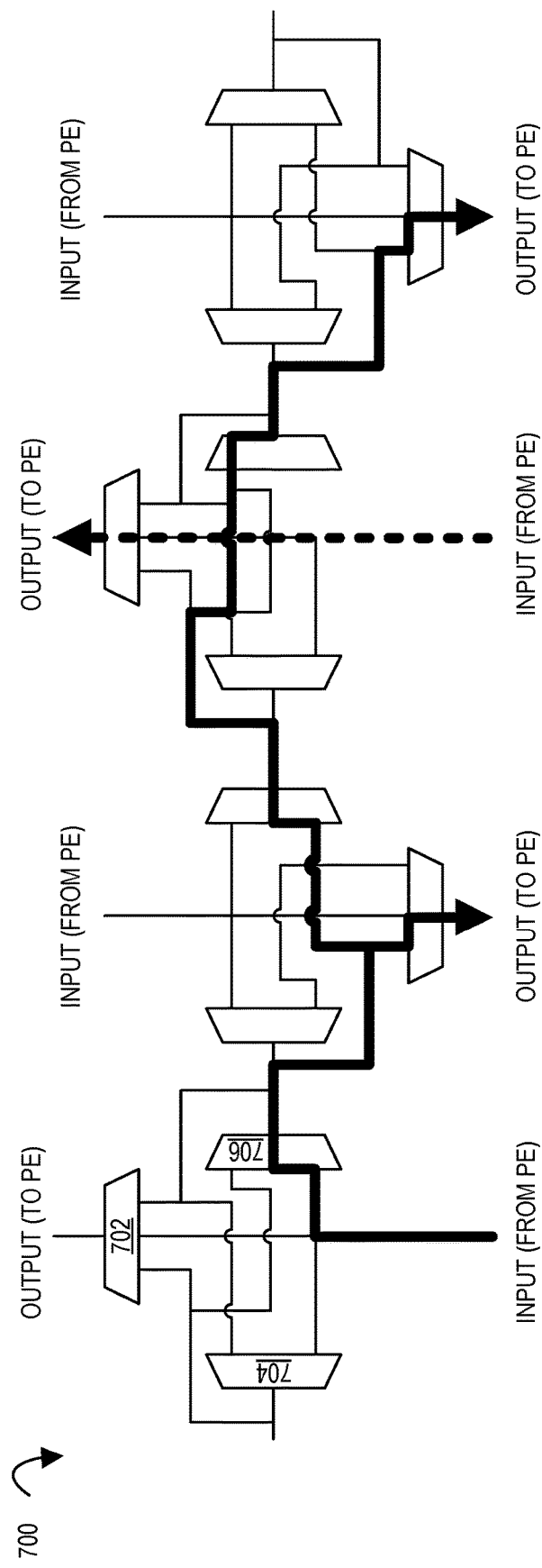
FIG. 7A illustrates a configurable data path network according to embodiments of the disclosure.
Figure 7B:
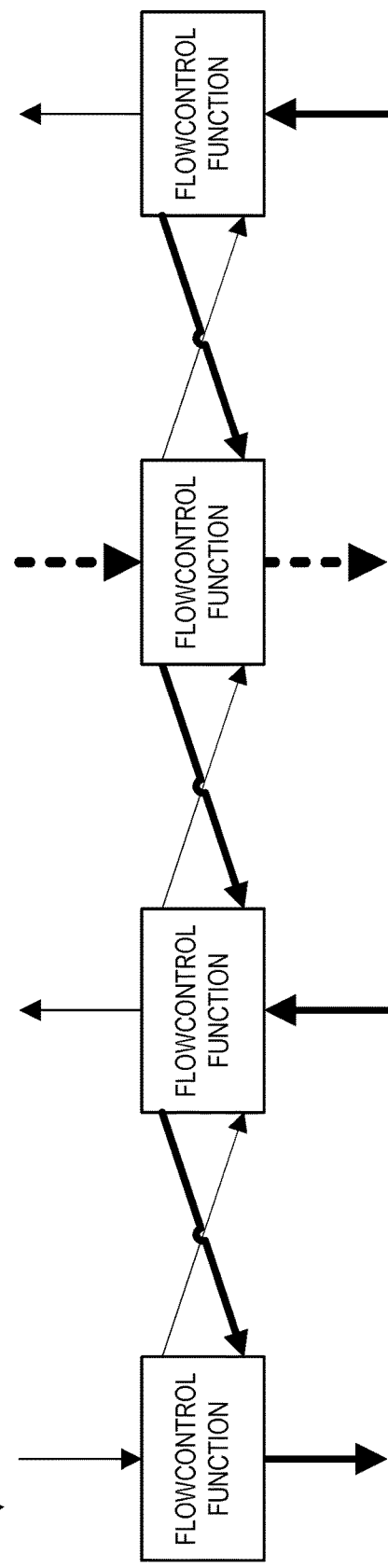
FIG. 7B illustrates a configurable flow control path network according to embodiments of the disclosure.

FIG. 7A illustrates a configurable data path network QAG00 (e.g., of network one or network two discussed in reference to FIG. 6) according to embodiments of the disclosure. Network QAG00 includes a plurality of multiplexers (e.g., multiplexers QAG02, QAG04, QAG06) that may be configured (e.g., via their respective control signals) to connect one or more data paths (e.g., from PEs) together. FIG. 7B illustrates a configurable flow control path network QAG01 (e.g., network one or network two discussed in reference to FIG. 6) according to embodiments of the disclosure. A network may be a light-weight PE-to-PE network. Certain embodiments of a network may be thought of as a set of composable primitives for the construction of distributed, point-to-point data channels. FIG. 7A shows a network that has two channels enabled, the bold black line and the dotted black line. The bold black line channel is multicast, e.g., a single input is sent to two outputs. Note that channels may cross at some points within a single network, even though dedicated circuit switched paths are formed between channel endpoints. Furthermore, this crossing may not introduce a structural hazard between the two channels, so that each operates independently and at full bandwidth.

Implementing distributed data channels may include two paths, illustrated in FIGS. 7A-7B. The forward, or data path, carries data from a producer to a consumer. Multiplexors may be configured to steer data and valid bits from the producer to the consumer, e.g., as in FIG. 7A. In the case of multicast, the data will be steered to multiple consumer endpoints. The second portion of this embodiment of a network is the flow control or backpressure path, which flows in reverse of the forward data path, e.g., as in FIG. 7B. Consumer endpoints may assert when they are ready to accept new data. These signals may then be steered back to the producer using configurable logical conjunctions, labelled as (e.g., backflow) flowcontrol function in FIG. 7B. In one embodiment, each flowcontrol function circuit may be a plurality of switches (e.g., muxes), for example, similar to FIG. 7A. The flow control path may handle returning control data from consumer to producer. Conjunctions may enable multicast, e.g., where each consumer is ready to receive data before the producer assumes that it has been received. In one embodiment, a PE is a PE that has a dataflow operator as its architectural interface. Additionally or alternatively, in one embodiment a PE may be any kind of PE (e.g., in the fabric), for example, but not limited to, a PE that has an instruction pointer, triggered instruction, or state machine based architectural interface.

The network may be statically configured, e.g., in addition to PEs being statically configured. During the configuration step, configuration bits may be set at each network component. These bits control, for example, the multiplexer selections and flow control functions. A network may comprise a plurality of networks, e.g., a data path network and a flow control path network. A network or plurality of networks may utilize paths of different widths (e.g., a first width, and a narrower or wider width). In one embodiment, a data path network has a wider (e.g., bit transport) width than the width of a flow control path network. In one embodiment, each of a first network and a second network includes their own data path network and flow control path network, e.g., data path network A and flow control path network A and wider data path network B and flow control path network B.

Certain embodiments of a network are bufferless, and data is to move between producer and consumer in a single cycle. Certain embodiments of a network are also boundless, that is, the network spans the entire fabric. In one embodiment, one PE is to communicate with any other PE in a single cycle. In one embodiment, to improve routing bandwidth, several networks may be laid out in parallel between rows of PEs.

Relative to FPGAs, certain embodiments of networks herein have three advantages: area, frequency, and program expression. Certain embodiments of networks herein operate at a coarse grain, e.g., which reduces the number configuration bits, and thereby the area of the network. Certain embodiments of networks also obtain area reduction by implementing flow control logic directly in circuitry (e.g., silicon). Certain embodiments of hardened network implementations also enjoys a frequency advantage over FPGA. Because of an area and frequency advantage, a power advantage may exist where a lower voltage is used at throughput parity. Finally, certain embodiments of networks provide better high-level semantics than FPGA wires, especially with respect to variable timing, and thus those certain embodiments are more easily targeted by compilers. Certain embodiments of networks herein may be thought of as a set of composable primitives for the construction of distributed, point-to-point data channels.

In certain embodiments, a multicast source may not assert its data valid unless it receives a ready signal from each sink. Therefore, an extra conjunction and control bit may be utilized in the multicast case.

Like certain PEs, the network may be statically configured. During this step, configuration bits are set at each network component. These bits control, for example, the multiplexer selection and flow control function. The forward path of our network requires some bits to swing its muxes. In the example shown in FIG. 7A, four bits per hop are required: the east and west muxes utilize one bit each, while the southbound multiplexer utilize two bits. In this embodiment, four bits may be utilized for the data path, but 7 bits may be utilized for the flow control function (e.g., in the flow control path network). Other embodiments may utilize more bits, for example, if a CSA further utilizes a north-south direction. The flow control function may utilize a control bit for each direction from which flow control can come. This may enables the setting of the sensitivity of the flow control function statically. The table 1 below summarizes the Boolean algebraic implementation of the flow control function for the network in FIG. 7B, with configuration bits capitalized. In this example, seven bits are utilized.

TABLE 1

Flow Implementation

| | |
|---|---|
| readyToEast | (EAST_WEST_SENSITIVE+readyFromWest) * (EAST_SOUTH_SENSITIVE+readyFromSouth) |
| readyToWest | (WEST_EAST_SENSITVE+readyFromEast) * (WEST_SOUTH_SENSITIVE+readyFromSouth) |
| readyToNorth | (NORTH_WEST_SENSITIVE+readyFromWest) * (NORTH_EAST_SENSITIVE+readyFromEast) * (NORTH_SOUTH_SENSTIVE+readyFromSouth) |

For the third flow control box from the left in FIG. 7B, EAST_WEST_SENSITIVE and NORTH_SOUTH_SENSITIVE are depicted as set to implement the flow control for the bold line and dotted line channels, respectively.

Figure 8:
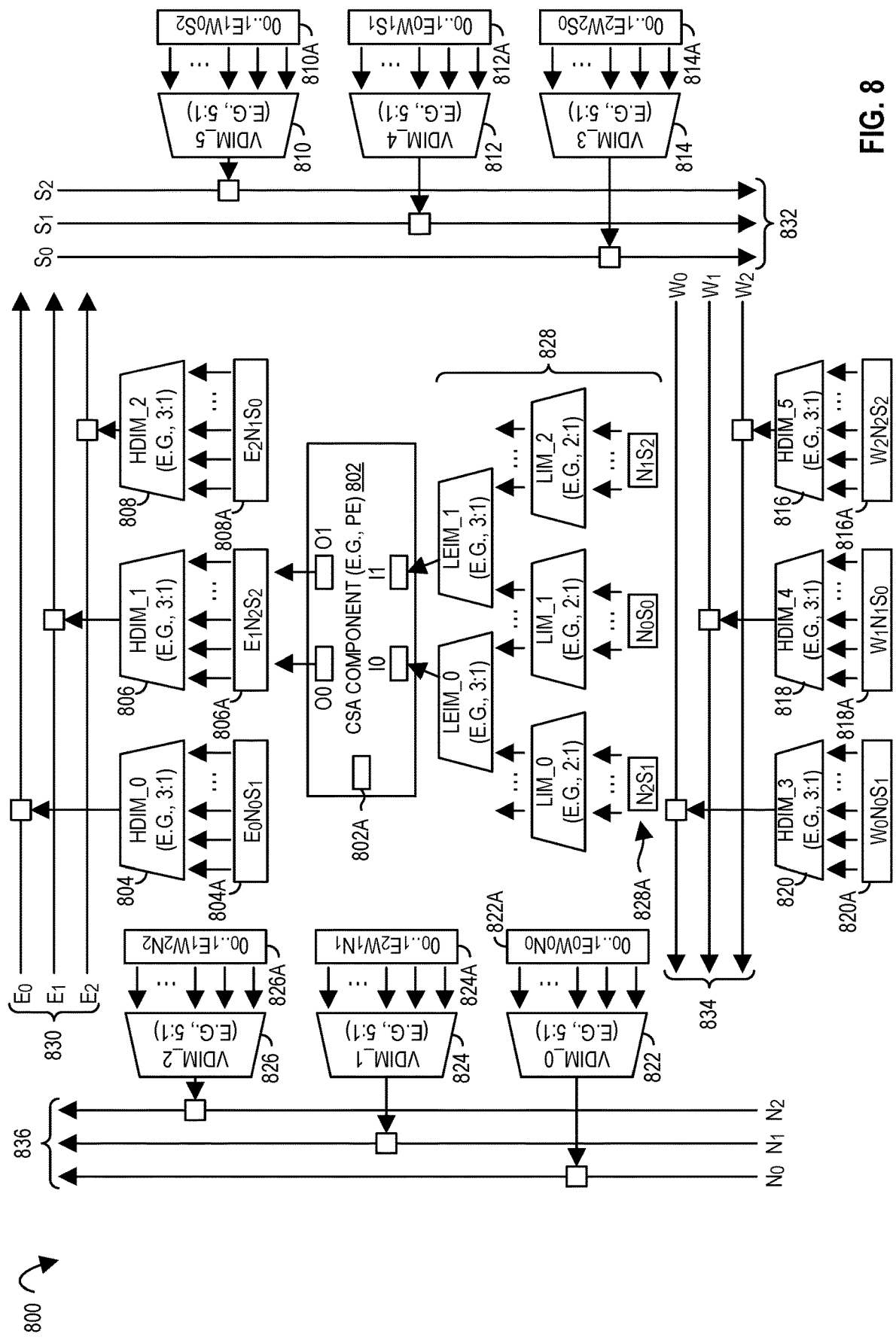
FIG. 8 illustrates a circuit switched network according to embodiments of the disclosure.

FIG. 8 illustrates a circuit switched network 800 according to embodiments of the disclosure. Circuit switched network 800 is coupled to a CSA component (e.g., a processing element (PE)) 802, and may likewise couple to other CSA component(s) (e.g., PEs), for example, over one or more channels that are created from switches (e.g., multiplexers) 804-828. This may include horizontal (H) switches and/or vertical (V) switches. Depicted switches may be switches in FIG. 6. Switches may include one or more registers 804A-828A to store the control values (e.g., configuration bits) to control the selection of input(s) and/or output(s) of the switch to allow values to pass from an input(s) to an output(s). In one embodiment, the switches are selectively coupled to one or more of networks 830 (e.g., sending data to the right (east (E))), 832 (e.g., sending data downwardly (south (S))), 834 (e.g., sending data to the left (west (W))), and/or 836 (e.g., sending data upwardly (north (N))). Networks 830, 832, 834, and/or 836 may be coupled to another instance of the components (or a subset of the components) in FIG. 8, for example, to create flow controlled communications channels (e.g., paths) which support communications between components (e.g., PEs) of a configurable spatial accelerator (e.g., a CSA as discussed herein). In one embodiment, a network (e.g., networks 830, 832, 834, and/or 836 or a separate network) receive a control value (e.g., configuration bits) from a source (e.g., a core) and cause that control value (e.g., configuration bits) to be stored in registers 804A-828A to cause the corresponding switches 804-828 to form the desired channels (e.g., according to a dataflow graph). Processing element 802 may also include control register(s) 802A, for example, as operation configuration register 919 in FIG. 9. Switches and other components may thus be set in certain embodiments to create data path or data paths between processing elements and/or backpressure paths for those data paths, e.g., as discussed herein. In one embodiment, the values (e.g., configuration bits) in these (control) registers 804A-828A are depicted with variables names that refer to the mux selection for the inputs, for example, with the values having a number which refers to the port number, and a letter which refers to the direction or PE output the data is coming from, e.g., where E1 in 806A refers to port number 1 coming from the east side of the network.

The network(s) may be statically configured, e.g., in addition to PEs being statically configured during configuration for a dataflow graph. During the configuration step, configuration bits may be set at each network component. These bits may control, for example, the multiplexer selections to control the flow of a dataflow token (e.g., on a data path network) and its corresponding backpressure token (e.g., on a flow control path network). A network may comprise a plurality of networks, e.g., a data path network and a flow control path network. A network or plurality of networks may utilize paths of different widths (e.g., a first width, and a narrower or wider second width). In one embodiment, a data path network has a wider (e.g., bit transport) width than the width of a flow control path network. In one embodiment, each of a first network and a second network includes their own data paths and flow control paths, e.g., data path A and flow control path A and wider data path B and flow control path B. For example, a data path and flow control path for a single output buffer of a producer PE that couples to a plurality of input buffers of consumer PEs. In one embodiment, to improve routing bandwidth, several networks are laid out in parallel between rows of PEs Like certain PEs, the network may be statically configured. During this step, configuration bits may be set at each network component. These bits control, for example, the data path (e.g., multiplexer created data path) and/or flow control path (e.g., multiplexer created flow control path). The forward (e.g., data) path may utilize control bits to swing its switches and/or logic gates.

FIG. 9 illustrates a hardware processor tile 900 comprising an accelerator 902 according to embodiments of the disclosure. Accelerator 902 may be a CSA according to this disclosure. Tile 900 includes a plurality of cache banks (e.g., cache bank 908). Request address file (RAF) circuits 910 may be included, e.g., as discussed below in Section 2.2. ODI may refer to an On Die Interconnect, e.g., an interconnect stretching across an entire die connecting up all the tiles. OTI may refer to an On Tile Interconnect, for example, stretching across a tile, e.g., connecting cache banks on the tile together.

2.1 Processing Elements

In certain embodiments, a CSA includes an array of heterogeneous PEs, in which the fabric is composed of several types of PEs each of which implement only a subset of the dataflow operators. By way of example, FIG. 10 shows a provisional implementation of a PE capable of implementing a broad set of the integer and control operations. Other PEs, including those supporting floating point addition, floating point multiplication, buffering, and certain control operations may have a similar implementation style, e.g., with the appropriate (dataflow operator) circuitry substituted for the ALU. PEs (e.g., dataflow operators) of a CSA may be configured (e.g., programmed) before the beginning of execution to implement a particular dataflow operation from among the set that the PE supports. A configuration may include one or two control words which specify an opcode controlling the ALU, steer the various multiplexors within the PE, and actuate dataflow into and out of the PE channels. Dataflow operators may be implemented by microcoding these configurations bits. The depicted integer PE 1000 in FIG. 10 is organized as a single-stage logical pipeline flowing from top to bottom. Data enters PE 1000 from one of set of local networks, where it is registered in an input buffer for subsequent operation. Each PE may support a number of wide, data-oriented and narrow, control-oriented channels. The number of provisioned channels may vary based on PE functionality, but one embodiment of an integer-oriented PE has 2 wide and 1-2 narrow input and output channels. Although the integer PE is implemented as a single-cycle pipeline, other pipelining choices may be utilized. For example, multiplication PEs may have multiple pipeline stages.

PE execution may proceed in a dataflow style. Based on the configuration microcode, the scheduler may examine the status of the PE ingress and egress buffers, and, when all the inputs for the configured operation have arrived and the egress buffer of the operation is available, orchestrates the actual execution of the operation by a dataflow operator (e.g., on the ALU). The resulting value may be placed in the configured egress buffer. Transfers between the egress buffer of one PE and the ingress buffer of another PE may occur asynchronously as buffering becomes available. In certain embodiments, PEs are provisioned such that at least one dataflow operation completes per cycle. Section 2 discussed dataflow operator encompassing primitive operations, such as add, xor, or pick. Certain embodiments may provide advantages in energy, area, performance, and latency. In one embodiment, with an extension to a PE control path, more fused combinations may be enabled. In one embodiment, the width of the processing elements is 64 bits, e.g., for the heavy utilization of double-precision floating point computation in HPC and to support 64-bit memory addressing.

2.2 Communications Networks

Embodiments of the CSA microarchitecture provide a hierarchy of networks which together provide an implementation of the architectural abstraction of latency-insensitive channels across multiple communications scales. The lowest level of CSA communications hierarchy may be the local network. The local network may be statically circuit switched, e.g., using configuration registers to swing multiplexor(s) in the local network data-path to form fixed electrical paths between communicating PEs. In one embodiment, the configuration of the local network is set once per dataflow graph, e.g., at the same time as the PE configuration. In one embodiment, static, circuit switching optimizes for energy, e.g., where a large majority (perhaps greater than 95%) of CSA communications traffic will cross the local network. A program may include terms which are used in multiple expressions. To optimize for this case, embodiments herein provide for hardware support for multicast within the local network. Several local networks may be ganged together to form routing channels, e.g., which are interspersed (as a grid) between rows and columns of PEs. As an optimization, several local networks may be included to carry control tokens. In comparison to a FPGA interconnect, a CSA local network may be routed at the granularity of the data-path, and another difference may be a CSA's treatment of control. One embodiment of a CSA local network is explicitly flow controlled (e.g., back-pressured). For example, for each forward data-path and multiplexor set, a CSA is to provide a backward-flowing flow control path that is physically paired with the forward data-path. The combination of the two microarchitectural paths may provide a low-latency, low-energy, low-area, point-to-point implementation of the latency-insensitive channel abstraction. In one embodiment, a CSA's flow control lines are not visible to the user program, but they may be manipulated by the architecture in service of the user program. For example, the exception handling mechanisms described in Section 1.2 may be achieved by pulling flow control lines to a "not present" state upon the detection of an exceptional condition. This action may not only gracefully stalls those parts of the pipeline which are involved in the offending computation, but may also preserve the machine state leading up the exception, e.g., for diagnostic analysis. A second network layer, e.g., the mezzanine network, may be a shared, packet switched network. Mezzanine network may include a plurality of distributed network controllers, network dataflow endpoint circuits. The mezzanine network (e.g., the network schematically indicated by the dotted box in FIG. 48) may provide more general, long range communications, e.g., at the cost of latency, bandwidth, and energy. In some programs, most communications may occur on the local network, and thus mezzanine network provisioning will be considerably reduced in comparison, for example, each PE may connects to multiple local networks, but the CSA will provision only one mezzanine endpoint per logical neighborhood of PEs. Since the mezzanine is effectively a shared network, each mezzanine network may carry multiple logically independent channels, e.g., and be provisioned with multiple virtual channels. In one embodiment, the main function of the mezzanine network is to provide wide-range communications in-between PEs and between PEs and memory. In addition to this capability, the mezzanine may also include network dataflow endpoint circuit(s), for example, to perform certain dataflow operations. In addition to this capability, the mezzanine may also operate as a runtime support network, e.g., by which various services may access the complete fabric in a user-program-transparent manner. In this capacity, the mezzanine endpoint may function as a controller for its local neighborhood, for example, during CSA configuration. To form channels spanning a CSA tile, three subchannels and two local network channels (which carry traffic to and from a single channel in the mezzanine network) may be utilized. In one embodiment, one mezzanine channel is utilized, e.g., one mezzanine and two local=3 total network hops.

The composability of channels across network layers may be extended to higher level network layers at the inter-tile, inter-die, and fabric granularities.

FIG. 10 illustrates a processing element 1000 according to embodiments of the disclosure. In one embodiment, operation configuration register 1019 is loaded during configuration (e.g., mapping) and specifies the particular operation (or operations) this processing (e.g., compute) element is to perform. Register 1020 activity may be controlled by that operation (an output of multiplexer 1016, e.g., controlled by the scheduler 1014). Scheduler 1014 may schedule an operation or operations of processing element 1000, for example, when input data and control input arrives. Control input buffer 1022 is connected to local network 1002 (e.g., and local network 1002 may include a data path network as in FIG. 7A and a flow control path network as in FIG. 7B) and is loaded with a value when it arrives (e.g., the network has a data bit(s) and valid bit(s)). Control output buffer 1032, data output buffer 1034, and/or data output buffer 1036 may receive an output of processing element 1000, e.g., as controlled by the operation (an output of multiplexer 1016). Status register 1038 may be loaded whenever the ALU 1018 executes (also controlled by output of multiplexer 1016). Data in control input buffer 1022 and control output buffer 1032 may be a single bit. Multiplexer 1021 (e.g., operand A) and multiplexer 1023 (e.g., operand B) may source inputs.

For example, suppose the operation of this processing (e.g., compute) element is (or includes) what is called call a pick in FIG. 3B. The processing element 1000 then is to select data from either data input buffer 1024 or data input buffer 1026, e.g., to go to data output buffer 1034 (e.g., default) or data output buffer 1036. The control bit in 1022 may thus indicate a 0 if selecting from data input buffer 1024 or a 1 if selecting from data input buffer 1026.

For example, suppose the operation of this processing (e.g., compute) element is (or includes) what is called call a switch in FIG. 3B. The processing element 1000 is to output data to data output buffer 1034 or data output buffer 1036, e.g., from data input buffer 1024 (e.g., default) or data input buffer 1026. The control bit in 1022 may thus indicate a 0 if outputting to data output buffer 1034 or a 1 if outputting to data output buffer 1036.

Multiple networks (e.g., interconnects) may be connected to a processing element, e.g., (input) networks 1002, 1004, 1006 and (output) networks 1008, 1010, 1012. The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network 1002 (e.g., set up as a control interconnect) is depicted as being switched (e.g., connected) to control input buffer 1022. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 1022, e.g., to indicate to the upstream producer (e.g., PE) that a new control input value is not to be loaded into (e.g., sent to) control input buffer 1022 until the backpressure signal indicates there is room in the control input buffer 1022 for the new control input value (e.g., from a control output buffer of the upstream producer). In one embodiment, the new control input value may not enter control input buffer 1022 until both (i) the upstream producer receives the "space available" backpressure signal from "control input" buffer 1022 and (ii) the new control input value is sent from the upstream producer, e.g., and this may stall the processing element 1000 until that happens (and space in the target, output buffer(s) is available).

Data input buffer 1024 and data input buffer 1026 may perform similarly, e.g., local network 1004 (e.g., set up as a data (as opposed to control) interconnect) is depicted as being switched (e.g., connected) to data input buffer 1024. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 1024, e.g., to indicate to the upstream producer (e.g., PE) that a new data input value is not to be loaded into (e.g., sent to) data input buffer 1024 until the backpressure signal indicates there is room in the data input buffer 1024 for the new data input value (e.g., from a data output buffer of the upstream producer). In one embodiment, the new data input value may not enter data input buffer 1024 until both (i) the upstream producer receives the "space available" backpressure signal from "data input" buffer 1024 and (ii) the new data input value is sent from the upstream producer, e.g., and this may stall the processing element 1000 until that happens (and space in the target, output buffer(s) is available). A control output value and/or data output value may be stalled in their respective output buffers (e.g., 1032, 1034, 1036) until a backpressure signal indicates there is available space in the input buffer for the downstream processing element(s).

A processing element 1000 may be stalled from execution until its operands (e.g., a control input value and its corresponding data input value or values) are received and/or until there is room in the output buffer(s) of the processing element 1000 for the data that is to be produced by the execution of the operation on those operands.

In certain embodiments, a significant source of area and energy reduction is the customization of the dataflow operations supported by each type of processing element. In one embodiment, a proper subset (e.g., most) processing elements support only a few operations (e.g., one, two, three, or four operation types), for example, an implementation choice where a floating point PE only supports one of floating point multiply or floating point add, but not both.

2.3 Memory Interface

Figure 11:
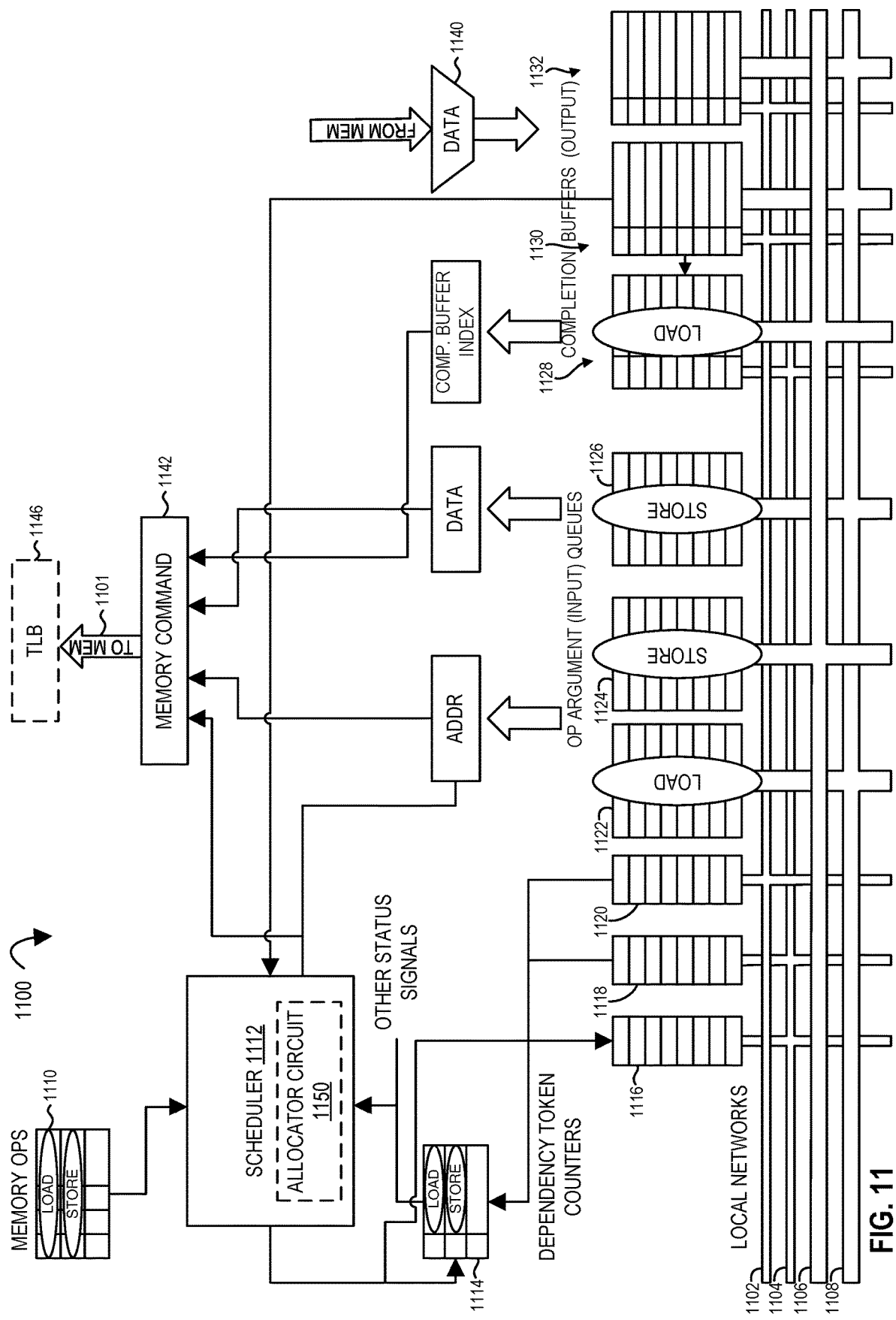
FIG. 11 illustrates a request address file (RAF) circuit according to embodiments of the disclosure.
Figure 12:
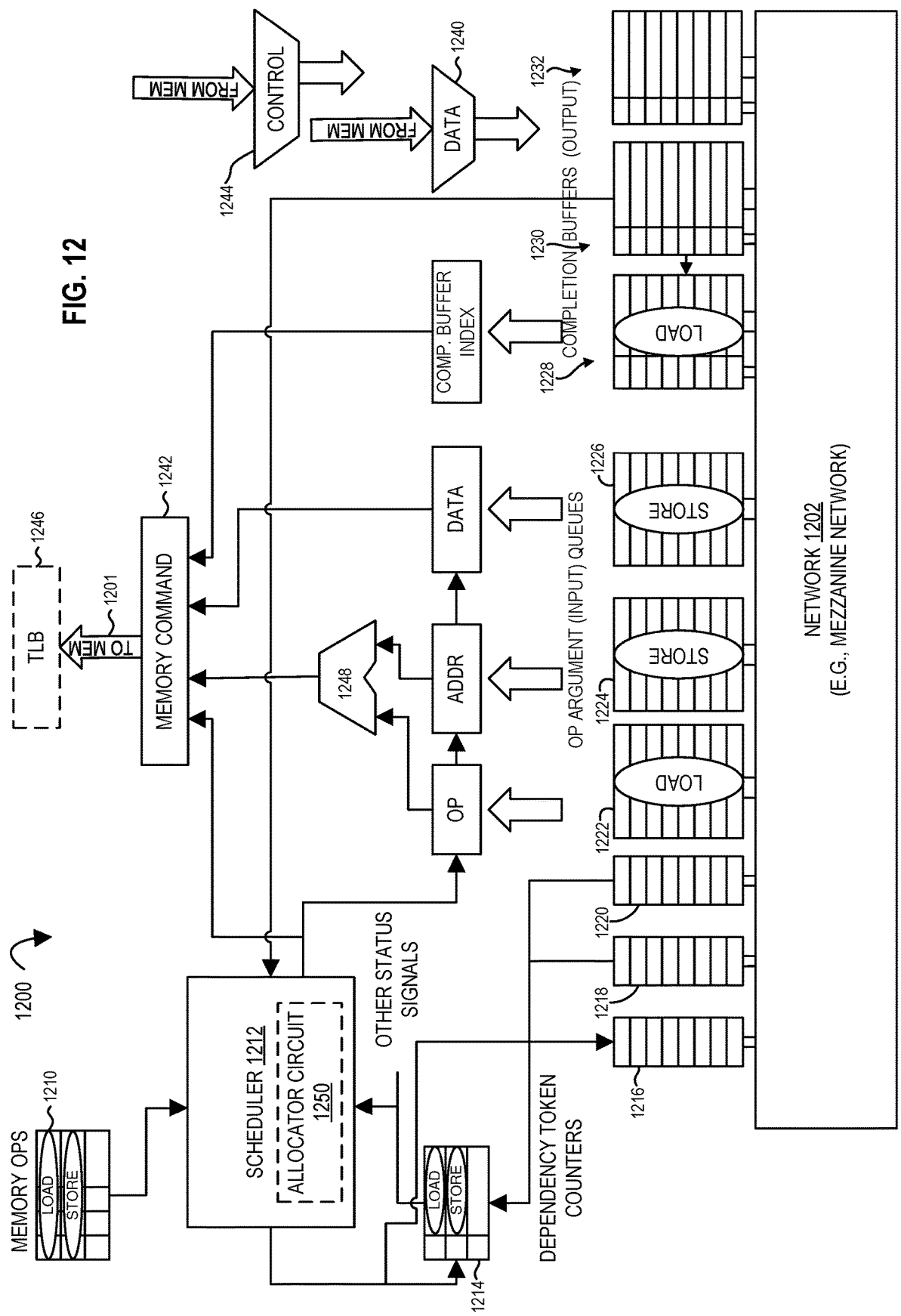
FIG. 12 illustrates another request address file (RAF) circuit according to embodiments of the disclosure.

In certain embodiments, data requests (e.g., a load request or a store request) are sent and received by memory interface circuits (e.g., RAF circuits) of a configurable spatial accelerator. In one embodiment, data corresponding to a request (e.g., a load request or a store request) is returned to the same memory interface circuit (e.g., RAF circuit) that issued the request. In another embodiment, data corresponding to a request (e.g., a load request or a store request) from a first memory interface circuit (e.g., RAF circuit) is sent to another memory interface circuit (e.g., RAF circuit) that did not issue the request but is to receive the corresponding data for the request. A request address file (RAF) circuit, versions of which are shown in FIG. 11 and FIG. 12, may be responsible for executing memory operations and serve as an intermediary between the CSA fabric and the memory hierarchy. As such, the main microarchitectural task of the RAF may be to rationalize the out-of-order memory subsystem with the in-order semantics of CSA fabric. In this capacity, the RAF circuit may be provisioned with completion buffers, e.g., data storage structures that re-order memory responses and return them to the fabric in the request order. The second major functionality of the RAF circuit may be to provide support in the form of address translation and a page walker. Incoming virtual addresses may be translated to physical addresses using a (e.g., channel-associative) translation lookaside buffer (TLB). To provide ample memory bandwidth, each CSA tile may include multiple RAF circuits. Like the various PEs of the fabric, the RAF circuits may operate in a dataflow-style by checking for the availability of input arguments and output buffering, if required, before selecting a memory operation to execute. In certain embodiments, a single RAF circuit (e.g., its port into memory) is multiplexed among several co-located memory operations (e.g., as indicated by a value stored in a memory operation register for the RAF circuit). A multiplexed RAF circuit may be used to minimize the area overhead of its various subcomponents, for example, to share the Accelerator Cache Interconnect (ACI) network (e.g., as described in more detail below), shared virtual memory (SVM) support hardware, mezzanine network interface, and/or other hardware management facilities. However, there are some program characteristics that may also motivate this choice. In one embodiment, a (e.g., valid) dataflow graph is to poll memory in a shared virtual memory system. Memory-latency-bound programs, like graph traversals, may utilize many separate memory operations to saturate memory bandwidth due to memory-dependent control flow. Although each RAF may be multiplexed, a CSA may include multiple (e.g., between 8 and 32) RAFs at a tile granularity to ensure adequate cache bandwidth. RAFs may communicate with the rest of the fabric via both a local network and a mezzanine network. Where RAFs are multiplexed, each RAF may be provisioned with several ports into the local network. These ports may serve as a minimum-latency, highly-deterministic path to memory for use by latency-sensitive or high-bandwidth memory operations. In addition, a RAF may be provisioned with a mezzanine network endpoint, e.g., which provides memory access to runtime services and distant user-level memory accessors.

FIG. 11 illustrates a request address file (RAF) circuit 1100 according to embodiments of the disclosure. In one embodiment, at configuration time, the memory load and store operations that were in a dataflow graph are specified in register(s) 1110. The arcs to those memory operations in the dataflow graphs may then be connected to the input queues 1122, 1124, and 1126. The arcs from those memory operations are thus to leave completion buffers 1128, 1130, or 1132 in certain embodiments. Dependency tokens (which may be single bits) arrive into queues 1118 and 1120 in certain embodiments. Dependency tokens are to leave from queue 1116 in certain embodiments. Dependency token counter 1114 may be a compact representation of a queue and track a number of dependency tokens used for any given input queue. If the dependency token counters 1114 saturate, no additional dependency tokens may be generated for new memory operations in certain embodiments. Accordingly, a memory ordering circuit (e.g., a RAF in FIG. 13) may stall scheduling new memory operations until the dependency token counters 1114 becomes unsaturated. Optionally, an allocator circuit 1250 may be included, for example, as discussed in Section 2.4. In certain embodiments, allocator circuit 1250 is to allocate components of the RAF circuit 1100 to a particular memory operation (e.g., a store operation or a load operation), for example, as indicated by a value stored in register(s) 1110. In one embodiment, the components for an operation are (i) a single input queue 1122, 1124, or 1126 (e.g., to receive address data from a PE for a load operation requested by a PE from memory (e.g., cache) via port 1101) and a corresponding completion buffer 1128, 1130, or 1132 (e.g., to receive an indication that the load operation has been completed from memory) or (ii) a pair of input queues from 1122, 1124, or 1126 (e.g., one to receive data-to-be-stored (e.g., payload data) and one to receive an address indicating where to store that data from a PE into memory (e.g., cache) via port 1101) and a corresponding completion buffer 1128, 1130, or 1132 (e.g., to receive an indication that the store operation has been completed in memory). As an example for a load, an address arrives into queue 1122 which the scheduler 1112 matches up in register 1110 as being programmed to be a load operation. In certain embodiments, a completion buffer slot for this load is assigned, e.g., in the order the address arrived. Assuming this particular load in the graph has no dependencies specified, the address and completion buffer slot are sent off to the memory system by the scheduler (e.g., via memory command 1142) in certain embodiments. When the result returns to multiplexer 1140 (shown schematically), it is stored into the completion buffer slot it specifies (e.g., as it carried the target slot all along though the memory system) in certain embodiments. The completion buffer sends results back into local network (e.g., local network 1102, 1104, 1106, or 1108) in the order the addresses arrived in certain embodiments.

Stores may be similar, for example, except both address and data have to arrive (e.g., from one or more PEs) before any operation is sent off to the memory system in certain embodiments.

Local network 1102, 1104, 1106, or 1108 may be a circuit switched network, e.g., as discussed in reference to FIGS. 6-8. In certain embodiments, RAF circuit 1100 is to send a backpressure value via a network to a producer (e.g., transmitter) component (e.g., PE) when an input queue of the RAF circuit 1100 is full. The backpressure value may cause a stall of the producing component (e.g., PE) from issuing or sending an additional memory request (e.g., to that particularly input queue) until storage space is available in the input queue of the RAF circuit. In certain embodiments, a receiving component (e.g., PE) is to send a backpressure value via a network to RAF circuit 1100 to stall the sending of data from a completion buffer 1128, 1130, or 1132 until storage space is available in the input queue of the receiving component (e.g., PE).

Optionally, a translation lookaside buffer (TLB) 1146 may be included to convert a logical address received from an input queue 1122, 1124, or 1126 into a physical address of the memory (e.g., cache). In one embodiment, the memory accessed is one or more of the cache banks discussed herein.

FIG. 12 illustrates a request address file (RAF) circuit 1200 according to embodiments of the disclosure. In one embodiment, at configuration time, the memory load and store operations that were in a dataflow graph are specified in register(s) 1210. The arcs to those memory operations in the dataflow graphs may then be connected to the input queues 1222, 1224, and 1226. The arcs from those memory operations are thus to leave completion buffers 1228, 1230, or 1232 in certain embodiments. Dependency tokens (which may be single bits) arrive into queues 1218 and 1220 in certain embodiments. Dependency tokens are to leave from queue 1216 in certain embodiments. Dependency token counter 1214 may be a compact representation of a queue and track a number of dependency tokens used for any given input queue. If the dependency token counters 1214 saturate, no additional dependency tokens may be generated for new memory operations in certain embodiments. Accordingly, a memory ordering circuit (e.g., a RAF in FIG. 13) may stall scheduling new memory operations until the dependency token counters 1214 becomes unsaturated. In certain embodiments, ALU 1248 is provided in the RAF circuit 1200 to permit memory address calculations to be directly performed in the RAF, e.g., where use of the ALU is optionally specified as part of the configuration value in register 1210. Example uses include: address displacement calculations in which a base address is added to an offset and/or stateful calculations in which an address may be repeatedly incremented at the RAF, such as streaming load (sld).

Optionally, an allocator circuit 1250 may be included, for example, as discussed in Section 2.4. In certain embodiments, allocator circuit 1250 is to allocate components of the RAF circuit 1200 to a particular memory operation (e.g., a store operation or a load operation), for example, as indicated by a value stored in register(s) 1210. In one embodiment, the components for an operation are (i) a single input queue 1222, 1224, or 1226 (e.g., to receive address data from a PE for a load operation requested by a PE from memory (e.g., cache) via port 1201) and a corresponding completion buffer 1228, 1230, or 1232 (e.g., to receive an indication that the load operation has been completed from memory) or (ii) a pair of input queues from 1222, 1224, or 1226 (e.g., one to receive data-to-be-stored (e.g., payload data) and one to receive an address indicating where to store that data from a PE into memory (e.g., cache) via port 1201) and a corresponding completion buffer 1228, 1230, or 1232 (e.g., to receive an indication that the store operation has been completed in memory). As an example for a load, an address arrives into queue 1222 which the scheduler 1212 matches up in register 1210 as being programmed to be a load operation. In certain embodiments, a completion buffer slot for this load is assigned, e.g., in the order the address arrived. Assuming this particular load in the graph has no dependencies specified, the address and completion buffer slot are sent off to the memory system by the scheduler (e.g., via memory command 1242) in certain embodiments. When the result returns to demultiplexer 1240 (shown schematically), it is stored into the completion buffer slot specified by the control information provided by control demultiplexer 1244 (e.g., as it carried the target slot all along though the memory system) in certain embodiments. The completion buffer sends results back into CSA network (e.g., mezzanine network 1202) in the order the addresses arrived in certain embodiments.

Stores may be similar, for example, except both address and data have to arrive (e.g., from one or more PEs) before any operation is sent off to the memory system in certain embodiments.

Network 1202 may be a packet switched network, e.g., a mezzanine network as discussed in reference to FIGS. 48-55. In certain embodiments, RAF circuit 1200 is to send a backpressure value via a network to a producer (e.g., transmitter) component (e.g., PE) when an input queue of the RAF circuit 1200 is full. The backpressure value may cause a stall of the producing component (e.g., PE) from issuing or sending an additional memory request (e.g., to that particularly input queue) until storage space is available in the input queue of the RAF circuit. In certain embodiments, a receiving component (e.g., PE) is to send a backpressure value via a network to RAF circuit 1200 to stall the sending of data from a completion buffer 1228, 1230, or 1232 until storage space is available in the input queue of the receiving component (e.g., PE). Data sent from and into network 1220 may include a channel identification value that identifies which input queue 1222, 1224, or 1226 that data is to be stored into (e.g., data less the bits that for the identification value). For example, an identification value may include a first field that identifies a particular input queue of a RAF circuit (e.g., and a second field that identifies that particular RAF circuit from a plurality of RAF circuits).

Optionally, a translation lookaside buffer (TLB) 1246 may be included to convert a logical address received from an input queue 1222, 1224, or 1226 into a physical address of the memory (e.g., cache). In one embodiment, the memory accessed is one or more of the cache banks discussed herein.

Figure 13:
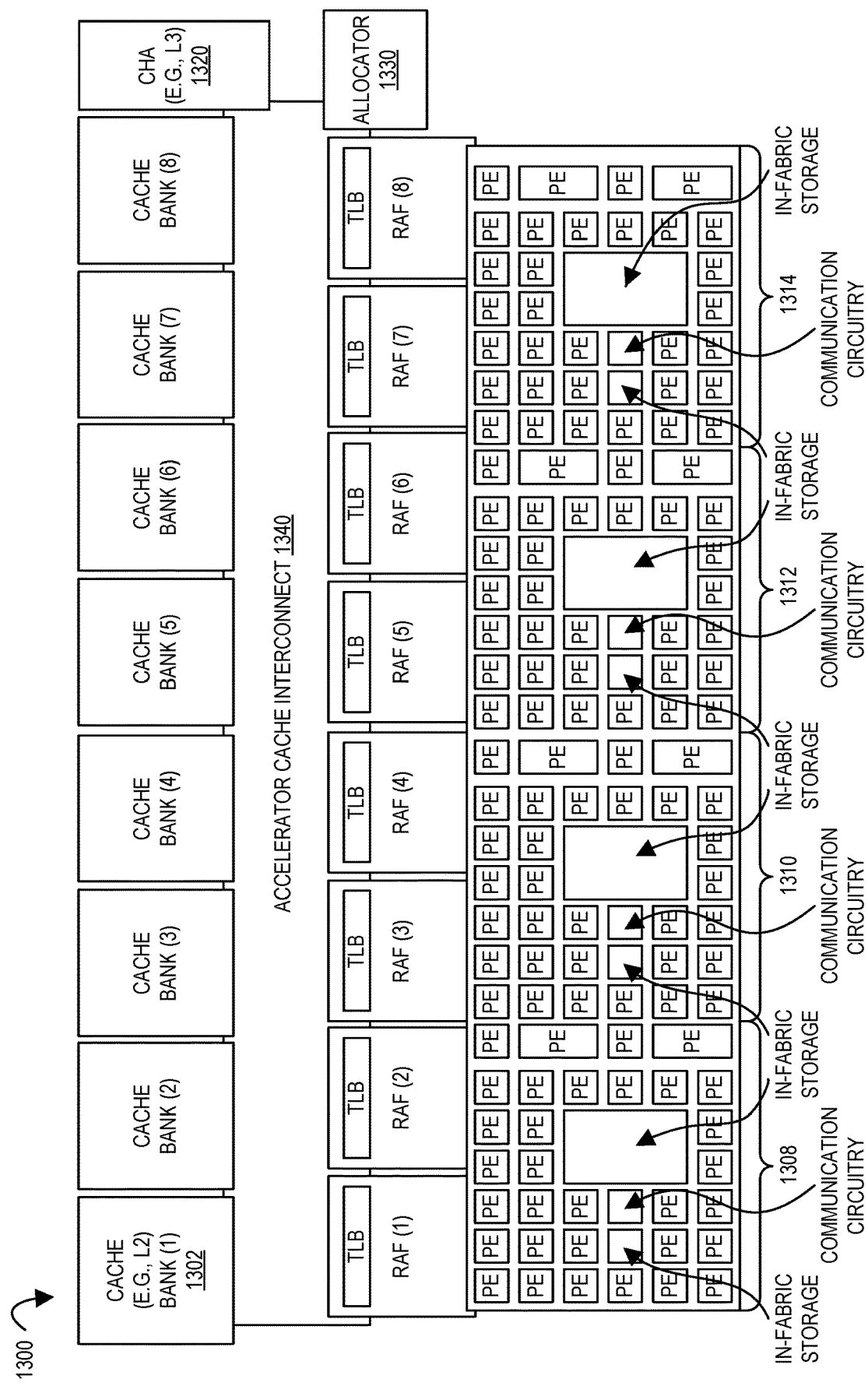
FIG. 13 illustrates a plurality of request address file (RAF) circuits coupled between a plurality of accelerator tiles and a plurality of cache banks according to embodiments of the disclosure.

Dataflow graphs may be capable of generating a profusion of (e.g., word granularity) requests in parallel. Thus, certain embodiments of the CSA provide a cache subsystem with sufficient bandwidth to service the CSA. A heavily banked cache microarchitecture, e.g., as shown in FIG. 13 may be utilized. FIG. 13 illustrates a circuit 1300 with a plurality of request address file (RAF) circuits (e.g., RAF circuit (1)) coupled between a plurality of accelerator tiles (1308, 1310, 1312, 1314) and a plurality of cache banks (e.g., cache bank 1302) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopt the shared virtual memory (SVM) model to integrate with other tiled architectures. Certain embodiments include an Accelerator Cache Interconnect (ACI) network 1340 connecting the RAFs to the cache banks. This network may carry address and data between the RAFs and the cache. The topology of the ACI may be a cascaded crossbar, e.g., as a compromise between latency and implementation complexity. Allocator 1330 (e.g., allocator circuit) may be included to allocate components of RAF circuit(s) for particular operations or instances of particular operations, e.g., as discussed below in Section 2.4. Allocator may be coupled to a core of a processor, e.g., one of the cores in FIG. 2. A core may send an indication to an allocator to begin allocation. PEs may communicate with RAF circuits via a circuit switched network, e.g., as discussed herein.

In certain embodiments, accelerator-cache network is further coupled to circuitry 1320 that includes a cache home agent and/or next level cache. In certain embodiments, accelerator-cache network (e.g., interconnect) is separate from any (for example, circuit switched or packet switched) network of an accelerator (e.g., accelerator tile), e.g., RAF is the interface between the processing elements and the cache home agent and/or next level cache. In one embodiment, a cache home agent is to connect to a memory (e.g., separate from the cache banks) to access data from that memory (e.g., memory 202 in FIG. 2), e.g., to move data between the cache banks and the (e.g., system) memory. In one embodiment, a next level cache is a (e.g., single) higher level cache, for example, such that the next level cache (e.g., higher level cache) is checked for data that was not found (e.g., a miss) in a lower level cache (e.g., cache banks). In one embodiment, this data is payload data. In another embodiment, this data is a physical address to virtual address mapping. In one embodiment, a CHA is to perform a search of (e.g., system) memory for a miss (e.g., a miss in the higher level cache) and not perform a search for a hit (e.g., the data being requested is in the cache being searched).

Figure 14:
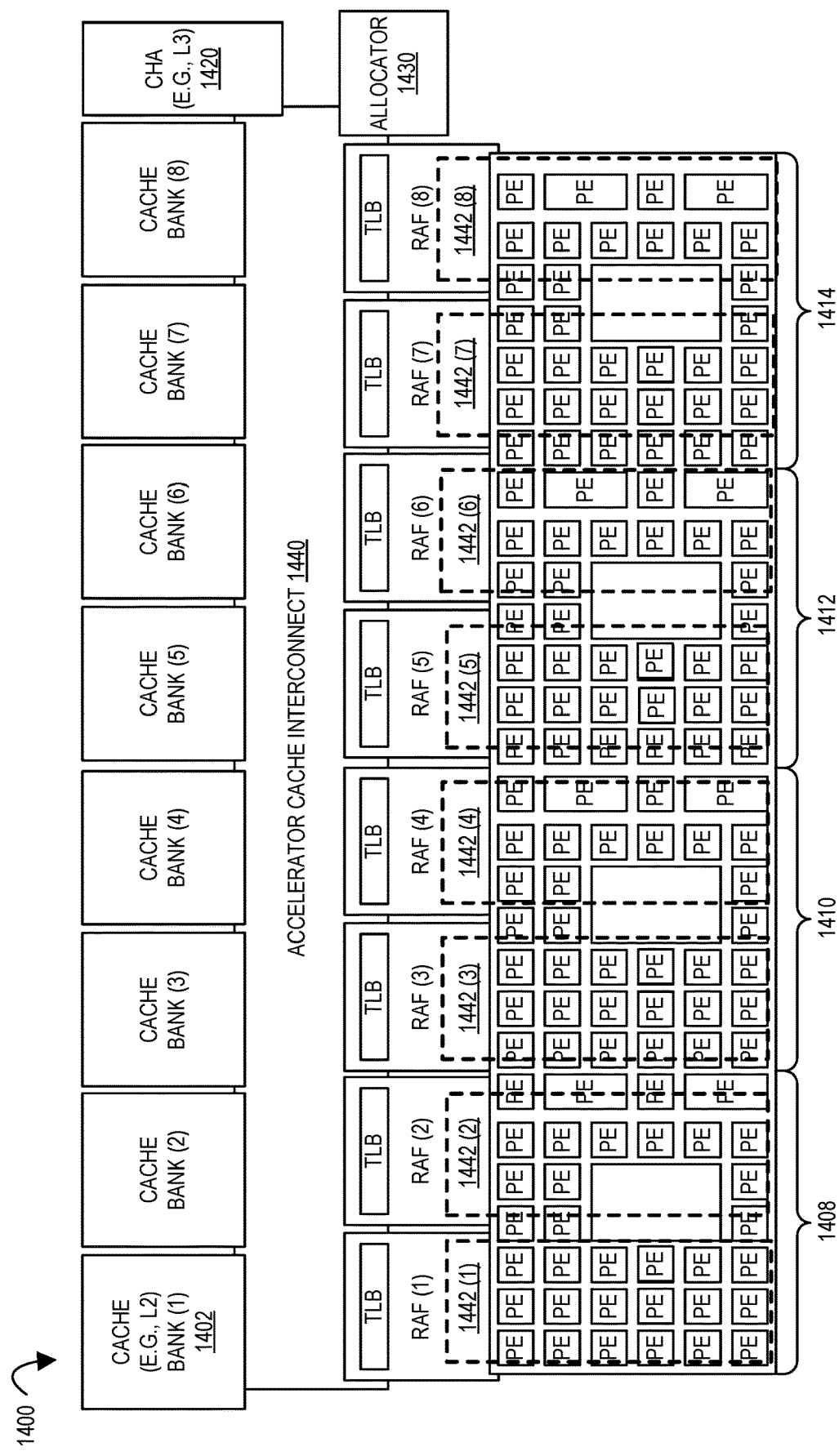
FIG. 14 illustrates a plurality of request address file (RAF) circuits coupled between a plurality of accelerator tiles and a plurality of cache banks according to embodiments of the disclosure.

FIG. 14 illustrates a circuit 1400 with a plurality of request address file (RAF) circuits (e.g., RAF circuit (1)) coupled between a plurality of accelerator tiles (1408, 1410, 1412, 1414) and a plurality of cache banks (e.g., cache bank 1402) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopt the shared virtual memory (SVM) model to integrate with other tiled architectures. Certain embodiments include an Accelerator Cache Interconnect (ACI) network 1440 connecting the RAFs to the cache banks. This network may carry address and data between the RAFs and the cache. The topology of the ACI may be a cascaded crossbar, e.g., as a compromise between latency and implementation complexity. Allocator 1430 (e.g., allocator circuit) may be included to allocate components of RAF circuit(s) for particular operations or instances of particular operations, e.g., as discussed below in Section 2.4. Allocator may be coupled to a core of a processor, e.g., one of the cores in FIG. 2. A core may send an indication to an allocator to begin allocation. PEs may communicate with RAF circuits via a packed switched network, e.g., mezzanine network as discussed herein. In the depicted embodiment, each RAF circuit (1) through (8) includes its own respective mezzanine network 1442 (1) through (8) as shown with a dotted box to couple to one or more (e.g., any) of the PEs in FIG. 14.

In certain embodiments, accelerator-cache network is further coupled to circuitry 1420 that includes a cache home agent and/or next level cache. In certain embodiments, accelerator-cache network (e.g., interconnect) is separate from any (for example, circuit switched or packet switched) network of an accelerator (e.g., accelerator tile), e.g., RAF is the interface between the processing elements and the cache home agent and/or next level cache. In one embodiment, a cache home agent is to connect to a memory (e.g., separate from the cache banks) to access data from that memory (e.g., memory 202 in FIG. 2), e.g., to move data between the cache banks and the (e.g., system) memory. In one embodiment, a next level cache is a (e.g., single) higher level cache, for example, such that the next level cache (e.g., higher level cache) is checked for data that was not found (e.g., a miss) in a lower level cache (e.g., cache banks). In one embodiment, this data is payload data. In another embodiment, this data is a physical address to virtual address mapping. In one embodiment, a CHA is to perform a search of (e.g., system) memory for a miss (e.g., a miss in the higher level cache) and not perform a search for a hit (e.g., the data being requested is in the cache being searched).

2.4 Allocation of Memory Interface Circuits and/or Components Thereof

To meet nowadays increasingly advanced performance target and aggressive energy goal, a parallel, distributed dataflow architecture, named Configurable Spatial Architecture (CSA), has been developed. A CSA may include processing elements, request address file (RAF) circuits, network between the processing elements and RAF circuits, cache(s), network between RAF circuits and cache(s), other memory (e.g., as shown in FIG. 16), network between caches and memory, or any combination thereof.

As a dataflow architecture, embodiments of CSA have a unique memory architecture, for example, where memory accesses are decoupled into an explicit request and response phase allowing pipelining through memory. This architecture permits the address generation portions of the dataflow graphs to typically produce a large number of address accesses, and allows these embodiments of CSA to drive high memory bandwidth, and also gives the CSA memory interface microarchitecture a number of opportunities to improve program performance by observing the memory access stream. Certain embodiments herein leverage these improvements to improve performance of dataflow graphs, e.g., by allowing more data accesses in a given period of time. In one embodiment, the characteristics of parallel computing determine the intensive memory accesses and therefore the CSA's memory sub-system is critical for the ultimate performance levels, e.g., to minimize the execution time within the memory sub-system. Certain embodiments herein provide for improved memory sub-system design via allocation and the improvements to allocation discussed herein.

FIG. 15 illustrates a flow diagram 1500 according to embodiments of the disclosure. Depicted flow 1500 includes: coupling a spatial array of processing elements to a first memory interface circuit comprising a first port into a cache, a first plurality of input queues to store data for memory requests from the spatial array of processing elements, and a first memory operation register, and to a second memory interface circuit comprising a second port into the cache, a second plurality of input queues to store data for memory requests from the spatial array of processing elements, and a second memory operation register 1502; setting respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements 1504; and setting respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements 1506.

Figure 16:
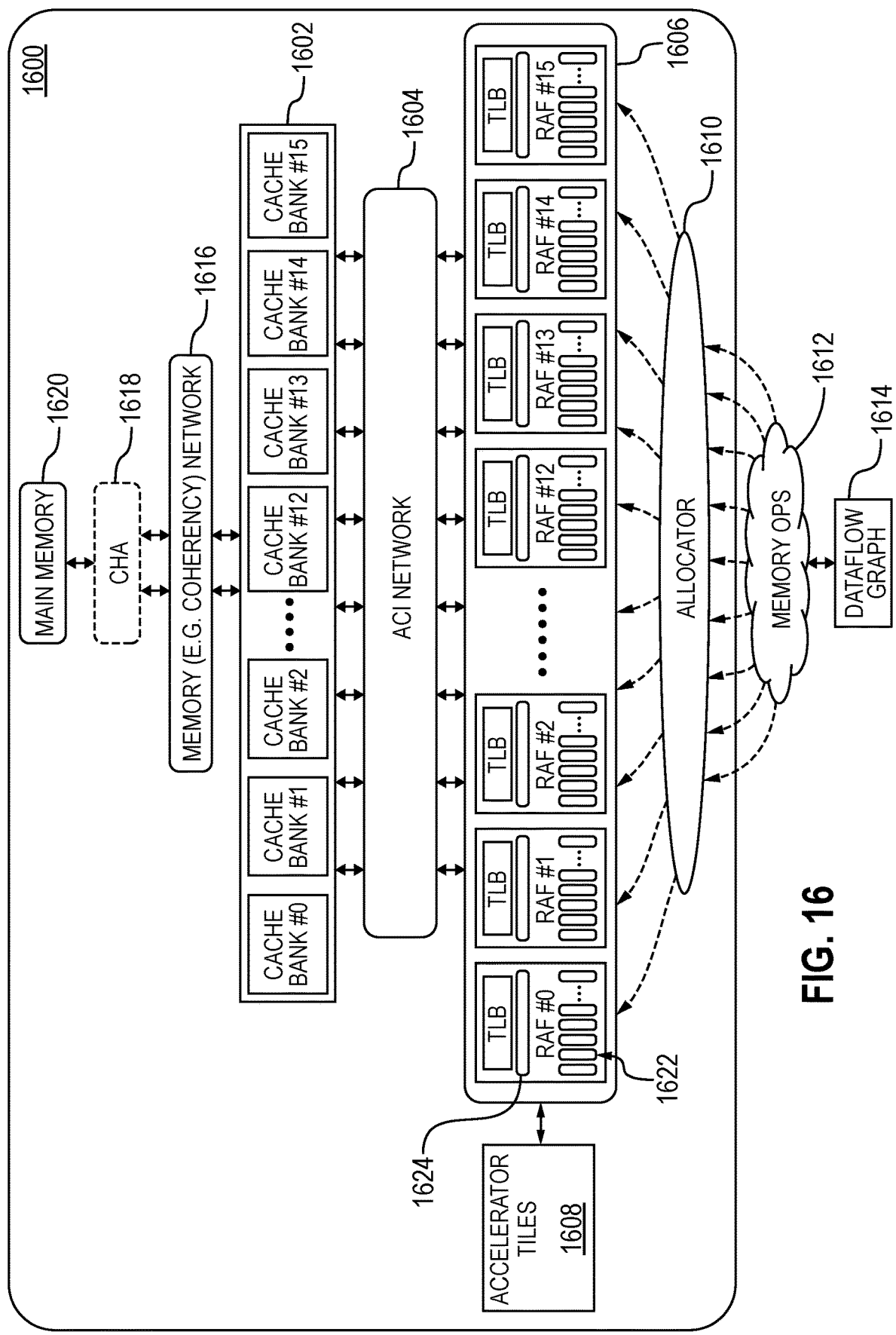
FIG. 16 illustrates a high level view of a configurable spatial accelerator and its memory sub-systems according to embodiments of the disclosure.

FIG. 16 illustrates a high level view of a configurable spatial accelerator and its memory sub-systems (including RAF circuits 1606, Accelerator Cache Interface (ACI) network 1604, cache banks 1602, memory (e.g., coherency) network 1616, cache home agent 1618, and main memory 1620) according to embodiments of the disclosure. The depicted CSA memory sub-systems are distributed, with multiple interfaces (e.g., RAF circuits) capable of injecting requests. In certain embodiments, this distributed dataflow architecture and microarchitecture improves the functioning of a computer (e.g., including RAF circuits).

In one embodiment, each RAF circuit includes multiple input queues (e.g., and multiple completion buffers) that are to be programmed (e.g., via storing a respective value into a memory operation register(s)) to (e.g., repeatedly) perform a certain operation. For example, a given processing element may request data from memory (e.g., cache) and do so via sending a memory request (e.g., sending a value that indicates a memory address) to a particular input queue(s) of a RAF circuit, and that RAF circuit (e.g., its memory operation register(s)) was pre-programmed to cause issuance of those requests to memory. As another example, each RAF circuit includes a plurality of input queues (e.g., input queues 1622 in RAF circuit 1) and a plurality of slots in a completion buffer (e.g., completion buffer 1624 in RAF circuit 1) that are assigned to a particular memory operation (e.g., for a particular data requesting PE and/or data receiving PE, which may be the same PE in one embodiment). RAF circuits may receive memory operation requests from accelerator tile(s) 1608 (e.g., an accelerator tile having a plurality of processing elements as discussed herein).

In FIG. 16, an allocator 1610 (e.g., an allocator circuit) is to send the appropriate control values (e.g., into memory operation register(s)) to assign memory operation to a particular RAF circuit (e.g., and more particularly, to a particular subset of the components of that particular RAF circuit) according to a desired allocation mode of a plurality of allocation modes. Having a plurality of allocation modes is an improvement to the functioning of a computer because it allows allocation flexibility based on static and dynamic execution properties of a dataflow graph. Certain embodiments herein improve the performance of a CSA with an optimized mapping of memory operations and RAF circuit resources (e.g., input buffers and/or completion buffers).

One or more of the allocation modes herein allow for optimizing RAF circuit resources in order to match each application's requirements and thus reach the optimal performance goal. In embodiments with a statically multiplexed and distributed structure, allocation of RAF circuits (e.g., and proper subsets of the components therein) allows for memory operations of a dataflow graph to be bound to the RAF circuits in a way that achieves the maximal performance. Several considerations may weigh into this decision, including static and dynamic execution properties of the dataflow graph.

In certain embodiments, a memory operation is (or a proper subset of the memory operations of a dataflow graph are) statically assigned to a particular RAF circuit for the lifetime of graph execution. In one embodiment, a plurality of respective memory operations are assigned to each respective RAF circuit, and, at runtime, a RAF circuit (e.g., hardware) will select (e.g., each cycle) one memory operation among the ready-to-execute memory operations (e.g., ready because their data is available in an input queue(s) and there is space available in their completion buffer for their data and/or completion indication). In certain embodiments, a memory operation is (or a proper subset of the memory operations of a dataflow graph are) dynamically assigned to a particular RAF circuit during the lifetime of graph execution.

In certain embodiments, the RAF circuit is responsible for executing memory operations and serves as an interface between the CSA fabric (e.g., PEs) and the memory hierarchy. Certain embodiments herein include an allocator (e.g., allocator circuit) that assigns memory operations to RAF channels. In one embodiment, the allocator is to achieve the best performance and maximal bandwidth. The allocator may take as inputs: (i) the number of memory operations to be performed in executing a dataflow graph (e.g., "N" number of memory operations (OP) in the graph: $OP_0$, $OP_1$, $OP_2$, ... $OP_{N-1}$, (ii) the number of RAF circuits, and/or (iii) the number of input queues (and/or completion buffers) for each RAF circuit (e.g., "R" number of RAF circuits (e.g., per CSA tile) and "C" number of input queues per RAF circuit): RAF(0)_InputQueue0, RAF(0)_InputQueue1, . . . RAF(0)_InputQueueC−1, RAF(1)_InputQueue0, RAF(1)_InputQueue1, . . . RAF(1)_InputQueueC−1, and RAF(R−1)_InputQueue0, RAF(R−1)_InputQueue1, . . . RAF(R−1)_InputQueueC−1). An InputQueue as discussed above may be a single input queue or a pair of input queues that are bound together (e.g., in a store operation, a first input queue to receive the data to be stored and a second input queue to receive the address for the data that is to be stored). In one embodiment, a single memory request is issued (e.g., arbitrated) by each RAF circuit per cycle into cache (e.g., via an ACI network) and thus the allocation of memory operations to RAF circuits is critical for performance. In one embodiment, the allocation is to select between multiple allocation modes to achieve a mapping of N memory operations to (e.g., R×C) RAF resources (e.g., input queues) that achieves the best performance and/or lowest power consumption. In one embodiment, each RAF circuit has the same number of input queues (and/or completion buffers) as any other RAF circuits utilized.

In one embodiment, a random allocation of memory operations to RAF components (e.g., input queues) is done, but such an allocation may have extreme load imbalance, and make the performance unacceptable and unpredictable.

The below includes twelve examples of (e.g., non-random) allocation modes for an allocator to utilize to assign memory operations to RAF circuits in order to reach a desired goal (e.g., optimal performance level). An allocation mode may select from one or more of the following goals: (1) high-bandwidth memory operations are more critical to performance, (2) high-latency memory operations are more critical to performance, (3) load-balancing across all RAF circuits leads to better performance, (4) assignments based on bidding groups help improve performance, (5) assignments based on operation types help improve performance, or (6) assignments based on operation bins with bandwidth ranges help improve performance. Further, the below includes two allocation modes to allocate completion buffers.

In certain embodiments, an allocator (e.g., allocator circuit) collects run time data (or accesses previously collected run time data). The run time data may include memory issue counts for a dataflow graph. In one embodiment, memory issues counts may be any integer, e.g., a certain dataflow graph may include 10s, 100s, 1000s, 10,000s, 100,000s, millions, or even billions of memory issuances for that dataflow graph.

In one embodiment, each of the RAF circuits are an instance of RAF circuit 1100 of FIG. 11 or RAF circuit 1200 of FIG. 12. In certain embodiments, the setting of a value into a memory operation register (e.g., into register(s) 1110 in FIG. 11 or into register(s) 1210 in FIG. 12) sets that RAF circuit into the desired allocation mode, for example, to cause the assigning of input queues for a respective, particular memory operation according to the allocation mode. In certain embodiments, the assigning includes coupling input queues to a port of a RAF circuit into memory (e.g., into cache).

I. Load-Balancing Longest-Job-First (LB-LJF) Allocation Mode

In certain embodiments, memory operations that are issued more times are more critical to performance. In one embodiment, for a particular dataflow graph and input data set, each memory operation will execute a fixed number of times. If frequently issued memory operations are given less issue bandwidth, the minimum execution time will increase in certain embodiments.

Thus, giving high-issue count operations the higher arbitration priority may help improve the performance and achieve higher bandwidth in these embodiments. In addition, better performance may be achieved in these embodiments if the total number of issue times across all RAF circuits is balanced. The first allocation mode provides those two improvements by sorting the memory operations (e.g., of a single dataflow graph) according to their issue counts and assigning the memory operations to RAF components (e.g., input queues) in a balanced way. This may be referred to as Load-Balancing Longest-Job-First (LB-LJF) allocation mode.

An example of this allocation mode is described below:
1) Sort all memory operations from the highest issue count (e.g., the number of times a particular memory operation executes) to the lowest issue count. Issue count may be obtained either through feedback (e.g., profile-guided optimization) or from compiler generated relative issue count estimations;
2) Start assigning the sorted memory operations to RAF (0)_InputQueue0, RAF(1)_InputQueue0, . . . RAF(R−1)_InputQueue0 until every RAF circuit's first component (e.g., input queue) is allocated;
3) Count all RAF circuits' issue counts (e.g., loads and stores) that have been assigned so far, e.g., add all issue counts of all components (e.g., input queues) in each RAF circuit;
4) Assigning the next sorted memory operation to the next available component (e.g., input queue) of the RAF circuit with the minimal load;
5) Repeat 3) and 4) until the last of the memory operations is allocated to a RAF circuit; and
6) Note if two memory operations' issue counts are the same, this allocation mode handles them in the opposite of the lexical program order (or in lexical program order in another embodiment).

Figure 19:
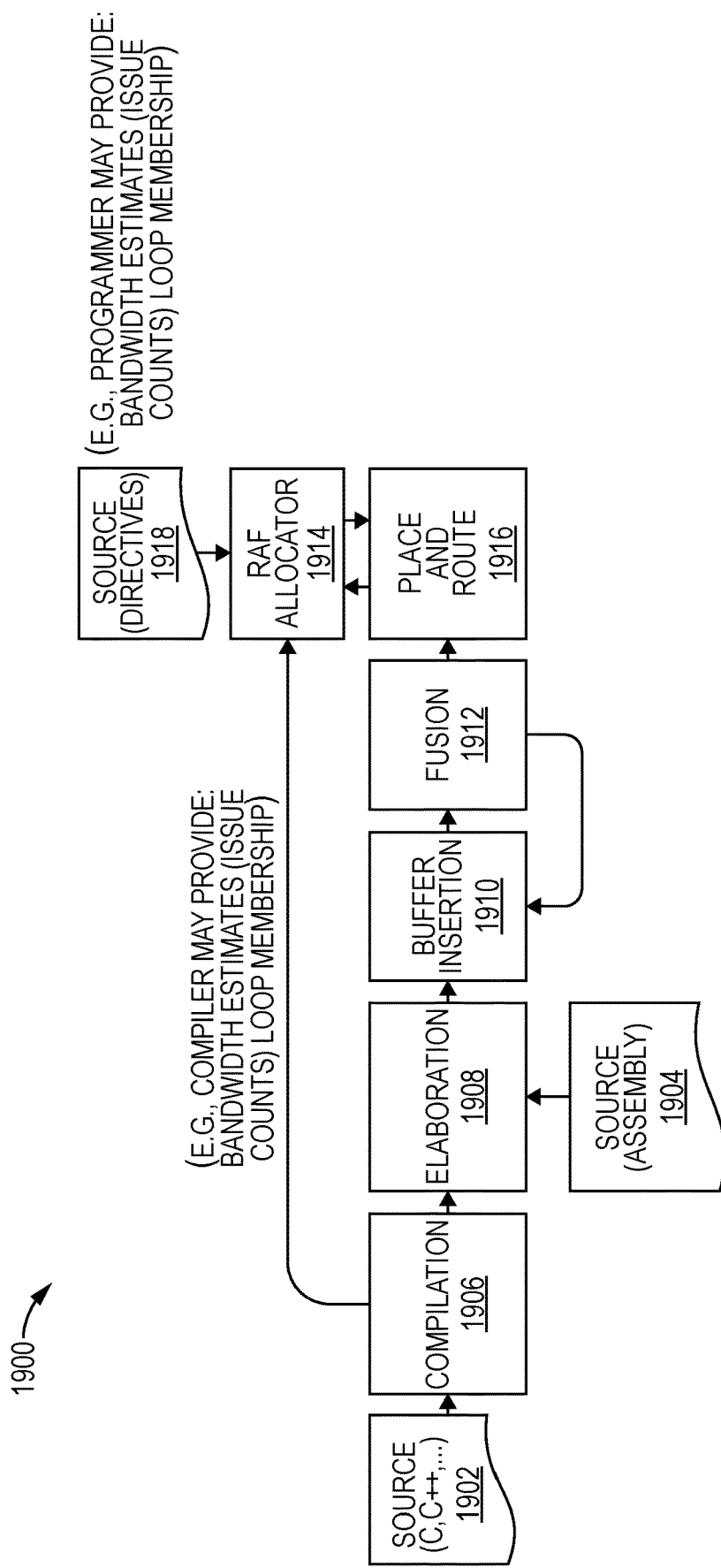
FIG. 19 illustrates a software flow for allocation according to embodiments of the disclosure.

In one embodiment, LB-LJF RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the LB-LJF allocation mode is able to balance memory operations (e.g., issue counts) across multiple RAF circuits.

II. Load-Balancing (LB) Allocation Mode

The second allocation mode is referred to as Load-Balancing (LB) allocation mode. Similar to the first allocation mode, this allocation mode gives high-issue count operations the higher arbitration priority and balances the total number of issue times across all RAFs. One difference from the first allocation mode is that this allocation mode does not sort memory operations according to their issue counts, but instead allocates them to RAF components (e.g., input queues) according to their lexical program order.

An example of this allocation mode is described below:
1) Start assigning, in lexical program (e.g., unsorted), the memory operations to RAF(0)_InputQueue0, RAF(1)_InputQueue0, . . . RAF(R−1)_InputQueue0 until every RAF circuit's first component (e.g., input queue) is allocated;
2) Count all RAF circuits' issue counts (e.g., loads and stores) that have been assigned so far, e.g., add all issue counts of all components (e.g., input queues) in each RAF circuit. In one embodiment, issue count is obtained either through feedback (e.g., profile-guided optimization) or from compiler generated relative issue count estimations;
3) Assigning the next (e.g., unsorted) memory operation to the next available component (e.g., input queue) of the RAF circuit with the minimal load; and
4) Repeat 2) and 3) until the last of the memory operations is allocated to a RAF circuit.

In one embodiment, LB RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the LB allocation mode is able to balance memory operations (e.g., issue counts) across multiple RAF circuits.

III. Bin-Based Load-Balancing Longest-Job-First (BB-LB-LJF)

The third RAF allocation mode is referred to as Bin-Based Load-Balancing Longest-Job-First (BB-LB-LJF) allocation mode. Similar to the first allocation mode, this allocation mode gives high-issue count operations the higher arbitration priority and balances the total number of issue times across all RAFs. One difference from the first allocation mode is that this allocation mode places a proper subset of memory operations that are issued substantially the same amount of times in the same bin and treats those in each bin equally in order to optimize the performance further. The detailed allocation mode is described.

An example of this allocation mode is described below:
1) Sort all memory operations from the highest issue count (e.g., the number of times a particular memory operation executes) to the lowest issue count. Issue count may be obtained either through feedback (e.g., profile-guided optimization) or from compiler generated relative issue count estimations;
2) Additionally, the memory operations with close issue counts (for example, plus or minus about 2%, 3%, 4%, 5%, 6%, 7%, 8%, 9%, 10%, or any other integer) are considered part of a single bin so that each bin of a plurality of bins covers a small range of issue counts instead of a single issue count;
3) All bins are sorted from the highest issue count range to the lowest issue count range; but inside each bin, memory operations remain in the lexical program order (for example, a bin for issue counts between 100 and 1000 may include a first (in program order) memory operation having an issue count of 850 and a second (in program order) memory operation having an issue count of 950);
4) Start assigning the memory operations beginning with the first of the sorted bins to RAF(0)_InputQueue0, RAF(1)_InputQueue0, . . . RAF(R−1)_InputQueue0 until every RAF circuit's first component (e.g., input queue) is allocated;
4) Count all RAF circuits' issue counts (e.g., loads and stores) that have been assigned so far, e.g., add all issue counts of all components (e.g., input queues) in each RAF circuit;
5) Assigning the next (in program order) memory operation from a bin to the next available component (e.g., input queue) of the RAF circuit with the minimal load; and
4) Repeat 4) and 5) until the last of the memory operations is allocated to a RAF circuit.

In one embodiment, BB-LB-LJF RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the BB-LB-LJF allocation mode is able to balance memory operations (e.g., issue counts) across multiple RAF circuits.

IV. Type-Based Load-Balancing Longest-Job-First (TB-LB-LJF) Allocation Mode

The fourth RAF allocation mode is referred to as Type-Based Load-Balancing Longest-Job-First (TB-LB-LJF) allocation mode. This allocation mode uses bandwidth as a key decider of RAF component (e.g., input queue) resource allocation among competing memory operations (e.g., with the number of issue times as the bandwidth indicator) to provide a load-balancing allocation mode which also applies a longest-job-first strategy. Certain embodiments of this mode also prioritize different types of memory requests to further optimize the performance.

In certain embodiments, there are three main types of memory operations handled by a CSA memory subsystem, i.e., loads, stores, and prefetches. However, in certain dataflow graphs, it may not be desirable to treat all of those three main types with the same level of priority when allocating RAF circuit resources. In certain embodiments, prefetches are not as critical as load and store requests where prefetches aim to boost the performance by fetching data well before it is actually needed. In certain embodiments, allocating loads and stores before prefetches leads to a better performing CSA.

In certain embodiments, in the fourth allocation mode, memory operations in the order of load-store-prefetch are sorted according to their issue counts and assigned to RAF components (e.g., input queues) in a balanced way.

An example of this allocation mode is described below:
1) Sort all load operations from the highest issue count (e.g., the number of times a particular memory operation executes) to the lowest issue count. Issue count may be obtained either through feedback (e.g., profile-guided optimization) or from compiler generated relative issue count estimations;
2) Sort all store operations from the highest issue count (e.g., the number of times a particular memory operation executes) to the lowest issue count. Issue count may be obtained either through feedback (e.g., profile-guided optimization) or from compiler generated relative issue count estimations;
3) Sort all pre-fetch operations from the highest issue count (e.g., the number of times a particular memory operation executes) to the lowest issue count. Issue count may be obtained either through feedback (e.g., profile-guided optimization) or from compiler generated relative issue count estimations;
4) Start assigning the sorted memory operations (e.g., in the following order as needed: sorted load operations, then sorted store operations, and finally, sorted prefetch operations) to RAF(0)_InputQueue0, RAF(1)_InputQueue0, ... RAF(R−1)_InputQueue0 until every RAF circuit's first component (e.g., input queue) is allocated;
5) Count all RAF circuits' issue counts (e.g., loads and stores) that have been assigned so far, e.g., add all issue counts of all components (e.g., input queues) in each RAF circuit;
6) Assigning the next memory operation to the next available component (e.g., input queue) of the RAF circuit with the minimal load for the sorted operations (e.g., in the following order as needed: sorted load operations, then sorted store operations, and finally, sorted prefetch operations);
7) Repeat 5) and 6) until the last of the memory operations is allocated to a RAF circuit; and
8) Note if two memory operations' issue counts are the same, this allocation mode handles them in the opposite of the lexical program order (or in lexical program order in another embodiment).

In one embodiment, TB-LB-LJF RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the TB-LB-LJF allocation mode is able to balance memory operations (e.g., issue counts) across multiple RAF circuits and takes the types of memory operations in consideration.

V. Randomized Load-Balancing Longest-Job-First (Randomized-LB-LJF) Allocation Mode The fifth RAF allocation mode is referred to as Randomized Load-Balancing Longest-Job-First (Randomized-LB-LJF) allocation mode. This allocation mode applies a randomized strategy to make the RAF allocations more coarse-grained. In one embodiment of this mode, memory operations are sorted according to their issue counts and assigned to RAF components (e.g., input queues) in a balanced way by applying a randomized methodology.

An example of this allocation mode is described below:
1) Sort all memory operations from the highest issue count (e.g., the number of times a particular memory operation executes) to the lowest issue count. Issue count may be obtained either through feedback (e.g., profile-guided optimization) or from compiler generated relative issue count estimations;
2) Start assigning the sorted memory operations to RAF (0)_InputQueue0, RAF(1)_InputQueue0, ... RAF(R−1)_InputQueue0 until every RAF circuit's first component (e.g., input queue) is allocated;
3) Count all RAF circuits' issue counts (e.g., loads and stores) that have been assigned so far, e.g., add all issue counts of all components (e.g., input queues) in each RAF circuit;
4) Pick "M" number (e.g., a proper subset of all the RAF circuits) of RAF circuits below an (e.g., minimal) issue count value;
5) Randomly choose one RAF circuit from the M number (e.g., more than one and less than all of) RAF circuits;
6) Assigning the next sorted memory operation to that one chosen RAF circuit;
7) Repeat 3)-6) until the last of memory operation is allocated; and
8) Note if two memory operations' issue counts are the same, this allocation mode handles them in the opposite of the lexical program order (or in lexical program order in another embodiment).

In one embodiment, Randomized-LB-LJF RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the Randomized-LB-LJF allocation mode is able to balance memory operations (e.g., issue counts) across multiple RAF circuits and also utilizes advantages of a randomized strategy.

VI. Randomized Bin-Based Load-Balancing Longest-Job-First (Randomized-BB-LB-LJF) Allocation Mode The sixth RAF allocation mode is referred to as Randomized Bin-Based Load-Balancing Longest-Job-First (Randomized-BB-LB-LJF) allocation mode. This allocation mode uses bandwidth as a key decider of RAF channel (e.g., input queue) resource allocation among competing memory operations (e.g., with the number of issue times as the bandwidth indicator). In one embodiment, this mode also applies both Longest-Job-First and randomized strategies. Certain embodiments of this mode also put all memory operations that are issued (e.g., substantially or roughly) the same amount of times in the same bin and treats them equally in order to optimize the performance further. Thus, certain embodiments herein utilize memory operations sorted according to their issue counts, puts those into the bins, and assigns them to RAF components (e.g., input queues) in a balanced way by applying a randomized strategy.

An example of this allocation mode is described below:
1) Sort all memory operations from the highest issue count (e.g., the number of times a particular memory operation executes) to the lowest issue count. Issue count may be obtained either through feedback (e.g., profile-guided optimization) or from compiler generated relative issue count estimations;
2) Additionally, the memory operations with close issue counts (for example, plus or minus about 2%, 3%, 4%, 5%, 6%, 7%, 8%, 9%, 10%, or any other integer) are considered part of a single bin so that each bin of a plurality of bins covers a small range of issue counts instead of a single issue count;

3) All bins are sorted from the highest issue count range to the lowest issue count range; but inside each bin, memory operations remain in the lexical program order (for example, a bin for issue counts between 100 and 1000 may include a first (in program order) memory operation having an issue count of 850 and a second (in program order) memory operation having an issue count of 950);

4) Start assigning the memory operations beginning with the first of the sorted bins to RAF(0)_InputQueue0, RAF(1)_InputQueue0, . . . RAF(R−1)_InputQueue0 until every RAF circuit's first component (e.g., input queue) is allocated;

4) Count all RAF circuits' issue counts (e.g., loads and stores) that have been assigned so far, e.g., add all issue counts of all components (e.g., input queues) in each RAF circuit;

5) Pick "M" number (e.g., a proper subset of all the RAF circuits) of RAF circuits below an (e.g., minimal) issue count value;

6) Randomly choose one RAF circuit from the M number (e.g., more than one and less than all of) RAF circuits;

7) Assigning the next sorted memory operation to that one chosen RAF circuit; and 8) Repeat 4)-7) until the last of memory operation is allocated.

In one embodiment, Randomized-BB-LB-LJF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the Randomized-LB-LJF allocation mode is able to balance memory operations (e.g., issue counts) across multiple RAF circuits and also take advantage of randomized and bin-based strategies.

VII. Bin-Based Randomized Load-Balancing Longest-Job-First (BB-Randomized-LB-LJF) Allocation Mode The seventh RAF allocation mode is referred to as Bin-Based Randomized Load-Balancing Longest-Job-First (BB-Randomized-LB-LJF) allocation mode. In certain embodiments, memory operations that are issued more times are more critical to performance, there is better performance if the total number of issue times across all RAF circuits is balanced, a randomized strategy makes the allocations more coarse-grained, and memory operations with similar (e.g., very close) issue counts are put in the same bin and are treated similarly. In certain embodiments of this mode, memory operations are sorted according to their issue counts, put into the bins, and assigned to RAF components (e.g., input queues) in a balanced way by applying a randomized strategy.

An example of this allocation mode is described below:

1) Sort all memory operations from the highest issue count (e.g., the number of times a particular memory operation executes) to the lowest issue count. Issue count may be obtained either through feedback (e.g., profile-guided optimization) or from compiler generated relative issue count estimations;

2) Additionally, the memory operations with close issue counts (for example, plus or minus about 2%, 3%, 4%, 5%, 6%, 7%, 8%, 9%, 10%, or any other integer) are considered part of a single bin so that each bin of a plurality of bins covers a small range of issue counts instead of a single issue count;

3) All bins are sorted from the highest issue count range to the lowest issue count range; but inside each bin, memory operations remain in the lexical program order (for example, a bin for issue counts between 100 and 1000 may include a first (in program order) memory operation having an issue count of 850 and a second (in program order) memory operation having an issue count of 950);

4) Start assigning the memory operations randomly from the first of the sorted bins (e.g, then, when done, randomly from the second bin, etc.) to RAF(0)_InputQueue0, RAF(1)_InputQueue0, . . . RAF(R−1)_InputQueue0 until every RAF circuit's first component (e.g., input queue) is allocated. Note that the memory operations in the same bin are allocated to RAF circuits in the random order;

5) Count all RAF circuits' issue counts (e.g., loads and stores) that have been assigned so far, e.g., add all issue counts of all components (e.g., input queues) in each RAF circuit;

6) Assigning the next (in random order) memory operation from a highest issue count bin to the next available component (e.g., input queue) of the RAF circuit with the minimal load; and 4) Repeat 5) and 6) until the last of the memory operations is allocated to a RAF circuit.

In one embodiment, BB-Randomized-LB-LJF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the BB-Randomized-LB-LJF allocation mode is able to balance memory operations (e.g., issue counts) across multiple RAF circuits and also take advantage of randomized and bin-based strategies.

VIII. Bandwidth-Balancing Longest-Job-First (Bandwidth-Balancing LJF) Allocation Mode The eighth RAF allocation mode is referred to as Bandwidth-Balancing Longest-Job-First (Bandwidth-Balancing LJF) allocation mode. This allocation mode uses request and response bandwidth as a key decider of RAF component (e.g., input queue) resource allocation among competing memory operations. In one embodiment, this mode is a load-balancing allocation mode which also applies a Longest-Job-First strategy. In certain embodiments of this mode, memory operations are sorted according to their issue counts and assigned to RAF components (e.g., input queues) in a request/response bandwidth balanced way.

An example of this allocation mode is described below:

1) Sort all memory operations from the highest issue count (e.g., the number of times a particular memory operation executes) to the lowest issue count. Issue count may be obtained either through feedback (e.g., profile-guided optimization) or from compiler generated relative issue count estimations;

2) Start assigning the sorted memory operations to RAF(0)_InputQueue0, RAF(1)_InputQueue0, . . . RAF(R−1)_InputQueue0 until every RAF circuit's first component (e.g., input queue) is allocated;

3) Individually track for each RAF circuit ("RAFi"): its total request bandwidth ("Req_BW") and total response bandwidth ("Res_BW"), for example, RAFi: Req_BWi and Res_BWi for i=0, 1, 2, . . . R−1;
4) Assigning the next sorted memory operation to the next available component (e.g., input queue) of the RAF circuit that satisfies Minimum(Maximum (Req_BWi+Req_BWNext, Res_BWi+Res_BWNext), for i=0 . . . R−1); and
5) Repeat 3) and 4) until the last of the memory operations is allocated to a RAF circuit.

In one embodiment, Bandwidth-Balancing LJF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the Bandwidth-Balancing LJF allocation mode is able to balance request/response bandwidth across multiple RAF circuits while giving the higher arbitration priority to the longer memory operation.

IX. Bandwidth-Balancing Allocation Mode

The ninth RAF allocation mode is referred to as Bandwidth-Balancing allocation mode. This allocation mode uses request and response bandwidth as a key decider of RAF component (e.g., input queue) resource allocation among competing memory operations. In one embodiment, this mode is a bandwidth balancing allocation mode to optimize the performance by so that each RAF circuit's request/response bandwidth is balanced.

An example of this allocation mode is described below:
1) Start assigning, in lexical program order, (e.g., unsorted) memory operations to RAF(0)_InputQueue0, RAF(1)_InputQueue0, . . . RAF(R−1)_InputQueue0 until every RAF circuit's first component (e.g., input queue) is allocated;
2) Individually track for each RAF circuit ("RAFi"): its total request bandwidth ("Req_BW") and total response bandwidth ("Res_BW"), for example, RAFi: Req_BWi and Res_BWi for i=0, 1, 2, . . . R−1;
3) Assigning the next, in lexical program order, (e.g., unsorted) memory operation to the next available component (e.g., input queue) of the RAF circuit that satisfies Minimum(Maximum (Req_BWi+Req_BWNext, Res_BWi+Res_BWNext), for i=0 . . . R−1); and
4) Repeat 2) and 3) until the last of the memory operations is allocated to a RAF circuit.

In one embodiment, Bandwidth-Balancing allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the Bandwidth-Balancing allocation mode is able to balance request/response bandwidth across the RAF circuits.

X. Latency-Aware Load-Balancing Longest-Job-First (LA-LB-LJF) Allocation Mode

The tenth RAF allocation mode is referred to as Latency-Aware Load-Balancing Longest-Job-First (LA-LB-LJF) allocation mode. This allocation mode uses both the bandwidth and latency as a key decider of RAF component (e.g., input queue) resource allocation among competing memory operations. This allocation mode uses the number of issue times as the bandwidth indicator and uses the multiplication of the bandwidth and latency as the load indicator, as well as a longest-job-first strategy. In one embodiment, giving high-bandwidth operations the higher arbitration priority helps improve the performance and achieve higher bandwidth, but memory operations with longer latency may be more likely important and giving them the higher priority during the RAF resource allocations help reduce the latency and lead to the better performance in certain embodiments. Certain embodiments herein provide an allocation mode that considers both the bandwidth and latency (e.g., where the load is a multiplication of the bandwidth and latency), and balances the loads across all RAF circuit in a balanced manner. In one embodiment, memory operations are sorted according to their loads (e.g., bandwidth value multiplied by latency value) and assigns the memory operations to RAF components (e.g., input queues) in a balanced way.

An example of this allocation mode is described below:
1) In certain embodiments, a memory operation's load is represented as the multiplication of its issue count and memory latency. The issue count and/or latency may be obtained either through feedback (e.g., profile-guided optimization) or from compiler generated relative issue count estimations;
2) Sort all memory operations from the highest load (e.g., load as represented above) to the lowest load (e.g., load as represented above);
3) Start assigning the sorted memory operations to RAF (0)_InputQueue0, RAF(1)_InputQueue0, . . . RAF(R−1)_InputQueue0 until every RAF circuit's first component (e.g., input queue) is allocated;
4) Individually track for each RAF circuit its loads thus far;
5) Assigning the next memory operation to the next available component (e.g., input queue) of the RAF circuit with the minimal load;
6) Repeat 4) and 35 until the last of the memory operations is allocated to a RAF circuit; and
7) Note if two memory operations' issue counts are the same, this allocation mode handles them in the opposite of the lexical program order (or in lexical program order in another embodiment).

In one embodiment, LA-LB-LJF RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the LA-LB-LJF allocation mode is able to balance memory operations (e.g., issue counts) across multiple RAF circuits by taking both the bandwidth and latency into consideration.

XI. Bidding-Group-Based Load-Balancing Longest-Job-First (BGB-LB-LJF) Allocation Mode The eleventh RAF allocation mode is referred to as Bidding-Group-Based Load-Balancing Longest-Job-First (BGB-LB-LJF) allocation mode. Certain embodiments of this allocation mode includes two parts, (i) first allocating the memory operations to RAF circuit bidding groups described (e.g., as discussed below in reference to FIG. 17) and then allocating them to individual RAF circuits in each bidding group, e.g., where in both parts, a load-balancing allocation mode also applies a longest-job-first strategy. This allocation mode uses bandwidth as a key decider of RAF component (e.g., input queue) resource allocation among competing memory operations (e.g., using the number of issue times as the bandwidth indicator). In certain embodiments, this mode gives high-issue count operations the higher arbitration priority (e.g., to improve the performance and achieve the higher bandwidth) and balances bandwidth across RAF circuits.

An example of this allocation mode is described below:
1) Sort all memory operations from the highest issue count (e.g., the number of times a particular memory operation executes) to the lowest issue count. Issue count may be obtained either through feedback (e.g., profile-guided optimization) or from compiler generated relative issue count estimations;
2) Divide a proper subset or RAF circuits into M (e.g., where M is a integer greater than one) number of bidding groups (e.g., Group1, Group2, . . . GroupM);
3) As a first part, assign memory operations to RAF bidding groups by:
   a) Walking through the sorted memory operations and assigning memory operations to Group1, Group2, . . . GroupM until every bidding group is allocated a memory operation;
   b) Count all groups' loads (e.g., issue counts) thus far (e.g., add all issue counts of memory operations in each bidding group);
   c) Continue to walk through the sorted memory operations and allocate the next memory operation to the group with the minimal load;
   d) Loop back to 3b) until the last memory operation is allocated to a bidding group;
   e) Note if two memory operations' issue counts are the same, this allocation mode handles them in the opposite of the lexical program order (or in lexical program order in another embodiment);
4) As a second part: assign memory operations to RAF circuits within each bidding group. For example, in the first part i.e., 3) above, some number of memory operations may be assigned to the bidding group Groupi (where i is the group number from 1 to M) with X RAF circuits (RAFXi, RAFXi+1, . . . RAFXi+X−1)
   a) Walk through the sorted memory operations assigned to Groupi and assign them to RAFXi, RAFXi+1, . . . RAFXi+X−1 until every RAF circuit's first component (e.g., input queue) is allocated;
   b) Count all X RAF circuits' loads so far;
   c) Continue to walk through the sorted memory operations and allocate the next memory operation to the next available component (e.g., input queue) of the RAF circuit with the minimal load;
   d) Loop back to b) until the last memory operation is allocated; and
   e) Note if two memory operations' issue counts are the same, this allocation mode handles them in the opposite of the lexical program order (or in lexical program order in another embodiment)

In one embodiment, BGB-LB-LJF RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the BGB-LB-LJF allocation mode is able to balance memory operations (e.g., issue counts) across RAF bidding groups and within each group.

XII. Load-Balancing Longest-Job-First Bidding-Group-Based (LB-LJF-BGB) Allocation Mode The twelfth RAF allocation mode is referred to as Load-Balancing Longest-Job-First Bidding-Group-Based (LB-LJFBGB) allocation mode. In contrast to 1)-4) in the example discussed above for the eleventh allocation mode, an embodiment of the twelfth allocation mode swaps the order of two parts (e.g., part 3 and part 4) in that example of the eleventh allocation mode. For example, an embodiment of the twelfth allocation mode first allocates the memory operations to RAF circuits and then groups RAF circuits into bidding groups.

This allocation mode uses bandwidth as a key decider of RAF component (e.g., input queue) resource allocation among competing memory operations (e.g., using the number of issue times as the bandwidth indicator). In certain embodiments, memory operations are sorted according to their issue counts and assigned to RAF circuits, and then groups RAF circuits into respective bidding groups in a balanced way.

An example of this allocation mode is described below:
1) Sort all memory operations from the highest issue count (e.g., the number of times a particular memory operation executes) to the lowest issue count. Issue count may be obtained either through feedback (e.g., profile-guided optimization) or from compiler generated relative issue count estimations;
2) Divide a proper subset or RAF circuits into M (e.g., where M is a integer greater than one) number of bidding groups (e.g., Group1, Group2, . . . GroupM), for example, with "R" number of RAF circuits each having "C" number of components (e.g., input queues) per RAF circuit;
3) Assign memory operations to R virtual RAF circuits and:
   a) Walk through the sorted memory operations and assign them to virtual RAF(0), virtual RAF(1), . . . virtual RAF(R−1) until every virtual RAF circuit's first component (e.g., input queue) is allocated;
   b) Count all virtual RAF circuits' loads so far (e.g., add all issue counts of memory operations assigned for each virtual RAF);
   c) Continue to walk through the sorted memory operations and allocate the next memory operation to the next available component (e.g., input queue) of the virtual RAF with the minimal load;
   d) Loop back to b) until the last memory operation is allocated;
   e) Note if two memory operations' issue counts are the same, this allocation mode handles them in the opposite of the lexical program order (or in lexical program order in another embodiment);
4) Assign R number of virtual RAFs to number M bidding groups while there are X number of virtual RAFs per group (e.g., where M×X=R) and:
   a) Calculate all R virtual RAF circuits' total loads (e.g., issue counts) and sort them accordingly;
   b) Walk through the sorted virtual RAFs from the highest load to the lowest load and assign them to Group1, Group2, . . . GroupM until every bidding group is allocated with a first RAF circuit;
   c) Count all bidding groups' loads (e.g., issue counts) so far (e.g., add all issue counts of memory operations for each bidding group);

d) Continue to walk through the sorted virtual RAFs and allocate the next virtual RAF to the group with the minimal load;
e) Loop back to c) until the last virtual RAF is allocated to a bidding group, if a bidding group has X virtual RAFs assigned the bidding group is removed from consideration and no further RAFs will be assigned to it;
f) Note if two memory operations' issue counts are the same, this allocation mode handles them in the opposite of the lexical program order (or in lexical program order in another embodiment);
5) Map R virtual RAFs in M bidding groups to R physical (e.g., actual) RAFs in the following way:
X virtual RAFs in Group 1 are RAF(0), RAF(1), . . . RAFX−1
X virtual RAFs in Group2 are RAFX, RAFX+1, . . . RAF2X−1
. . .
X virtual RAFs in GroupM are RAFR-X, RAFR-X+1, . . . RAF(R−1).

In one embodiment, LB-LJF-BGB RAF allocation mode assigns RAF components (e.g., input queues) to memory operations statically before the application starts to run and relies on the bandwidth information whose estimation (e.g., the issue counts) is assumed to be provided by a compiler (e.g., that generates a dataflow graph) and/or late tools (e.g., any of the elaboration, buffer insertion, fusion, and place and route software modules in FIG. 19). In certain embodiments, the LB-LJF-BGB allocation mode is able to balance memory operations (e.g., issue counts) across RAF bidding groups and in each group.

Thus in certain embodiments of hardware, there is not a single allocation mode that can help each workload achieve the optimal performance level. Different workloads benefit from different allocation modes, and thus a single hardware design may be used for multiple dataflow graphs (e.g., having different workloads) by switching to a different (e.g., of the twelve above) allocation mode to optimize the performance.

Figure 17:
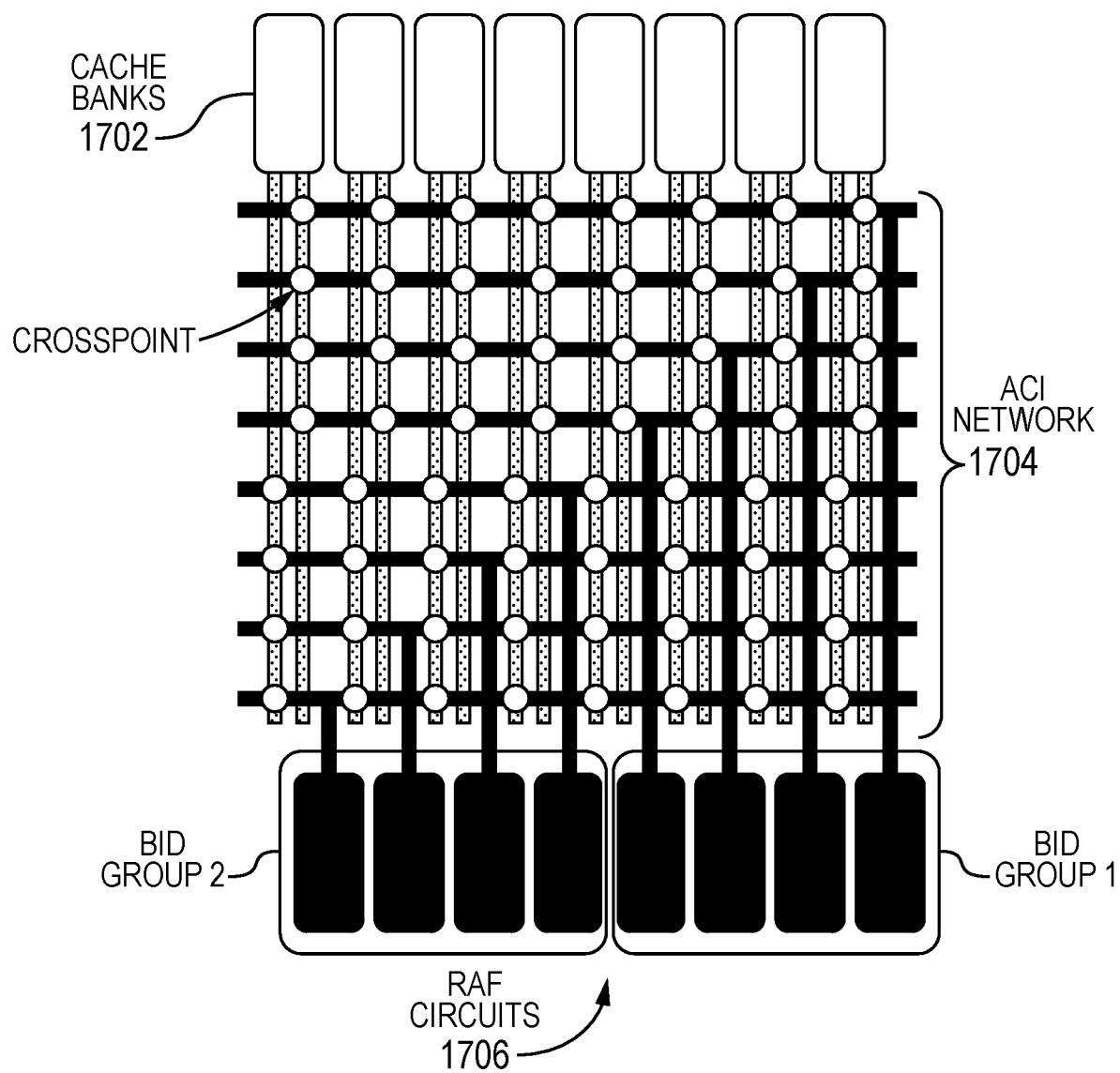
FIG. 17 illustrates a network between RAF circuits and cache banks that utilizes bid groups for RAF circuit allocation according to embodiments of the disclosure.

FIG. 17 illustrates a network 1704 (e.g., an ACI network) between RAF circuits 1706 and cache banks 1702 that utilizes bid groups for RAF circuit allocation according to embodiments of the disclosure. To improve ACI network bandwidth, certain embodiments herein adopt an approach based on bid groups. In this approach, each ACI network endpoint (e.g., RAF circuits or cache banks) is provisioned with a plurality of request storage (e.g., input) queues. Groups of (e.g., nearby) RAF circuits (or cache banks) share one of these input queues into each of the cache banks. FIG. 17 shows an ACI network 1704 in which the RAF circuits have been arranged into two groups of four RAF circuits each. In certain embodiments, the ACI network thus allows collisions among the bid groups to be simultaneously buffered by partitioning requestors into bid groups, e.g., to smooth collisions across time and improve the realizable ACI network bandwidth.

Additionally or alternatively to the RAF circuit allocation modes discussed herein, completion buffers of a single RAF circuit may be allocated according to a plurality of allocation modes. In certain embodiments, a RAF circuit is responsible for executing memory operations and serves as an interface between processing elements of a CSA fabric and the memory hierarchy. In one embodiment, a RAF circuit is to rationalize an out-of-order memory subsystem with in-order semantics of the CSA fabric. In this capacity, a RAF circuit may be provisioned with completion buffers (CB), e.g., queue-like structures that can re-order memory responses and return them to the CSA fabric in the original request order. Therefore, each load or store request is to allocate a slot in the completion buffer before it can issue into the memory subsystem in certain embodiments.

However, in one embodiment a plurality (e.g., all) of memory operations that are handled by a single RAF circuit share CB entries (e.g., slots), and thus they complete for usage of those CB entries (e.g., slots). Without enough CB entries, memory operations may have to stall. In addition, all memory operations handled by each RAF circuit may compete for issuance (e.g., arbitration) into the (e.g., ACI) network in order to be issued to cache banks.

In certain embodiments, completion buffer slots are statically partitioned among the memory operations as a part of the program/graph configuration. However, in other embodiments, it may be desirable that more CB entries are be assigned to memory operations that are more critical for the performance and less CB entries should be assigned to trivial memory operations that are not on the critical paths. Further, in some cases it is critical to not over provision completion buffer storage. As noted previously, dataflow graphs often generate large volumes of memory requests, which can lead to inefficient request bandwidth allocation and, thereby, performance degradation in the case of low bandwidth memory operations. Thus, careful CB allocation acts as a bandwidth balancer and improves performance.

Certain embodiments herein optimize CB resources in order to match each dataflow graph's static and dynamic requirements to achieve the optimal performance goal (e.g., the shortest execution time of a dataflow graph). In one embodiment, "N" (e.g., greater than one) memory operations, op0, op1, op2, . . . , opN−1, are assigned to $RAF_M$ (e.g., where the value "M" identifies the particular RAF circuit). Note that in certain embodiments, (e.g., in each cycle) only one of memory operation can be arbitrated to an ACI network in a given time period (e.g., heading to the cache) so that those N number of memory operations are competing with each other.

Assuming there are "B" number (e.g., greater than one) of CB entries in $RAF_M$ that are shared by N memory operations, in one embodiment, the allocation of completion buffers is to select between multiple allocation modes to achieve an optimal mapping of the "B" number of CB entries for N memory operations, op0, op1, op2, . . . , opN−1, that can achieve the best performance according to Bi number of CB entries are assigned so that:

$$B=\Sigma Bi (\text{for } i=0 \text{ to } (N-1)) \tag{1}$$

In some embodiments, a random allocation causes an extreme imbalance of resource utilization, making the performance unacceptable and unpredictable. In some embodiments, equal weight allocation can be done, but that may be not flexible and thus not achieve the optimal performance desired. Certain embodiments herein allocate completion buffer (CB) slots according to bandwidth/latency as a key decider among competing memory operations. In one embodiment, each memory operation's load indicator is based on bandwidth/latency. In certain embodiments, a CB allocation mode assign some portions of total CB entries based on the load indicator and applies the equal weight allocation for the rest of the total CB entries to help (e.g., every) memory operations received the desired amount of resources.

Figure 18:
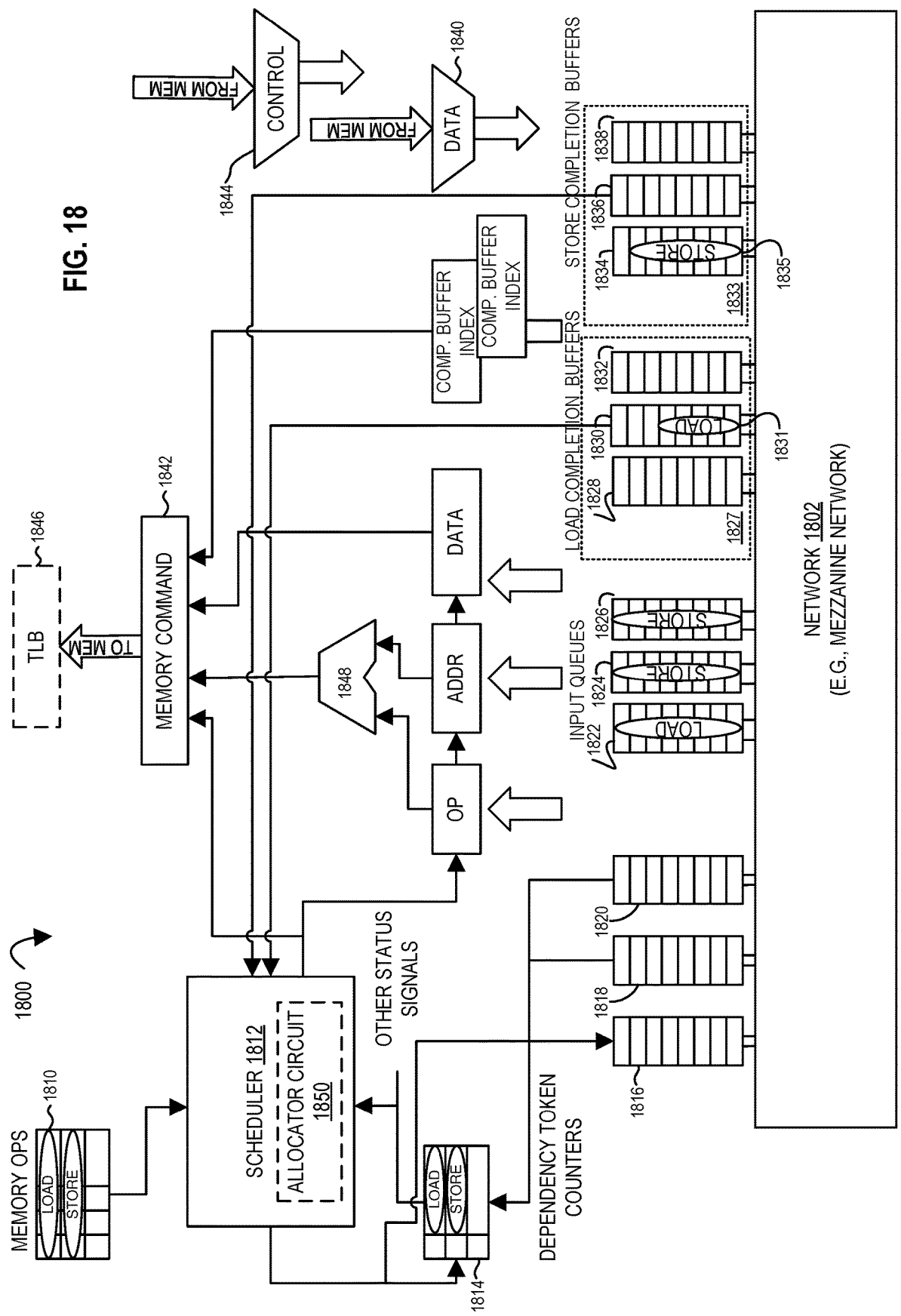
FIG. 18 illustrates another request address file (RAF) circuit according to embodiments of the disclosure.

FIG. 18 illustrates a request address file (RAF) circuit 1800 according to embodiments of the disclosure. In the depicted embodiment, RAF circuit 1800 includes a unified physical completion buffer 1827 (e.g., with a respective port of multiple ports coupled to a proper subset of slots 1828, 1830, and 1832) (e.g., buffer reserved only for load operations) and unified physical completion buffer 1833 (e.g., with a respective port of multiple ports coupled to a proper subset of slots 1834, 1836, and 1838) (e.g., buffer reserved only for store operations). In one embodiment, at configuration time, the memory load and store operations that were in a dataflow graph are specified in register(s) 1810. The arcs to those memory operations in the dataflow graphs may then be connected to the input queues 1822, 1824, and 1826. The arcs from those memory operations are thus to leave completion buffers 1827 or 1833 in certain embodiments. In one embodiment, set of completion buffer slots 1828, 1830, and 1832 are each a part of single (e.g., unified) completion buffer hardware 1827 that is logically divided (e.g., assigned) into logical buffers (e.g., logical load buffer 1831 that is assigned (e.g., less than all) slots in unified physical completion buffer 1827) that are assignable to particular memory operations) and/or set of completion buffer slots 1834, 1836, and 1838 are each a part of another single (e.g., unified) completion buffer hardware 1833 that is logically divided into logical buffers (e.g., logical store buffer 1835 that is assigned (e.g., less than all) slots in unified physical completion buffer 1835) that are assignable to particular memory operations). In one embodiment, set of completion buffer slots 1828, 1830, 1832, 1834, 1836, and 1838 are each a part of single (e.g., unified) completion buffer hardware that is logically divided into slots that are assignable to particular memory operations, e.g., a single completion buffer is formed from a load completion buffer 1827 and a store completion buffer 1833. In certain embodiments, the assignment of a completion buffer (e.g., a certain number of slots of a unified completion buffer) is according to any of the disclosure herein.

Dependency tokens (which may be single bits) arrive into queues 1818 and 1820 in certain embodiments. Dependency tokens are to leave from queue 1816 in certain embodiments. Dependency token counter 1814 may be a compact representation of a queue and track a number of dependency tokens used for any given input queue. If the dependency token counters 1814 saturate, no additional dependency tokens may be generated for new memory operations in certain embodiments. Accordingly, a memory ordering circuit (e.g., a RAF circuit) may stall scheduling new memory operations until the dependency token counters 1814 becomes unsaturated. In certain embodiments, ALU 1848 is provided in the RAF circuit 1800 to permit memory address calculations to be directly performed in the RAF, e.g., where use of the ALU is optionally specified as part of the configuration value (e.g., stored into register 1810). Example uses include: address displacement calculations in which a base address is added to an offset and/or stateful calculations in which an address may be repeatedly incremented at the RAF, such as streaming load (sld).

Optionally, an allocator circuit 1850 may be included, for example, as discussed in Section 2.4. In certain embodiments, allocator circuit 1850 is to allocate components (e.g., one or more (but less than all) of slots of completion buffer) of the RAF circuit 1800 to a particular memory operation (e.g., a store operation or a load operation), for example, as indicated by a value stored in register(s) 1810. In one embodiment, the components for an operation are (i) a single input queue 1822, 1824, or 1826 (e.g., to receive address data from a PE for a load operation requested by a PE from memory (e.g., cache) via port 1801) and a corresponding completion buffer (e.g., a logical buffer from unified physical completion buffer 1827) (e.g., to receive an indication that the load operation has been completed from memory) or (ii) a pair of input queues from 1822, 1824, or 1826 (e.g., one to receive data-to-be-stored (e.g., payload data) and one to receive an address indicating where to store that data from a PE into memory (e.g., cache) via port 1801) and a corresponding completion buffer (logical buffer from unified physical completion buffer 1833) (e.g., to receive an indication that the store operation has been completed in memory). As an example for a load, an address arrives into queue 1822 which the scheduler 1812 matches up in register 1810 as being programmed to be a load operation. In certain embodiments, a completion buffer slot for this load is assigned, e.g., in the order the address arrived. Assuming this particular load in the graph has no dependencies specified, the address and completion buffer slot are sent off to the memory system by the scheduler (e.g., via memory command 1842) in certain embodiments. When the result returns to multiplexer 1840 (shown schematically), it is stored into the completion buffer slot it specifies (e.g., as it carried the target slot all along though the memory system) in certain embodiments. The completion buffer sends results back into CSA network (e.g., mezzanine network 1802) in the order the addresses arrived in certain embodiments.

Stores may be similar, for example, except both address and data have to arrive (e.g., from one or more PEs) before any operation is sent off to the memory system in certain embodiments.

Memory command 1842 (e.g., ACI message) may include one or more (e.g., any combination) of the following: operation code (opcode), data, physical address, RAF circuit identification (ID), cache ID (e.g., cache bank ID), or completion buffer slot ID.

Network 1802 may be a packet switched network, e.g., a mezzanine network as discussed in reference to FIGS. 48-55. In certain embodiments, RAF circuit 1800 is to send a backpressure value via a network to a producer (e.g., transmitter) component (e.g., PE) when an input queue of the RAF circuit 1800 is full. The backpressure value may cause a stall of the producing component (e.g., PE) from issuing or sending an additional memory request (e.g., to that particularly input queue) until storage space is available in the input queue of the RAF circuit. In certain embodiments, a receiving component (e.g., PE) is to send a backpressure value via a network to RAF circuit 1800 to stall the sending of data from completion buffer slots 1828, 1830, or 1832 until storage space is available in the input queue of the receiving component (e.g., PE). Data sent from and into network 1820 may include a channel identification value that identifies which input queue 1822, 1824, or 1826 that data is to be stored into (e.g., data less the bits that for the identification value). For example, an identification value may include a first field that identifies a particular input queue of a RAF circuit (e.g., and a second field that identifies that particular RAF circuit from a plurality of RAF circuits).

Optionally, a translation lookaside buffer (TLB) 1846 may be included to convert a logical address received from an input queue 1822, 1824, or 1826 into a physical address of the memory (e.g., cache). In one embodiment, the memory accessed is one or more of the cache banks discussed herein.

In one embodiment, all memory operations in a single RAF circuit share the completion buffer entries and moreover only one memory operation in each RAF circuit can be granted into memory (e.g., by ACI arbitration circuitry). When the completion buffer entries assigned to a memory operation are all occupied, the memory request has to stall and waits until some completion buffer entries are cleared out and become available again in certain embodiments. In one embodiment buffer usage is represented by bandwidth multiplied by latency), and that resultant indicates which buffer(s) should be balanced with respect to memory operation's bandwidth and/or memory operation's latency in order to optimize throughput. It has been determined that completion buffer resource usage is a major performance bottleneck for certain dataflow graphs and thus certain modes of allocation of those resources are desirable for certain situations. The below includes two examples of (e.g., non-random) CB allocation modes for an allocator to utilize to assign CB slot(s) to memory operations in a RAF circuit in order to reach a desired goal (e.g., optimal performance level). In certain embodiments, the setting of a value into a memory operation register (e.g., into register(s) 1810 in FIG. 18) sets that RAF circuit into the desired CB allocation mode, for example, to cause the reserving of any proper subset (e.g., less than all) of the number of slots of load completion buffers or store completion buffers for a particular memory operation. In certain embodiments, a completion buffer (e.g., a slot or slots reserved for a particular memory operation) receives the result of an instance of a memory operation (e.g., an indication of success for a store operation or a retrieved data value for a load operation).

I. Bandwidth Aware Mode

In certain embodiments, more critical memory operations are to be assigned more CB entries (e.g., slots) to minimize the time that those critical memory operations are stalled because they impact the final performance more. Certain embodiments herein identify those critical memory operations by identifying memory operations with the highest bandwidth, and assigns more hardware resources in order to achieve a higher performance level. This CB allocation mode is a bandwidth aware completion buffer assignment (e.g., where the higher the bandwidth for a memory operation, the more CB entries that are assigned). In one embodiment, the number of issue times of each memory operation for particular dataflow graph is used as the indication of the bandwidth. This issue count may be obtained either through feedback (e.g., profile-guided optimization) or from compiler generated relative issue count estimations. In one embodiment, in order to guarantee that all memory operations have the desired completion buffer resources, some portions of completion buffer resources are evenly distributed to other memory operations.

An example of this Bandwidth Aware allocation mode is described below:
1) "R" number of RAF circuits (e.g., per CSA tile) and "C" memory operations (e.g., input queues) per RAF circuit: RAF0_InputQueue0, . . . , RAF0_InputQueueC−1, RAF1_InputQueue0, . . . , RAF1_InputQueueC−1, . . . , RAFR−1_InputQueue0, . . . , RAFR−1_InputQueueC−1;
2) N memory operations, $op_0$, $op_1$, $op_2$, . . . $op_{N-1}$, are assigned to $RAF_M$ (e.g., where the value "M" identifies the particular RAF circuit) and there are totally "B" number of CB entries in $RAF_M$;
3) Calculate the total bandwidth of $RAF_M$: Total_Bandwidth_M=ΣIssueCount_$op_i$ (for i=0 to (C−1));
4) Memory operation $op_i$ is assigned according to: {[(B×P %÷N)+(B×(1−P %)×(Issue_Count_opi/Total_Bandwidth_M)]} CB entries, where the first part is the even distribution and the second part is the proportional distribution. In this embodiment, each memory operation is to receive the completion buffer resources proportional to its bandwidth (e.g., estimated by the issue count). To further improve the performance and to guarantee that each memory operation gets the minimal amount of completion buffer resources in order to run smoothly, certain embodiments divide the whole completion buffer resources into two pools. For example, with the first pool assigned to all memory operations evenly (named even pool, i.e., P % of total CB entries) and the second pool assigned according to the bandwidth as described above (named proportional pool or bandwidth-aware pool, i.e., 1−P % of total CB entries). The division may be different for different graphs and may be dynamic.

2. Latency and Bandwidth Aware Mode

Though in certain embodiments, memory operations with the higher bandwidth are more critical to performance, in other embodiments, memory operations with the longer latency are more critical to performance and assigning them more completion buffer improves the performance.

This CB allocation mode is a bandwidth and latency aware completion buffer assignment (e.g., with a load indication value being the resultant of the multiplication of the bandwidth and latency for each memory operation). For example, with the highest loads being assigned the most CB entries. This issue count and latency may be obtained either through feedback (e.g., profile-guided optimization) or from compiler generated relative issue count estimations. In one embodiment, to guarantee that all memory operations have the minimal completion buffer resources, some portions of completion buffer resources are evenly distributed to all memory operations. Thus in certain embodiments, CB slots are allocated based on the bandwidth-delay product of the various memory operations assigned to the particular RAF circuit.

An example of this Latency and Bandwidth Aware allocation mode is described below:
1) "R" number of RAF circuits (e.g., per CSA tile) and "C" memory operations (e.g., input queues) per RAF circuit: RAF0_InputQueue0, RAF0_InputQueueC−1, RAF1_InputQueue0, . . . , RAF1_InputQueueC−1, . . . , RAFR−1_InputQueue0, . . . , RAFR−1_InputQueueC−1;
2) N memory operations, $op_0$, $op_1$, $op_2$, . . . $op_{N-1}$, are assigned to $RAF_M$ (e.g., where the value "M" identifies the particular RAF circuit) and there are totally "B" number of CB entries in $RAF_M$;
3) Calculate the total load of $RAF_M$: Total_Load_M=Σ(IssueCount_$op_i$×Latency_$op_i$) (for i=0 to (C−1));
4) Memory operation $op_i$ is assigned according to: {[(B×P %÷N)+(B×(1−P %)×((Issue_Count_opi×Latency_opi)/Total_Load_M)]} CB entries, where the first part is the even distribution and the second part is the proportional distribution. In this embodiment, each memory operation is to receive the completion buffer resources proportional to its load, estimated by the multiplication of the issue count and the latency. To further improve the performance and to guarantee that each memory operation gets the minimal amount of completion buffer resources in order to run smoothly, certain embodiments divide the whole completion buffer resources into two pools. For example, with the first pool assigned to all memory operations evenly (named even pool, i.e., P % of total CB entries) and the second pool is assigned according to the load as described above (named proportional pool or load-aware pool, i.e., 1−P % of total CB entries). The division may be different for different dataflow graphs and may be dynamic.

FIG. 19 illustrates a software flow 1900 for allocation according to embodiments of the disclosure. The depicted flow 1900 indicates a path by which high-level languages (e.g., C, C++, and Fortran) can be translated into machine media executable by embodiments of CSA software. In particular, communications paths between the phases represent not only the communication of such media between phases of the translation but also represent the communication of metadata, such as bandwidth consumption, execution frequency, and loop membership. Compilation begins from source code 1902, which may include annotations 1918 to be consumed by later stages of the translator (e.g. RAF allocator 1914). The compiler 1906 translates the source code into an abstract dataflow graph operating set architecture. The abstract operating set architecture is then mapped to a specific CSA instance (e.g., hardware fabric) by the elaboration phase 1908 which replaces certain complex dataflow operators with machine-specific implementations. Optionally, abstract dataflow graph operating set architecture sources 1904, arising, for example, by hand coding, may be introduced as an input for elaboration. The elaborated dataflow graph is further modified by buffer insertion 1910, which adds storage to the graph, and fusion 1912, which collapses some operations into single processing elements. These phases may be run multiple times, in a looping fashion. Finally, the graph is placed and routed 1916 in the actual CSA instance (e.g., hardware fabric). The RAF allocation 1914 considered previously in Section 2.4 may participate in place and route, to assist the translation mechanism in providing a solution that will improve program performance subject to the behaviors of RAF allocation.

At least some embodiments of the disclosed technologies can be described in view of the following examples:

Example 1

An apparatus (e.g., a processor) comprising: a spatial array of processing elements; a cache; a first memory interface circuit comprising a first port into the cache, a first plurality of input queues to store data for memory requests from the spatial array of processing elements, and a first memory operation register; a second memory interface circuit comprising a second port into the cache, a second plurality of input queues to store data for memory requests from the spatial array of processing elements, and a second memory operation register; and an allocator circuit to: set respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements, and set respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements.

Example 2

The apparatus of example 1, wherein the respective first values set in the first memory operation register and the second memory operation register causes a first completion buffer of the first memory interface circuit to receive a completion indication from the cache for memory requests from the first processing element, a first completion buffer of the second memory interface circuit to receive a completion indication from the cache for memory requests from the second processing element, and a second completion buffer of the first memory interface circuit to receive a completion indication from the cache for memory requests from the third processing element.

Example 3

The apparatus of example 2, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the allocator circuit assigns a largest number of buffer slots of the unified completion buffer to the one of the first processing element or the third processing element that issues a largest number of memory requests for a dataflow graph.

Example 4

The apparatus of example 2, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the allocator circuit assigns a largest number of buffer slots of the unified completion buffer to the one of the first processing element or the third processing element that has a longest latency for memory requests for a dataflow graph.

Example 5

The apparatus of example 1, wherein the second allocation mode allocates input queues based on issuance by the first processing element of a largest number of memory requests for a dataflow graph, the second processing element of a next largest number of memory requests for the dataflow graph, and the third processing element of a smaller number of memory requests for the dataflow graph than the next largest number of memory requests.

Example 6

The apparatus of example 1, wherein the allocator circuit allocates a next input queue of the first memory interface circuit or the second memory interface circuit in program order to the one of the first memory interface circuit or the second memory interface circuit with a fewest number of memory requests assigned to its input queues for a dataflow graph.

Example 7

The apparatus of example 1, wherein the allocator circuit switches from the first allocation mode to the second allocation mode in runtime for a dataflow graph.

Example 8

The apparatus of example 1, wherein the first memory interface circuit, when in the first allocation mode, sends a first backpressure value to stall the first processing element from issuing an additional memory request when the first input queue of the first memory interface circuit is not available for data for the additional memory request, the second memory interface circuit, when in the first allocation mode, sends a second backpressure value to stall the second processing element from issuing an additional memory request when the first input queue of the second memory interface circuit is not available for data for the additional memory request, and the first memory interface circuit, when in the first allocation mode, sends a third backpressure value to stall the third processing element from issuing an additional memory request when the second input queue of the first memory interface circuit is not available for data for the additional memory request.

Example 9

A method comprising: coupling a spatial array of processing elements to a first memory interface circuit comprising a first port into a cache, a first plurality of input queues to store data for memory requests from the spatial array of processing elements, and a first memory operation register, and to a second memory interface circuit comprising a second port into the cache, a second plurality of input queues to store data for memory requests from the spatial array of processing elements, and a second memory operation register; setting respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements; and setting respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements.

Example 10

The method of example 9, wherein setting the respective first values in the first memory operation register and the second memory operation register causes a first completion buffer of the first memory interface circuit to receive a completion indication from the cache for memory requests from the first processing element, a first completion buffer of the second memory interface circuit to receive a completion indication from the cache for memory requests from the second processing element, and a second completion buffer of the first memory interface circuit to receive a completion indication from the cache for memory requests from the third processing element.

Example 11

The method of example 10, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that issues a largest number of memory requests for a dataflow graph.

Example 12

The method of example 10, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that has a longest latency for memory requests for a dataflow graph.

Example 13

The method of example 9, wherein the second allocation mode allocates input queues based on issuance by the first processing element of a largest number of memory requests for a dataflow graph, the second processing element of a next largest number of memory requests for the dataflow graph, and the third processing element of a smaller number of memory requests for the dataflow graph than the next largest number of memory requests.

Example 14

The method of example 9, wherein the setting of the respective first values or the respective second values comprises allocating a next input queue of the first memory interface circuit or the second memory interface circuit in program order to the one of the first memory interface circuit or the second memory interface circuit with a fewest number of memory requests assigned to its input queues for a dataflow graph.

Example 15

The method of example 9, wherein the method comprises switching from the first allocation mode to the second allocation mode in runtime for a dataflow graph.

Example 16

The method of example 9, wherein the first memory interface circuit, when in the first allocation mode, sends a first backpressure value to stall the first processing element from issuing an additional memory request when the first input queue of the first memory interface circuit is not available for data for the additional memory request, the second memory interface circuit, when in the first allocation mode, sends a second backpressure value to stall the second processing element from issuing an additional memory request when the first input queue of the second memory interface circuit is not available for data for the additional memory request, and the first memory interface circuit, when in the first allocation mode, sends a third backpressure value to stall the third processing element from issuing an additional memory request when the second input queue of the first memory interface circuit is not available for data for the additional memory request.

Example 17

A non-transitory machine readable medium that stores code that when executed by a machine causes the machine to perform a method comprising: coupling a spatial array of processing elements to a first memory interface circuit comprising a first port into a cache, a first plurality of input queues to store data for memory requests from the spatial array of processing elements, and a first memory operation register, and to a second memory interface circuit comprising a second port into the cache, a second plurality of input queues to store data for memory requests from the spatial array of processing elements, and a second memory operation register; setting respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements; and setting respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements.

Example 18

The non-transitory machine readable medium that of example 17, wherein setting the respective first values in the first memory operation register and the second memory operation register causes a first completion buffer of the first memory interface circuit to receive a completion indication from the cache for memory requests from the first processing element, a first completion buffer of the second memory interface circuit to receive a completion indication from the cache for memory requests from the second processing element, and a second completion buffer of the first memory interface circuit to receive a completion indication from the cache for memory requests from the third processing element.

Example 19

The non-transitory machine readable medium that of example 18, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that issues a largest number of memory requests for a dataflow graph.

Example 20

The non-transitory machine readable medium that of example 18, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that has a longest latency for memory requests for a dataflow graph.

Example 21

The non-transitory machine readable medium that of example 17, wherein the second allocation mode allocates input queues based on issuance by the first processing element of a largest number of memory requests for a dataflow graph, the second processing element of a next largest number of memory requests for the dataflow graph, and the third processing element of a smaller number of memory requests for the dataflow graph than the next largest number of memory requests.

Example 22

The non-transitory machine readable medium that of example 17, wherein the setting of the respective first values or the respective second values comprises allocating a next input queue of the first memory interface circuit or the second memory interface circuit in program order to the one of the first memory interface circuit or the second memory interface circuit with a fewest number of memory requests assigned to its input queues for a dataflow graph.

Example 23

The non-transitory machine readable medium that of example 17, wherein the method comprises switching from the first allocation mode to the second allocation mode in runtime for a dataflow graph.

Example 24

The non-transitory machine readable medium that of example 17, wherein the first memory interface circuit, when in the first allocation mode, sends a first backpressure value to stall the first processing element from issuing an additional memory request when the first input queue of the first memory interface circuit is not available for data for the additional memory request, the second memory interface circuit, when in the first allocation mode, sends a second backpressure value to stall the second processing element from issuing an additional memory request when the first input queue of the second memory interface circuit is not available for data for the additional memory request, and the first memory interface circuit, when in the first allocation mode, sends a third backpressure value to stall the third processing element from issuing an additional memory request when the second input queue of the first memory interface circuit is not available for data for the additional memory request.

2.5 Network Resources, e.g., Circuitry, to Perform (e.g., Dataflow) Operations

In certain embodiments, processing elements (PEs) communicate using dedicated virtual circuits which are formed by statically configuring a (e.g., circuit switched) communications network. These virtual circuits may be flow controlled and fully back-pressured, e.g., such that a PE will stall if either the source has no data or its destination is full. At runtime, data may flow through the PEs implementing the mapped dataflow graph (e.g., mapped algorithm). For example, data may be streamed in from memory, through the (e.g., fabric area of a) spatial array of processing elements, and then back out to memory.

Such an architecture may achieve remarkable performance efficiency relative to traditional multicore processors: compute, e.g., in the form of PEs, may be simpler and more numerous than cores and communications may be direct, e.g., as opposed to an extension of the memory system. However, the (e.g., fabric area of) spatial array of processing elements may be tuned for the implementation of compiler-generated expression trees, which may feature little multiplexing or demultiplexing. Certain embodiments herein extend (for example, via network resources, such as, but not limited to, network dataflow endpoint circuits) the architecture to support (e.g., high-radix) multiplexing and/or demultiplexing, for example, especially in the context of function calls.

Spatial arrays, such as the spatial array of processing elements 101 in FIG. 1, may use (e.g., packet switched) networks for communications. Certain embodiments herein provide circuitry to overlay high-radix dataflow operations on these networks for communications. For example, certain embodiments herein utilize the existing network for communications (e.g., interconnect network 104 described in reference to FIG. 1) to provide data routing capabilities between processing elements and other components of the spatial array, but also augment the network (e.g., network endpoints) to support the performance and/or control of some (e.g., less than all) of dataflow operations (e.g., without utilizing the processing elements to perform those dataflow operations). In one embodiment, (e.g., high radix) dataflow operations are supported with special hardware structures (e.g. network dataflow endpoint circuits) within a spatial array, for example, without consuming processing resources or degrading performance (e.g., of the processing elements).

In one embodiment, a circuit switched network between two points (e.g., between a producer and consumer of data) includes a dedicated communication line between those two points, for example, with (e.g., physical) switches between the two points set to create a (e.g., exclusive) physical circuit between the two points. In one embodiment, a circuit switched network between two points is set up at the beginning of use of the connection between the two points and maintained throughout the use of the connection. In another embodiment, a packet switched network includes a shared communication line (e.g., channel) between two (e.g., or more) points, for example, where packets from different connections share that communication line (for example, routed according to data of each packet, e.g., in the header of a packet including a header and a payload). An example of a packet switched network is discussed below, e.g., in reference to a mezzanine network.

Figure 20:
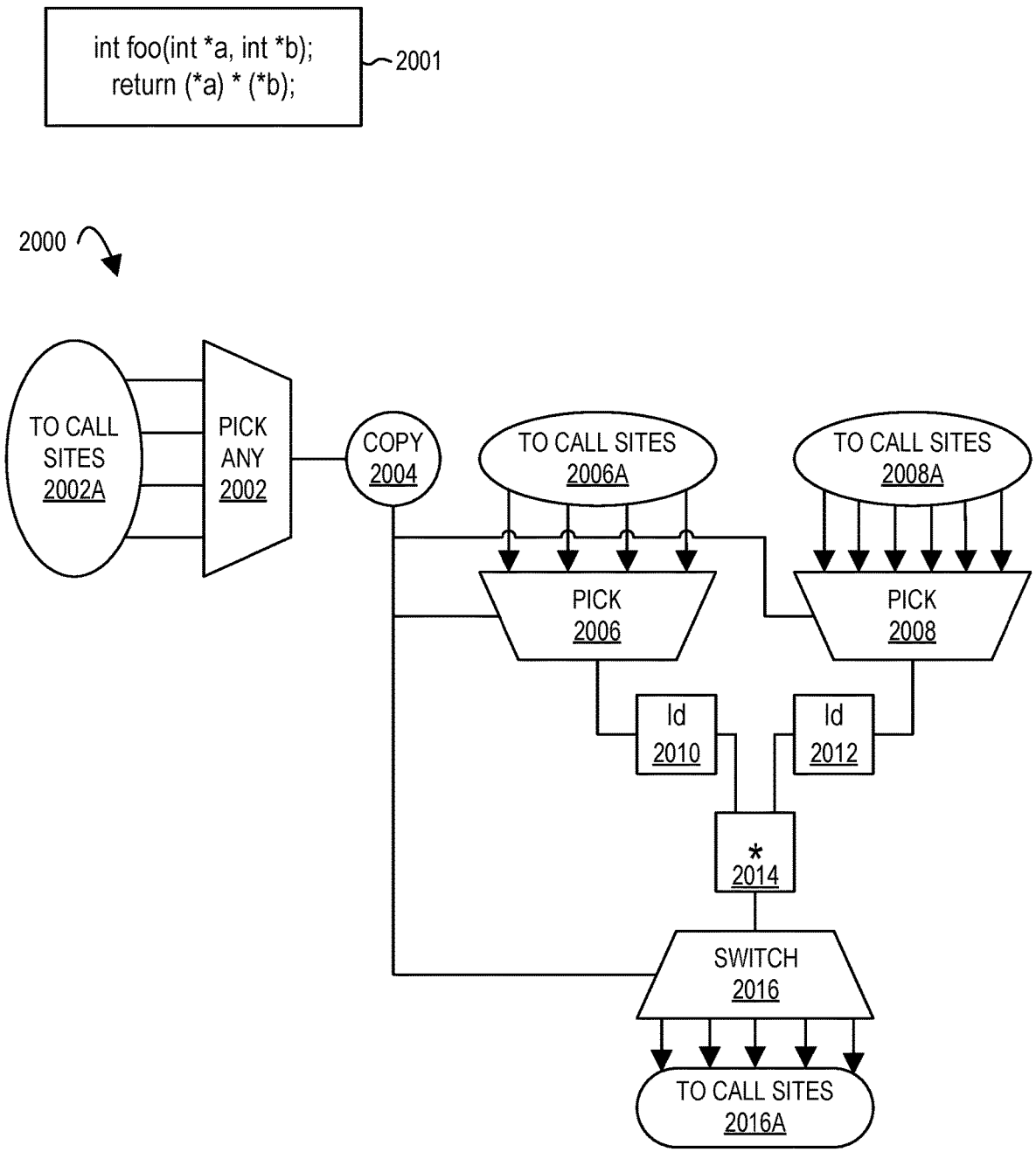
FIG. 20 illustrates a data flow graph of a pseudocode function call according to embodiments of the disclosure.

FIG. 20 illustrates a data flow graph 2000 of a pseudocode function call 2001 according to embodiments of the disclosure. Function call 2001 is to load two input data operands (e.g., indicated by pointers *a and *b, respectively), and multiply them together, and return the resultant data. This or other functions may be performed multiple times (e.g., in a dataflow graph). The dataflow graph in FIG. 20 illustrates a PickAny dataflow operator 2002 to perform the operation of selecting a control data (e.g., an index) (for example, from call sites 2002A) and copying with copy dataflow operator 2004 that control data (e.g., index) to each of the first Pick dataflow operator 2006, second Pick dataflow operator 2006, and Switch dataflow operator 2016. In one embodiment, an index (e.g., from the PickAny thus inputs and outputs data to the same index position, e.g., of [0, 1 . . . M], where M is an integer. First Pick dataflow operator 2006 may then pull one input data element of a plurality of input data elements 2006A according to the control data, and use the one input data element as (*a) to then load the input data value stored at *a with load dataflow operator 2010. Second Pick dataflow operator 2008 may then pull one input data element of a plurality of input data elements 2008A according to the control data, and use the one input data element as (*b) to then load the input data value stored at *b with load dataflow operator 2012. Those two input data values may then be multiplied by multiplication dataflow operator 2014 (e.g., as a part of a processing element). The resultant data of the multiplication may then be routed (e.g., to a downstream processing element or other component) by Switch dataflow operator 2016, e.g., to call sites 2016A, for example, according to the control data (e.g., index) to Switch dataflow operator 2016.

FIG. 20 is an example of a function call where the number of dataflow operators used to manage the steering of data (e.g., tokens) may be significant, for example, to steer the data to and/or from call sites. In one example, one or more of PickAny dataflow operator 2002, first Pick dataflow operator 2006, second Pick dataflow operator 2006, and Switch dataflow operator 2016 may be utilized to route (e.g., steer) data, for example, when there are multiple (e.g., many) call sites. In an embodiment where a (e.g., main) goal of introducing a multiplexed and/or demultiplexed function call is to reduce the implementation area of a particular dataflow graph, certain embodiments herein (e.g., of microarchitecture) reduce the area overhead of such multiplexed and/or demultiplexed (e.g., portions) of dataflow graphs.

Figure 21:
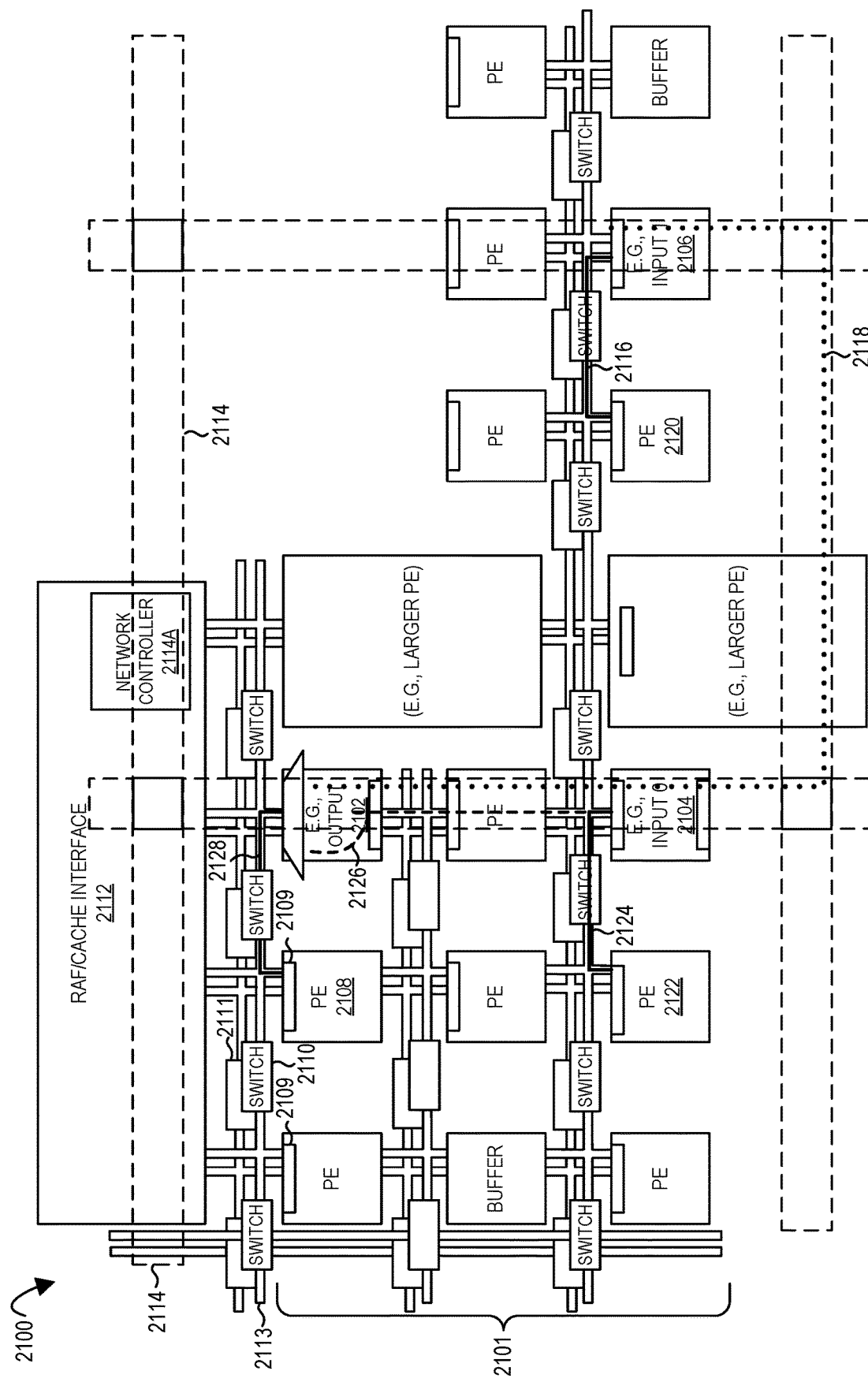
FIG. 21 illustrates a spatial array of processing elements with a plurality of network dataflow endpoint circuits according to embodiments of the disclosure.

FIG. 21 illustrates a spatial array 2101 of processing elements (PEs) with a plurality of network dataflow endpoint circuits (2102, 2104, 2106) according to embodiments of the disclosure. Spatial array 2101 of processing elements may include a communications (e.g., interconnect) network in between components, for example, as discussed herein. In one embodiment, communications network is one or more (e.g., channels of a) packet switched communications network. In one embodiment, communications network is one or more circuit switched, statically configured communications channels. For example, a set of channels coupled together by a switch (e.g., switch 2110 in a first network and switch 2111 in a second network). The first network and second network may be separate or coupled together. For example, switch 2110 may couple one or more of a plurality (e.g., four) data paths therein together, e.g., as configured to perform an operation according to a dataflow graph. In one embodiment, the number of data paths is any plurality. Processing element (e.g., processing element 2108) may be as disclosed herein, for example, as in FIG. 10. Accelerator tile 2100 includes a memory/cache hierarchy interface 2112, e.g., to interface the accelerator tile 2100 with a memory and/or cache. A data path may extend to another tile or terminate, e.g., at the edge of a tile. A processing element may include an input buffer (e.g., buffer 2109) and an output buffer.

Operations may be executed based on the availability of their inputs and the status of the PE. A PE may obtain operands from input channels and write results to output channels, although internal register state may also be used. Certain embodiments herein include a configurable dataflow-friendly PE. FIG. 10 shows a detailed block diagram of one such PE: the integer PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

Further, depicted accelerator tile 2100 includes packet switched communications network 2114, for example, as part of a mezzanine network, e.g., as described below. Certain embodiments herein allow for (e.g., a distributed) dataflow operations (e.g., operations that only route data) to be performed on (e.g., within) the communications network (e.g., and not in the processing element(s)). As an example, a distributed Pick dataflow operation of a dataflow graph is depicted in FIG. 21. Particularly, distributed pick is implemented using three separate configurations on three separate network (e.g., global) endpoints (e.g., network dataflow endpoint circuits (2102, 2104, 2106)). Dataflow operations may be distributed, e.g., with several endpoints to be configured in a coordinated manner. For example, a compilation tool may understand the need for coordination. Endpoints (e.g., network dataflow endpoint circuits) may be shared among several distributed operations, for example, a dataflow operation (e.g., pick) endpoint may be collated with several sends related to the dataflow operation (e.g., pick). A distributed dataflow operation (e.g., pick) may generate the same result the same as a non-distributed dataflow operation (e.g., pick). In certain embodiment, a difference between distributed and non-distributed dataflow operations is that in the distributed dataflow operations have their data (e.g., data to be routed, but which may not include control data) over a packet switched communications network, e.g., with associated flow control and distributed coordination. Although different sized processing elements (PE) are shown, in one embodiment, each processing element is of the same size (e.g., silicon area). In one embodiment, a buffer element to buffer data may also be included, e.g., separate from a processing element.

As one example, a pick dataflow operation may have a plurality of inputs and steer (e.g., route) one of them as an output, e.g., as in FIG. 20. Instead of utilizing a processing element to perform the pick dataflow operation, it may be achieved with one or more of network communication resources (e.g., network dataflow endpoint circuits). Additionally or alternatively, the network dataflow endpoint circuits may route data between processing elements, e.g., for the processing elements to perform processing operations on the data. Embodiments herein may thus utilize to the communications network to perform (e.g., steering) dataflow operations. Additionally or alternatively, the network dataflow endpoint circuits may perform as a mezzanine network discussed below.

In the depicted embodiment, packet switched communications network 2114 may handle certain (e.g., configuration) communications, for example, to program the processing elements and/or circuit switched network (e.g., network 2113, which may include switches). In one embodiment, a circuit switched network is configured (e.g., programmed) to perform one or more operations (e.g., dataflow operations of a dataflow graph).

Packet switched communications network 2114 includes a plurality of endpoints (e.g., network dataflow endpoint circuits (2102, 2104, 2106). In one embodiment, each endpoint includes an address or other indicator value to allow data to be routed to and/or from that endpoint, e.g., according to (e.g., a header of) a data packet.

Additionally or alternatively to performing one or more of the above, packet switched communications network 2114 may perform dataflow operations. Network dataflow endpoint circuits (2102, 2104, 2106) may be configured (e.g., programmed) to perform a (e.g., distributed pick) operation of a dataflow graph. Programming of components (e.g., a circuit) are described herein. An embodiment of configuring a network dataflow endpoint circuit (e.g., an operation configuration register thereof) is discussed in reference to FIG. 22.

As an example of a distributed pick dataflow operation, network dataflow endpoint circuits (2102, 2104, 2106) in FIG. 21 may be configured (e.g., programmed) to perform a distributed pick operation of a dataflow graph. An embodiment of configuring a network dataflow endpoint circuit (e.g., an operation configuration register thereof) is discussed in reference to FIG. 22. Additionally or alternatively to configuring remote endpoint circuits, local endpoint circuits may also be configured according to this disclosure.

Network dataflow endpoint circuit 2102 may be configured to receive input data from a plurality of sources (e.g., network dataflow endpoint circuit 2104 and network dataflow endpoint circuit 2106), and to output resultant data, e.g., as in FIG. 20), for example, according to control data. Network dataflow endpoint circuit 2104 may be configured to provide (e.g., send) input data to network dataflow endpoint circuit 2102, e.g., on receipt of the input data from processing element 2122. This may be referred to as Input 0 in FIG. 21. In one embodiment, circuit switched network is configured (e.g., programmed) to provide a dedicated communication line between processing element 2122 and network dataflow endpoint circuit 2104 along path 2124. Network dataflow endpoint circuit 2106 may be configured to provide (e.g., send) input data to network dataflow endpoint circuit 2102, e.g., on receipt of the input data from processing element 2120. This may be referred to as Input 1 in FIG. 21. In one embodiment, circuit switched network is configured (e.g., programmed) to provide a dedicated communication line between processing element 2120 and network dataflow endpoint circuit 2106 along path 2116.

When network dataflow endpoint circuit 2104 is to transmit input data to network dataflow endpoint circuit 2102 (e.g., when network dataflow endpoint circuit 2102 has available storage room for the data and/or network dataflow endpoint circuit 2104 has its input data), network dataflow endpoint circuit 2104 may generate a packet (e.g., including the input data and a header to steer that data to network dataflow endpoint circuit 2102 on the packet switched communications network 2114 (e.g., as a stop on that (e.g., ring) network 2114). This is illustrated schematically with dashed line 2126 in FIG. 21. Although the example shown in FIG. 21 utilizes two sources (e.g., two inputs) a single or any plurality (e.g., greater than two) of sources (e.g., inputs) may be utilized.

When network dataflow endpoint circuit 2106 is to transmit input data to network dataflow endpoint circuit 2102 (e.g., when network dataflow endpoint circuit 2102 has available storage room for the data and/or network dataflow endpoint circuit 2106 has its input data), network dataflow endpoint circuit 2104 may generate a packet (e.g., including the input data and a header to steer that data to network dataflow endpoint circuit 2102 on the packet switched communications network 2114 (e.g., as a stop on that (e.g., ring) network 2114). This is illustrated schematically with dashed line 2118 in FIG. 21. Though a mesh network is shown, other network topologies may be used.

Network dataflow endpoint circuit 2102 (e.g., on receipt of the Input 0 from network dataflow endpoint circuit 2104, Input 1 from network dataflow endpoint circuit 2106, and/or control data) may then perform the programmed dataflow operation (e.g., a Pick operation in this example). The network dataflow endpoint circuit 2102 may then output the according resultant data from the operation, e.g., to processing element 2108 in FIG. 21. In one embodiment, circuit switched network is configured (e.g., programmed) to provide a dedicated communication line between processing element 2108 (e.g., a buffer thereof) and network dataflow endpoint circuit 2102 along path 2128. A further example of a distributed Pick operation is discussed below in reference to FIG. 34-36.

In one embodiment, the control data to perform an operation (e.g., pick operation) comes from other components of the spatial array, e.g., a processing element or through network. An example of this is discussed below in reference to FIG. 22. Note that Pick operator is shown schematically in endpoint 2102, and may not be a multiplexer circuit, for example, see the discussion below of network dataflow endpoint circuit 2200 in FIG. 22.

In certain embodiments, a dataflow graph may have certain operations performed by a processing element and certain operations performed by a communication network (e.g., network dataflow endpoint circuit or circuits).

Figure 22:
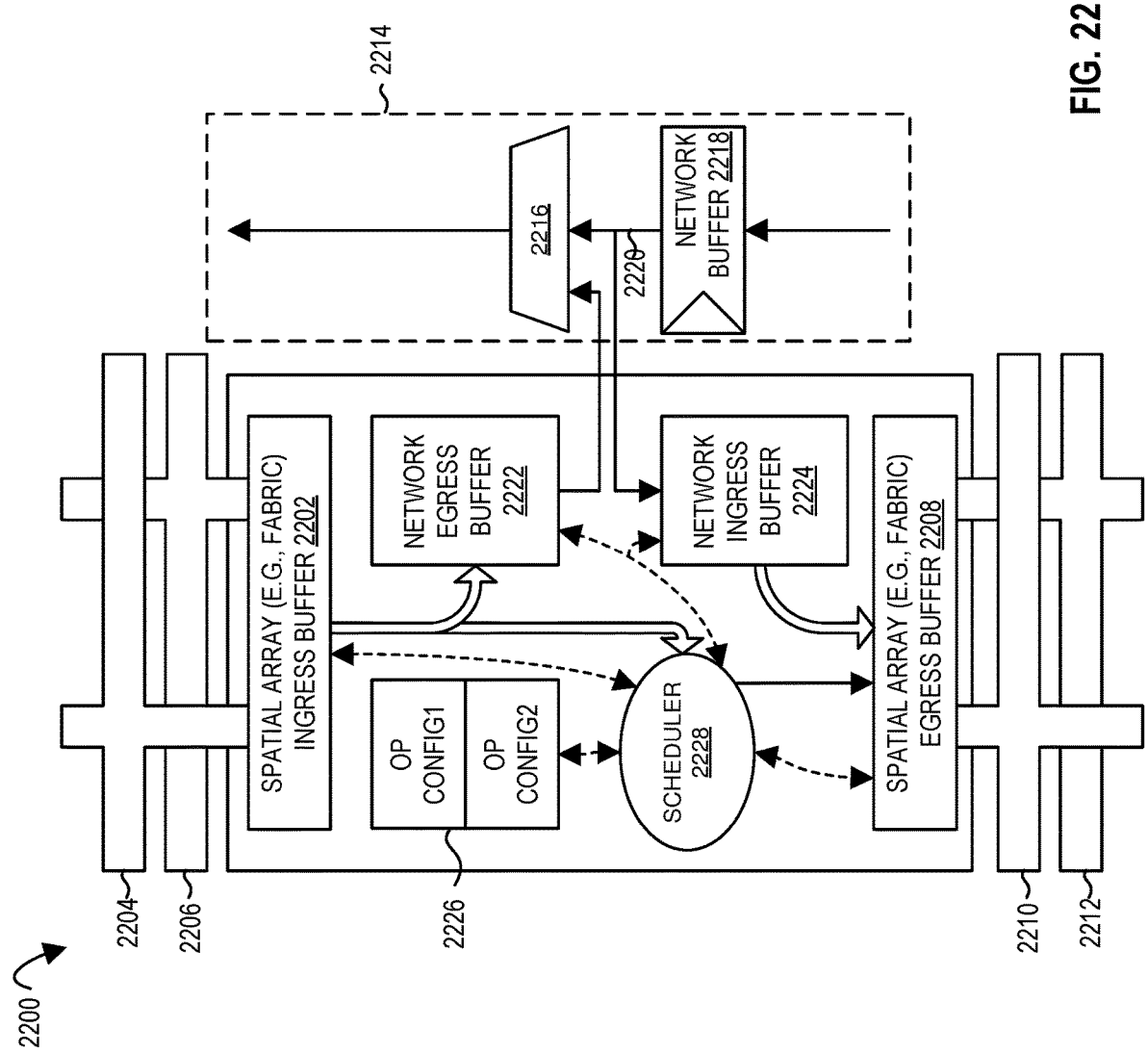
FIG. 22 illustrates a network dataflow endpoint circuit according to embodiments of the disclosure.

FIG. 22 illustrates a network dataflow endpoint circuit 2200 according to embodiments of the disclosure. Although multiple components are illustrated in network dataflow endpoint circuit 2200, one or more instances of each component may be utilized in a single network dataflow endpoint circuit. An embodiment of a network dataflow endpoint circuit may include any (e.g., not all) of the components in FIG. 22.

FIG. 22 depicts the microarchitecture of a (e.g., mezzanine) network interface showing embodiments of main data (solid line) and control data (dotted) paths. This microarchitecture provides a configuration storage and scheduler to enable (e.g., high-radix) dataflow operators. Certain embodiments herein include data paths to the scheduler to enable leg selection and description. FIG. 22 shows a high-level microarchitecture of a network (e.g., mezzanine) endpoint (e.g., stop), which may be a member of a ring network for context. To support (e.g., high-radix) dataflow operations, the configuration of the endpoint (e.g., operation configuration storage 2226) to include configurations that examine multiple network (e.g., virtual) channels (e.g., as opposed to single virtual channels in a baseline implementation). Certain embodiments of network dataflow endpoint circuit 2200 include data paths from ingress and to egress to control the selection of (e.g., pick and switch types of operations), and/or to describe the choice made by the scheduler in the case of PickAny dataflow operators or SwitchAny dataflow operators. Flow control and backpressure behavior may be utilized in each communication channel, e.g., in a (e.g., packet switched communications) network and (e.g., circuit switched) network (e.g., fabric of a spatial array of processing elements).

As one description of an embodiment of the microarchitecture, a pick dataflow operator may function to pick one output of resultant data from a plurality of inputs of input data, e.g., based on control data. A network dataflow endpoint circuit 2200 may be configured to consider one of the spatial array ingress buffer(s) 2202 of the circuit 2200 (e.g., data from the fabric being control data) as selecting among multiple input data elements stored in network ingress buffer(s) 2224 of the circuit 2200 to steer the resultant data to the spatial array egress buffer 2208 of the circuit 2200. Thus, the network ingress buffer(s) 2224 may be thought of as inputs to a virtual mux, the spatial array ingress buffer 2202 as the multiplexer select, and the spatial array egress buffer 2208 as the multiplexer output. In one embodiment, when a (e.g., control data) value is detected and/or arrives in the spatial array ingress buffer 2202, the scheduler 2228 (e.g., as programmed by an operation configuration in storage 2226) is sensitized to examine the corresponding network ingress channel. When data is available in that channel, it is removed from the network ingress buffer 2224 and moved to the spatial array egress buffer 2208. The control bits of both ingresses and egress may then be updated to reflect the transfer of data. This may result in control flow tokens or credits being propagated in the associated network. In certain embodiment, all inputs (e.g., control or data) may arise locally or over the network.

Initially, it may seem that the use of packet switched networks to implement the (e.g., high-radix staging) operators of multiplexed and/or demultiplexed codes hampers performance. For example, in one embodiment, a packet-switched network is generally shared and the caller and callee dataflow graphs may be distant from one another. Recall, however, that in certain embodiments, the intention of supporting multiplexing and/or demultiplexing is to reduce the area consumed by infrequent code paths within a dataflow operator (e.g., by the spatial array). Thus, certain embodiments herein reduce area and avoid the consumption of more expensive fabric resources, for example, like PEs, e.g., without (substantially) affecting the area and efficiency of individual PEs to supporting those (e.g., infrequent) operations.

Turning now to further detail of FIG. 22, depicted network dataflow endpoint circuit 2200 includes a spatial array (e.g., fabric) ingress buffer 2202, for example, to input data (e.g., control data) from a (e.g., circuit switched) network. As noted above, although a single spatial array (e.g., fabric) ingress buffer 2202 is depicted, a plurality of spatial array (e.g., fabric) ingress buffers may be in a network dataflow endpoint circuit. In one embodiment, spatial array (e.g., fabric) ingress buffer 2202 is to receive data (e.g., control data) from a communications network of a spatial array (e.g., a spatial array of processing elements), for example, from one or more of network 2204 and network 2206. In one embodiment, network 2204 is part of network 2113 in FIG. 21.

Depicted network dataflow endpoint circuit 2200 includes a spatial array (e.g., fabric) egress buffer 2208, for example, to output data (e.g., control data) to a (e.g., circuit switched) network. As noted above, although a single spatial array (e.g., fabric) egress buffer 2208 is depicted, a plurality of spatial array (e.g., fabric) egress buffers may be in a network dataflow endpoint circuit. In one embodiment, spatial array (e.g., fabric) egress buffer 2208 is to send (e.g., transmit) data (e.g., control data) onto a communications network of a spatial array (e.g., a spatial array of processing elements), for example, onto one or more of network 2210 and network 2212. In one embodiment, network 2210 is part of network 2113 in FIG. 21.

Additionally or alternatively, network dataflow endpoint circuit 2200 may be coupled to another network 2214, e.g., a packet switched network. Another network 2214, e.g., a packet switched network, may be used to transmit (e.g., send or receive) (e.g., input and/or resultant) data to processing elements or other components of a spatial array and/or to transmit one or more of input data or resultant data. In one embodiment, network 2214 is part of the packet switched communications network 2114 in FIG. 21, e.g., a time multiplexed network.

Network buffer 2218 (e.g., register(s)) may be a stop on (e.g., ring) network 2214, for example, to receive data from network 2214.

Depicted network dataflow endpoint circuit 2200 includes a network egress buffer 2222, for example, to output data (e.g., resultant data) to a (e.g., packet switched) network. As noted above, although a single network egress buffer 2222 is depicted, a plurality of network egress buffers may be in a network dataflow endpoint circuit. In one embodiment, network egress buffer 2222 is to send (e.g., transmit) data (e.g., resultant data) onto a communications network of a spatial array (e.g., a spatial array of processing elements), for example, onto network 2214. In one embodiment, network 2214 is part of packet switched network 2114 in FIG. 21. In certain embodiments, network egress buffer 2222 is to output data (e.g., from spatial array ingress buffer 2202) to (e.g., packet switched) network 2214, for example, to be routed (e.g., steered) to other components (e.g., other network dataflow endpoint circuit(s)).

Depicted network dataflow endpoint circuit 2200 includes a network ingress buffer 2222, for example, to input data (e.g., inputted data) from a (e.g., packet switched) network. As noted above, although a single network ingress buffer 2224 is depicted, a plurality of network ingress buffers may be in a network dataflow endpoint circuit. In one embodiment, network ingress buffer 2224 is to receive (e.g., transmit) data (e.g., input data) from a communications network of a spatial array (e.g., a spatial array of processing elements), for example, from network 2214. In one embodiment, network 2214 is part of packet switched network 2114 in FIG. 21. In certain embodiments, network ingress buffer 2224 is to input data (e.g., from spatial array ingress buffer 2202) from (e.g., packet switched) network 2214, for example, to be routed (e.g., steered) there (e.g., into spatial array egress buffer 2208) from other components (e.g., other network dataflow endpoint circuit(s)).

In one embodiment, the data format (e.g., of the data on network 2214) includes a packet having data and a header (e.g., with the destination of that data). In one embodiment, the data format (e.g., of the data on network 2204 and/or 2206) includes only the data (e.g., not a packet having data and a header (e.g., with the destination of that data)). Network dataflow endpoint circuit 2200 may add (e.g., data output from circuit 2200) or remove (e.g., data input into circuit 2200) a header (or other data) to or from a packet. Coupling 2220 (e.g., wire) may send data received from network 2214 (e.g., from network buffer 2218) to network ingress buffer 2224 and/or multiplexer 2216. Multiplexer 2216 may (e.g., via a control signal from the scheduler 2228) output data from network buffer 2218 or from network egress buffer 2222. In one embodiment, one or more of multiplexer 2216 or network buffer 2218 are separate components from network dataflow endpoint circuit 2200. A buffer may include a plurality of (e.g., discrete) entries, for example, a plurality of registers.

In one embodiment, operation configuration storage 2226 (e.g., register or registers) is loaded during configuration (e.g., mapping) and specifies the particular operation (or operations) this network dataflow endpoint circuit 2200 (e.g., not a processing element of a spatial array) is to perform (e.g., data steering operations in contrast to logic and/or arithmetic operations). Buffer(s) (e.g., 2202, 2208, 2222, and/or 2224) activity may be controlled by that operation (e.g., controlled by the scheduler 2228). Scheduler 2228 may schedule an operation or operations of network dataflow endpoint circuit 2200, for example, when (e.g., all) input (e.g., payload) data and/or control data arrives. Dotted lines to and from scheduler 2228 indicate paths that may be utilized for control data, e.g., to and/or from scheduler 2228. Scheduler may also control multiplexer 2216, e.g., to steer data to and/or from network dataflow endpoint circuit 2200 and network 2214.

In reference to the distributed pick operation in FIG. 21 above, network dataflow endpoint circuit 2102 may be configured (e.g., as an operation in its operation configuration register 2226 as in FIG. 22) to receive (e.g., in (two storage locations in) its network ingress buffer 2224 as in FIG. 22) input data from each of network dataflow endpoint circuit 2104 and network dataflow endpoint circuit 2106, and to output resultant data (e.g., from its spatial array egress buffer 2208 as in FIG. 22), for example, according to control data (e.g., in its spatial array ingress buffer 2202 as in FIG. 22). Network dataflow endpoint circuit 2104 may be configured (e.g., as an operation in its operation configuration register 2226 as in FIG. 22) to provide (e.g., send via circuit 2104's network egress buffer 2222 as in FIG. 22) input data to network dataflow endpoint circuit 2102, e.g., on receipt (e.g., in circuit 2104's spatial array ingress buffer 2202 as in FIG. 22) of the input data from processing element 2122. This may be referred to as Input 0 in FIG. 21. In one embodiment, circuit switched network is configured (e.g., programmed) to provide a dedicated communication line between processing element 2122 and network dataflow endpoint circuit 2104 along path 2124. Network dataflow endpoint circuit 2104 may include (e.g., add) a header packet with the received data (e.g., in its network egress buffer 2222 as in FIG. 22) to steer the packet (e.g., input data) to network dataflow endpoint circuit 2102. Network dataflow endpoint circuit 2106 may be configured (e.g., as an operation in its operation configuration register 2226 as in FIG. 22) to provide (e.g., send via circuit 2106's network egress buffer 2222 as in FIG. 22) input data to network dataflow endpoint circuit 2102, e.g., on receipt (e.g., in circuit 2106's spatial array ingress buffer 2202 as in FIG. 22) of the input data from processing element 2120. This may be referred to as Input 1 in FIG. 21. In one embodiment, circuit switched network is configured (e.g., programmed) to provide a dedicated communication line between processing element 2120 and network dataflow endpoint circuit 2106 along path 2116. Network dataflow endpoint circuit 2106 may include (e.g., add) a header packet with the received data (e.g., in its network egress buffer 2222 as in FIG. 22) to steer the packet (e.g., input data) to network dataflow endpoint circuit 2102.

When network dataflow endpoint circuit 2104 is to transmit input data to network dataflow endpoint circuit 2102 (e.g., when network dataflow endpoint circuit 2102 has available storage room for the data and/or network dataflow endpoint circuit 2104 has its input data), network dataflow endpoint circuit 2104 may generate a packet (e.g., including the input data and a header to steer that data to network dataflow endpoint circuit 2102 on the packet switched communications network 2114 (e.g., as a stop on that (e.g., ring) network). This is illustrated schematically with dashed line 2126 in FIG. 21. Network 2114 is shown schematically with multiple dotted boxes in FIG. 21. Network 2114 may include a network controller 2114A, e.g., to manage the ingress and/or egress of data on network 2114A.

When network dataflow endpoint circuit 2106 is to transmit input data to network dataflow endpoint circuit 2102 (e.g., when network dataflow endpoint circuit 2102 has available storage room for the data and/or network dataflow endpoint circuit 2106 has its input data), network dataflow endpoint circuit 2104 may generate a packet (e.g., including the input data and a header to steer that data to network dataflow endpoint circuit 2102 on the packet switched communications network 2114 (e.g., as a stop on that (e.g., ring) network). This is illustrated schematically with dashed line 2118 in FIG. 21.

Network dataflow endpoint circuit 2102 (e.g., on receipt of the Input 0 from network dataflow endpoint circuit 2104 in circuit 2102's network ingress buffer(s), Input 1 from network dataflow endpoint circuit 2106 in circuit 2102's network ingress buffer(s), and/or control data from processing element 2108 in circuit 2102's spatial array ingress buffer) may then perform the programmed dataflow operation (e.g., a Pick operation in this example). The network dataflow endpoint circuit 2102 may then output the according resultant data from the operation, e.g., to processing element 2108 in FIG. 21. In one embodiment, circuit switched network is configured (e.g., programmed) to provide a dedicated communication line between processing element 2108 (e.g., a buffer thereof) and network dataflow endpoint circuit 2102 along path 2128. A further example of a distributed Pick operation is discussed below in reference to FIG. 34-36. Buffers in FIG. 21 may be the small, unlabeled boxes in each PE.

Figures 23, 24, 25, 26:
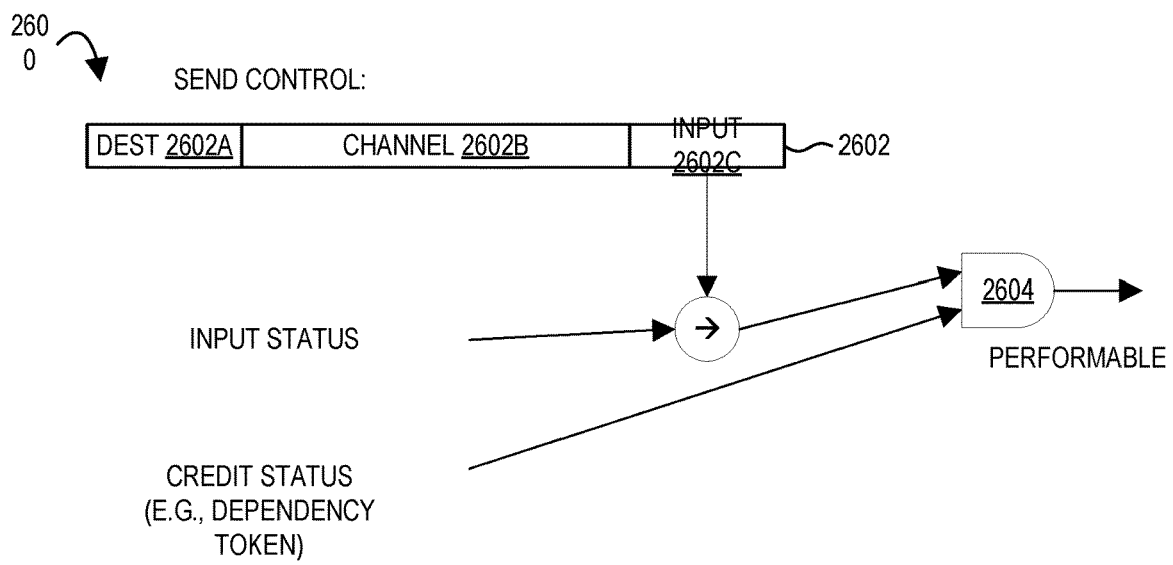
FIG. 23 illustrates data formats for a send operation and a receive operation according to embodiments of the disclosure.
FIG. 24 illustrates another data format for a send operation according to embodiments of the disclosure.
FIG. 25 illustrates to configure a circuit element (e.g., network dataflow endpoint circuit) data formats to configure a circuit element (e.g., network dataflow endpoint circuit) for a send (e.g., switch) operation and a receive (e.g., pick) operation according to embodiments of the disclosure.
FIG. 26 illustrates a configuration data format to configure a circuit element (e.g., network dataflow endpoint circuit) for a send operation with its input, output, and control data annotated on a circuit according to embodiments of the disclosure.

FIGS. 23-8 below include example data formats, but other data formats may be utilized. One or more fields may be included in a data format (e.g., in a packet). Data format may be used by network dataflow endpoint circuits, e.g., to transmit (e.g., send and/or receive) data between a first component (e.g., between a first network dataflow endpoint circuit and a second network dataflow endpoint circuit, component of a spatial array, etc.).

FIG. 23 illustrates data formats for a send operation 2302 and a receive operation 2304 according to embodiments of the disclosure. In one embodiment, send operation 2302 and receive operation 2304 are data formats of data transmitted on a packed switched communication network. Depicted send operation 2302 data format includes a destination field 2302A (e.g., indicating which component in a network the data is to be sent to), a channel field 2302B (e.g. indicating which channel on the network the data is to be sent on), and an input field 2302C (e.g., the payload or input data that is to be sent). Depicted receive operation 2304 includes an output field, e.g., which may also include a destination field (not depicted). These data formats may be used (e.g., for packet(s)) to handle moving data in and out of components. These configurations may be separable and/or happen in parallel. These configurations may use separate resources. The term channel may generally refer to the communication resources (e.g., in management hardware) associated with the request. Association of configuration and queue management hardware may be explicit.

FIG. 24 illustrates another data format for a send operation 2402 according to embodiments of the disclosure. In one embodiment, send operation 2402 is a data format of data transmitted on a packed switched communication network. Depicted send operation 2402 data format includes a type field (e.g., used to annotate special control packets, such as, but not limited to, configuration, extraction, or exception packets), destination field 2402B (e.g., indicating which component in a network the data is to be sent to), a channel field 2402C (e.g. indicating which channel on the network the data is to be sent on), and an input field 2402D (e.g., the payload or input data that is to be sent).

FIG. 25 illustrates configuration data formats to configure a circuit element (e.g., network dataflow endpoint circuit) for a send (e.g., switch) operation 2502 and a receive (e.g., pick) operation 2504 according to embodiments of the disclosure. In one embodiment, send operation 2502 and receive operation 2504 are configuration data formats for data to be transmitted on a packed switched communication network, for example, between network dataflow endpoint circuits. Depicted send operation configuration data format 2502 includes a destination field 2502A (e.g., indicating which component(s) in a network the (input) data is to be sent to), a channel field 2502B (e.g. indicating which channel on the network the (input) data is to be sent on), an input field 2502C (for example, an identifier of the component(s) that is to send the input data, e.g., the set of inputs in the (e.g., fabric ingress) buffer that this element is sensitive to), and an operation field 2502D (e.g., indicating which of a plurality of operations are to be performed). In one embodiment, the (e.g., outbound) operation is one of a Switch or SwitchAny dataflow operation, e.g., corresponding to a (e.g., same) dataflow operator of a dataflow graph.

Depicted receive operation configuration data format 2504 includes an output field 2504A (e.g., indicating which component(s) in a network the (resultant) data is to be sent to), an input field 2504B (e.g., an identifier of the component (s) that is to send the input data), and an operation field 2504C (e.g., indicating which of a plurality of operations are to be performed). In one embodiment, the (e.g., inbound) operation is one of a Pick, PickSingleLeg, PickAny, or Merge dataflow operation, e.g., corresponding to a (e.g., same) dataflow operator of a dataflow graph. In one embodiment, a merge dataflow operation is a pick that requires and dequeues all operands (e.g., with the egress endpoint receiving control).

A configuration data format utilized herein may include one or more of the fields described herein, e.g., in any order.

FIG. 26 illustrates a configuration data format 2602 to configure a circuit element (e.g., network dataflow endpoint circuit) for a send operation with its input, output, and control data annotated on a circuit 2600 according to embodiments of the disclosure. Depicted send operation configuration data format 2602 includes a destination field 2602A (e.g., indicating which component in a network the data is to be sent to), a channel field 2602B (e.g. indicating which channel on the (packet switched) network the data is to be sent on), and an input field 2302C (e.g., an identifier of the component(s) that is to send the input data). In one embodiment, circuit 2600 (e.g., network dataflow endpoint circuit) is to receive packet of data in the data format of send operation configuration data format 2602, for example, with the destination indicating which circuit of a plurality of circuits the resultant is to be sent to, the channel indicating which channel of the (packet switched) network the data is to be sent on, and the input being which circuit of a plurality of circuits the input data is to be received from. The AND gate 2604 is to allow the operation to be performed when both the input data is available and the credit status is a yes (for example, the dependency token indicates) indicating there is room for the output data to be stored, e.g., in a buffer of the destination. In certain embodiments, each operation is annotated with its requirements (e.g., inputs, outputs, and control) and if all requirements are met, the configuration is 'performable' by the circuit (e.g., network dataflow endpoint circuit).

Figure 27:
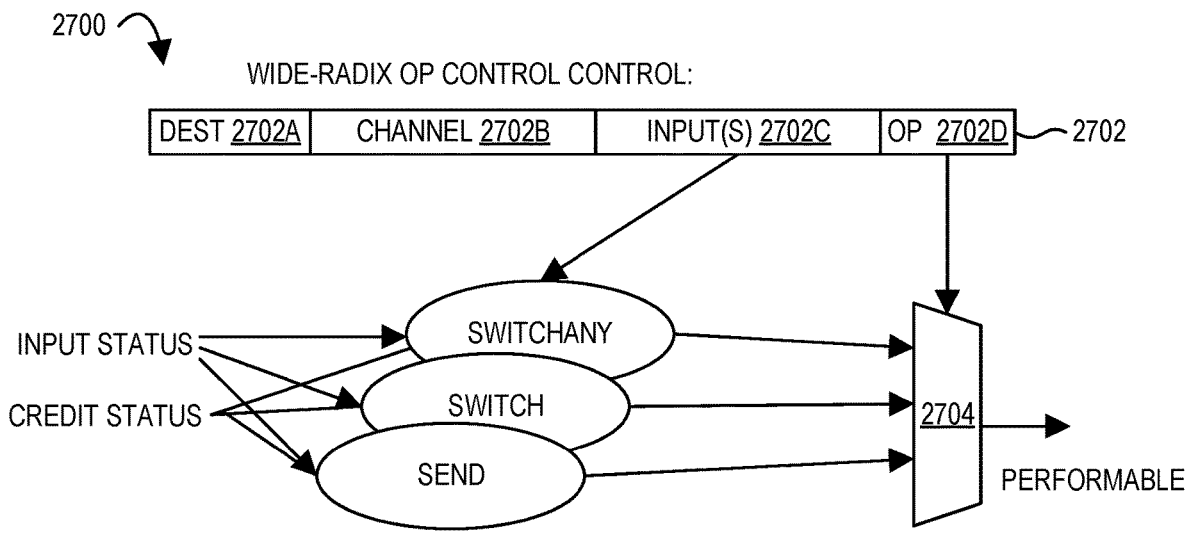
FIG. 27 illustrates a configuration data format to configure a circuit element (e.g., network dataflow endpoint circuit) for a selected operation with its input, output, and control data annotated on a circuit according to embodiments of the disclosure.

FIG. 27 illustrates a configuration data format 2702 to configure a circuit element (e.g., network dataflow endpoint circuit) for a selected (e.g., send) operation with its input, output, and control data annotated on a circuit 2700 according to embodiments of the disclosure. Depicted (e.g., send) operation configuration data format 2702 includes a destination field 2702A (e.g., indicating which component(s) in a network the (input) data is to be sent to), a channel field 2702B (e.g. indicating which channel on the network the (input) data is to be sent on), an input field 2702C (e.g., an identifier of the component(s) that is to send the input data), and an operation field 2702D (e.g., indicating which of a plurality of operations are to be performed and/or the source of the control data for that operation). In one embodiment, the (e.g., outbound) operation is one of a send, Switch, or SwitchAny dataflow operation, e.g., corresponding to a (e.g., same) dataflow operator of a dataflow graph.

In one embodiment, circuit 2700 (e.g., network dataflow endpoint circuit) is to receive packet of data in the data format of (e.g., send) operation configuration data format 2702, for example, with the input being the source(s) of the payload (e.g., input data) and the operation field indicating which operation is to be performed (e.g., shown schematically as Switch or SwitchAny). Depicted multiplexer 2704 may select the operation to be performed from a plurality of available operations, e.g., based on the value in operation field 2702D. In one embodiment, circuit 2700 is to perform that operation when both the input data is available and the credit status is a yes (for example, the dependency token indicates) indicating there is room for the output data to be stored, e.g., in a buffer of the destination.

In one embodiment, the send operation does not utilize control beyond checking its input(s) are available for sending. This may enable switch to perform the operation without credit on all legs. In one embodiment, the Switch and/or SwitchAny operation includes a multiplexer controlled by the value stored in the operation field 2702D to select the correct queue management circuitry.

Figure 28:
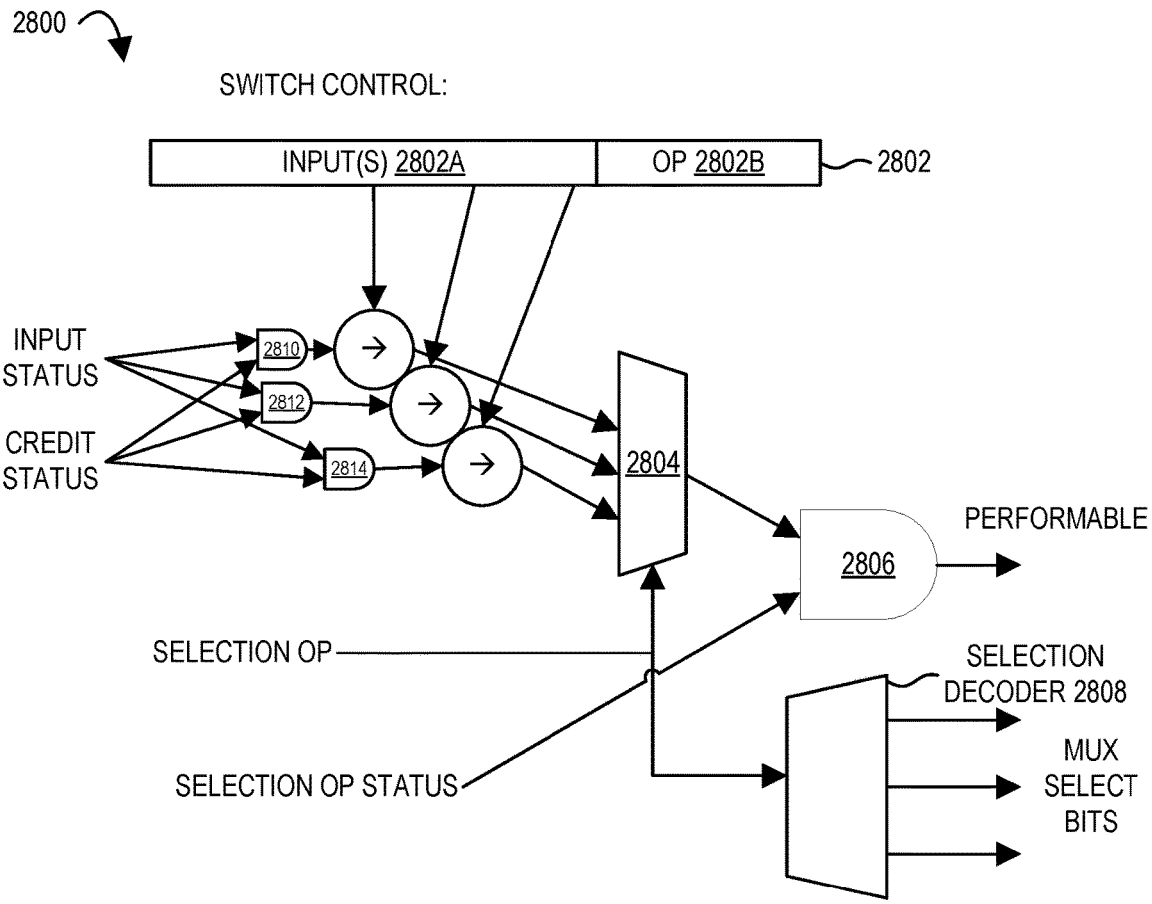
FIG. 28 illustrates a configuration data format to configure a circuit element (e.g., network dataflow endpoint circuit) for a Switch operation with its input, output, and control data annotated on a circuit according to embodiments of the disclosure.
Figure 29:
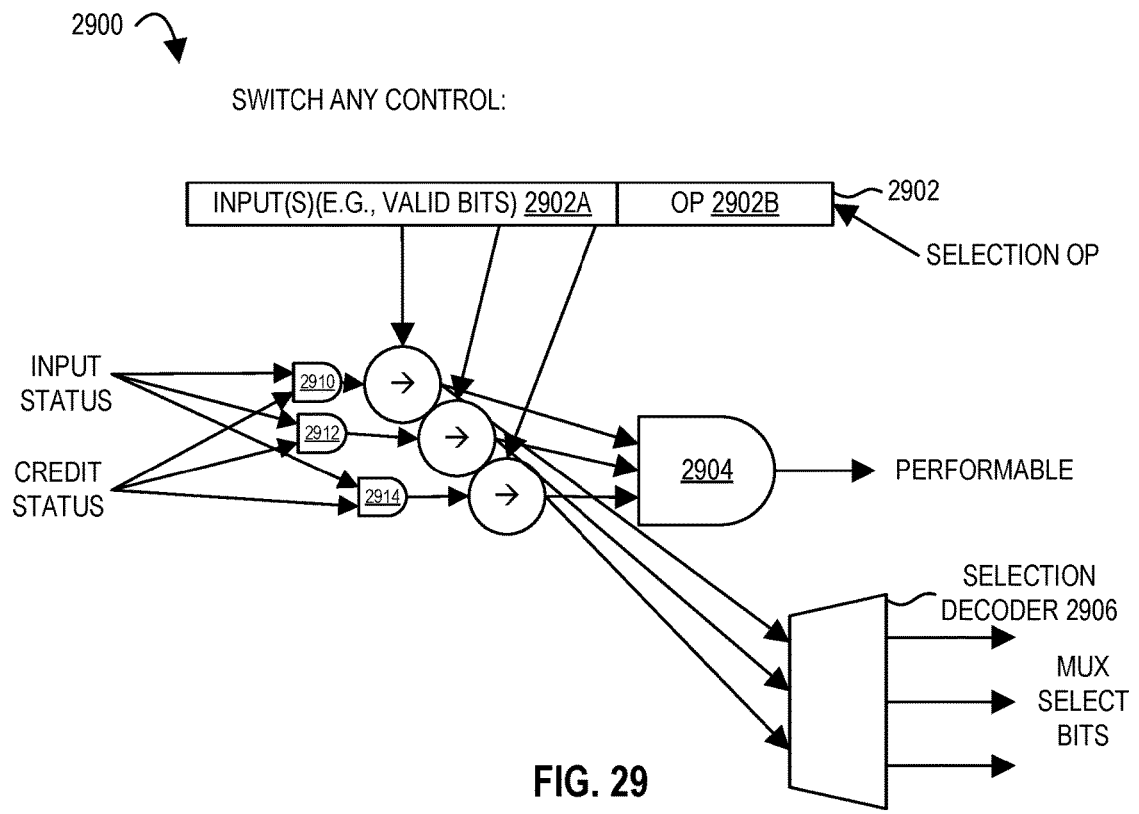
FIG. 29 illustrates a configuration data format to configure a circuit element (e.g., network dataflow endpoint circuit) for a SwitchAny operation with its input, output, and control data annotated on a circuit according to embodiments of the disclosure.

Value stored in operation field 2702D may select among control options, e.g., with different control (e.g., logic) circuitry for each operation, for example, as in FIGS. 28-31. In some embodiments, credit (e.g., credit on a network) status is another input (e.g., as depicted in FIGS. 28-29 here).

FIG. 28 illustrates a configuration data format to configure a circuit element (e.g., network dataflow endpoint circuit) for a Switch operation configuration data format 2802 with its input, output, and control data annotated on a circuit 2800 according to embodiments of the disclosure. In one embodiment, the (e.g., outbound) operation value stored in the operation field 2702D is for a Switch operation, e.g., corresponding to a Switch dataflow operator of a dataflow graph. In one embodiment, circuit 2800 (e.g., network dataflow endpoint circuit) is to receive a packet of data in the data format of Switch operation 2802, for example, with the input in input field 2802A being what component(s) are to be sent the data and the operation field 2802B indicating which operation is to be performed (e.g., shown schematically as Switch). Depicted circuit 2800 may select the operation to be executed from a plurality of available operations based on the operation field 2802B. In one embodiment, circuit 2700 is to perform that operation when both the input data (for example, according to the input status, e.g., there is room for the data in the destination(s)) is available and the credit status (e.g., selection operation (OP) status) is a yes (for example, the network credit indicates that there is availability on the network to send that data to the destination(s)). For example, multiplexers 2810, 2812, 2814 may be used with a respective input status and credit status for each input (e.g., where the output data is to be sent to in the switch operation), e.g., to prevent an input from showing as available until both the input status (e.g., room for data in the destination) and the credit status (e.g., there is room on the network to get to the destination) are true (e.g., yes). In one embodiment, input status is an indication there is or is not room for the (output) data to be stored, e.g., in a buffer of the destination. In certain embodiments, AND gate 2806 is to allow the operation to be performed when both the input data is available (e.g., as output from multiplexer 2804) and the selection operation (e.g., control data) status is a yes, for example, indicating the selection operation (e.g., which of a plurality of outputs an input is to be sent to, see, e.g., FIG. 20). In certain embodiments, the performance of the operation with the control data (e.g., selection op) is to cause input data from one of the inputs to be output on one or more (e.g., a plurality of) outputs (e.g., as indicated by the control data), e.g., according to the multiplexer selection bits from multiplexer 2808. In one embodiment, selection op chooses which leg of the switch output will be used and/or selection decoder creates multiplexer selection bits.

FIG. 29 illustrates a configuration data format to configure a circuit element (e.g., network dataflow endpoint circuit) for a SwitchAny operation configuration data format 2902 with its input, output, and control data annotated on a circuit 2900 according to embodiments of the disclosure. In one embodiment, the (e.g., outbound) operation value stored in the operation field 2702D is for a SwitchAny operation, e.g., corresponding to a SwitchAny dataflow operator of a dataflow graph. In one embodiment, circuit 2900 (e.g., network dataflow endpoint circuit) is to receive a packet of data in the data format of SwitchAny operation configuration data format 2902, for example, with the input in input field 2902A being what component(s) are to be sent the data and the operation field 2902B indicating which operation is to be performed (e.g., shown schematically as SwitchAny) and/or the source of the control data for that operation. In one embodiment, circuit 2700 is to perform that operation when any of the input data (for example, according to the input status, e.g., there is room for the data in the destination(s)) is available and the credit status is a yes (for example, the network credit indicates that there is availability on the network to send that data to the destination(s)). For example, multiplexers 2910, 2912, 2914 may be used with a respective input status and credit status for each input (e.g., where the output data is to be sent to in the SwitchAny operation), e.g., to prevent an input from showing as available until both the input status (e.g., room for data in the destination) and the credit status (e.g., there is room on the network to get to the destination) are true (e.g., yes). In one embodiment, input status is an indication there is room or is not room for the (output) data to be stored, e.g., in a buffer of the destination. In certain embodiments, OR gate 2904 is to allow the operation to be performed when any one of the outputs are available. In certain embodiments, the performance of the operation is to cause the first available input data from one of the inputs to be output on one or more (e.g., a plurality of) outputs, e.g., according to the multiplexer selection bits from multiplexer 2906. In one embodiment, SwitchAny occurs as soon as any output credit is available (e.g., as opposed to a Switch that utilizes a selection op). Multiplexer select bits may be used to steer an input to an (e.g., network) egress buffer of a network dataflow endpoint circuit.

Figure 30:
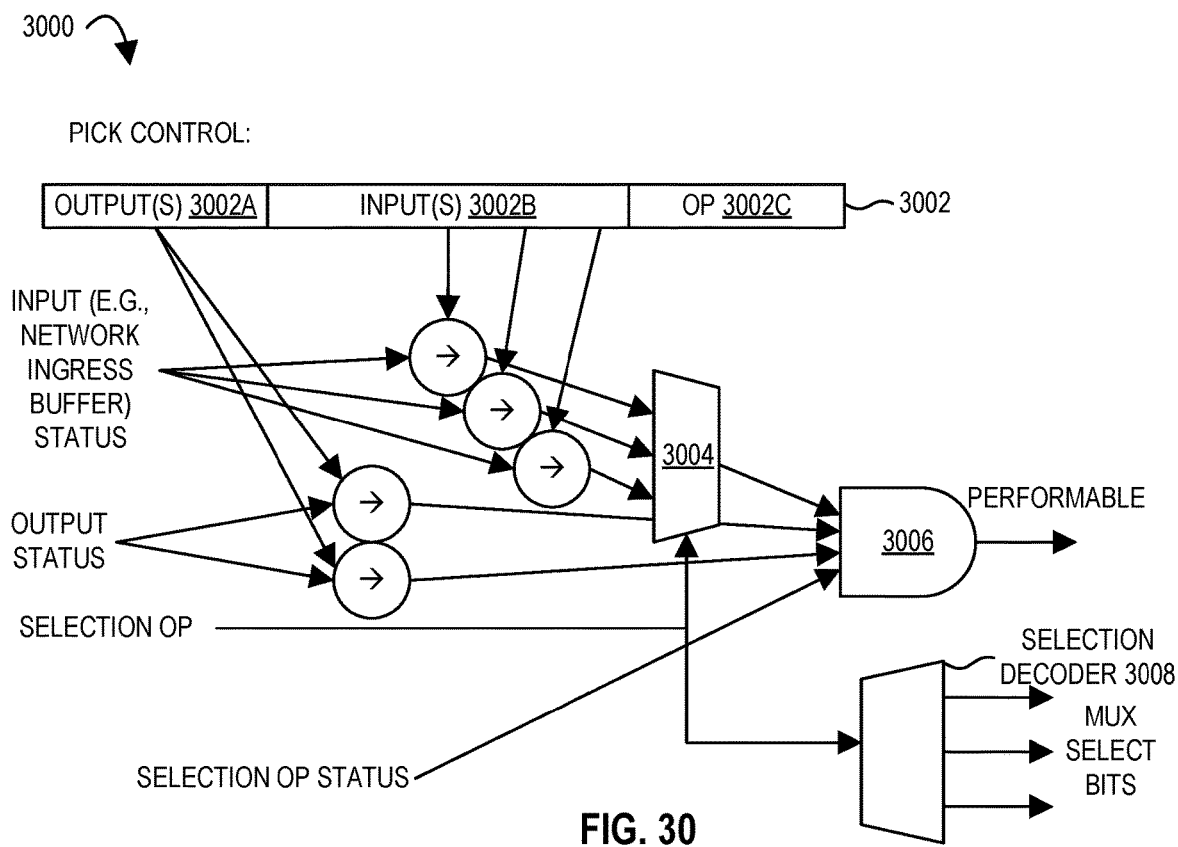
FIG. 30 illustrates a configuration data format to configure a circuit element (e.g., network dataflow endpoint circuit) for a Pick operation with its input, output, and control data annotated on a circuit according to embodiments of the disclosure.

FIG. 30 illustrates a configuration data format to configure a circuit element (e.g., network dataflow endpoint circuit) for a Pick operation configuration data format 3002 with its input, output, and control data annotated on a circuit 3000 according to embodiments of the disclosure. In one embodiment, the (e.g., inbound) operation value stored in the operation field 3002C is for a Pick operation, e.g., corresponding to a Pick dataflow operator of a dataflow graph. In one embodiment, circuit 3000 (e.g., network dataflow endpoint circuit) is to receive a packet of data in the data format of Pick operation configuration data format 3002, for example, with the data in input field 3002B being what component(s) are to send the input data, the data in output field 3002A being what component(s) are to be sent the input data, and the operation field 3002C indicating which operation is to be performed (e.g., shown schematically as Pick) and/or the source of the control data for that operation. Depicted circuit 3000 may select the operation to be executed from a plurality of available operations based on the operation field 3002C. In one embodiment, circuit 3000 is to perform that operation when both the input data (for example, according to the input (e.g., network ingress buffer) status, e.g., all the input data has arrived) is available, the credit status (e.g., output status) is a yes (for example, the spatial array egress buffer) indicating there is room for the output data to be stored, e.g., in a buffer of the destination(s), and the selection operation (e.g., control data) status is a yes.

In certain embodiments, AND gate 3006 is to allow the operation to be performed when both the input data is available (e.g., as output from multiplexer 3004), an output space is available, and the selection operation (e.g., control data) status is a yes, for example, indicating the selection operation (e.g., which of a plurality of outputs an input is to be sent to, see, e.g., FIG. 20). In certain embodiments, the performance of the operation with the control data (e.g., selection op) is to cause input data from one of a plurality of inputs (e.g., indicated by the control data) to be output on one or more (e.g., a plurality of) outputs, e.g., according to the multiplexer selection bits from multiplexer 3008. In one embodiment, selection op chooses which leg of the pick will be used and/or selection decoder creates multiplexer selection bits.

Figure 31:
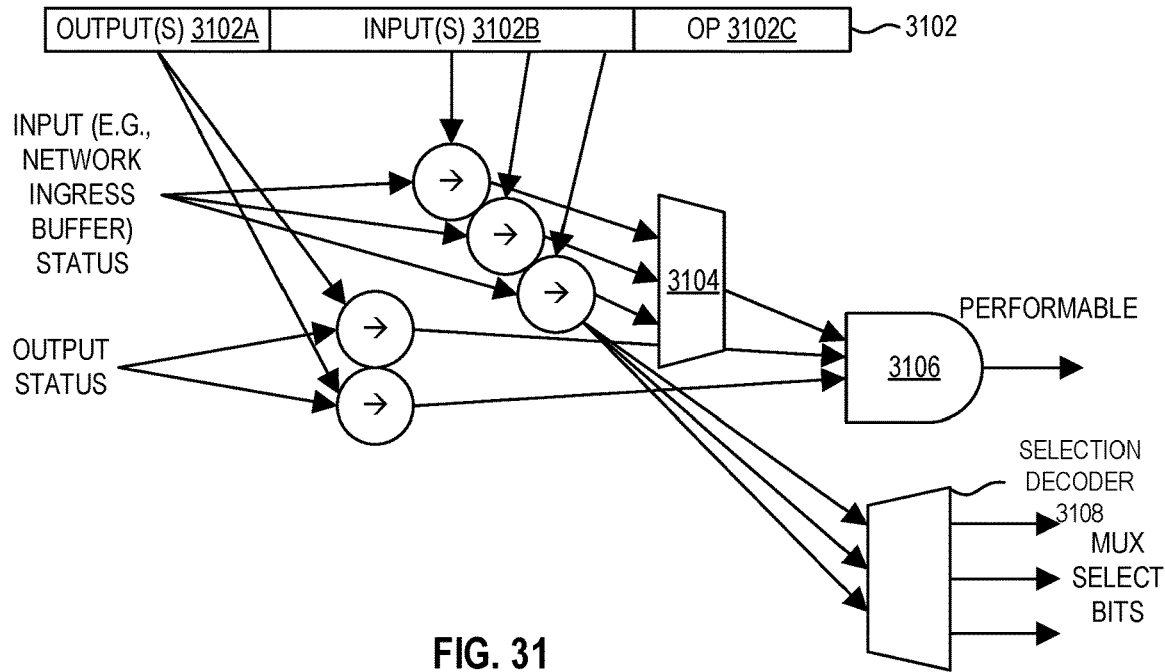
FIG. 31 illustrates a configuration data format to configure a circuit element (e.g., network dataflow endpoint circuit) for a PickAny operation with its input, output, and control data annotated on a circuit according to embodiments of the disclosure.

FIG. 31 illustrates a configuration data format to configure a circuit element (e.g., network dataflow endpoint circuit) for a PickAny operation 3102 with its input, output, and control data annotated on a circuit 3100 according to embodiments of the disclosure. In one embodiment, the (e.g., inbound) operation value stored in the operation field 3102C is for a PickAny operation, e.g., corresponding to a PickAny dataflow operator of a dataflow graph. In one embodiment, circuit 3100 (e.g., network dataflow endpoint circuit) is to receive a packet of data in the data format of PickAny operation configuration data format 3102, for example, with the data in input field 3102B being what component(s) are to send the input data, the data in output field 3102A being what component(s) are to be sent the input data, and the operation field 3102C indicating which operation is to be performed (e.g., shown schematically as PickAny). Depicted circuit 3100 may select the operation to be executed from a plurality of available operations based on the operation field 3102C. In one embodiment, circuit 3100 is to perform that operation when any (e.g., a first arriving of) the input data (for example, according to the input (e.g., network ingress buffer) status, e.g., any of the input data has arrived) is available and the credit status (e.g., output status) is a yes (for example, the spatial array egress buffer indicates) indicating there is room for the output data to be stored, e.g., in a buffer of the destination(s). In certain embodiments, AND gate 3106 is to allow the operation to be performed when any of the input data is available (e.g., as output from multiplexer 3104) and an output space is available. In certain embodiments, the performance of the operation is to cause the (e.g., first arriving) input data from one of a plurality of inputs to be output on one or more (e.g., a plurality of) outputs, e.g., according to the multiplexer selection bits from multiplexer 3108.

In one embodiment, PickAny executes on the presence of any data and/or selection decoder creates multiplexer selection bits.

Figure 32:
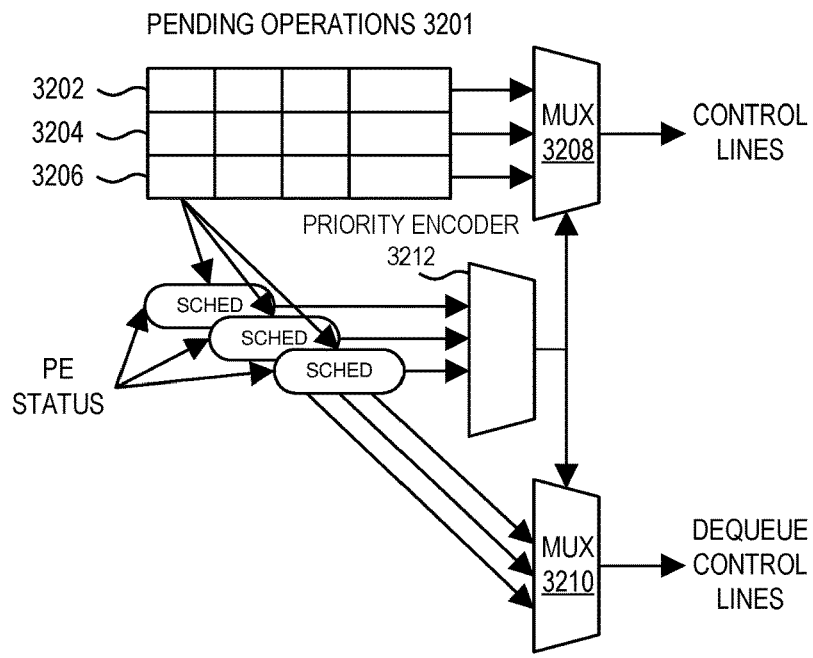
FIG. 32 illustrates selection of an operation by a network dataflow endpoint circuit for performance according to embodiments of the disclosure.

FIG. 32 illustrates selection of an operation (3202, 3204, 3206) by a network dataflow endpoint circuit 3200 for performance according to embodiments of the disclosure. Pending operations storage 3201 (e.g., in scheduler 2228 in FIG. 22) may store one or more dataflow operations, e.g., according to the format(s) discussed herein. Scheduler (for example, based on a fixed priority or the oldest of the operations, e.g., that have all of their operands) may schedule an operation for performance. For example, scheduler may select operation 3202, and according to a value stored in operation field, send the corresponding control signals from multiplexer 3208 and/or multiplexer 3210. As an example, several operations may be simultaneously executeable in a single network dataflow endpoint circuit. Assuming all data is there, the "performable" signal (e.g., as shown in FIGS. 26-31) may be input as a signal into multiplexer 3212. Multiplexer 3212 may send as an output control signals for a selected operation (e.g., one of operation 3202, 3204, and 3206) that cause multiplexer 3208 to configure the connections in a network dataflow endpoint circuit to perform the selected operation (e.g., to source from or send data to buffer(s)). Multiplexer 3212 may send as an output control signals for a selected operation (e.g., one of operation 3202, 3204, and 3206) that cause multiplexer 3210 to configure the connections in a network dataflow endpoint circuit to remove data from the queue(s), e.g., consumed data. As an example, see the discussion herein about having data (e.g., token) removed. The "PE status" in FIG. 32 may be the control data coming from a PE, for example, the empty indicator and full indicators of the queues (e.g., backpressure signals and/or network credit). In one embodiment, the PE status may include the empty or full bits for all the buffers and/or datapaths, e.g., in FIG. 22 herein. FIG. 32 illustrates generalized scheduling for embodiments herein, e.g., with specialized scheduling for embodiments discussed in reference to FIGS. 28-31.

In one embodiment, (e.g., as with scheduling) the choice of dequeue is determined by the operation and its dynamic behavior, e.g., to dequeue the operation after performance. In one embodiment, a circuit is to use the operand selection bits to dequeue data (e.g., input, output and/or control data).

Figure 33:
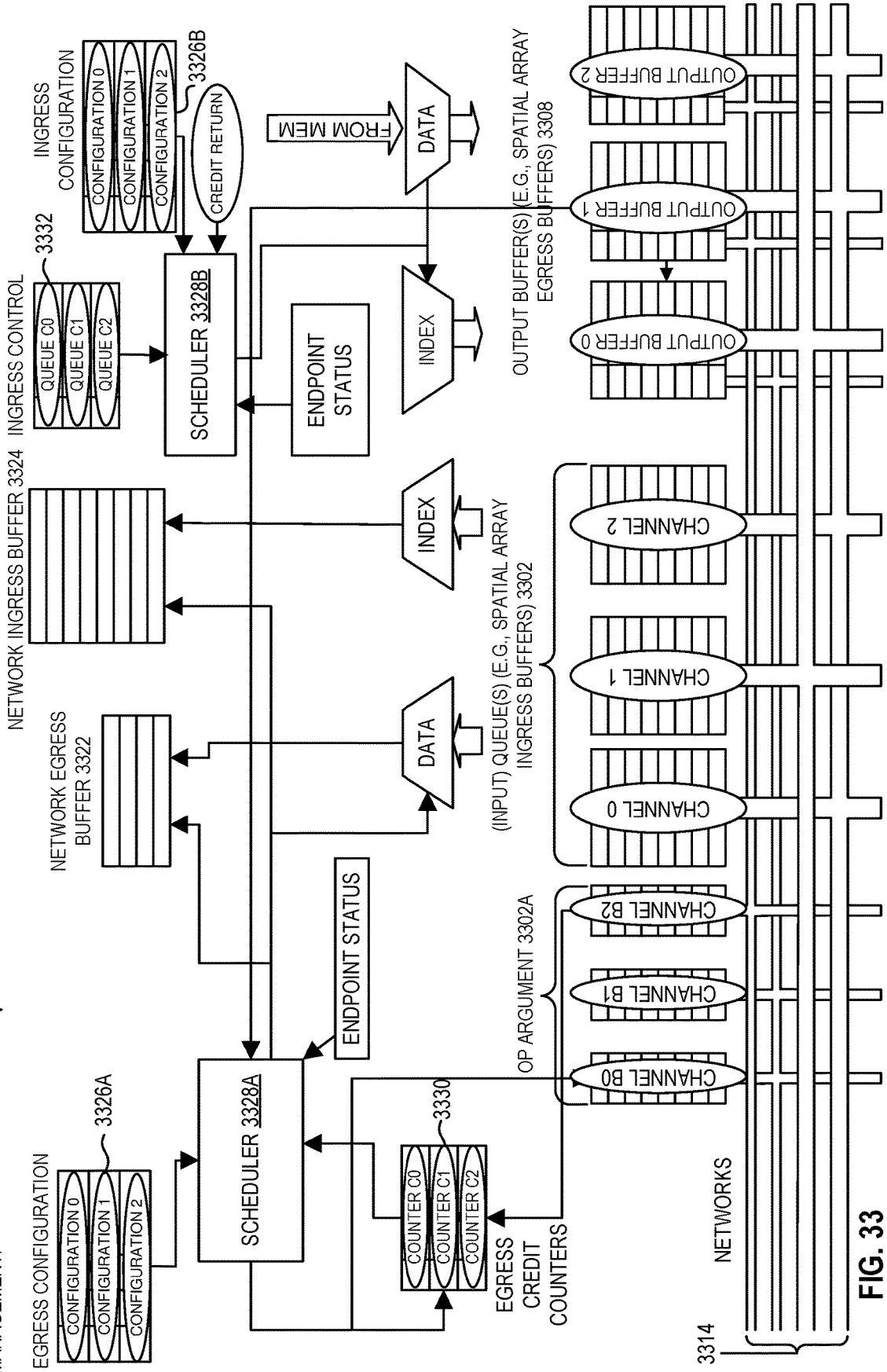
FIG. 33 illustrates a network dataflow endpoint circuit according to embodiments of the disclosure.

FIG. 33 illustrates a network dataflow endpoint circuit 3300 according to embodiments of the disclosure. In comparison to FIG. 22, network dataflow endpoint circuit 3300 has split the configuration and control into two separate schedulers. In one embodiment, egress scheduler 3328A is to schedule an operation on data that is to enter (e.g., from a circuit switched communication network coupled to) the dataflow endpoint circuit 3300 (e.g., at argument queue 3302, for example, spatial array ingress buffer 2202 as in FIG. 22) and output (e.g., from a packet switched communication network coupled to) the dataflow endpoint circuit 3300 (e.g., at network egress buffer 3322, for example, network egress buffer 2222 as in FIG. 22). In one embodiment, ingress scheduler 3328B is to schedule an operation on data that is to enter (e.g., from a packet switched communication network coupled to) the dataflow endpoint circuit 3300 (e.g., at network ingress buffer 3324, for example, network ingress buffer 3224 as in FIG. 22) and output (e.g., from a circuit switched communication network coupled to) the dataflow endpoint circuit 3300 (e.g., at output buffer 3308, for example, spatial array egress buffer 3208 as in FIG. 22). Scheduler 3328A and/or scheduler 3328B may include as an input the (e.g., operating) status of circuit 3300, e.g., fullness level of inputs (e.g., buffers 3302A, 3302), fullness level of outputs (e.g., buffers 3308), values (e.g., value in 3302A), etc. Scheduler 3328B may include a credit return circuit, for example, to denote that credit is returned to sender, e.g., after receipt in network ingress buffer 3324 of circuit 3300.

Figure 34:
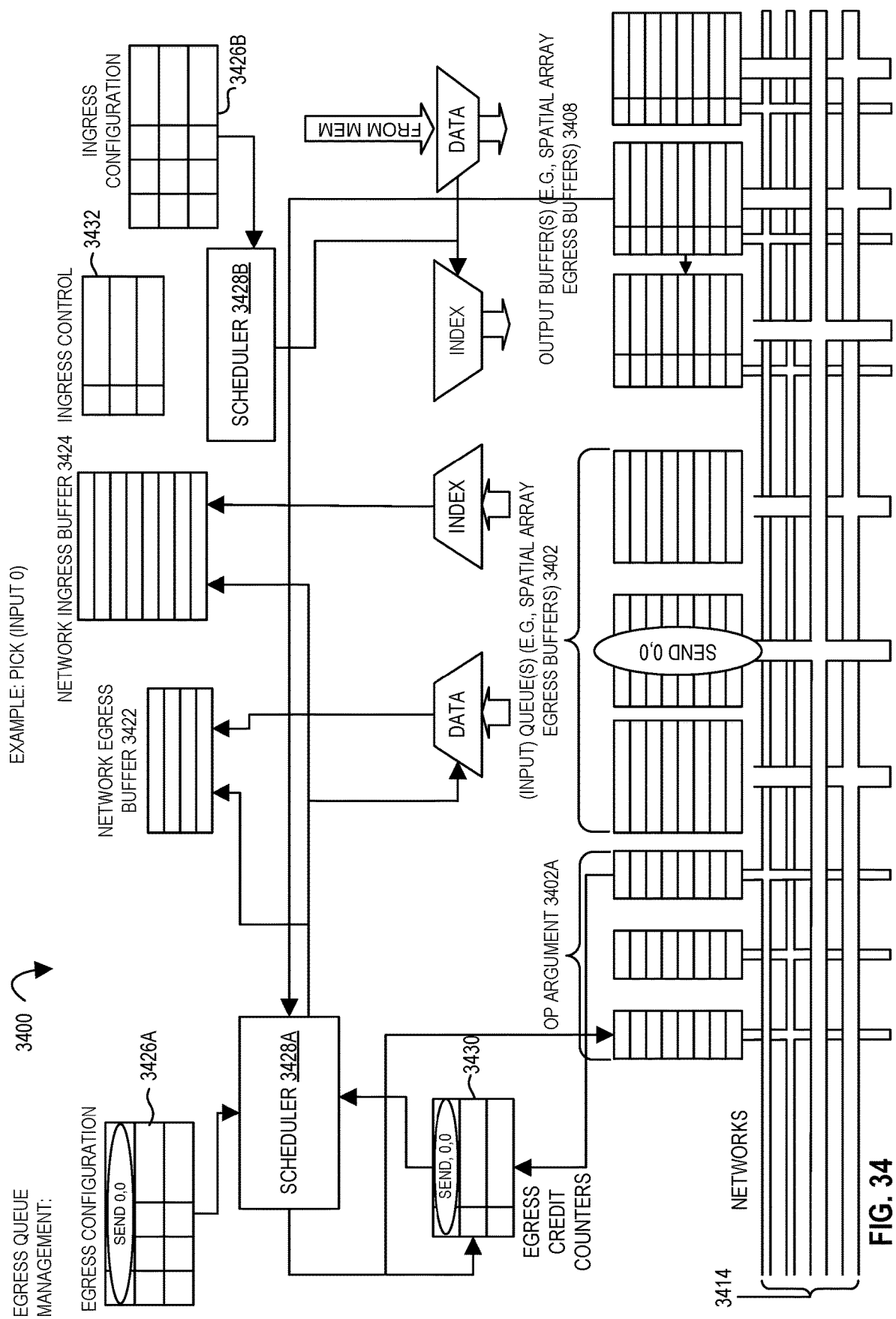
FIG. 34 illustrates a network dataflow endpoint circuit receiving input zero (0) while performing a pick operation according to embodiments of the disclosure.
Figure 35:
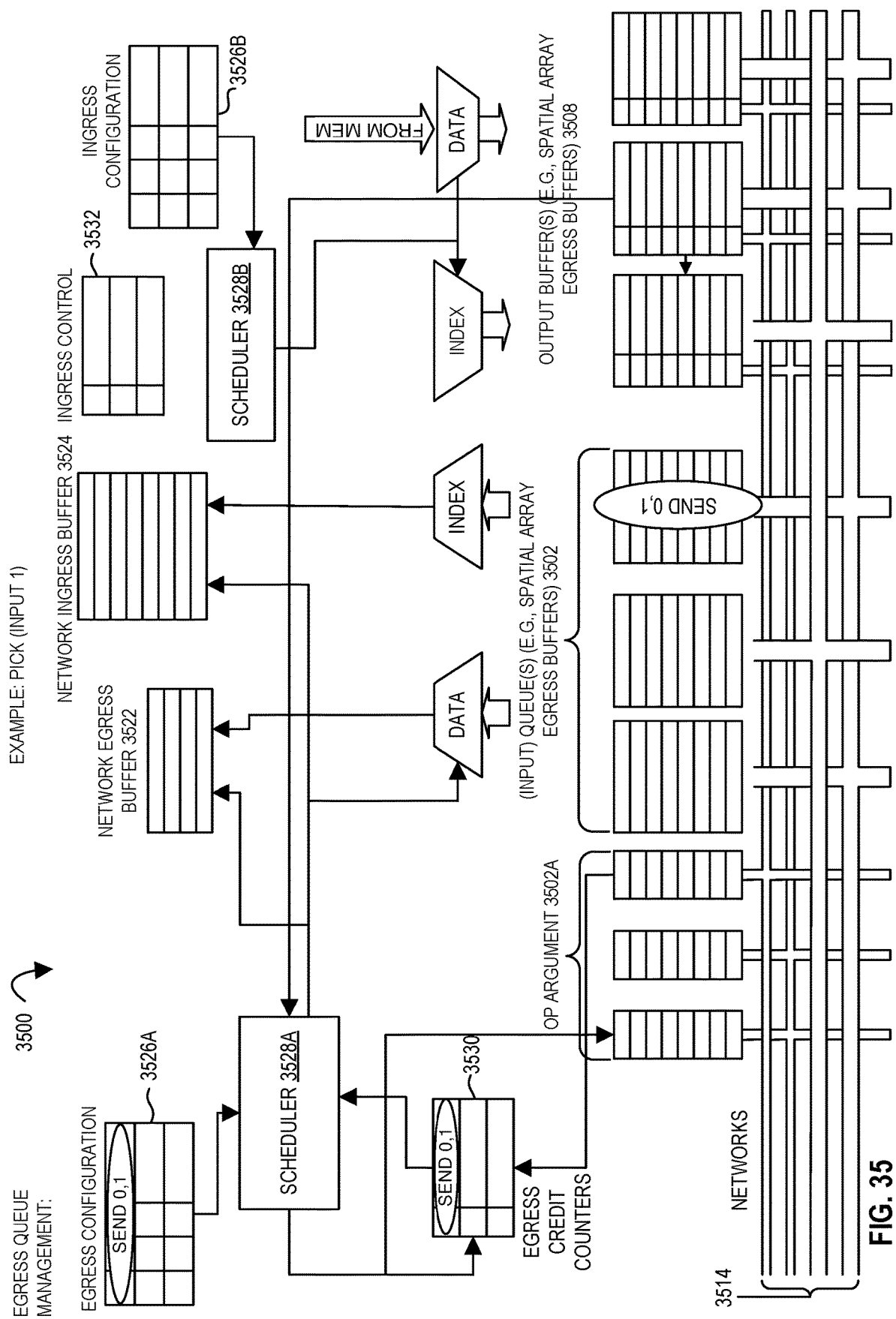
FIG. 35 illustrates a network dataflow endpoint circuit receiving input one (1) while performing a pick operation according to embodiments of the disclosure.
Figure 36:
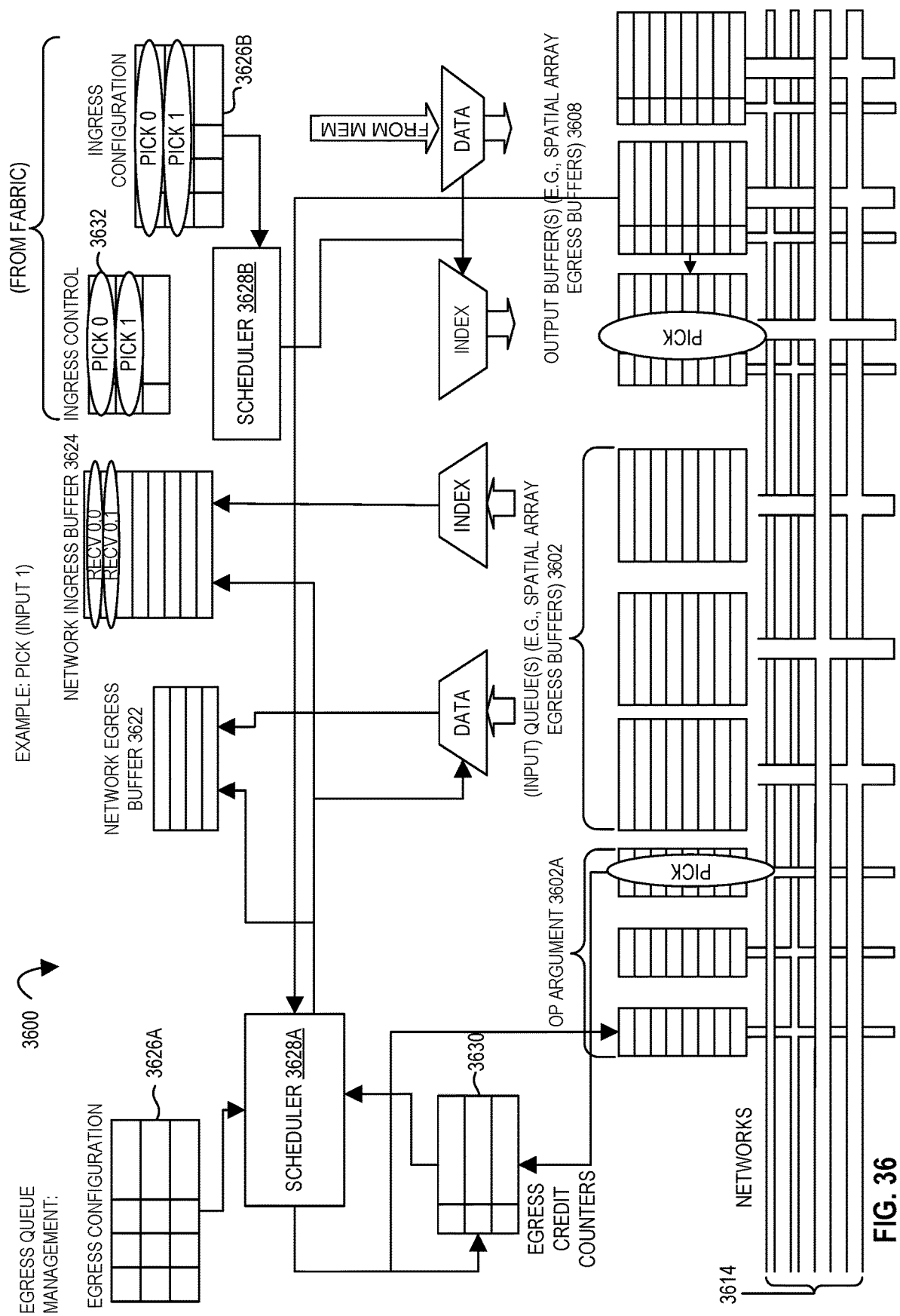
FIG. 36 illustrates a network dataflow endpoint circuit outputting the selected input while performing a pick operation according to embodiments of the disclosure.

Network 3314 may be a circuit switched network, e.g., as discussed herein. Additionally or alternatively, a packet switched network (e.g., as discussed herein) may also be utilized, for example, coupled to network egress buffer 3322, network ingress buffer 3324, or other components herein. Argument queue 3302 may include a control buffer 3302A, for example, to indicate when a respective input queue (e.g., buffer) includes a (new) item of data, e.g., as a single bit. Turning now to FIGS. 34-36, in one embodiment, these cumulatively show the configurations to create a distributed pick.

FIG. 34 illustrates a network dataflow endpoint circuit 3400 receiving input zero (0) while performing a pick operation according to embodiments of the disclosure, for example, as discussed above in reference to FIG. 21. In one embodiment, egress configuration 3426A is loaded (e.g., during a configuration step) with a portion of a pick operation that is to send data to a different network dataflow endpoint circuit (e.g., circuit 3600 in FIG. 36). In one embodiment, egress scheduler 3428A is to monitor the argument queue 3402 (e.g., data queue) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 3600 in FIG. 36) and Y being the value indicating which network ingress buffer (e.g., buffer 3624) location the value is to be stored. In one embodiment, Y is the value indicating a particular channel of a multiple channel (e.g., packet switched) network (e.g., 0 being channel 0 and/or buffer element 0 of network dataflow endpoint circuit 3600 in FIG. 36). When the input data arrives, it is then to be sent (e.g., from network egress buffer 3422) by network dataflow endpoint circuit 3400 to a different network dataflow endpoint circuit (e.g., network dataflow endpoint circuit 3600 in FIG. 36).

FIG. 35 illustrates a network dataflow endpoint circuit 3500 receiving input one (1) while performing a pick operation according to embodiments of the disclosure, for example, as discussed above in reference to FIG. 21. In one embodiment, egress configuration 3526A is loaded (e.g., during a configuration step) with a portion of a pick operation that is to send data to a different network dataflow endpoint circuit (e.g., circuit 3600 in FIG. 36). In one embodiment, egress scheduler 3528A is to monitor the argument queue 3520 (e.g., data queue 3502B) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 3600 in FIG. 36) and Y being the value indicating which network ingress buffer (e.g., buffer 3624) location the value is to be stored. In one embodiment, Y is the value indicating a particular channel of a multiple channel (e.g., packet switched) network (e.g., 1 being channel 1 and/or buffer element 1 of network dataflow endpoint circuit 3600 in FIG. 36). When the input data arrives, it is then to be sent (e.g., from network egress buffer 3422) by network dataflow endpoint circuit 3500 to a different network dataflow endpoint circuit (e.g., network dataflow endpoint circuit 3600 in FIG. 36).

FIG. 36 illustrates a network dataflow endpoint circuit 3600 outputting the selected input while performing a pick operation according to embodiments of the disclosure, for example, as discussed above in reference to FIG. 21. In one embodiment, other network dataflow endpoint circuits (e.g., circuit 3400 and circuit 3500) are to send their input data to network ingress buffer 3624 of circuit 3600. In one embodiment, ingress configuration 3626B is loaded (e.g., during a configuration step) with a portion of a pick operation that is to pick the data sent to network dataflow endpoint circuit 3600, e.g., according to a control value. In one embodiment, control value is to be received in ingress control 3632 (e.g., buffer). In one embodiment, ingress scheduler 3528A is to monitor the receipt of the control value and the input values (e.g., in network ingress buffer 3624). For example, if the control value says pick from buffer element A (e.g., 0 or 1 in this example) (e.g., from channel A) of network ingress buffer 3624, the value stored in that buffer element A is then output as a resultant of the operation by circuit 3600, for example, into an output buffer 3608, e.g., when output buffer has storage space (e.g., as indicated by a backpressure signal). In one embodiment, circuit 3600's output data is sent out when the egress buffer has a token (e.g., input data and control data) and the receiver asserts that it has buffer (e.g., indicating storage is available, although other assignments of resources are possible, this example is simply illustrative).

Figure 37:
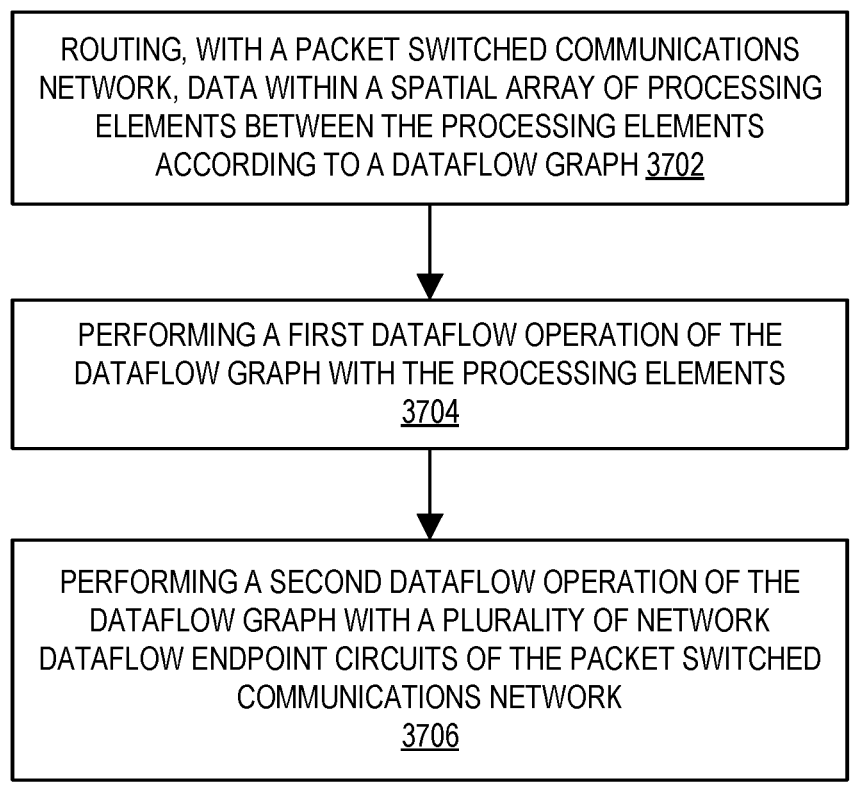
FIG. 37 illustrates a flow diagram according to embodiments of the disclosure.

FIG. 37 illustrates a flow diagram 3700 according to embodiments of the disclosure. Depicted flow 3700 includes providing a spatial array of processing elements 3702; routing, with a packet switched communications network, data within the spatial array between processing elements according to a dataflow graph 3704; performing a first dataflow operation of the dataflow graph with the processing elements 3706; and performing a second dataflow operation of the dataflow graph with a plurality of network dataflow endpoint circuits of the packet switched communications network 3708.

Referring again to FIG. 9, accelerator (e.g., CSA) 902 may perform (e.g., or request performance of) an access (e.g., a load and/or store) of data to one or more of plurality of cache banks (e.g., cache bank 908). A memory interface circuit (e.g., request address file (RAF) circuit(s)) may be included, e.g., as discussed herein, to provide access between memory (e.g., cache banks) and the accelerator 902. Referring again to FIG. 13, a requesting circuit (e.g., a processing element) may perform (e.g., or request performance of) an access (e.g., a load and/or store) of data to one or more of plurality of cache banks (e.g., cache bank 1302). A memory interface circuit (e.g., request address file (RAF) circuit(s)) may be included, e.g., as discussed herein, to provide access between memory (e.g., one or more banks of the cache memory) and the accelerator (e.g., one or more of accelerator tiles (1308, 1310, 1312, 1314)). Referring again to FIGS. 21 and/or 22, a requesting circuit (e.g., a processing element) may perform (e.g., or request performance of) an access (e.g., a load and/or store) of data to one or more of a plurality of cache banks. A memory interface circuit (for example, request address file (RAF) circuit(s), e.g., RAF/cache interface 2112) may be included, e.g., as discussed herein, to provide access between memory (e.g., one or more banks of the cache memory) and the accelerator (e.g., one or more of the processing elements and/or network dataflow endpoint circuits (e.g., circuits 2102, 2104, 2106)).

In certain embodiments, an accelerator (e.g., a PE thereof) couples to a RAF circuit or a plurality of RAF circuits through (i) a circuit switched network (for example, as discussed herein, e.g., in reference to FIGS. 6-13) or (ii) through a packet switched network (for example, as discussed herein, e.g., in reference to FIGS. 20-37).

In certain embodiments, a circuit (e.g., a request address file (RAF) circuit) (e.g., each of a plurality of RAF circuits) includes a translation lookaside buffer (TLB) (e.g., TLB circuit). TLB may receive an input of a virtual address and output a physical address corresponding to the mapping (e.g., address mapping) of the virtual address to the physical address (e.g., different than any mapping of a dataflow graph to hardware). A virtual address may be an address as seen by a program running on circuitry (e.g., on an accelerator and/or processor). A physical address may be an (e.g., different than the virtual) address in memory hardware. A TLB may include a data structure (e.g., table) to store (e.g., recently used) virtual-to-physical memory address translations, e.g., such that the translation does not have to be performed on each virtual address present to obtain the physical memory address corresponding to that virtual address. If the virtual address entry is not in the TLB, a circuit (e.g., a TLB manager circuit) may perform a page walk to determine the virtual-to-physical memory address translation. In one embodiment, a circuit (e.g., a RAF circuit) is to receive an input of a virtual address for translation in a TLB (e.g., TLB in RAF circuit) from a requesting entity (e.g., a PE or other hardware component) via a circuit switched network, e.g., as in FIGS. 6-13. Additionally or alternatively, a circuit (e.g., a RAF circuit) may receive an input of a virtual address for translation in a TLB (e.g., TLB in RAF circuit) from a requesting entity (e.g., a PE, network dataflow endpoint circuit, or other hardware component) via a packet switched network, e.g., as in FIGS. 20-37. In certain embodiments, data received for a memory (e.g., cache) access request is a memory command. A memory command may include the virtual address to-be-accessed, operation to be performed (e.g., a load or a store), and/or payload data (e.g., for a store).

2.6 Floating Point Support

Figure 38:
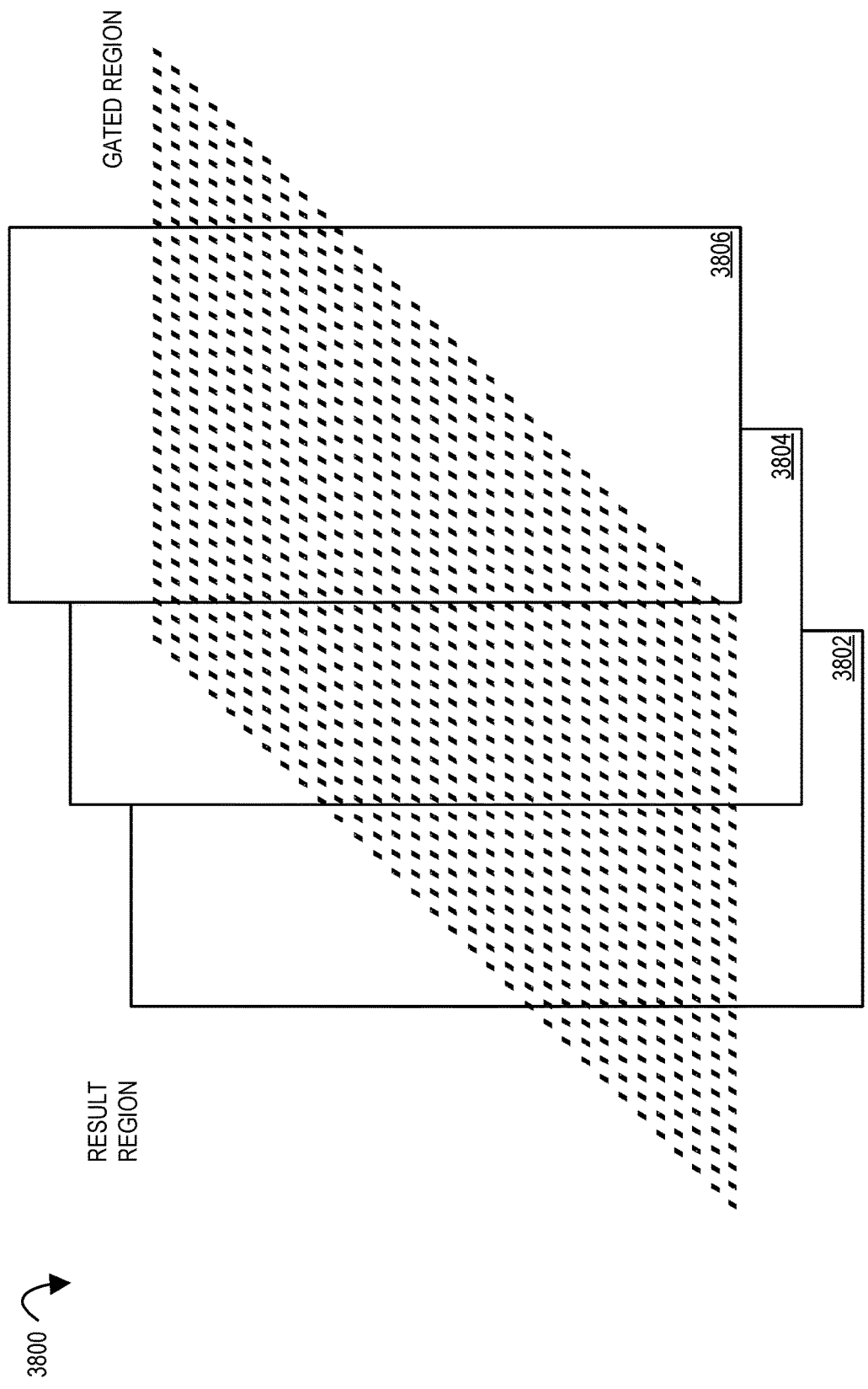
FIG. 38 illustrates a floating point multiplier partitioned into three regions (the result region, three potential carry regions, and the gated region) according to embodiments of the disclosure.

Certain HPC applications are characterized by their need for significant floating point bandwidth. To meet this need, embodiments of a CSA may be provisioned with multiple (e.g., between 128 and 256 each) of floating add and multiplication PEs, e.g., depending on tile configuration. A CSA may provide a few other extended precision modes, e.g., to simplify math library implementation. CSA floating point PEs may support both single and double precision, but lower precision PEs may support machine learning workloads. A CSA may provide an order of magnitude more floating point performance than a processor core. In one embodiment, in addition to increasing floating point bandwidth, in order to power all of the floating point units, the energy consumed in floating point operations is reduced. For example, to reduce energy, a CSA may selectively gate the low-order bits of the floating point multiplier array. In examining the behavior of floating point arithmetic, the low order bits of the multiplication array may often not influence the final, rounded product. FIG. 38 illustrates a floating point multiplier 3800 partitioned into three regions (the result region, three potential carry regions (3802, 3804, 3806), and the gated region) according to embodiments of the disclosure. In certain embodiments, the carry region is likely to influence the result region and the gated region is unlikely to influence the result region. Considering a gated region of g bits, the maximum carry may be:

$$\text{carry}_g \leq \frac{1}{2^g} \sum_{1}^{g} i 2^{i-1}$$

$$\leq \sum_{1}^{g} \frac{i}{2^g} - \sum_{1}^{g} \frac{1}{2^g} + 1$$

$$\leq g - 1$$

Given this maximum carry, if the result of the carry region is less than $2^c - g$, where the carry region is c bits wide, then the gated region may be ignored since it does not influence the result region. Increasing g means that it is more likely the gated region will be needed, while increasing c means that, under random assumption, the gated region will be unused and may be disabled to avoid energy consumption. In embodiments of a CSA floating multiplication PE, a two stage pipelined approach is utilized in which first the carry region is determined and then the gated region is determined if it is found to influence the result. If more information about the context of the multiplication is known, a CSA more aggressively tune the size of the gated region. In FMA, the multiplication result may be added to an accumulator, which is often much larger than either of the multiplicands. In this case, the addend exponent may be observed in advance of multiplication and the CSDA may adjust the gated region accordingly. One embodiment of the CSA includes a scheme in which a context value, which bounds the minimum result of a computation, is provided to related multipliers, in order to select minimum energy gating configurations.

2.7 Runtime Services

Figure 39:
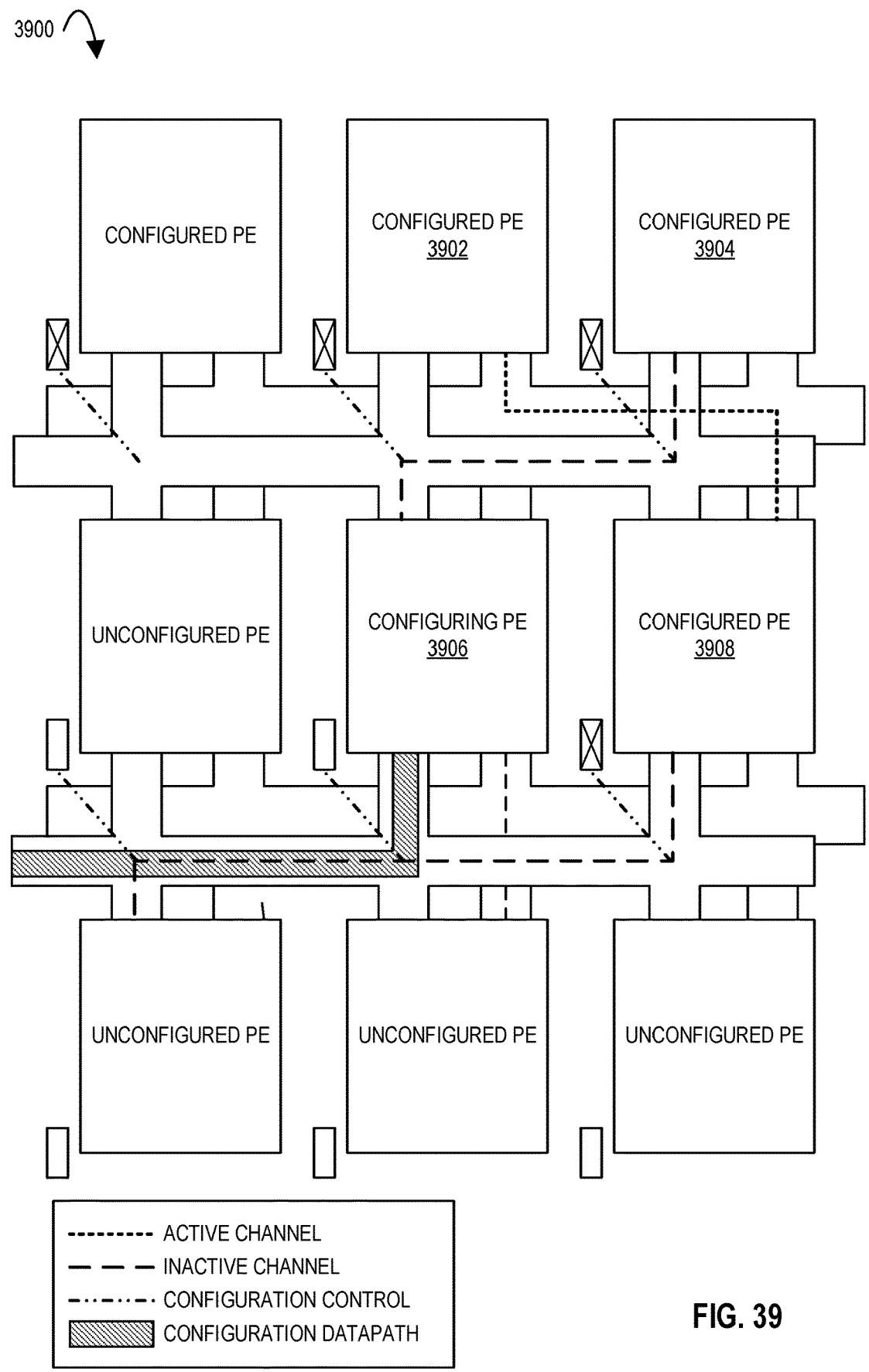
FIG. 39 illustrates an in-flight configuration of an accelerator with a plurality of processing elements according to embodiments of the disclosure.

In certain embodiment, a CSA includes a heterogeneous and distributed fabric, and consequently, runtime service implementations are to accommodate several kinds of PEs in a parallel and distributed fashion. Although runtime services in a CSA may be critical, they may be infrequent relative to user-level computation. Certain implementations, therefore, focus on overlaying services on hardware resources. To meet these goals, CSA runtime services may be cast as a hierarchy, e.g., with each layer corresponding to a CSA network. At the tile level, a single external-facing controller may accepts or sends service commands to an associated core with the CSA tile. A tile-level controller may serve to coordinate regional controllers at the RAFs, e.g., using the ACI network. In turn, regional controllers may coordinate local controllers at certain mezzanine network stops (e.g., network dataflow endpoint circuits). At the lowest level, service specific micro-protocols may execute over the local network, e.g., during a special mode controlled through the mezzanine controllers. The micro-protocols may permit each PE (e.g., PE class by type) to interact with the runtime service according to its own needs. Parallelism is thus implicit in this hierarchical organization, and operations at the lowest levels may occur simultaneously. This parallelism may enables the configuration of a CSA tile in between hundreds of nanoseconds to a few microseconds, e.g., depending on the configuration size and its location in the memory hierarchy. Embodiments of the CSA thus leverage properties of dataflow graphs to improve implementation of each runtime service. One key observation is that runtime services may need only to preserve a legal logical view of the dataflow graph, e.g., a state that can be produced through some ordering of dataflow operator executions. Services may generally not need to guarantee a temporal view of the dataflow graph, e.g., the state of a dataflow graph in a CSA at a specific point in time. This may permit the CSA to conduct most runtime services in a distributed, pipelined, and parallel fashion, e.g., provided that the service is orchestrated to preserve the logical view of the dataflow graph. The local configuration micro-protocol may be a packet-based protocol overlaid on the local network. Configuration targets may be organized into a configuration chain, e.g., which is fixed in the microarchitecture. Fabric (e.g., PE) targets may be configured one at a time, e.g., using a single extra register per target to achieve distributed coordination. To start configuration, a controller may drive an out-of-band signal which places all fabric targets in its neighborhood into an unconfigured, paused state and swings multiplexors in the local network to a pre-defined conformation. As the fabric (e.g., PE) targets are configured, that is they completely receive their configuration packet, they may set their configuration microprotocol registers, notifying the immediately succeeding target (e.g., PE) that it may proceed to configure using the subsequent packet. There is no limitation to the size of a configuration packet, and packets may have dynamically variable length. For example, PEs configuring constant operands may have a configuration packet that is lengthened to include the constant field (e.g., X and Y in FIGS. 3B-3C). FIG. 39 illustrates an in-flight configuration of an accelerator 3900 with a plurality of processing elements (e.g., PEs 3902, 3904, 3906, 3908) according to embodiments of the disclosure. Once configured, PEs may execute subject to dataflow constraints. However, channels involving unconfigured PEs may be disabled by the microarchitecture, e.g., preventing any undefined operations from occurring. These properties allow embodiments of a CSA to initialize and execute in a distributed fashion with no centralized control whatsoever. From an unconfigured state, configuration may occur completely in parallel, e.g., in perhaps as few as 200 nanoseconds. However, due to the distributed initialization of embodiments of a CSA, PEs may become active, for example sending requests to memory, well before the entire fabric is configured. Extraction may proceed in much the same way as configuration. The local network may be conformed to extract data from one target at a time, and state bits used to achieve distributed coordination. A CSA may orchestrate extraction to be non-destructive, that is, at the completion of extraction each extractable target has returned to its starting state. In this implementation, all state in the target may be circulated to an egress register tied to the local network in a scan-like fashion. Although in-place extraction may be achieved by introducing new paths at the register-transfer level (RTL), or using existing lines to provide the same functionalities with lower overhead. Like configuration, hierarchical extraction is achieved in parallel.

Figure 40:
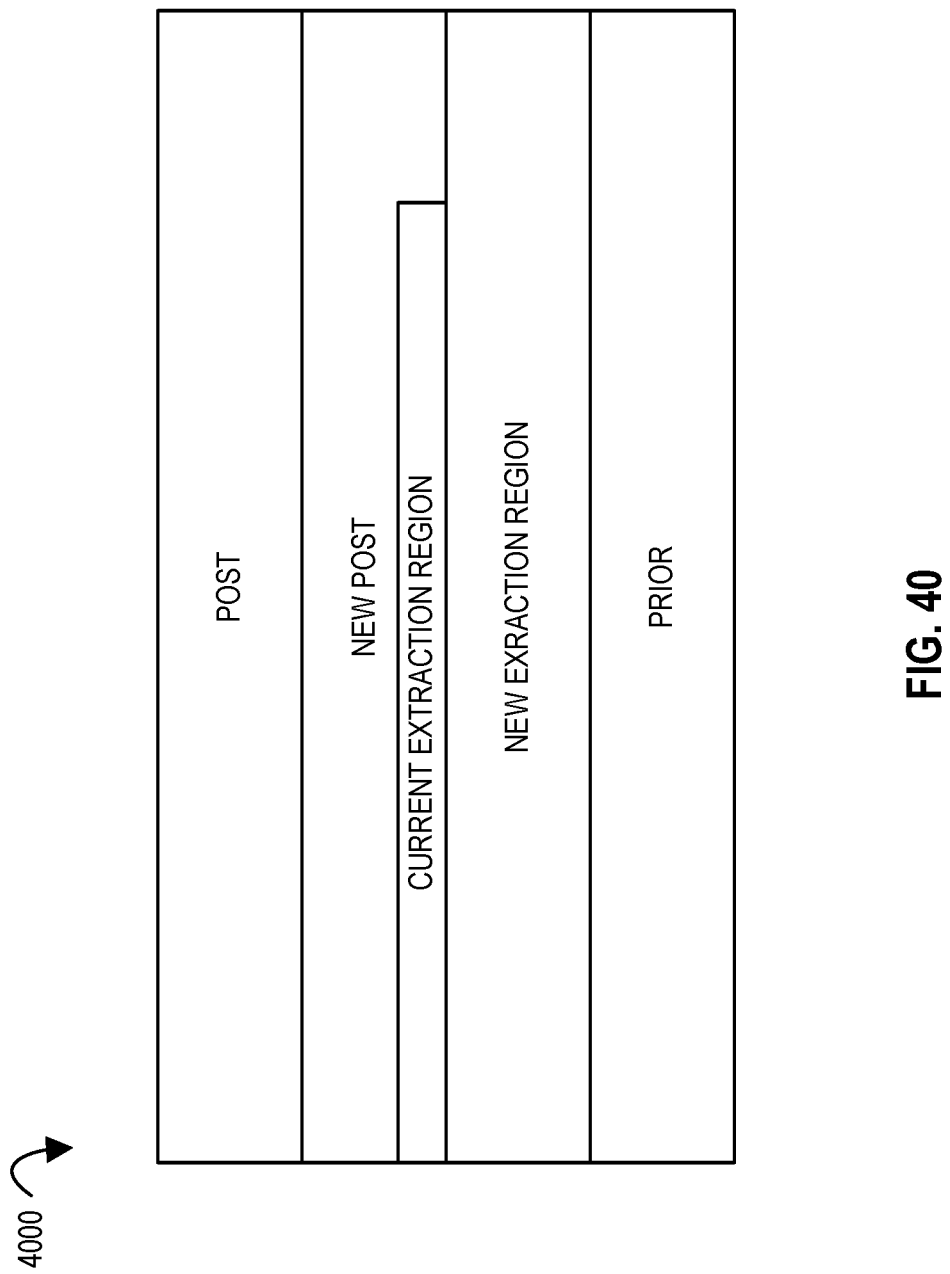
FIG. 40 illustrates a snapshot of an in-flight, pipelined extraction according to embodiments of the disclosure.

FIG. 40 illustrates a snapshot 4000 of an in-flight, pipelined extraction according to embodiments of the disclosure. In some use cases of extraction, such as checkpointing, latency may not be a concern so long as fabric throughput is maintained. In these cases, extraction may be orchestrated in a pipelined fashion. This arrangement, shown in FIG. 40, permits most of the fabric to continue executing, while a narrow region is disabled for extraction. Configuration and extraction may be coordinated and composed to achieve a pipelined context switch. Exceptions may differ qualitatively from configuration and extraction in that, rather than occurring at a specified time, they arise anywhere in the fabric at any point during runtime. Thus, in one embodiment, the exception micro-protocol may not be overlaid on the local network, which is occupied by the user program at runtime, and utilizes its own network. However, by nature, exceptions are rare and insensitive to latency and bandwidth. Thus certain embodiments of CSA utilize a packet switched network to carry exceptions to the local mezzanine stop, e.g., where they are forwarded up the service hierarchy (e.g., as in FIG. 55). Packets in the local exception network may be extremely small. In many cases, a PE identification (ID) of only two to eight bits suffices as a complete packet, e.g., since the CSA may create a unique exception identifier as the packet traverses the exception service hierarchy. Such a scheme may be desirable because it also reduces the area overhead of producing exceptions at each PE.

3. Compilation

The ability to compile programs written in high-level languages onto a CSA may be essential for industry adoption. This section gives a high-level overview of compilation strategies for embodiments of a CSA. First is a proposal for a CSA software framework that illustrates the desired properties of an ideal production-quality toolchain. Next, a prototype compiler framework is discussed. A "control-to-dataflow conversion" is then discussed, e.g., to converts ordinary sequential control-flow code into CSA dataflow assembly code.

3.1 Example Production Framework

Figure 41:
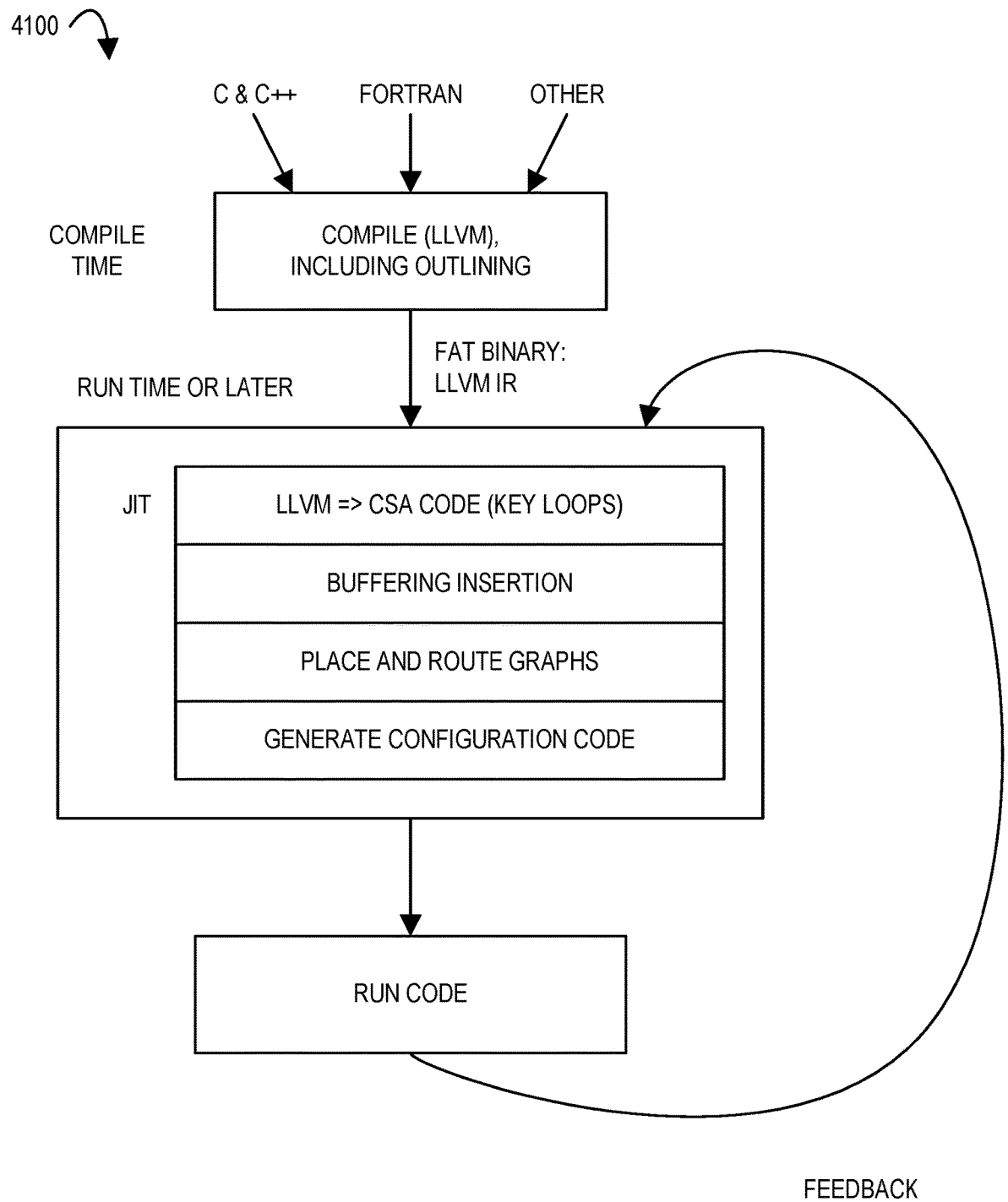
FIG. 41 illustrates a compilation toolchain for an accelerator according to embodiments of the disclosure.

FIG. 41 illustrates a compilation toolchain 4100 for an accelerator according to embodiments of the disclosure. This toolchain compiles high-level languages (such as C, C++, and Fortran) into a combination of host code (LLVM) intermediate representation (IR) for the specific regions to be accelerated. The CSA-specific portion of this compilation toolchain takes LLVM IR as its input, optimizes and compiles this IR into a CSA assembly, e.g., adding appropriate buffering on latency-insensitive channels for performance. It then places and routes the CSA assembly on the hardware fabric, and configures the PEs and network for execution. In one embodiment, the toolchain supports the CSA-specific compilation as a just-in-time (JIT), incorporating potential runtime feedback from actual executions. One of the key design characteristics of the framework is compilation of (LLVM) IR for the CSA, rather than using a higher-level language as input. While a program written in a high-level programming language designed specifically for the CSA might achieve maximal performance and/or energy efficiency, the adoption of new high-level languages or programming frameworks may be slow and limited in practice because of the difficulty of converting existing code bases. Using (LLVM) IR as input enables a wide range of existing programs to potentially execute on a CSA, e.g., without the need to create a new language or significantly modify the front-end of new languages that want to run on the CSA.

3.2 Prototype Compiler

Figure 42:
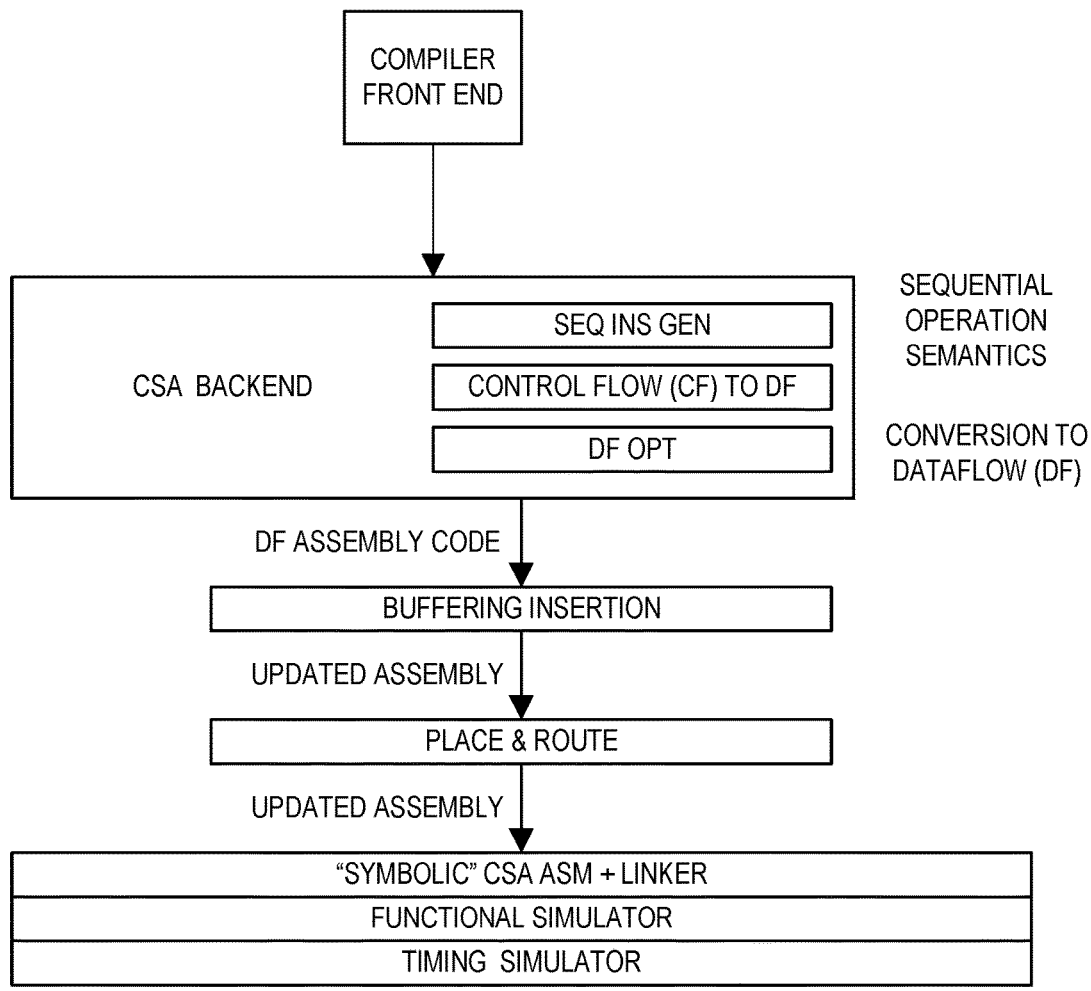
FIG. 42 illustrates a compiler for an accelerator according to embodiments of the disclosure.

FIG. 42 illustrates a compiler 4200 for an accelerator according to embodiments of the disclosure. Compiler 4200 initially focuses on ahead-of-time compilation of C and C++ through the (e.g., Clang) front-end. To compile (LLVM) IR, the compiler implements a CSA back-end target within LLVM with three main stages. First, the CSA back-end lowers LLVM IR into a target-specific machine instructions for the sequential unit, which implements most CSA operations combined with a traditional RISC-like control-flow architecture (e.g., with branches and a program counter). The sequential unit in the toolchain may serve as a useful aid for both compiler and application developers, since it enables an incremental transformation of a program from control flow (CF) to dataflow (DF), e.g., converting one section of code at a time from control-flow to dataflow and validating program correctness. The sequential unit may also provide a model for handling code that does not fit in the spatial array. Next, the compiler converts these control-flow instructions into dataflow operators (e.g., code) for the CSA. This phase is described later in Section 3.3. Then, the CSA back-end may run its own optimization passes on the dataflow instructions. Finally, the compiler may dump the instructions in a CSA assembly format. This assembly format is taken as input to late-stage tools which place and route the dataflow instructions on the actual CSA hardware.

3.3 Control to Dataflow Conversion

A key portion of the compiler may be implemented in the control-to-dataflow conversion pass, or dataflow conversion pass for short. This pass takes in a function represented in control flow form, e.g., a control-flow graph (CFG) with sequential machine instructions operating on virtual registers, and converts it into a dataflow function that is conceptually a graph of dataflow operations (instructions) connected by latency-insensitive channels (LICs). This section gives a high-level description of this pass, describing how it conceptually deals with memory operations, branches, and loops in certain embodiments.

Straight-Line Code

Figure 43C:
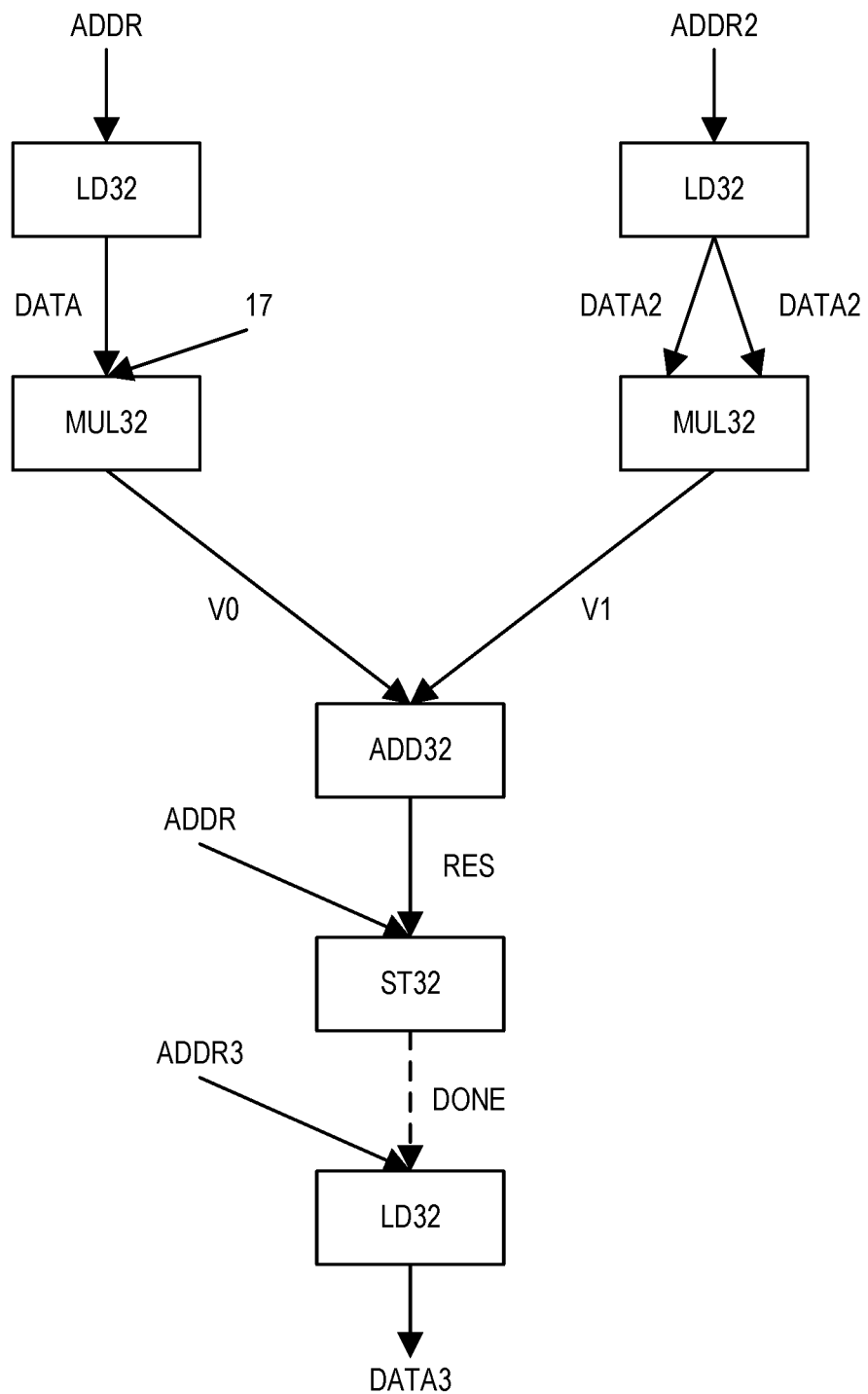
FIG. 43C illustrates a dataflow graph for the dataflow assembly code of FIG. 43B for an accelerator according to embodiments of the disclosure.

FIG. 43A illustrates sequential assembly code 4302 according to embodiments of the disclosure. FIG. 43B illustrates dataflow assembly code 4304 for the sequential assembly code 4302 of FIG. 43A according to embodiments of the disclosure. FIG. 43C illustrates a dataflow graph 4306 for the dataflow assembly code 4304 of FIG. 43B for an accelerator according to embodiments of the disclosure.

First, consider the simple case of converting straight-line sequential code to dataflow. The dataflow conversion pass may convert a basic block of sequential code, such as the code shown in FIG. 43A into CSA assembly code, shown in FIG. 43B. Conceptually, the CSA assembly in FIG. 43B represents the dataflow graph shown in FIG. 43C. In this example, each sequential instruction is translated into a matching CSA assembly. The .lic statements (e.g., for data) declare latency-insensitive channels which correspond to the virtual registers in the sequential code (e.g., Rdata). In practice, the input to the dataflow conversion pass may be in numbered virtual registers. For clarity, however, this section uses descriptive register names. Note that load and store operations are supported in the CSA architecture in this embodiment, allowing for many more programs to run than an architecture supporting only pure dataflow. Since the sequential code input to the compiler is in SSA (singlestatic assignment) form, for a simple basic block, the control-to-dataflow pass may convert each virtual register definition into the production of a single value on a latency-insensitive channel. The SSA form allows multiple uses of a single definition of a virtual register, such as in Rdata2). To support this model, the CSA assembly code supports multiple uses of the same LIC (e.g., data2), with the simulator implicitly creating the necessary copies of the LICs. One key difference between sequential code and dataflow code is in the treatment of memory operations. The code in FIG. 43A is conceptually serial, which means that the load32 (ld32) of addr3 should appear to happen after the st32 of addr, in case that addr and addr3 addresses overlap.

Branches

To convert programs with multiple basic blocks and conditionals to dataflow, the compiler generates special dataflow operators to replace the branches. More specifically, the compiler uses switch operators to steer outgoing data at the end of a basic block in the original CFG, and pick operators to select values from the appropriate incoming channel at the beginning of a basic block. As a concrete example, consider the code and corresponding dataflow graph in FIGS. 44A-44C, which conditionally computes a value of y based on several inputs: a i, x, and n. After computing the branch condition test, the dataflow code uses a switch operator (e.g., see FIGS. 3B-3C) steers the value in channel x to channel xF if test is 0, or channel xT if test is 1. Similarly, a pick operator (e.g., see FIGS. 3B-3C) is used to send channel yF to y if test is 0, or send channel yT to y if test is 1. In this example, it turns out that even though the value of a is only used in the true branch of the conditional, the CSA is to include a switch operator which steers it to channel aT when test is 1, and consumes (eats) the value when test is 0. This latter case is expressed by setting the false output of the switch to % ign. It may not be correct to simply connect channel a directly to the true path, because in the cases where execution actually takes the false path, this value of "a" will be left over in the graph, leading to incorrect value of a for the next execution of the function.

This example highlights the property of control equivalence, a key property in embodiments of correct dataflow conversion.

Control Equivalence:

Consider a single-entry-single-exit control flow graph G with two basic blocks A and B. A and B are control-equivalent if all complete control flow paths through G visit A and B the same number of times.

Figure 44C:
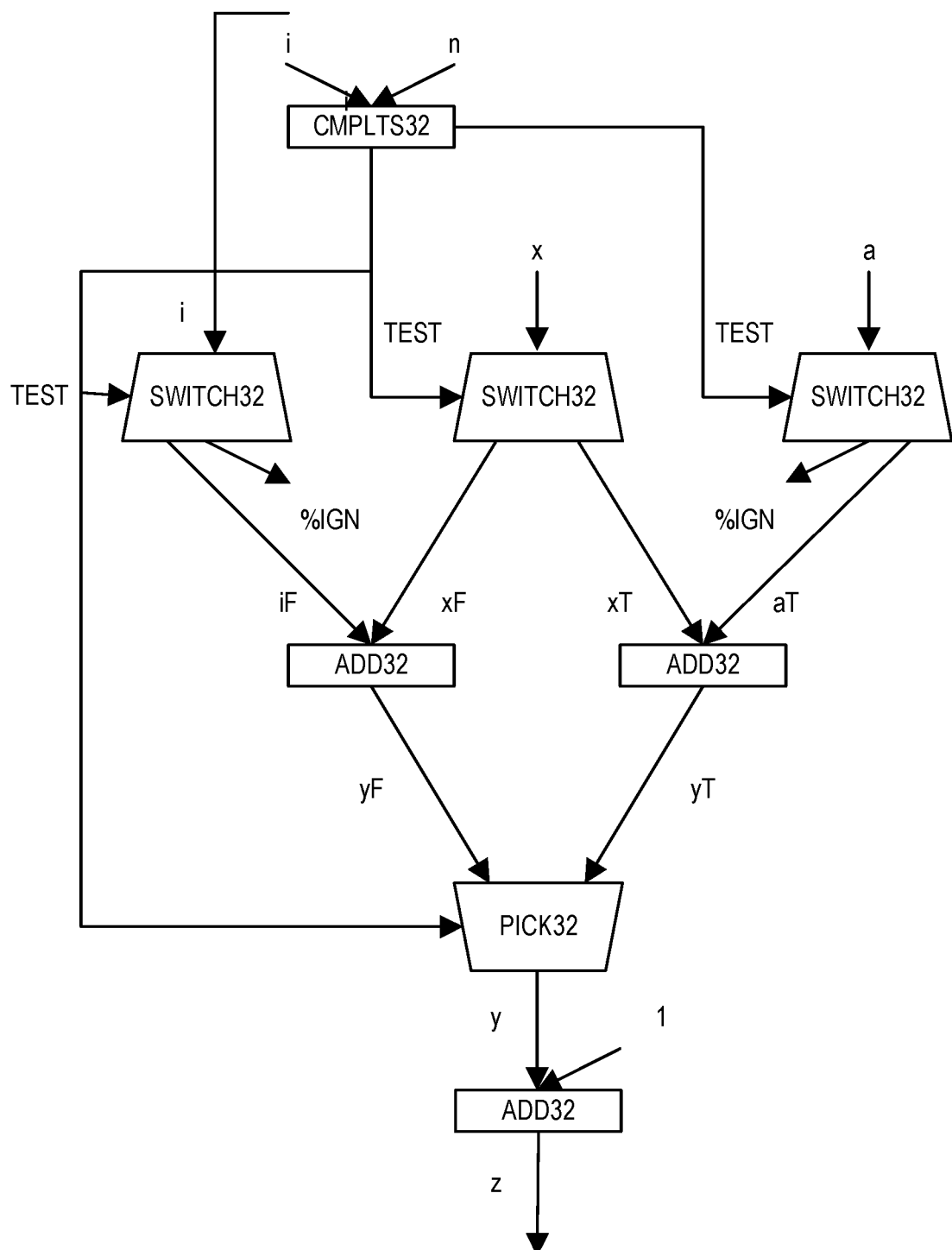
FIG. 44C illustrates a dataflow graph for the dataflow assembly code of FIG. 44B for an accelerator according to embodiments of the disclosure.

LIC Replacement:

In a control flow graph G, suppose an operation in basic block A defines a virtual register x, and an operation in basic block B that uses x. Then a correct control-to-dataflow transformation can replace x with a latency-insensitive channel only if A and B are control equivalent. The control-equivalence relation partitions the basic blocks of a CFG into strong control-dependence regions. FIG. 44A illustrates C source code 4402 according to embodiments of the disclosure. FIG. 44B illustrates dataflow assembly code 4404 for the C source code 4402 of FIG. 44A according to embodiments of the disclosure. FIG. 44C illustrates a dataflow graph 4406 for the dataflow assembly code 4404 of FIG. 44B for an accelerator according to embodiments of the disclosure. In the example in FIGS. 44A-44C, the basic block before and after the conditionals are control-equivalent to each other, but the basic blocks in the true and false paths are each in their own control dependence region. One correct algorithm for converting a CFG to dataflow is to have the compiler insert (1) switches to compensate for the mismatch in execution frequency for any values that flow between basic blocks which are not control equivalent, and (2) picks at the beginning of basic blocks to choose correctly from any incoming values to a basic block. Generating the appropriate control signals for these picks and switches may be the key part of dataflow conversion.

Loops

Figure 45C:
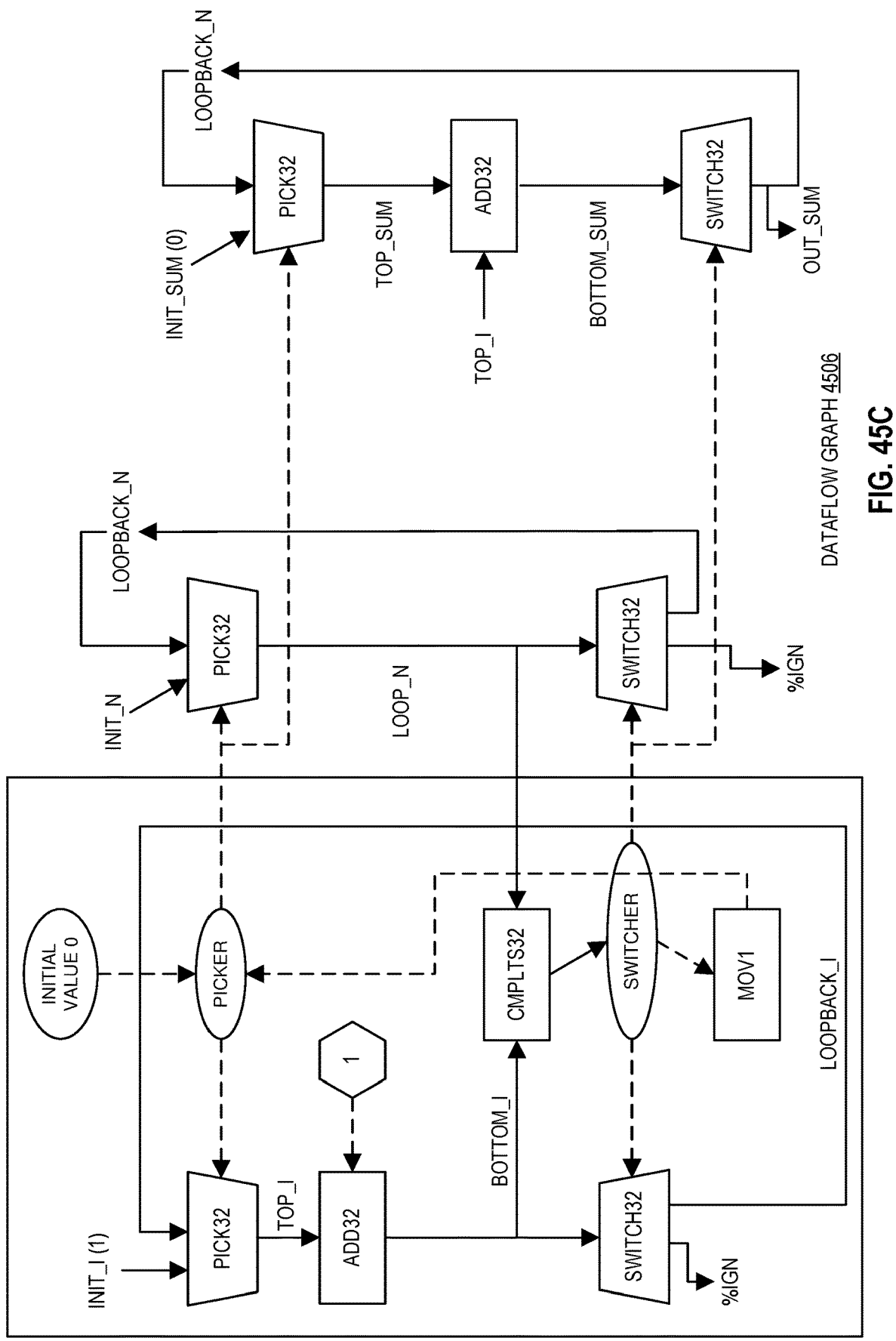
FIG. 45C illustrates a dataflow graph for the dataflow assembly code of FIG. 45B for an accelerator according to embodiments of the disclosure.

Another important class of CFGs in dataflow conversion are CFGs for single-entry-single-exit loops, a common form of loop generated in (LLVM) IR. These loops may be almost acyclic, except for a single back edge from the end of the loop back to a loop header block. The dataflow conversion pass may use same high-level strategy to convert loops as for branches, e.g., it inserts switches at the end of the loop to direct values out of the loop (either out the loop exit or around the back-edge to the beginning of the loop), and inserts picks at the beginning of the loop to choose between initial values entering the loop and values coming through the back edge. FIG. 45A illustrates C source code 4502 according to embodiments of the disclosure. FIG. 45B illustrates dataflow assembly code 4504 for the C source code 4502 of FIG. 45A according to embodiments of the disclosure. FIG. 45C illustrates a dataflow graph 4506 for the dataflow assembly code 4504 of FIG. 45B for an accelerator according to embodiments of the disclosure. FIGS. 45A-45C shows C and CSA assembly code for an example do-while loop that adds up values of a loop induction variable i, as well as the corresponding dataflow graph. For each variable that conceptually cycles around the loop (i and sum), this graph has a corresponding pick/switch pair that controls the flow of these values. Note that this example also uses a pick/switch pair to cycle the value of n around the loop, even though n is loop-invariant. This repetition of n enables conversion of n's virtual register into a LIC, since it matches the execution frequencies between a conceptual definition of n outside the loop and the one or more uses of n inside the loop. In general, for a correct dataflow conversion, registers that are live-in into a loop are to be repeated once for each iteration inside the loop body when the register is converted into a LIC. Similarly, registers that are updated inside a loop and are live-out from the loop are to be consumed, e.g., with a single final value sent out of the loop. Loops introduce a wrinkle into the dataflow conversion process, namely that the control for a pick at the top of the loop and the switch for the bottom of the loop are offset. For example, if the loop in FIG. 44A executes three iterations and exits, the control to picker should be 0, 1, 1, while the control to switcher should be 1, 1, 0. This control is implemented by starting the picker channel with an initial extra 0 when the function begins on cycle 0 (which is specified in the assembly by the directives .value 0 and .avail 0), and then copying the output switcher into picker. Note that the last 0 in switcher restores a final 0 into picker, ensuring that the final state of the dataflow graph matches its initial state.

Figure 46A:
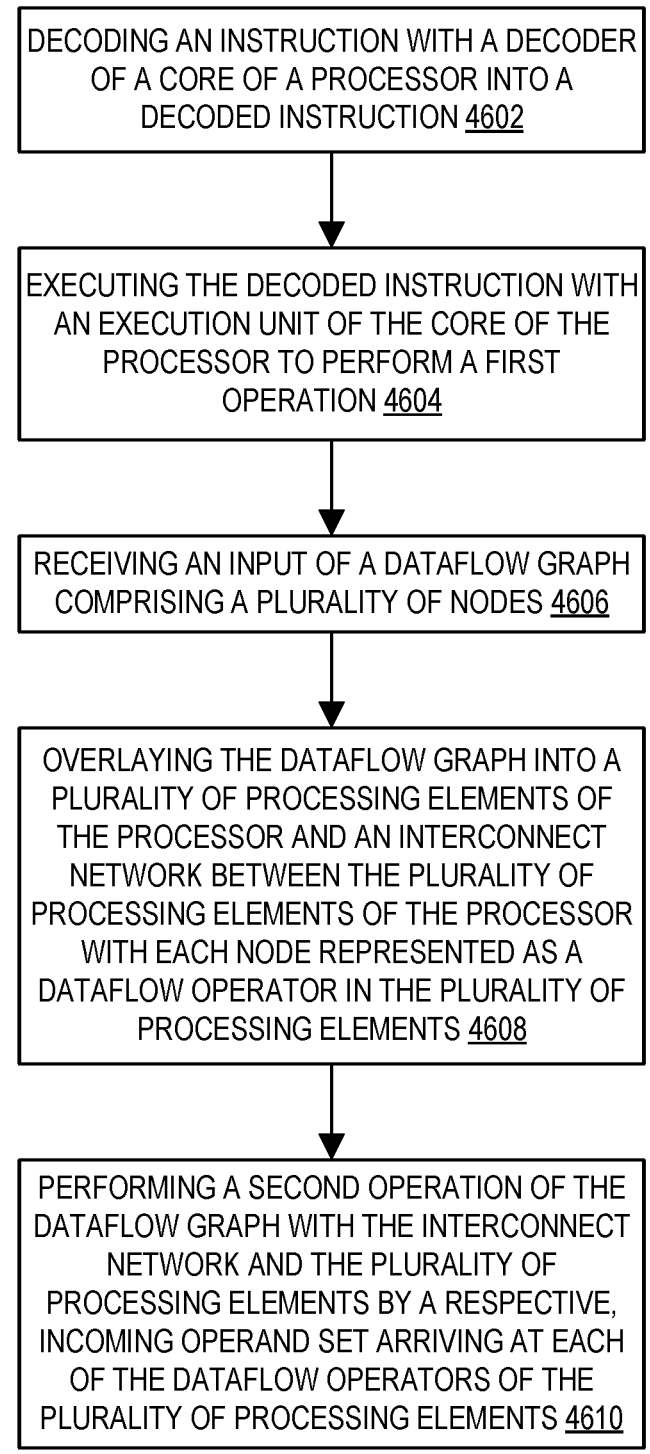
FIG. 46A illustrates a flow diagram according to embodiments of the disclosure.

FIG. 46A illustrates a flow diagram 4600 according to embodiments of the disclosure. Depicted flow 4600 includes decoding an instruction with a decoder of a core of a processor into a decoded instruction 4602; executing the decoded instruction with an execution unit of the core of the processor to perform a first operation 4604; receiving an input of a dataflow graph comprising a plurality of nodes 4606; overlaying the dataflow graph into a plurality of processing elements of the processor and an interconnect network between the plurality of processing elements of the processor with each node represented as a dataflow operator in the plurality of processing elements 4608; and performing a second operation of the dataflow graph with the interconnect network and the plurality of processing elements by a respective, incoming operand set arriving at each of the dataflow operators of the plurality of processing elements 4610.

Figure 46B:
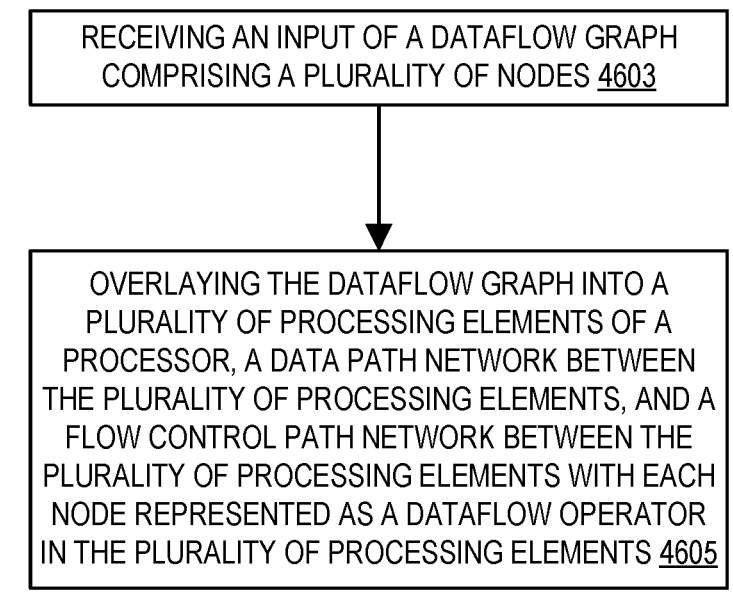
FIG. 46B illustrates a flow diagram according to embodiments of the disclosure.

FIG. 46B illustrates a flow diagram 4601 according to embodiments of the disclosure. Depicted flow 4601 includes receiving an input of a dataflow graph comprising a plurality of nodes 4603; and overlaying the dataflow graph into a plurality of processing elements of a processor, a data path network between the plurality of processing elements, and a flow control path network between the plurality of processing elements with each node represented as a dataflow operator in the plurality of processing elements 4605.

In one embodiment, the core writes a command into a memory queue and a CSA (e.g., the plurality of processing elements) monitors the memory queue and begins executing when the command is read. In one embodiment, the core executes a first part of a program and a CSA (e.g., the plurality of processing elements) executes a second part of the program. In one embodiment, the core does other work while the CSA is executing its operations.

4. CSA Advantages

In certain embodiments, the CSA architecture and microarchitecture provides profound energy, performance, and usability advantages over roadmap processor architectures and FPGAs. In this section, these architectures are compared to embodiments of the CSA and highlights the superiority of CSA in accelerating parallel dataflow graphs relative to each.

4.1 Processors

Figure 47:
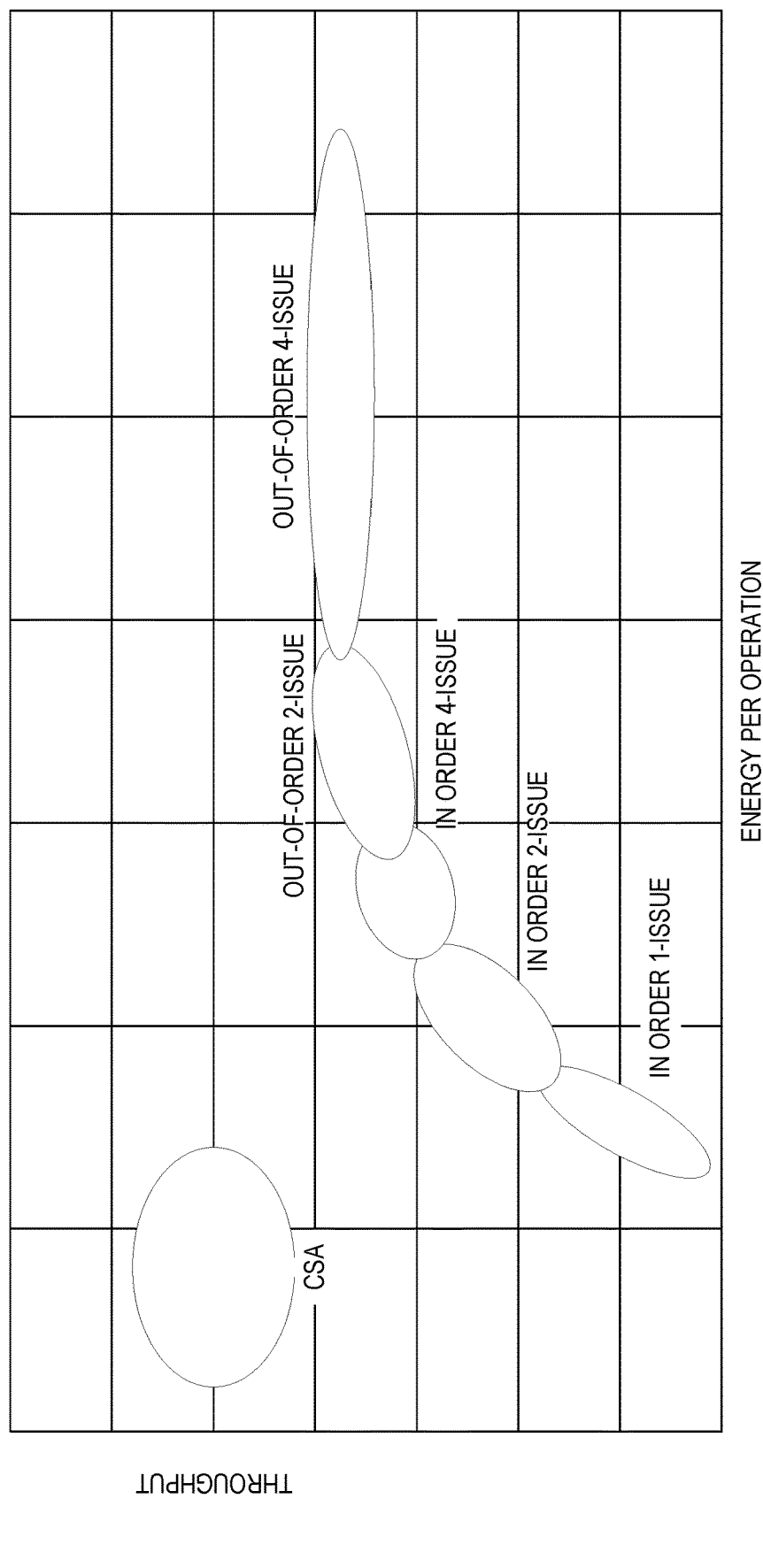
FIG. 47 illustrates a throughput versus energy per operation graph according to embodiments of the disclosure.

FIG. 47 illustrates a throughput versus energy per operation graph 4700 according to embodiments of the disclosure. As shown in FIG. 47, small cores are generally more energy efficient than large cores, and, in some workloads, this advantage may be translated to absolute performance through higher core counts. The CSA microarchitecture follows these observations to their conclusion and removes (e.g., most) energy-hungry control structures associated with von Neumann architectures, including most of the instruction-side microarchitecture. By removing these overheads and implementing simple, single operation PEs, embodiments of a CSA obtains a dense, efficient spatial array. Unlike small cores, which are usually quite serial, a CSA may gang its PEs together, e.g., via the circuit switched local network, to form explicitly parallel aggregate dataflow graphs. The result is performance in not only parallel applications, but also serial applications as well. Unlike cores, which may pay dearly for performance in terms area and energy, a CSA is already parallel in its native execution model. In certain embodiments, a CSA neither requires speculation to increase performance nor does it need to repeatedly re-extract parallelism from a sequential program representation, thereby avoiding two of the main energy taxes in von Neumann architectures. Most structures in embodiments of a CSA are distributed, small, and energy efficient, as opposed to the centralized, bulky, energy hungry structures found in cores. Consider the case of registers in the CSA: each PE may have a few (e.g., 10 or less) storage registers. Taken individually, these registers may be more efficient that traditional register files. In aggregate, these registers may provide the effect of a large, in-fabric register file. As a result, embodiments of a CSA avoids most of stack spills and fills incurred by classical architectures, while using much less energy per state access. Of course, applications may still access memory. In embodiments of a CSA, memory access request and response are architecturally decoupled, enabling workloads to sustain many more outstanding memory accesses per unit of area and energy. This property yields substantially higher performance for cache-bound workloads and reduces the area and energy needed to saturate main memory in memory-bound workloads. Embodiments of a CSA expose new forms of energy efficiency which are unique to non-von Neumann architectures. One consequence of executing a single operation (e.g., instruction) at a (e.g., most) PEs is reduced operand entropy. In the case of an increment operation, each execution may result in a handful of circuit-level toggles and little energy consumption, a case examined in detail in Section 5.2. In contrast, von Neumann architectures are multiplexed, resulting in large numbers of bit transitions. The asynchronous style of embodiments of a CSA also enables microarchitectural optimizations, such as the floating point optimizations described in Section 2.6 that are difficult to realize in tightly scheduled core pipelines. Because PEs may be relatively simple and their behavior in a particular dataflow graph be statically known, clock gating and power gating techniques may be applied more effectively than in coarser architectures. The graph-execution style, small size, and malleability of embodiments of CSA PEs and the network together enable the expression many kinds of parallelism: instruction, data, pipeline, vector, memory, thread, and task parallelism may all be implemented. For example, in embodiments of a CSA, one application may use arithmetic units to provide a high degree of address bandwidth, while another application may use those same units for computation. In many cases, multiple kinds of parallelism may be combined to achieve even more performance. Many key HPC operations may be both replicated and pipelined, resulting in orders-of-magnitude performance gains. In contrast, von Neumann-style cores typically optimize for one style of parallelism, carefully chosen by the architects, resulting in a failure to capture all important application kernels. Just as embodiments of a CSA expose and facilitates many forms of parallelism, it does not mandate a particular form of parallelism, or, worse, a particular subroutine be present in an application in order to benefit from the CSA. Many applications, including single-stream applications, may obtain both performance and energy benefits from embodiments of a CSA, e.g., even when compiled without modification. This reverses the long trend of requiring significant programmer effort to obtain a substantial performance gain in singlestream applications. Indeed, in some applications, embodiments of a CSA obtain more performance from functionally equivalent, but less "modern" codes than from their convoluted, contemporary cousins which have been tortured to target vector instructions.

4.2 Comparison of CSA Embodiments and FGPAs

The choice of dataflow operators as the fundamental architecture of embodiments of a CSA differentiates those CSAs from a FGPA, and particularly the CSA is as superior accelerator for HPC dataflow graphs arising from traditional programming languages. Dataflow operators are fundamentally asynchronous. This enables embodiments of a CSA not only to have great freedom of implementation in the microarchitecture, but it also enables them to simply and succinctly accommodate abstract architectural concepts. For example, embodiments of a CSA naturally accommodate many memory microarchitectures, which are essentially asynchronous, with a simple load-store interface. One need only examine an FPGA DRAM controller to appreciate the difference in complexity. Embodiments of a CSA also leverage asynchrony to provide faster and more-fully-featured runtime services like configuration and extraction, which are believed to be four to six orders of magnitude faster than an FPGA. By narrowing the architectural interface, embodiments of a CSA provide control over most timing paths at the microarchitectural level. This allows embodiments of a CSA to operate at a much higher frequency than the more general control mechanism offered in a FPGA. Similarly, clock and reset, which may be architecturally fundamental to FPGAs, are microarchitectural in the CSA, e.g., obviating the need to support them as programmable entities. Dataflow operators may be, for the most part, coarse-grained. By only dealing in coarse operators, embodiments of a CSA improve both the density of the fabric and its energy consumption: CSA executes operations directly rather than emulating them with look-up tables. A second consequence of coarseness is a simplification of the place and route problem. CSA dataflow graphs are many orders of magnitude smaller than FPGA net-lists and place and route time are commensurately reduced in embodiments of a CSA. The significant differences between embodiments of a CSA and a FPGA make the CSA superior as an accelerator, e.g., for dataflow graphs arising from traditional programming languages.

5. Evaluation

The CSA is a novel computer architecture with the potential to provide enormous performance and energy advantages relative to roadmap processors. Consider the case of computing a single strided address for walking across an array. This case may be important in HPC applications, e.g., which spend significant integer effort in computing address offsets. In address computation, and especially strided address computation, one argument is constant and the other varies only slightly per computation. Thus, only a handful of bits per cycle toggle in the majority of cases. Indeed, it may be shown, using a derivation similar to the bound on floating point carry bits described in Section 2.6, that less than two bits of input toggle per computation in average for a stride calculation, reducing energy by 50% over a random toggle distribution. Were a time-multiplexed approach used, much of this energy savings may be lost. In one embodiment, the CSA achieves approximately 3× energy efficiency over a core while delivering an 8× performance gain. The parallelism gains achieved by embodiments of a CSA may result in reduced program run times, yielding a proportionate, substantial reduction in leakage energy. At the PE level, embodiments of a CSA are extremely energy efficient. A second important question for the CSA is whether the CSA consumes a reasonable amount of energy at the tile level. Since embodiments of a CSA are capable of exercising every floating point PE in the fabric at every cycle, it serves as a reasonable upper bound for energy and power consumption, e.g., such that most of the energy goes into floating point multiply and add.

6. Further CSA Details

This section discusses further details for configuration and exception handling.

6.1 Microarchitecture for Configuring a CSA

This section discloses examples of how to configure a CSA (e.g., fabric), how to achieve this configuration quickly, and how to minimize the resource overhead of configuration. Configuring the fabric quickly may be of preeminent importance in accelerating small portions of a larger algorithm, and consequently in broadening the applicability of a CSA. The section further discloses features that allow embodiments of a CSA to be programmed with configurations of different length.

Embodiments of a CSA (e.g., fabric) may differ from traditional cores in that they make use of a configuration step in which (e.g., large) parts of the fabric are loaded with program configuration in advance of program execution. An advantage of static configuration may be that very little energy is spent at runtime on the configuration, e.g., as opposed to sequential cores which spend energy fetching configuration information (an instruction) nearly every cycle. The previous disadvantage of configuration is that it was a coarse-grained step with a potentially large latency, which places an under-bound on the size of program that can be accelerated in the fabric due to the cost of context switching. This disclosure describes a scalable microarchitecture for rapidly configuring a spatial array in a distributed fashion, e.g., that avoids the previous disadvantages.

As discussed above, a CSA may include light-weight processing elements connected by an inter-PE network. Programs, viewed as control-dataflow graphs, are then mapped onto the architecture by configuring the configurable fabric elements (CFEs), for example PEs and the interconnect (fabric) networks. Generally, PEs may be configured as dataflow operators and once all input operands arrive at the PE, some operation occurs, and the results are forwarded to another PE or PEs for consumption or output. PEs may communicate over dedicated virtual circuits which are formed by statically configuring the circuit switched communications network. These virtual circuits may be flow controlled and fully back-pressured, e.g., such that PEs will stall if either the source has no data or destination is full. At runtime, data may flow through the PEs implementing the mapped algorithm. For example, data may be streamed in from memory, through the fabric, and then back out to memory. Such a spatial architecture may achieve remarkable performance efficiency relative to traditional multicore processors: compute, in the form of PEs, may be simpler and more numerous than larger cores and communications may be direct, as opposed to an extension of the memory system.

Embodiments of a CSA may not utilize (e.g., software controlled) packet switching, e.g., packet switching that requires significant software assistance to realize, which slows configuration. Embodiments of a CSA include out-of-band signaling in the network (e.g., of only 2-3 bits, depending on the feature set supported) and a fixed configuration topology to avoid the need for significant software support.

One key difference between embodiments of a CSA and the approach used in FPGAs is that a CSA approach may use a wide data word, is distributed, and includes mechanisms to fetch program data directly from memory. Embodiments of a CSA may not utilize JTAG-style single bit communications in the interest of area efficiency, e.g., as that may require milliseconds to completely configure a large FPGA fabric.

Embodiments of a CSA include a distributed configuration protocol and microarchitecture to support this protocol. Initially, configuration state may reside in memory. Multiple (e.g., distributed) local configuration controllers (boxes) (LCCs) may stream portions of the overall program into their local region of the spatial fabric, e.g., using a combination of a small set of control signals and the fabric-provided network. State elements may be used at each CFE to form configuration chains, e.g., allowing individual CFEs to self-program without global addressing.

Embodiments of a CSA include specific hardware support for the formation of configuration chains, e.g., not software establishing these chains dynamically at the cost of increasing configuration time. Embodiments of a CSA are not purely packet switched and do include extra out-of-band control wires (e.g., control is not sent through the data path requiring extra cycles to strobe this information and reserialize this information). Embodiments of a CSA decreases configuration latency by fixing the configuration ordering and by providing explicit out-of-band control (e.g., by at least a factor of two), while not significantly increasing network complexity.

Embodiments of a CSA do not use a serial mechanism for configuration in which data is streamed bit by bit into the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 48:
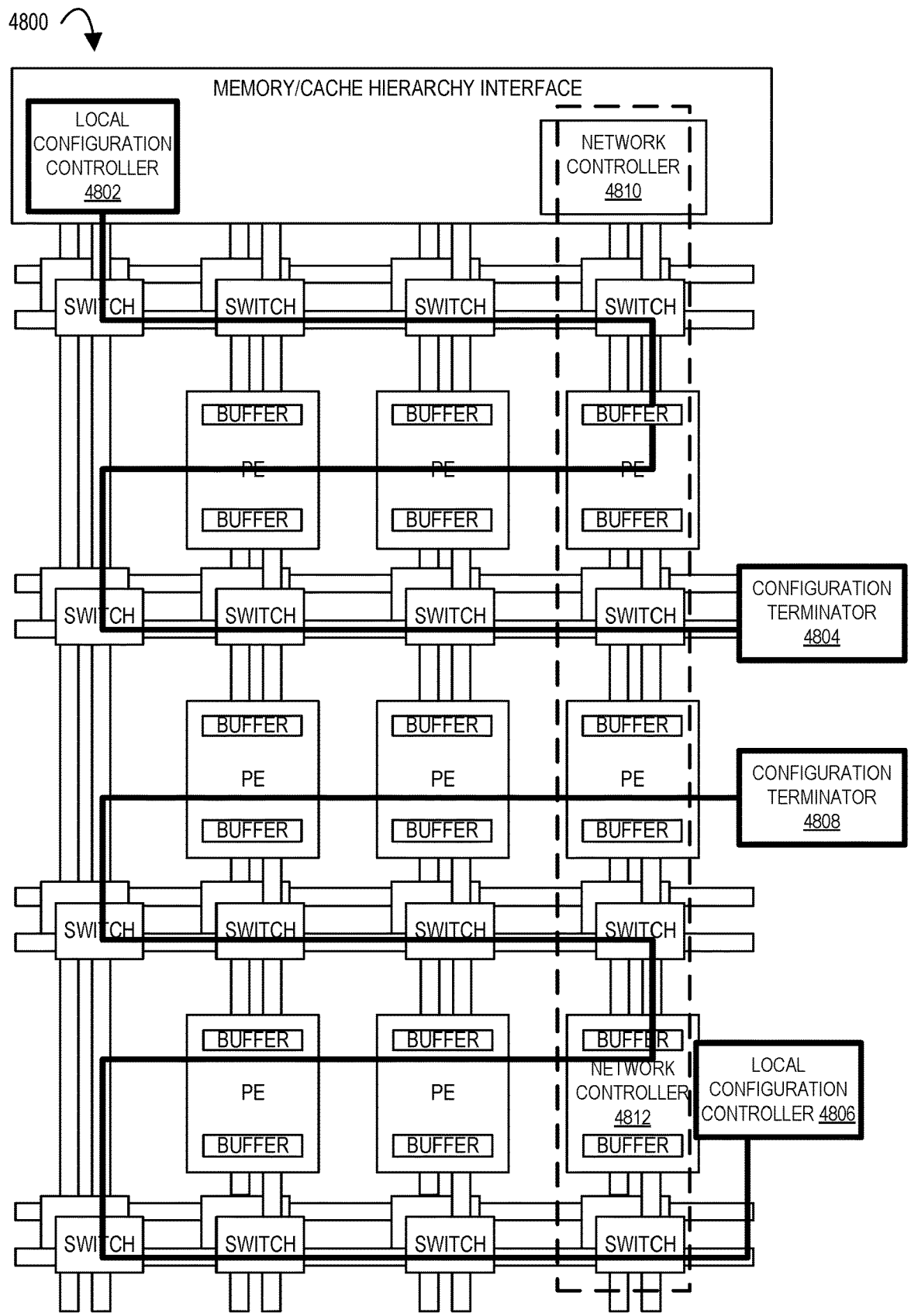
FIG. 48 illustrates an accelerator tile comprising an array of processing elements and a local configuration controller according to embodiments of the disclosure.

FIG. 48 illustrates an accelerator tile 4800 comprising an array of processing elements (PE) and a local configuration controller (4802, 4806) according to embodiments of the disclosure. Each PE, each network controller (e.g., network dataflow endpoint circuit), and each switch may be a configurable fabric elements (CFEs), e.g., which are configured (e.g., programmed) by embodiments of the CSA architecture.

Embodiments of a CSA include hardware that provides for efficient, distributed, low-latency configuration of a heterogeneous spatial fabric. This may be achieved according to four techniques. First, a hardware entity, the local configuration controller (LCC) is utilized, for example, as in FIGS. 48-50. An LCC may fetch a stream of configuration information from (e.g., virtual) memory. Second, a configuration data path may be included, e.g., that is as wide as the native width of the PE fabric and which may be overlaid on top of the PE fabric. Third, new control signals may be received into the PE fabric which orchestrate the configuration process. Fourth, state elements may be located (e.g., in a register) at each configurable endpoint which track the status of adjacent CFEs, allowing each CFE to unambiguously self-configure without extra control signals. These four microarchitectural features may allow a CSA to configure chains of its CFEs. To obtain low configuration latency, the configuration may be partitioned by building many LCCs and CFE chains. At configuration time, these may operate independently to load the fabric in parallel, e.g., dramatically reducing latency. As a result of these combinations, fabrics configured using embodiments of a CSA architecture, may be completely configured (e.g., in hundreds of nanoseconds). In the following, the detailed the operation of the various components of embodiments of a CSA configuration network are disclosed.

Figure 49A:
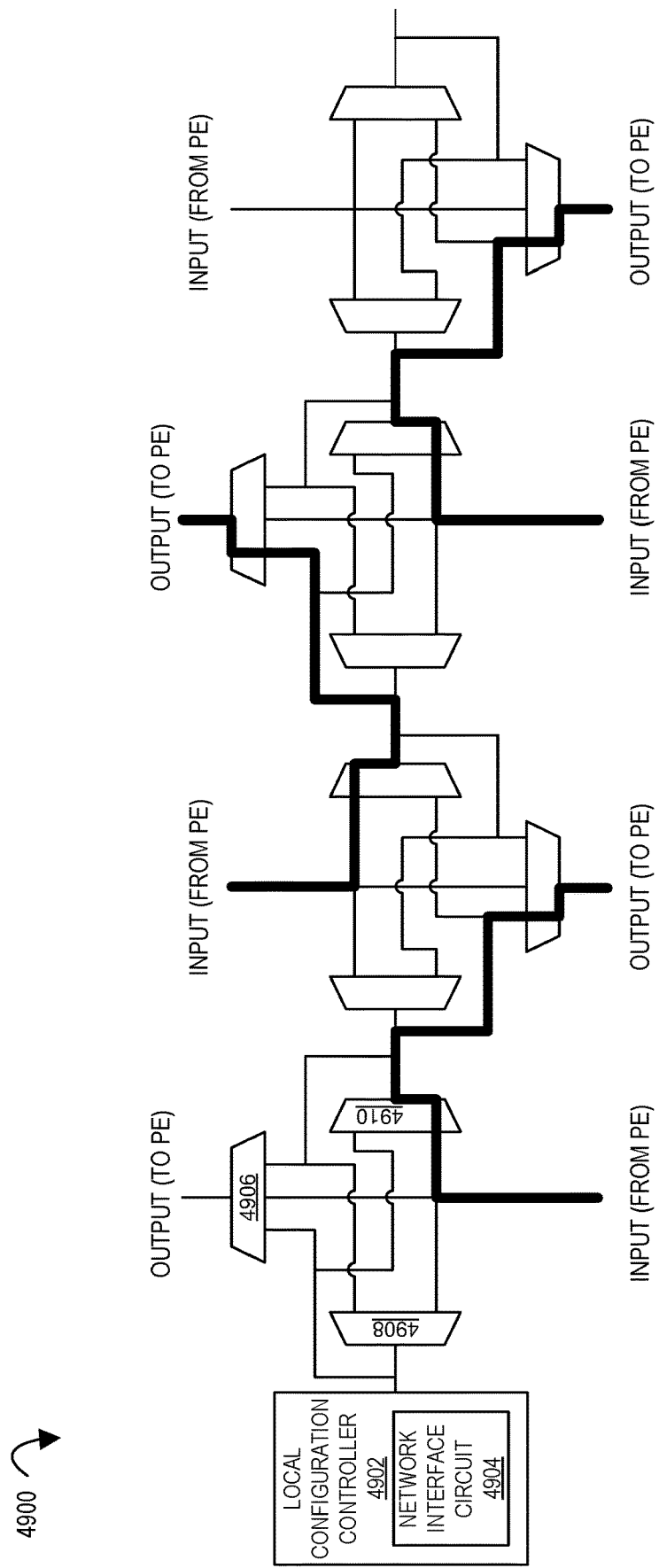
FIGS. 49A-49C illustrate a local configuration controller configuring a data path network according to embodiments of the disclosure.
Figure 49B:
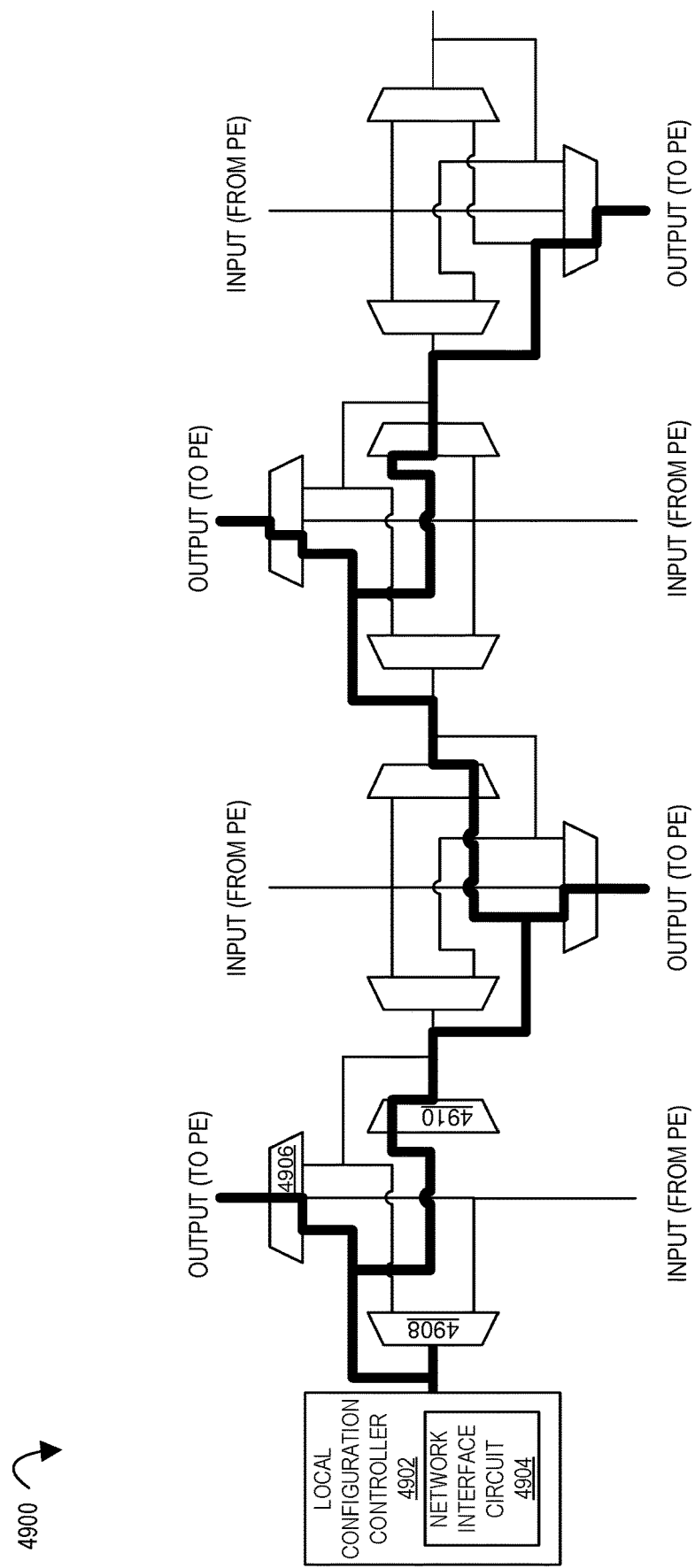
Figure 49C:
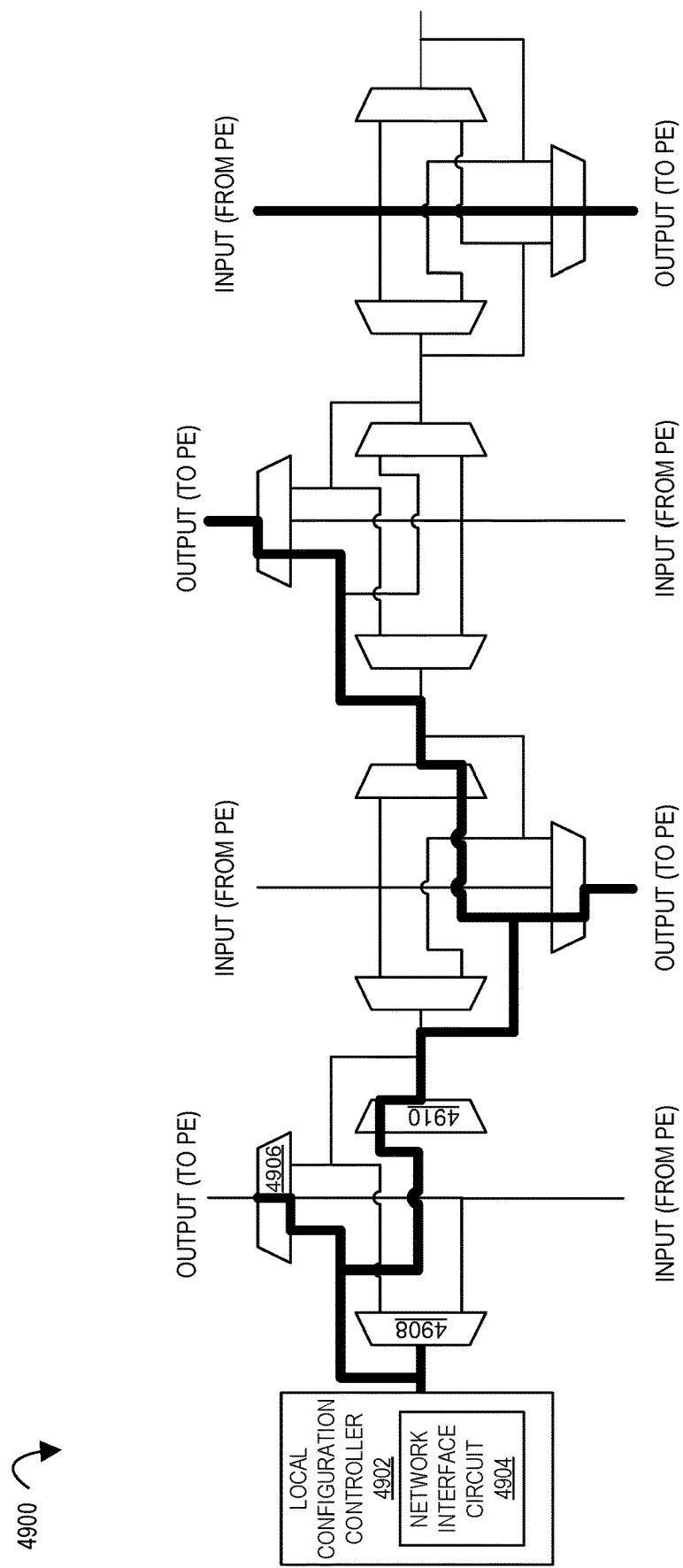

FIGS. 49A-49C illustrate a local configuration controller 4902 configuring a data path network according to embodiments of the disclosure. Depicted network includes a plurality of multiplexers (e.g., multiplexers 4906, 4908, 4910) that may be configured (e.g., via their respective control signals) to connect one or more data paths (e.g., from PEs) together. FIG. 49A illustrates the network 4900 (e.g., fabric) configured (e.g., set) for some previous operation or program. FIG. 49B illustrates the local configuration controller 4902 (e.g., including a network interface circuit 4904 to send and/or receive signals) strobing a configuration signal and the local network is set to a default configuration (e.g., as depicted) that allows the LCC to send configuration data to all configurable fabric elements (CFEs), e.g., muxes. FIG. 49C illustrates the LCC strobing configuration information across the network, configuring CFEs in a predetermined (e.g., silicon-defined) sequence. In one embodiment, when CFEs are configured they may begin operation immediately. In another embodiments, the CFEs wait to begin operation until the fabric has been completely configured (e.g., as signaled by configuration terminator (e.g., configuration terminator 5104 and configuration terminator 5108 in FIG. 51) for each local configuration controller). In one embodiment, the LCC obtains control over the network fabric by sending a special message, or driving a signal. It then strobes configuration data (e.g., over a period of many cycles) to the CFEs in the fabric. In these figures, the multiplexor networks are analogues of the "Switch" shown in certain Figures (e.g., FIG. 6).

Local Configuration Controller

Figure 50:
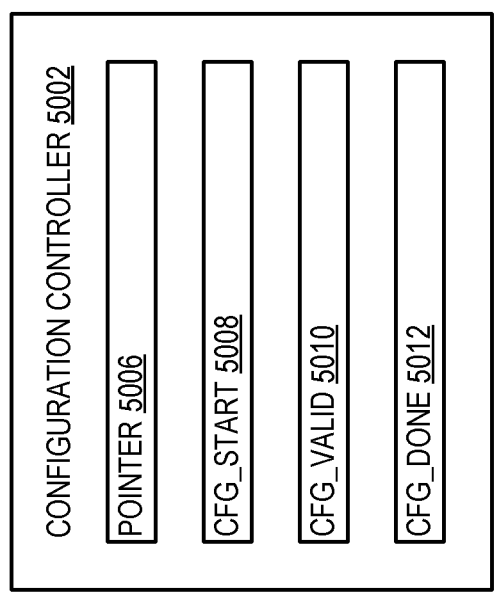
FIG. 50 illustrates a configuration controller according to embodiments of the disclosure.

FIG. 50 illustrates a (e.g., local) configuration controller 5002 according to embodiments of the disclosure. A local configuration controller (LCC) may be the hardware entity which is responsible for loading the local portions (e.g., in a subset of a tile or otherwise) of the fabric program, interpreting these program portions, and then loading these program portions into the fabric by driving the appropriate protocol on the various configuration wires. In this capacity, the LCC may be a special-purpose, sequential microcontroller.

LCC operation may begin when it receives a pointer to a code segment. Depending on the LCB microarchitecture, this pointer (e.g., stored in pointer register 5006) may come either over a network (e.g., from within the CSA (fabric) itself) or through a memory system access to the LCC. When it receives such a pointer, the LCC optionally drains relevant state from its portion of the fabric for context storage, and then proceeds to immediately reconfigure the portion of the fabric for which it is responsible. The program loaded by the LCC may be a combination of configuration data for the fabric and control commands for the LCC, e.g., which are lightly encoded. As the LCC streams in the program portion, it may interprets the program as a command stream and perform the appropriate encoded action to configure (e.g., load) the fabric.

Two different microarchitectures for the LCC are shown in FIG. 48, e.g., with one or both being utilized in a CSA. The first places the LCC 4802 at the memory interface. In this case, the LCC may make direct requests to the memory system to load data. In the second case the LCC 4806 is placed on a memory network, in which it may make requests to the memory only indirectly. In both cases, the logical operation of the LCB is unchanged. In one embodiment, an LCCs is informed of the program to load, for example, by a set of (e.g., OS-visible) control-status-registers which will be used to inform individual LCCs of new program pointers, etc.

Extra Out-of-Band Control Channels (e.g., Wires)

In certain embodiments, configuration relies on 2-8 extra, out-of-band control channels to improve configuration speed, as defined below. For example, configuration controller 5002 may include the following control channels, e.g., CFG_START control channel 5008, CFG_VALID control channel 5010, and CFG_DONE control channel 5012, with examples of each discussed in Table 2 below.

TABLE 2

| Control Channels | |
|---|---|
| CFS_START | Asserted at beginning of configuration. Sets configuration state at each CFE and sets the configuration bus. |
| CFG_VALID | Denotes validity of values on configuration bus. |
| CFG_DONE | Optional Denotes completion of the configuration of a particular CFE. This allows configuration to be short circuited in case a CFE does not require additional configuration. |

Generally, the handling of configuration information may be left to the implementer of a particular CFE. For example, a selectable function CFE may have a provision for setting registers using an existing data path, while a fixed function CFE might simply set a configuration register.

Due to long wire delays when programming a large set of CFEs, the CFG_VALID signal may be treated as a clock/latch enable for CFE components. Since this signal is used as a clock, in one embodiment the duty cycle of the line is at most 50%. As a result, configuration throughput is approximately halved. Optionally, a second CFG_VALID signal may be added to enable continuous programming.

In one embodiment, only CFG_START is strictly communicated on an independent coupling (e.g., wire), for example, CFG_VALID and CFG_DONE may be overlaid on top of other network couplings.

Reuse of Network Resources

To reduce the overhead of configuration, certain embodiments of a CSA make use of existing network infrastructure to communicate configuration data. A LCC may make use of both a chip-level memory hierarchy and a fabric-level communications networks to move data from storage into the fabric. As a result, in certain embodiments of a CSA, the configuration infrastructure adds no more than 2% to the overall fabric area and power.

Reuse of network resources in certain embodiments of a CSA may cause a network to have some hardware support for a configuration mechanism. Circuit switched networks of embodiments of a CSA cause an LCC to set their multiplexors in a specific way for configuration when the 'CFG_START' signal is asserted. Packet switched networks do not require extension, although LCC endpoints (e.g., configuration terminators) use a specific address in the packet switched network. Network reuse is optional, and some embodiments may find dedicated configuration buses to be more convenient.

Per CFE State

Each CFE may maintain a bit denoting whether or not it has been configured (see, e.g., FIG. 39). This bit may be de-asserted when the configuration start signal is driven, and then asserted once the particular CFE has been configured. In one configuration protocol, CFEs are arranged to form chains with the CFE configuration state bit determining the topology of the chain. A CFE may read the configuration state bit of the immediately adjacent CFE. If this adjacent CFE is configured and the current CFE is not configured, the CFE may determine that any current configuration data is targeted at the current CFE. When the 'CFG_DONE' signal is asserted, the CFE may set its configuration bit, e.g., enabling upstream CFEs to configure. As a base case to the configuration process, a configuration terminator (e.g., configuration terminator 4804 for LCC 4802 or configuration terminator 4808 for LCC 4806 in FIG. 48) which asserts that it is configured may be included at the end of a chain.

Internal to the CFE, this bit may be used to drive flow control ready signals. For example, when the configuration bit is de-asserted, network control signals may automatically be clamped to a values that prevent data from flowing, while, within PEs, no operations or other actions will be scheduled.
Dealing with High-delay Configuration Paths One embodiment of an LCC may drive a signal over a long distance, e.g., through many multiplexors and with many loads. Thus, it may be difficult for a signal to arrive at a distant CFE within a short clock cycle. In certain embodiments, configuration signals are at some division (e.g., fraction of) of the main (e.g., CSA) clock frequency to ensure digital timing discipline at configuration. Clock division may be utilized in an out-of-band signaling protocol, and does not require any modification of the main clock tree.
Ensuring Consistent Fabric Behavior During Configuration Since certain configuration schemes are distributed and have non-deterministic timing due to program and memory effects, different portions of the fabric may be configured at different times. As a result, certain embodiments of a CSA provide mechanisms to prevent inconsistent operation among configured and unconfigured CFEs. Generally, consistency is viewed as a property required of and maintained by CFEs themselves, e.g., using the internal CFE state. For example, when a CFE is in an unconfigured state, it may claim that its input buffers are full, and that its output is invalid. When configured, these values will be set to the true state of the buffers. As enough of the fabric comes out of configuration, these techniques may permit it to begin operation. This has the effect of further reducing context switching latency, e.g., if long-latency memory requests are issued early.
Variable-Width Configuration Different CFEs may have different configuration word widths. For smaller CFE configuration words, implementers may balance delay by equitably assigning CFE configuration loads across the network wires. To balance loading on network wires, one option is to assign configuration bits to different portions of network wires to limit the net delay on any one wire. Wide data words may be handled by using serialization/deserialization techniques. These decisions may be taken on a per-fabric basis to optimize the behavior of a specific CSA (e.g., fabric). Network controller (e.g., one or more of network controller 4810 and network controller 4812 may communicate with each domain (e.g., subset) of the CSA (e.g., fabric), for example, to send configuration information to one or more LCCs. Network controller may be part of a communications network (e.g., separate from a circuit switched network). Network controller may include a network dataflow endpoint circuit.

6.2 Microarchitecture for Low Latency Configuration of a CSA and for Timely Fetching of Configuration Data for a CSA Embodiments of a CSA may be an energy-efficient and high-performance means of accelerating user applications. When considering whether a program (e.g., a dataflow graph thereof) may be successfully accelerated by an accelerator, both the time to configure the accelerator and the time to run the program may be considered. If the run time is short, then the configuration time may play a large role in determining successful acceleration. Therefore, to maximize the domain of accelerable programs, in some embodiments the configuration time is made as short as possible. One or more configuration caches may be includes in a CSA, e.g., such that the high bandwidth, low-latency store enables rapid reconfiguration. Next is a description of several embodiments of a configuration cache.

In one embodiment, during configuration, the configuration hardware (e.g., LCC) optionally accesses the configuration cache to obtain new configuration information. The configuration cache may operate either as a traditional address based cache, or in an OS managed mode, in which configurations are stored in the local address space and addressed by reference to that address space. If configuration state is located in the cache, then no requests to the backing store are to be made in certain embodiments. In certain embodiments, this configuration cache is separate from any (e.g., lower level) shared cache in the memory hierarchy.

Figure 51:
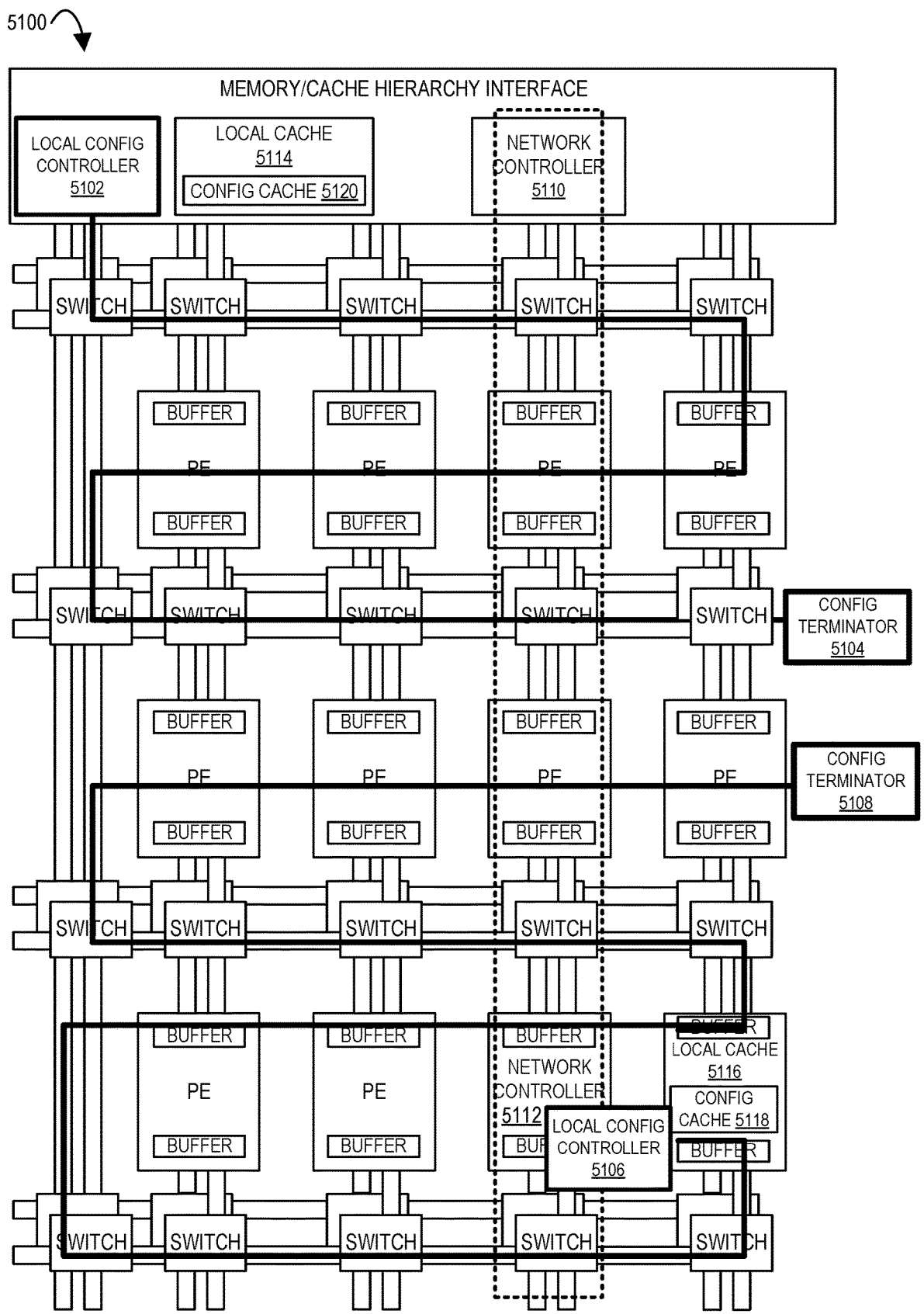
FIG. 51 illustrates an accelerator tile comprising an array of processing elements, a configuration cache, and a local configuration controller according to embodiments of the disclosure.

FIG. 51 illustrates an accelerator tile 5100 comprising an array of processing elements, a configuration cache (e.g., 5118 or 5120), and a local configuration controller (e.g., 5102 or 5106) according to embodiments of the disclosure. In one embodiment, configuration cache 5114 is co-located with local configuration controller 5102. In one embodiment, configuration cache 5118 is located in the configuration domain of local configuration controller 5106, e.g., with a first domain ending at configuration terminator 5104 and a second domain ending at configuration terminator 5108). A configuration cache may allow a local configuration controller may refer to the configuration cache during configuration, e.g., in the hope of obtaining configuration state with lower latency than a reference to memory. A configuration cache (storage) may either be dedicated or may be accessed as a configuration mode of an in-fabric storage element, e.g., local cache 5116.
Caching Modes 1. Demand Caching—In this mode, the configuration cache operates as a true cache. The configuration controller issues address-based requests, which are checked against tags in the cache. Misses are loaded into the cache and then may be re-referenced during future reprogramming.
2. In-Fabric Storage (Scratchpad) Caching—In this mode the configuration cache receives a reference to a configuration sequence in its own, small address space, rather than the larger address space of the host. This may improve memory density since the portion of cache used to store tags may instead be used to store configuration.

In certain embodiments, a configuration cache may have the configuration data pre-loaded into it, e.g., either by external direction or internal direction. This may allow reduction in the latency to load programs. Certain embodiments herein provide for an interface to a configuration cache which permits the loading of new configuration state into the cache, e.g., even if a configuration is running in the fabric already. The initiation of this load may occur from either an internal or external source. Embodiments of a pre-loading mechanism further reduce latency by removing the latency of cache loading from the configuration path.

Pre Fetching Modes
1. Explicit Prefetching—A configuration path is augmented with a new command, ConfigurationCachePrefetch. Instead of programming the fabric, this command simply cause a load of the relevant program configuration into a configuration cache, without programming the fabric. Since this mechanism piggybacks on the existing configuration infrastructure, it is exposed both within the fabric and externally, e.g., to cores and other entities accessing the memory space.
2. Implicit prefetching—A global configuration controller may maintain a prefetch predictor, and use this to initiate the explicit prefetching to a configuration cache, e.g., in an automated fashion.

6.3 Hardware for Rapid Reconfiguration of a CSA in Response to an Exception

Certain embodiments of a CSA (e.g., a spatial fabric) include large amounts of instruction and configuration state, e.g., which is largely static during the operation of the CSA. Thus, the configuration state may be vulnerable to soft errors. Rapid and error-free recovery of these soft errors may be critical to the long-term reliability and performance of spatial systems.

Certain embodiments herein provide for a rapid configuration recovery loop, e.g., in which configuration errors are detected and portions of the fabric immediately reconfigured. Certain embodiments herein include a configuration controller, e.g., with reliability, availability, and serviceability (RAS) reprogramming features. Certain embodiments of CSA include circuitry for high-speed configuration, error reporting, and parity checking within the spatial fabric. Using a combination of these three features, and optionally, a configuration cache, a configuration/exception handling circuit may recover from soft errors in configuration. When detected, soft errors may be conveyed to a configuration cache which initiates an immediate reconfiguration of (e.g., that portion of) the fabric. Certain embodiments provide for a dedicated reconfiguration circuit, e.g., which is faster than any solution that would be indirectly implemented in the fabric. In certain embodiments, co-located exception and configuration circuit cooperates to reload the fabric on configuration error detection.

Figure 52:
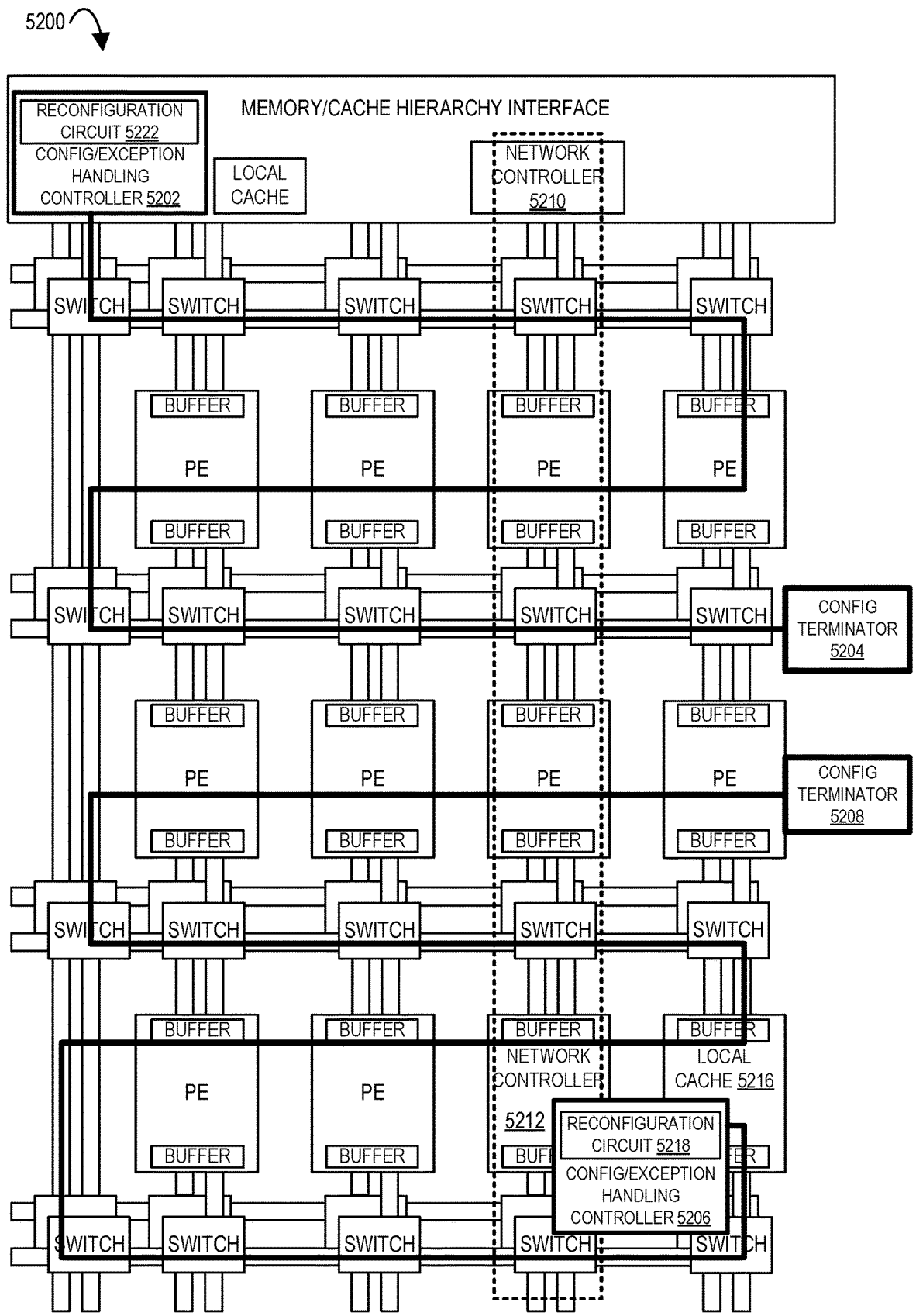
FIG. 52 illustrates an accelerator tile comprising an array of processing elements and a configuration and exception handling controller with a reconfiguration circuit according to embodiments of the disclosure.

FIG. 52 illustrates an accelerator tile 5200 comprising an array of processing elements and a configuration and exception handling controller (5202, 5206) with a reconfiguration circuit (5218, 5222) according to embodiments of the disclosure. In one embodiment, when a PE detects a configuration error through its local RAS features, it sends a (e.g., configuration error or reconfiguration error) message by its exception generator to the configuration and exception handling controller (e.g., 5202 or 5206). On receipt of this message, the configuration and exception handling controller (e.g., 5202 or 5206) initiates the co-located reconfiguration circuit (e.g., 5218 or 5222, respectively) to reload configuration state. The configuration microarchitecture proceeds and reloads (e.g., only) configurations state, and in certain embodiments, only the configuration state for the PE reporting the RAS error. Upon completion of reconfiguration, the fabric may resume normal operation. To decrease latency, the configuration state used by the configuration and exception handling controller (e.g., 5202 or 5206) may be sourced from a configuration cache. As a base case to the configuration or reconfiguration process, a configuration terminator (e.g., configuration terminator 5204 for configuration and exception handling controller 5202 or configuration terminator 5208 for configuration and exception handling controller 5206) in FIG. 52) which asserts that it is configured (or reconfigures) may be included at the end of a chain.

Figure 53:
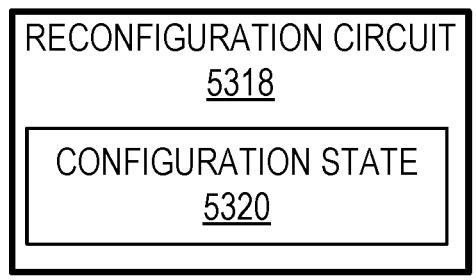
FIG. 53 illustrates a reconfiguration circuit according to embodiments of the disclosure.

FIG. 53 illustrates a reconfiguration circuit 5318 according to embodiments of the disclosure. Reconfiguration circuit 5318 includes a configuration state register 5320 to store the configuration state (or a pointer thereto).

7.4 Hardware for Fabric-Initiated Reconfiguration of a CSA

Some portions of an application targeting a CSA (e.g., spatial array) may be run infrequently or may be mutually exclusive with other parts of the program. To save area, to improve performance, and/or reduce power, it may be useful to time multiplex portions of the spatial fabric among several different parts of the program dataflow graph. Certain embodiments herein include an interface by which a CSA (e.g., via the spatial program) may request that part of the fabric be reprogrammed. This may enable the CSA to dynamically change itself according to dynamic control flow. Certain embodiments herein allow for fabric initiated reconfiguration (e.g., reprogramming). Certain embodiments herein provide for a set of interfaces for triggering configuration from within the fabric. In some embodiments, a PE issues a reconfiguration request based on some decision in the program dataflow graph. This request may travel a network to our new configuration interface, where it triggers reconfiguration. Once reconfiguration is completed, a message may optionally be returned notifying of the completion. Certain embodiments of a CSA thus provide for a program (e.g., dataflow graph) directed reconfiguration capability.

Figure 54:
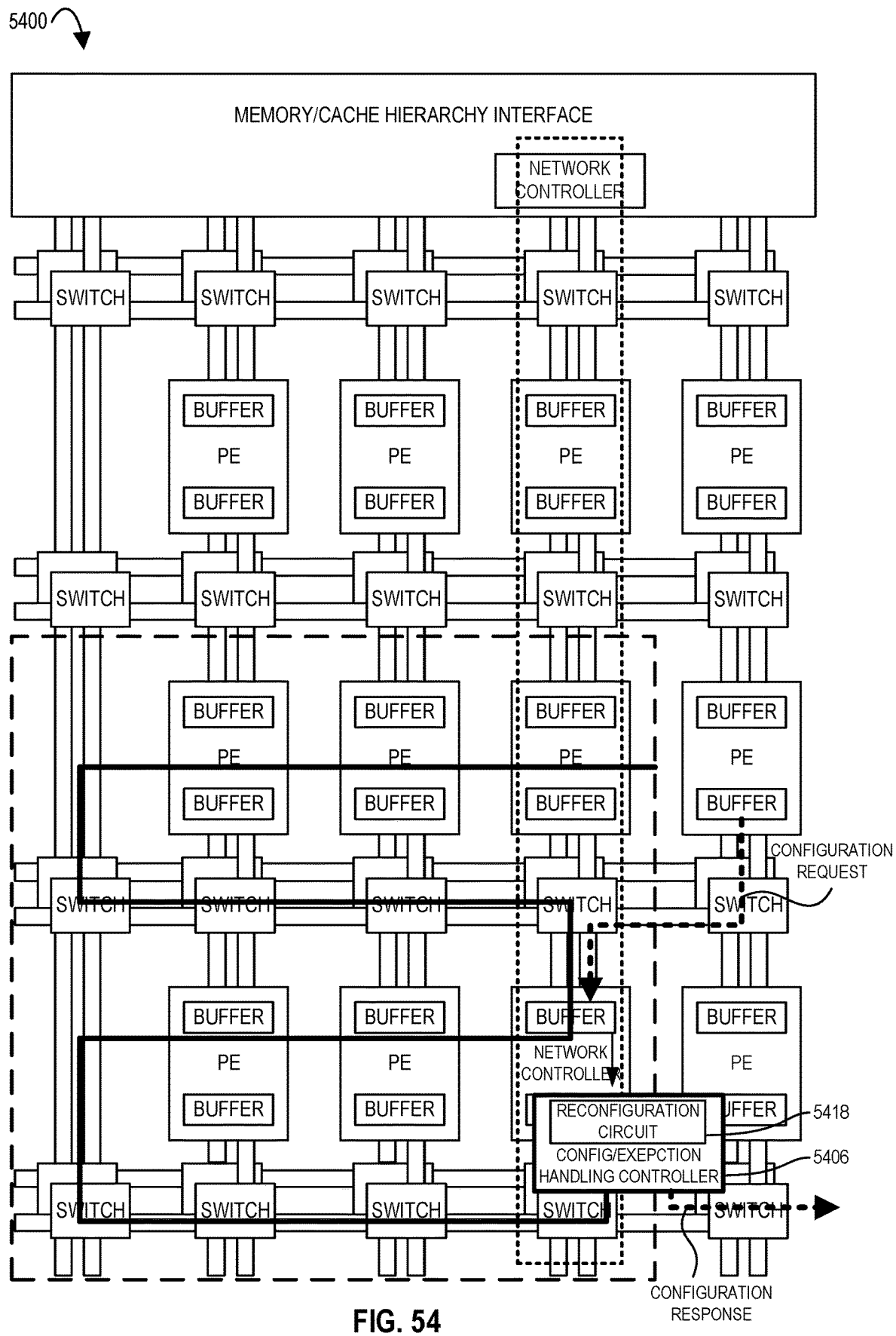
FIG. 54 illustrates an accelerator tile comprising an array of processing elements and a configuration and exception handling controller with a reconfiguration circuit according to embodiments of the disclosure.

FIG. 54 illustrates an accelerator tile 5400 comprising an array of processing elements and a configuration and exception handling controller 5406 with a reconfiguration circuit 5418 according to embodiments of the disclosure. Here, a portion of the fabric issues a request for (re)configuration to a configuration domain, e.g., of configuration and exception handling controller 5406 and/or reconfiguration circuit 5418. The domain (re)configures itself, and when the request has been satisfied, the configuration and exception handling controller 5406 and/or reconfiguration circuit 5418 issues a response to the fabric, to notify the fabric that (re)configuration is complete. In one embodiment, configuration and exception handling controller 5406 and/or reconfiguration circuit 5418 disables communication during the time that (re)configuration is ongoing, so the program has no consistency issues during operation.

Configuration Modes

Configure-by-address—In this mode, the fabric makes a direct request to load configuration data from a particular address.

Configure-by-reference—In this mode the fabric makes a request to load a new configuration, e.g., by a pre-determined reference ID. This may simplify the determination of the code to load, since the location of the code has been abstracted.

Configuring Multiple Domains

A CSA may include a higher level configuration controller to support a multicast mechanism to cast (e.g., via network indicated by the dotted box) configuration requests to multiple (e.g., distributed or local) configuration controllers. This may enable a single configuration request to be replicated across larger portions of the fabric, e.g., triggering a broad reconfiguration.

6.5 Exception Aggregators

Certain embodiments of a CSA may also experience an exception (e.g., exceptional condition), for example, floating point underflow. When these conditions occur, a special handlers may be invoked to either correct the program or to terminate it. Certain embodiments herein provide for a system-level architecture for handling exceptions in spatial fabrics. Since certain spatial fabrics emphasize area efficiency, embodiments herein minimize total area while providing a general exception mechanism. Certain embodiments herein provides a low area means of signaling exceptional conditions occurring in within a CSA (e.g., a spatial array). Certain embodiments herein provide an interface and signaling protocol for conveying such exceptions, as well as a PE-level exception semantics. Certain embodiments herein are dedicated exception handling capabilities, e.g., and do not require explicit handling by the programmer.

Figure 55:
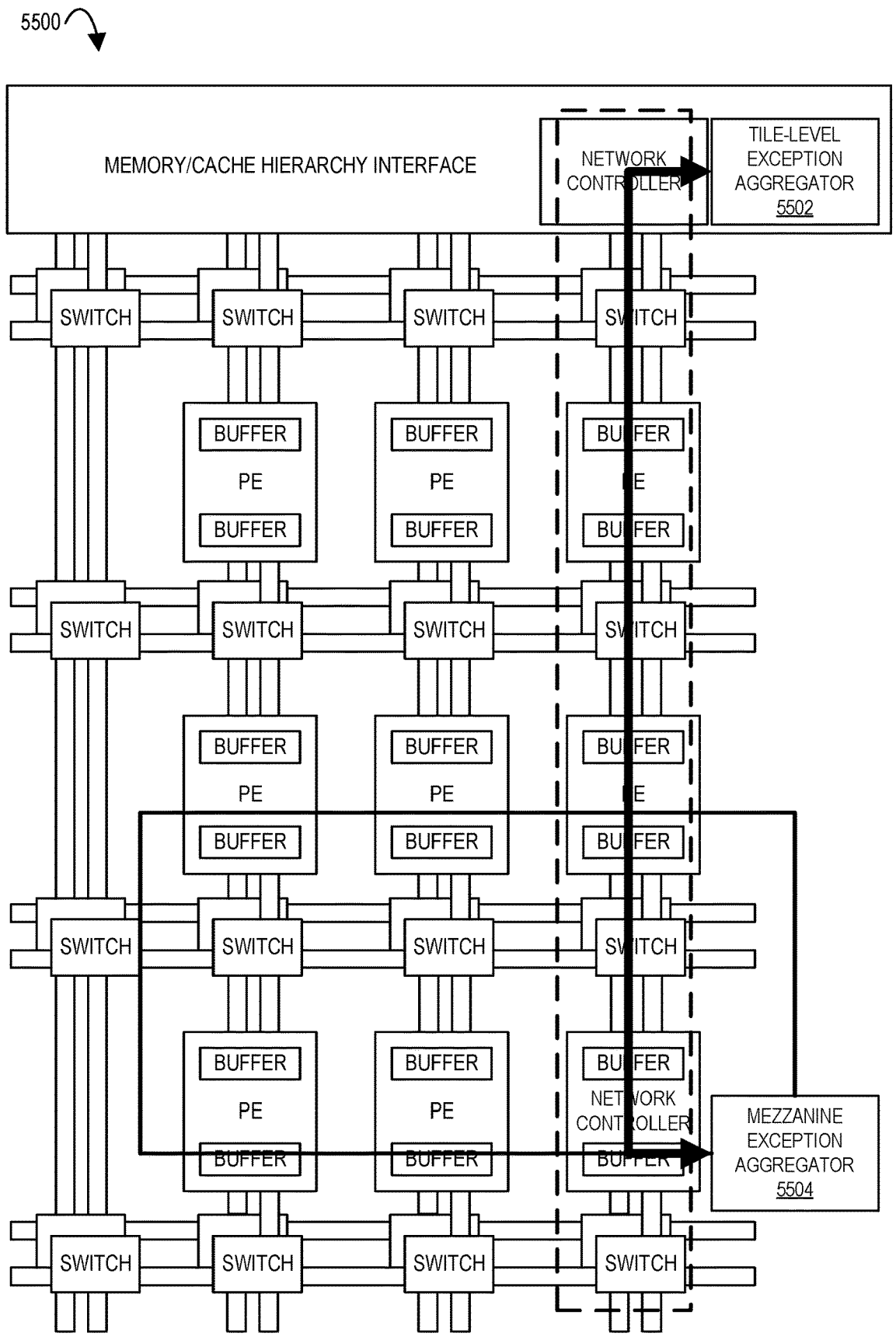
FIG. 55 illustrates an accelerator tile comprising an array of processing elements and a mezzanine exception aggregator coupled to a tile-level exception aggregator according to embodiments of the disclosure.
Figure 56:
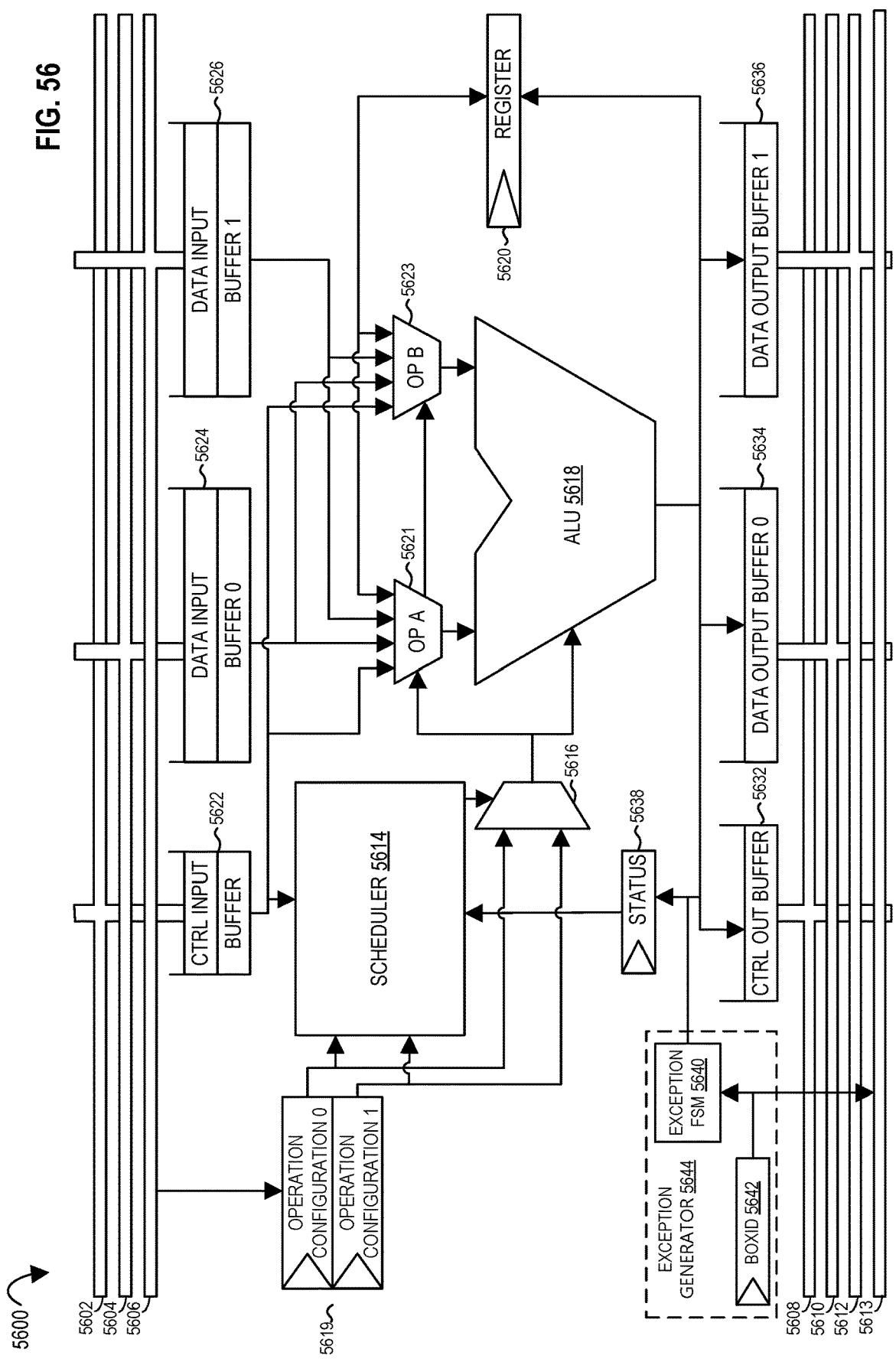
FIG. 56 illustrates a processing element with an exception generator according to embodiments of the disclosure.

One embodiments of a CSA exception architecture consists of four portions, e.g., shown in FIGS. 55-56. These portions may be arranged in a hierarchy, in which exceptions flow from the producer, and eventually up to the tile-level exception aggregator (e.g., handler), which may rendezvous with an exception servicer, e.g., of a core. The four portions may be:

1. PE Exception Generator
2. Local Exception Network
3. Mezzanine Exception Aggregator
4. Tile-Level Exception Aggregator FIG. 55 illustrates an accelerator tile 5500 comprising an array of processing elements and a mezzanine exception aggregator 5502 coupled to a tile-level exception aggregator 5504 according to embodiments of the disclosure. FIG. 56 illustrates a processing element 5600 with an exception generator 5644 according to embodiments of the disclosure.

PE Exception Generator

Processing element 5600 may include processing element 1000 from FIG. 10, for example, with similar numbers being similar components, e.g., local network 1002 and local network 5602. Additional network 5613 (e.g., channel) may be an exception network. A PE may implement an interface to an exception network (e.g., exception network 5613 (e.g., channel) on FIG. 56). For example, FIG. 56 shows the microarchitecture of such an interface, wherein the PE has an exception generator 5644 (e.g., initiate an exception finite state machine (FSM) 5640 to strobe an exception packet (e.g., BOXID 5642) out on to the exception network. BOXID 5642 may be a unique identifier for an exception producing entity (e.g., a PE or box) within a local exception network. When an exception is detected, exception generator 5644 senses the exception network and strobes out the BOXID when the network is found to be free. Exceptions may be caused by many conditions, for example, but not limited to, arithmetic error, failed ECC check on state, etc. however, it may also be that an exception dataflow operation is introduced, with the idea of support constructs like breakpoints.

The initiation of the exception may either occur explicitly, by the execution of a programmer supplied instruction, or implicitly when a hardened error condition (e.g., a floating point underflow) is detected. Upon an exception, the PE 5600 may enter a waiting state, in which it waits to be serviced by the eventual exception handler, e.g., external to the PE 5600. The contents of the exception packet depend on the implementation of the particular PE, as described below.

Local Exception Network

A (e.g., local) exception network steers exception packets from PE 5600 to the mezzanine exception network. Exception network (e.g., 5613) may be a serial, packet switched network consisting of a (e.g., single) control wire and one or more data wires, e.g., organized in a ring or tree topology, e.g., for a subset of PEs. Each PE may have a (e.g., ring) stop in the (e.g., local) exception network, e.g., where it can arbitrate to inject messages into the exception network.

PE endpoints needing to inject an exception packet may observe their local exception network egress point. If the control signal indicates busy, the PE is to wait to commence inject its packet. If the network is not busy, that is, the downstream stop has no packet to forward, then the PE will proceed commence injection.

Network packets may be of variable or fixed length. Each packet may begin with a fixed length header field identifying the source PE of the packet. This may be followed by a variable number of PE-specific field containing information, for example, including error codes, data values, or other useful status information.

Mezzanine Exception Aggregator

The mezzanine exception aggregator 5504 is responsible for assembling local exception network into larger packets and sending them to the tile-level exception aggregator 5502. The mezzanine exception aggregator 5504 may prepend the local exception packet with its own unique ID, e.g., ensuring that exception messages are unambiguous. The mezzanine exception aggregator 5504 may interface to a special exception-only virtual channel in the mezzanine network, e.g., ensuring the deadlock-freedom of exceptions.

The mezzanine exception aggregator 5504 may also be able to directly service certain classes of exception. For example, a configuration request from the fabric may be served out of the mezzanine network using caches local to the mezzanine network stop.

Tile-Level Exception Aggregator

The final stage of the exception system is the tile-level exception aggregator 5502. The tile-level exception aggregator 5502 is responsible for collecting exceptions from the various mezzanine-level exception aggregators (e.g., 5504) and forwarding them to the appropriate servicing hardware (e.g., core). As such, the tile-level exception aggregator 5502 may include some internal tables and controller to associate particular messages with handler routines. These tables may be indexed either directly or with a small state machine in order to steer particular exceptions.

Like the mezzanine exception aggregator, the tile-level exception aggregator may service some exception requests. For example, it may initiate the reprogramming of a large portion of the PE fabric in response to a specific exception.

6.6 Extraction Controllers

Certain embodiments of a CSA include an extraction controller(s) to extract data from the fabric. The below discusses embodiments of how to achieve this extraction quickly and how to minimize the resource overhead of data extraction. Data extraction may be utilized for such critical tasks as exception handling and context switching. Certain embodiments herein extract data from a heterogeneous spatial fabric by introducing features that allow extractable fabric elements (EFEs) (for example, PEs, network controllers, and/or switches) with variable and dynamically variable amounts of state to be extracted.

Embodiments of a CSA include a distributed data extraction protocol and microarchitecture to support this protocol. Certain embodiments of a CSA include multiple local extraction controllers (LECs) which stream program data out of their local region of the spatial fabric using a combination of a (e.g., small) set of control signals and the fabric-provided network. State elements may be used at each extractable fabric element (EFE) to form extraction chains, e.g., allowing individual EFEs to self-extract without global addressing.

Embodiments of a CSA do not use a local network to extract program data. Embodiments of a CSA include specific hardware support (e.g., an extraction controller) for the formation of extraction chains, for example, and do not rely on software to establish these chains dynamically, e.g., at the cost of increasing extraction time. Embodiments of a CSA are not purely packet switched and do include extra out-of-band control wires (e.g., control is not sent through the data path requiring extra cycles to strobe and reserialize this information). Embodiments of a CSA decrease extraction latency by fixing the extraction ordering and by providing explicit out-of-band control (e.g., by at least a factor of two), while not significantly increasing network complexity.

Embodiments of a CSA do not use a serial mechanism for data extraction, in which data is streamed bit by bit from the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 57:
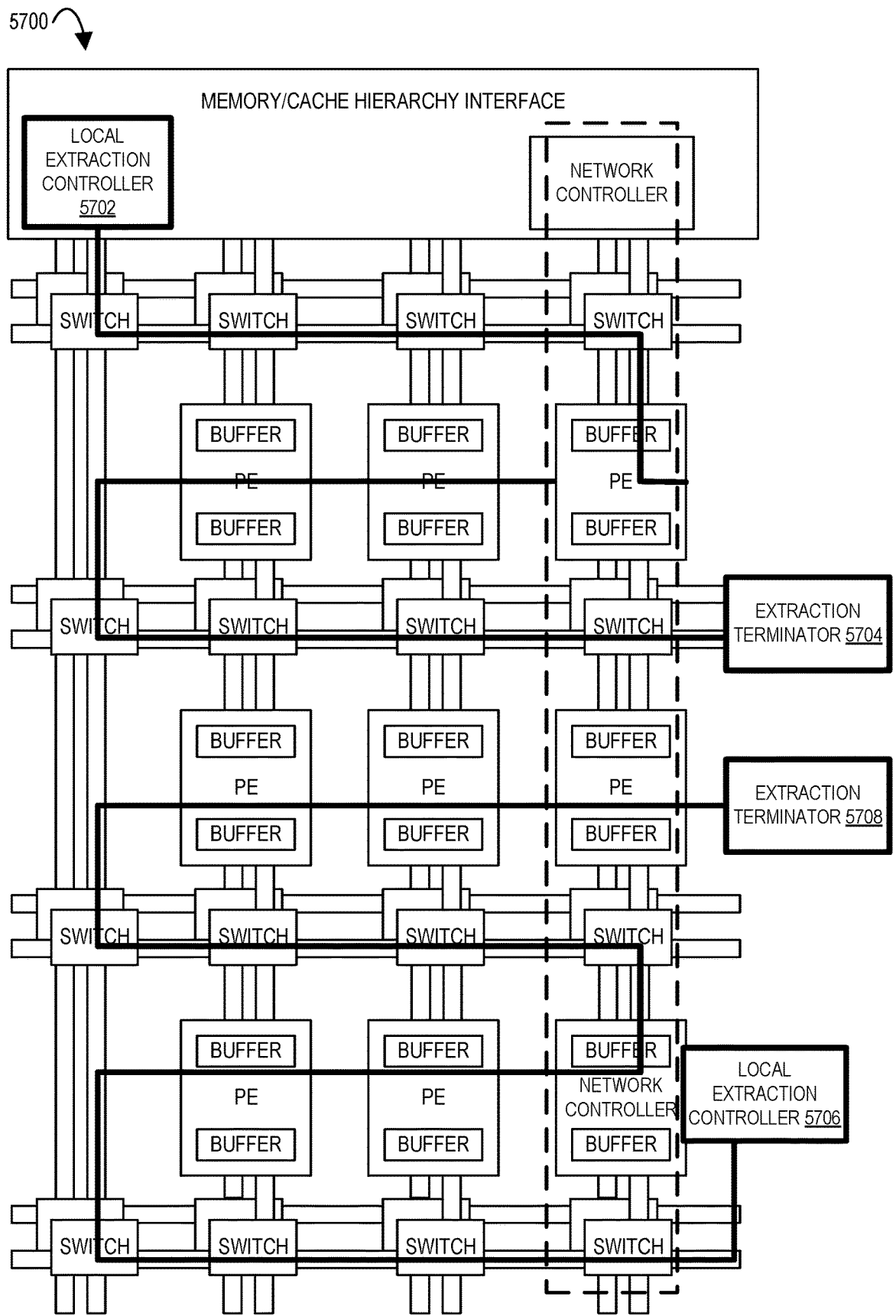
FIG. 57 illustrates an accelerator tile comprising an array of processing elements and a local extraction controller according to embodiments of the disclosure.

FIG. 57 illustrates an accelerator tile 5700 comprising an array of processing elements and a local extraction controller (5702, 5706) according to embodiments of the disclosure. Each PE, each network controller, and each switch may be an extractable fabric elements (EFEs), e.g., which are configured (e.g., programmed) by embodiments of the CSA architecture.

Embodiments of a CSA include hardware that provides for efficient, distributed, low-latency extraction from a heterogeneous spatial fabric. This may be achieved according to four techniques. First, a hardware entity, the local extraction controller (LEC) is utilized, for example, as in FIGS. 57-59. A LEC may accept commands from a host (for example, a processor core), e.g., extracting a stream of data from the spatial array, and writing this data back to virtual memory for inspection by the host. Second, a extraction data path may be included, e.g., that is as wide as the native width of the PE fabric and which may be overlaid on top of the PE fabric. Third, new control signals may be received into the PE fabric which orchestrate the extraction process. Fourth, state elements may be located (e.g., in a register) at each configurable endpoint which track the status of adjacent EFEs, allowing each EFE to unambiguously export its state without extra control signals. These four microarchitectural features may allow a CSA to extract data from chains of EFEs. To obtain low data extraction latency, certain embodiments may partition the extraction problem by including multiple (e.g., many) LECs and EFE chains in the fabric. At extraction time, these chains may operate independently to extract data from the fabric in parallel, e.g., dramatically reducing latency. As a result of these combinations, a CSA may perform a complete state dump (e.g., in hundreds of nanoseconds).

Figure 58A:
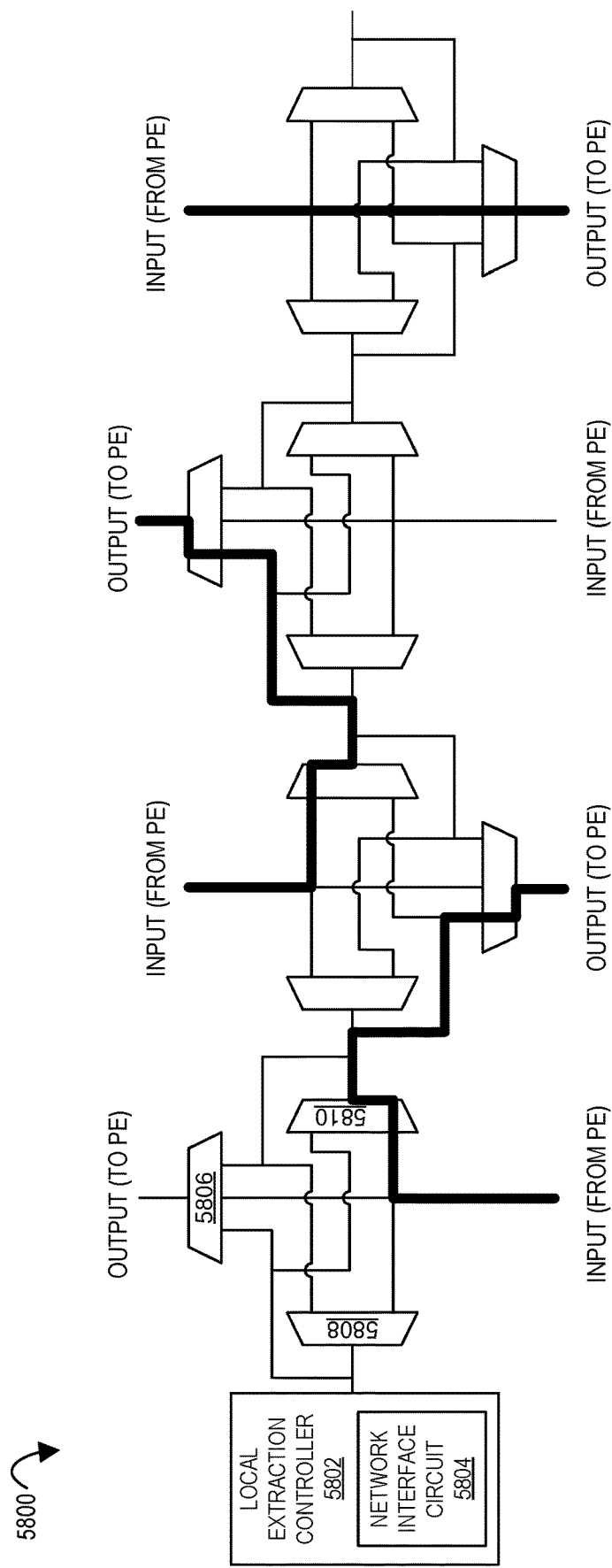
FIGS. 58A-58C illustrate a local extraction controller configuring a data path network according to embodiments of the disclosure.
Figure 58B:
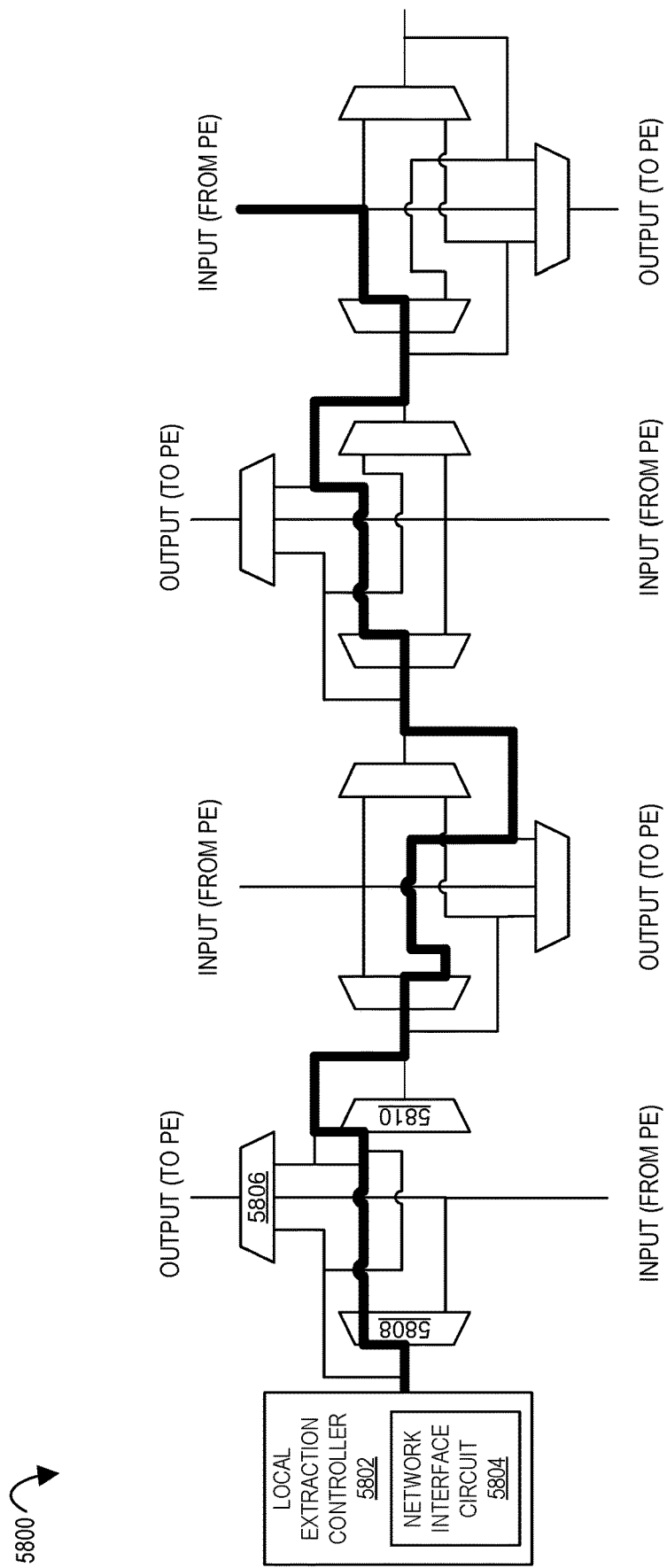
Figure 58C:
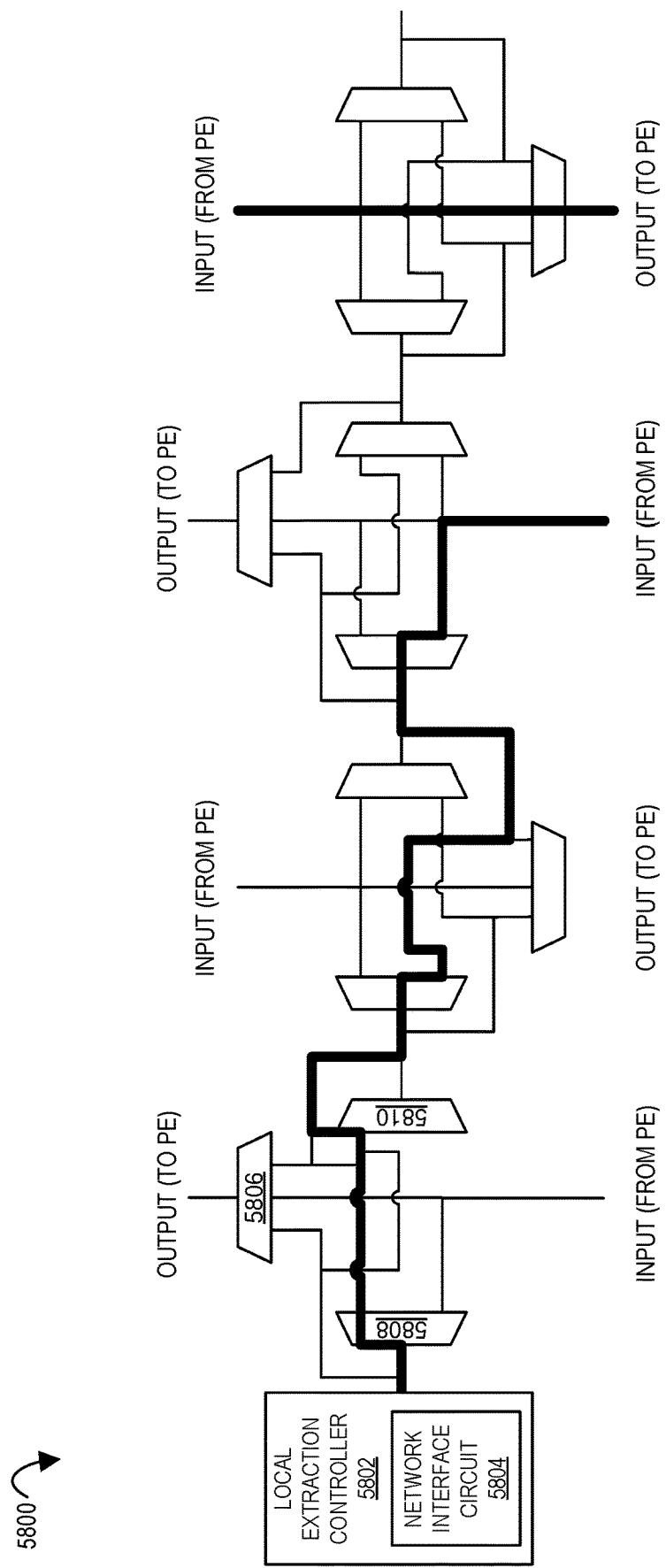

FIGS. 58A-58C illustrate a local extraction controller 5802 configuring a data path network according to embodiments of the disclosure. Depicted network includes a plurality of multiplexers (e.g., multiplexers 5806, 5808, 5810) that may be configured (e.g., via their respective control signals) to connect one or more data paths (e.g., from PEs) together. FIG. 58A illustrates the network 5800 (e.g., fabric) configured (e.g., set) for some previous operation or program. FIG. 58B illustrates the local extraction controller 5802 (e.g., including a network interface circuit 5804 to send and/or receive signals) strobing an extraction signal and all PEs controlled by the LEC enter into extraction mode. The last PE in the extraction chain (or an extraction terminator) may master the extraction channels (e.g., bus) and being sending data according to either (1) signals from the LEC or (2) internally produced signals (e.g., from a PE). Once completed, a PE may set its completion flag, e.g., enabling the next PE to extract its data. FIG. 58C illustrates the most distant PE has completed the extraction process and as a result it has set its extraction state bit or bits, e.g., which swing the muxes into the adjacent network to enable the next PE to begin the extraction process. The extracted PE may resume normal operation. In some embodiments, the PE may remain disabled until other action is taken. In these figures, the multiplexor networks are analogues of the "Switch" shown in certain Figures (e.g., FIG. 6).

The following sections describe the operation of the various components of embodiments of an extraction network.

Local Extraction Controller

Figure 59:
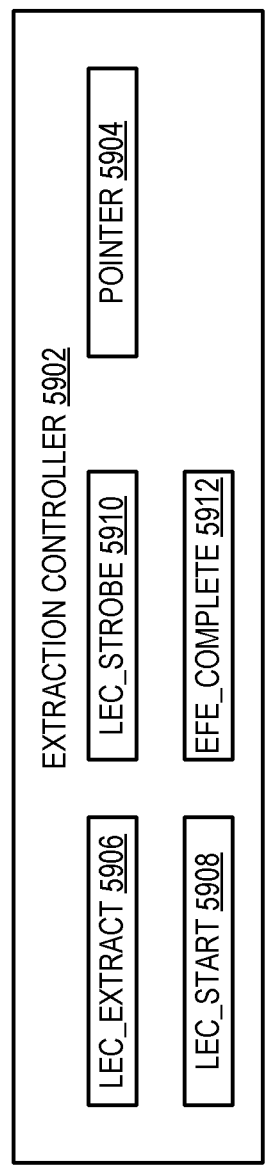
FIG. 59 illustrates an extraction controller according to embodiments of the disclosure.

FIG. 59 illustrates an extraction controller 5902 according to embodiments of the disclosure. A local extraction controller (LEC) may be the hardware entity which is responsible for accepting extraction commands, coordinating the extraction process with the EFEs, and/or storing extracted data, e.g., to virtual memory. In this capacity, the LEC may be a special-purpose, sequential microcontroller.

LEC operation may begin when it receives a pointer to a buffer (e.g., in virtual memory) where fabric state will be written, and, optionally, a command controlling how much of the fabric will be extracted. Depending on the LEC microarchitecture, this pointer (e.g., stored in pointer register 5904) may come either over a network or through a memory system access to the LEC. When it receives such a pointer (e.g., command), the LEC proceeds to extract state from the portion of the fabric for which it is responsible. The LEC may stream this extracted data out of the fabric into the buffer provided by the external caller.

Two different microarchitectures for the LEC are shown in FIG. 57. The first places the LEC 5702 at the memory interface. In this case, the LEC may make direct requests to the memory system to write extracted data. In the second case the LEC 5706 is placed on a memory network, in which it may make requests to the memory only indirectly. In both cases, the logical operation of the LEC may be unchanged. In one embodiment, LECs are informed of the desire to extract data from the fabric, for example, by a set of (e.g., OS-visible) control-status-registers which will be used to inform individual LECs of new commands.

Extra Out-of-Band Control Channels (e.g., Wires)

In certain embodiments, extraction relies on 2-8 extra, out-of-band signals to improve configuration speed, as defined below. Signals driven by the LEC may be labelled LEC. Signals driven by the EFE (e.g., PE) may be labelled EFE. Configuration controller 5902 may include the following control channels, e.g., LEC_EXTRACT control channel 6006, LEC_START control channel 5908, LEC_STROBE control channel 5910, and EFE_COMPLETE control channel 5912, with examples of each discussed in Table 3 below.

TABLE 3

Extraction Channels

| | |
|---|---|
| LEC_EXTRACT | Optional signal asserted by the LEC during extraction process. Lowering this signal causes normal operation to resume. |
| LEC_START | Signal denoting start of extraction, allowing setup of local EFE state |

TABLE 3-continued

Extraction Channels

| | |
|---|---|
| LEC_STROBE | Optional strobe signal for controlling extraction related state machines at EFEs. EFEs may generate this signal internally in some implementations. |
| EFE_COMPLETE | Optional signal strobed when EFE has completed dumping state. This helps LEC identify the completion of individual EFE dumps. |

Generally, the handling of extraction may be left to the implementer of a particular EFE. For example, selectable function EFE may have a provision for dumping registers using an existing data path, while a fixed function EFE might simply have a multiplexor.

Due to long wire delays when programming a large set of EFEs, the LEC_STROBE signal may be treated as a clock/latch enable for EFE components. Since this signal is used as a clock, in one embodiment the duty cycle of the line is at most 50%. As a result, extraction throughput is approximately halved. Optionally, a second LEC_STROBE signal may be added to enable continuous extraction.

In one embodiment, only LEC_START is strictly communicated on an independent coupling (e.g., wire), for example, other control channels may be overlayed on existing network (e.g., wires).

Reuse of Network Resources

To reduce the overhead of data extraction, certain embodiments of a CSA make use of existing network infrastructure to communicate extraction data. A LEC may make use of both a chip-level memory hierarchy and a fabric-level communications networks to move data from the fabric into storage. As a result, in certain embodiments of a CSA, the extraction infrastructure adds no more than 2% to the overall fabric area and power.

Reuse of network resources in certain embodiments of a CSA may cause a network to have some hardware support for an extraction protocol. Circuit switched networks require of certain embodiments of a CSA cause a LEC to set their multiplexors in a specific way for configuration when the 'LEC_START' signal is asserted. Packet switched networks may not require extension, although LEC endpoints (e.g., extraction terminators) use a specific address in the packet switched network. Network reuse is optional, and some embodiments may find dedicated configuration buses to be more convenient.

Per EFE State

Each EFE may maintain a bit denoting whether or not it has exported its state. This bit may de-asserted when the extraction start signal is driven, and then asserted once the particular EFE finished extraction. In one extraction protocol, EFEs are arranged to form chains with the EFE extraction state bit determining the topology of the chain. A EFE may read the extraction state bit of the immediately adjacent EFE. If this adjacent EFE has its extraction bit set and the current EFE does not, the EFE may determine that it owns the extraction bus. When an EFE dumps its last data value, it may drives the 'EFE_DONE' signal and sets its extraction bit, e.g., enabling upstream EFEs to configure for extraction. The network adjacent to the EFE may observe this signal and also adjust its state to handle the transition. As a base case to the extraction process, an extraction terminator (e.g., extraction terminator 5704 for LEC 5702 or extraction terminator 5708 for LEC 5706 in FIG. 48) which asserts that extraction is complete may be included at the end of a chain.

Internal to the EFE, this bit may be used to drive flow control ready signals. For example, when the extraction bit is de-asserted, network control signals may automatically be clamped to a values that prevent data from flowing, while, within PEs, no operations or actions will be scheduled.

Dealing with High-Delay Paths

One embodiment of a LEC may drive a signal over a long distance, e.g., through many multiplexors and with many loads. Thus, it may be difficult for a signal to arrive at a distant EFE within a short clock cycle. In certain embodiments, extraction signals are at some division (e.g., fraction of) of the main (e.g., CSA) clock frequency to ensure digital timing discipline at extraction. Clock division may be utilized in an out-of-band signaling protocol, and does not require any modification of the main clock tree.

Ensuring Consistent Fabric Behavior During Extraction

Since certain extraction scheme are distributed and have non-deterministic timing due to program and memory effects, different members of the fabric may be under extraction at different times. While LEC_EXTRACT is driven, all network flow control signals may be driven logically low, e.g., thus freezing the operation of a particular segment of the fabric.

An extraction process may be non-destructive. Therefore a set of PEs may be considered operational once extraction has completed. An extension to an extraction protocol may allow PEs to optionally be disabled post extraction. Alternatively, beginning configuration during the extraction process will have similar effect in embodiments.

Single PE Extraction

In some cases, it may be expedient to extract a single PE. In this case, an optional address signal may be driven as part of the commencement of the extraction process. This may enable the PE targeted for extraction to be directly enabled. Once this PE has been extracted, the extraction process may cease with the lowering of the LEC_EXTRACT signal. In this way, a single PE may be selectively extracted, e.g., by the local extraction controller.

Handling Extraction Backpressure

In an embodiment where the LEC writes extracted data to memory (for example, for post-processing, e.g., in software), it may be subject to limited memory bandwidth. In the case that the LEC exhausts its buffering capacity, or expects that it will exhaust its buffering capacity, it may stops strobing the LEC_STROBE signal until the buffering issue has resolved.

Note that in certain figures (e.g., FIGS. 48, 51, 52, 54, 55, and 57) communications are shown schematically. In certain embodiments, those communications may occur over the (e.g., interconnect) network.

6.7 Flow Diagrams

Figure 60:
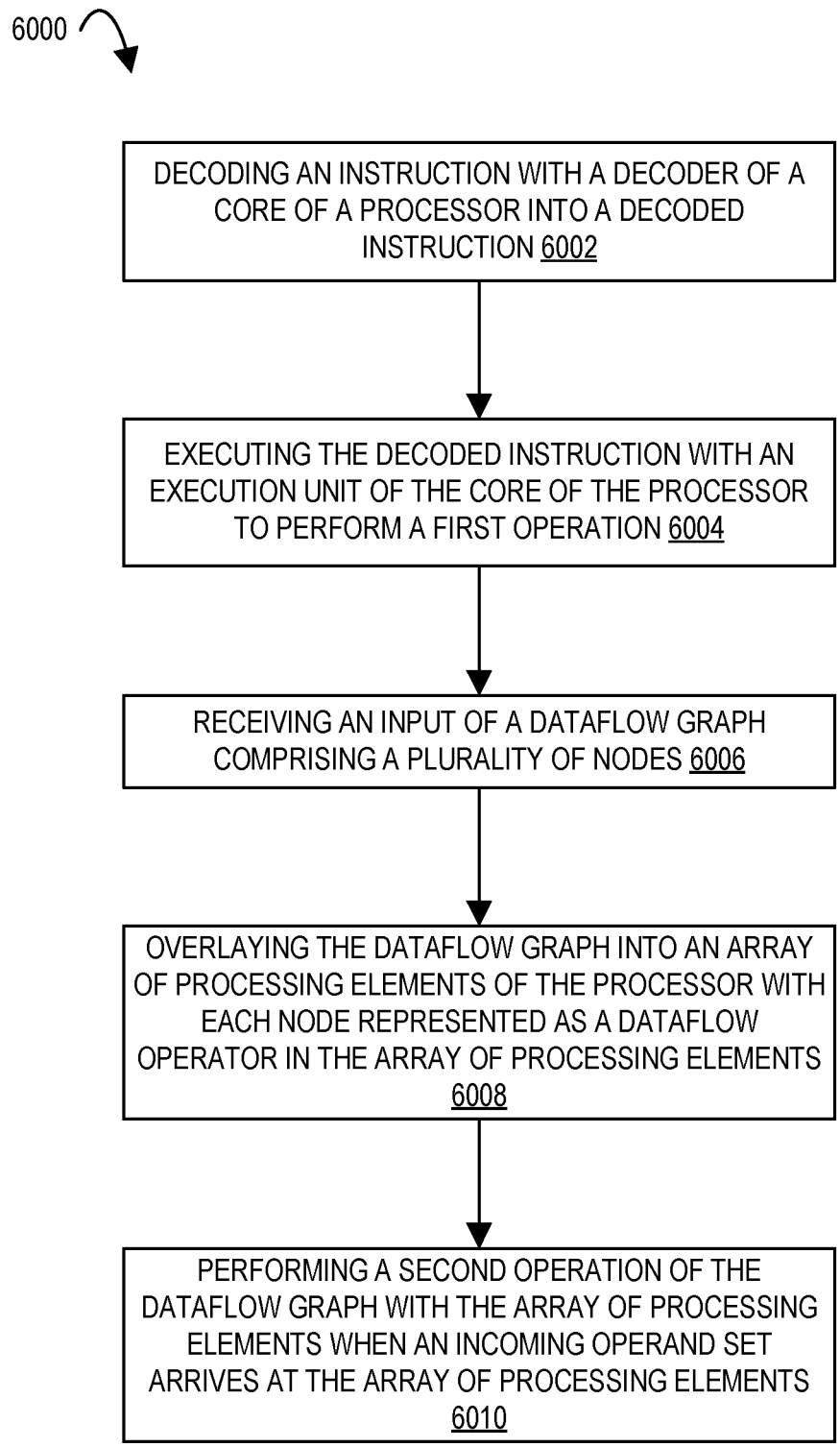
FIG. 60 illustrates a flow diagram according to embodiments of the disclosure.

FIG. 60 illustrates a flow diagram 6000 according to embodiments of the disclosure. Depicted flow 6000 includes decoding an instruction with a decoder of a core of a processor into a decoded instruction 6002; executing the decoded instruction with an execution unit of the core of the processor to perform a first operation 6004; receiving an input of a dataflow graph comprising a plurality of nodes 6006; overlaying the dataflow graph into an array of processing elements of the processor with each node represented as a dataflow operator in the array of processing elements 6008; and performing a second operation of the dataflow graph with the array of processing elements when an incoming operand set arrives at the array of processing elements 6010.

Figure 61:
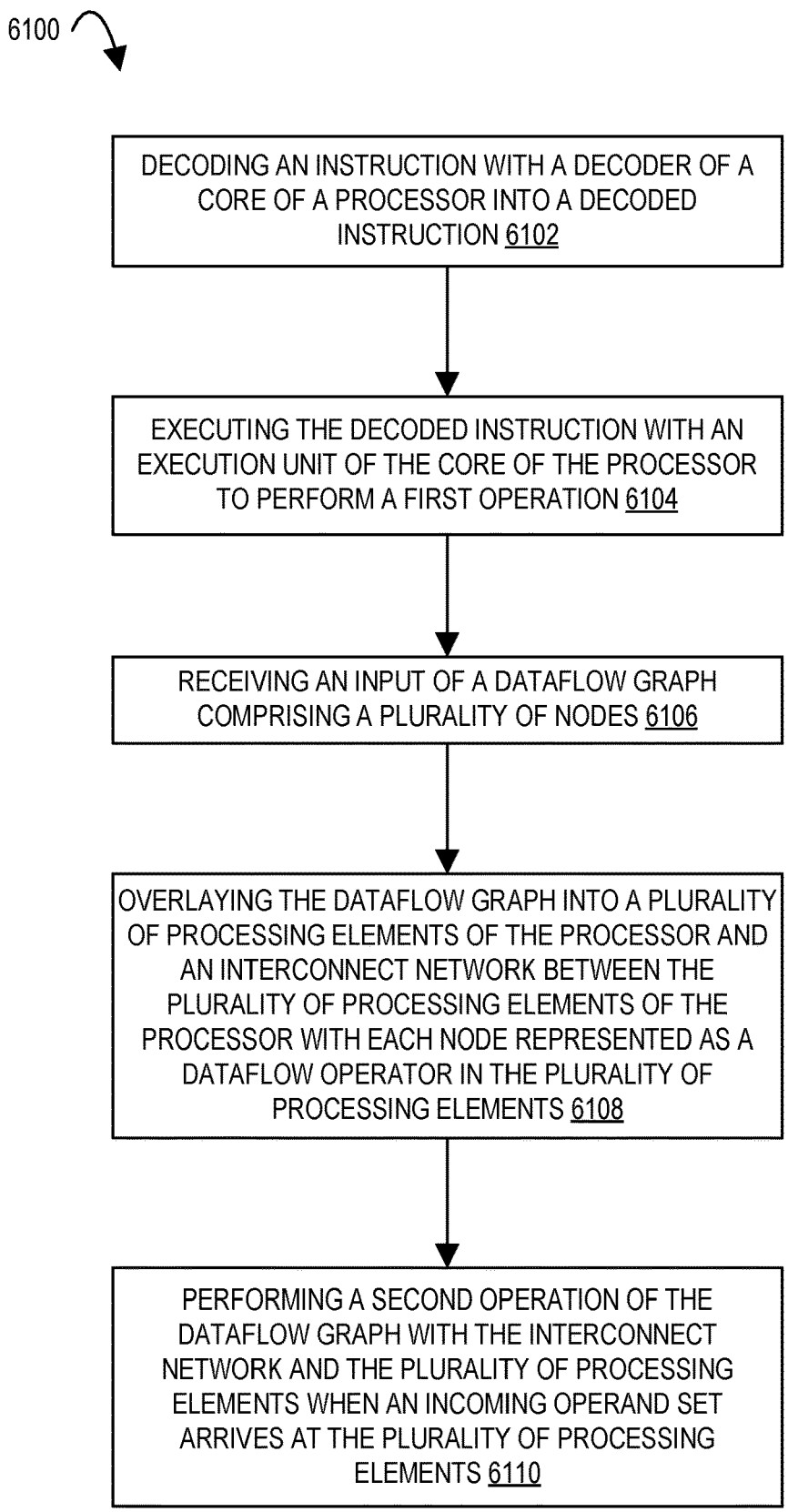
FIG. 61 illustrates a flow diagram according to embodiments of the disclosure.

FIG. 61 illustrates a flow diagram 6100 according to embodiments of the disclosure. Depicted flow 6100 includes decoding an instruction with a decoder of a core of a processor into a decoded instruction 6102; executing the decoded instruction with an execution unit of the core of the processor to perform a first operation 6104; receiving an input of a dataflow graph comprising a plurality of nodes 6106; overlaying the dataflow graph into a plurality of processing elements of the processor and an interconnect network between the plurality of processing elements of the processor with each node represented as a dataflow operator in the plurality of processing elements 6108; and performing a second operation of the dataflow graph with the interconnect network and the plurality of processing elements when an incoming operand set arrives at the plurality of processing elements 6110.

6.8 Memory

Figure 62A:
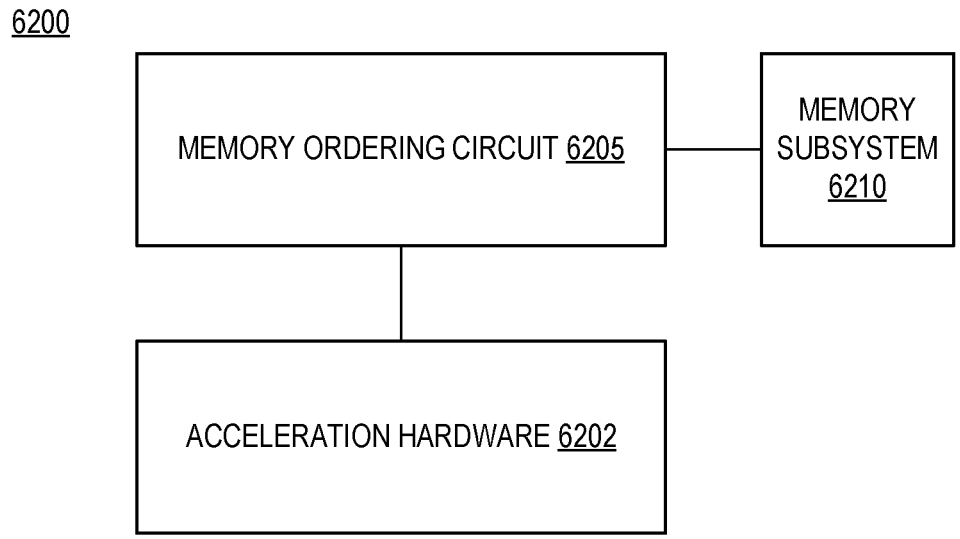
FIG. 62A is a block diagram of a system that employs a memory ordering circuit interposed between a memory subsystem and acceleration hardware according to embodiments of the disclosure.

FIG. 62A is a block diagram of a system 6200 that employs a memory ordering circuit 6205 interposed between a memory subsystem 6210 and acceleration hardware 6202, according to an embodiment of the present disclosure. The memory subsystem 6210 may include known memory components, including cache, memory, and one or more memory controller(s) associated with a processor-based architecture. The acceleration hardware 6202 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit-switched communications network. These virtual circuits are flow controlled and fully back pressured, such that PEs will stall if either the source has no data or the destination is full. At runtime, data flows through the PEs implementing a mapped algorithm according to a dataflow graph, also referred to as a subprogram herein. For example, data may be streamed in from memory, through the acceleration hardware 6202, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 6210. Memory system parallelism, however, helps to support parallel PE computation. If memory accesses are serialized, high parallelism is likely unachievable. To facilitate parallelism of memory accesses, the disclosed memory ordering circuit 6205 includes memory ordering architecture and microarchitecture, as will be explained in detail. In one embodiment, the memory ordering circuit 6205 is a request address file circuit (or "RAF") or other memory request circuitry.

Figure 62B:
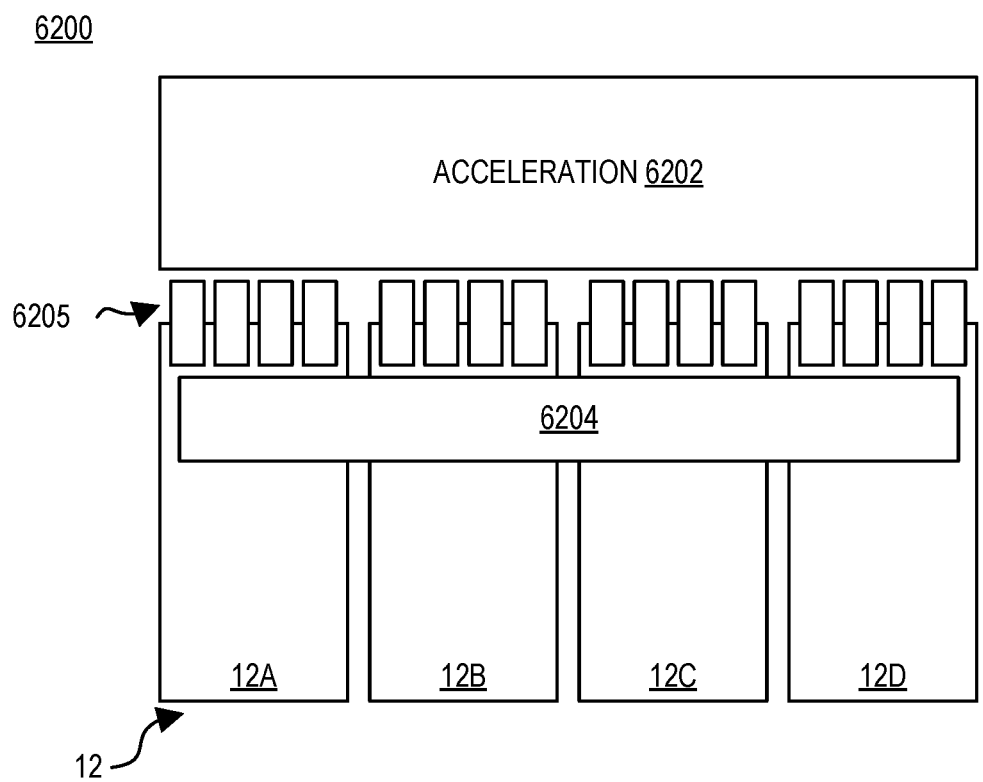
FIG. 62B is a block diagram of the system of FIG. 62A, but which employs multiple memory ordering circuits according to embodiments of the disclosure.

FIG. 62B is a block diagram of the system 6200 of FIG. 62A but which employs multiple memory ordering circuits 6205, according to an embodiment of the present disclosure. Each memory ordering circuit 6205 may function as an interface between the memory subsystem 6210 and a portion of the acceleration hardware 6202 (e.g., spatial array of processing elements or tile). The memory subsystem 6210 may include a plurality of cache slices 12 (e.g., cache slices 12A, 12B, 12C, and 12D in the embodiment of FIG. 62B), and a certain number of memory ordering circuits 6205 (four in this embodiment) may be used for each cache slice 12. A crossbar 6204 (e.g., RAF circuit) may connect the memory ordering circuits 6205 to banks of cache that make up each cache slice 12A, 12B, 12C, and 12D. For example, there may be eight banks of memory in each cache slice in one embodiment. The system 6200 may be instantiated on a single die, for example, as a system on a chip (SoC). In one embodiment, the SoC includes the acceleration hardware 6202. In an alternative embodiment, the acceleration hardware 6202 is an external programmable chip such as an FPGA or CGRA, and the memory ordering circuits 6205 interface with the acceleration hardware 6202 through an input/output hub or the like.

Each memory ordering circuit 6205 may accept read and write requests to the memory subsystem 6210. The requests from the acceleration hardware 6202 arrive at the memory ordering circuit 6205 in a separate channel for each node of the dataflow graph that initiates read or write accesses, also referred to as load or store accesses herein. Buffering is provided so that the processing of loads will return the requested data to the acceleration hardware 6202 in the order it was requested. In other words, iteration six data is returned before iteration seven data, and so forth. Furthermore, note that the request channel from a memory ordering circuit 6205 to a particular cache bank may be implemented as an ordered channel and any first request that leaves before a second request will arrive at the cache bank before the second request.

Figure 63:
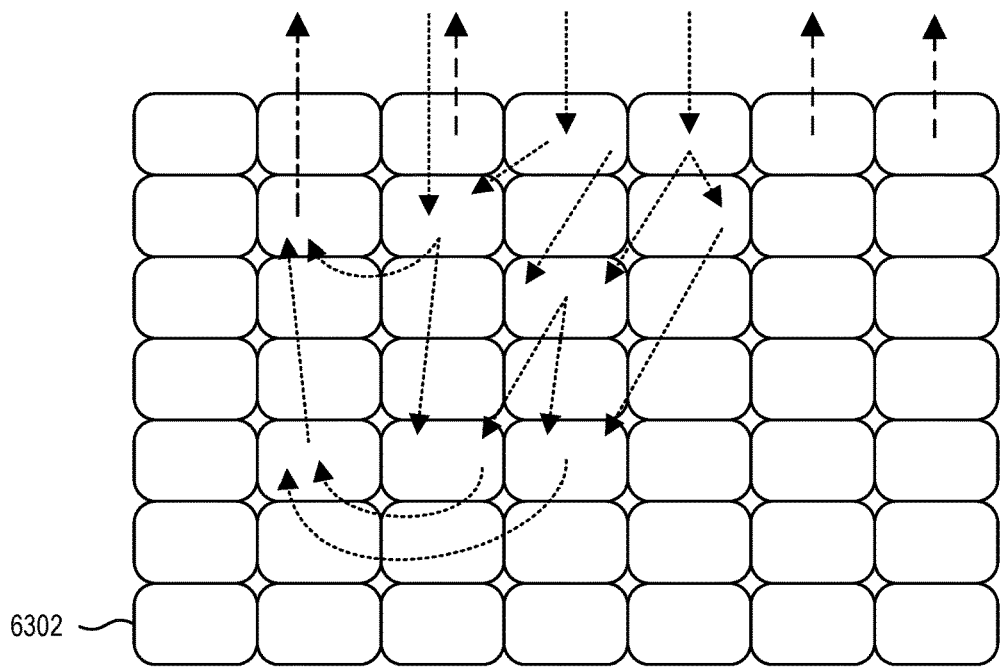
FIG. 63 is a block diagram illustrating general functioning of memory operations into and out of acceleration hardware according to embodiments of the disclosure.

FIG. 63 is a block diagram 6300 illustrating general functioning of memory operations into and out of the acceleration hardware 6202, according to an embodiment of the present disclosure. The operations occurring out the top of the acceleration hardware 6202 are understood to be made to and from a memory of the memory subsystem 6210. Note that two load requests are made, followed by corresponding load responses. While the acceleration hardware 6202 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 6202 is latency-insensitive in terms of the request and response channels, and inherent parallel processing that may occur. The acceleration hardware may also decouple execution of a program from implementation of the memory subsystem 6210 (FIG. 62A), as interfacing with the memory occurs at discrete moments separate from multiple processing steps taken by the acceleration hardware 6202. For example, a load request to and a load response from memory are separate actions, and may be scheduled differently in different circumstances depending on dependency flow of memory operations. The use of spatial fabric, for example, for processing instructions facilitates spatial separation and distribution of such a load request and a load response.

Figure 64:
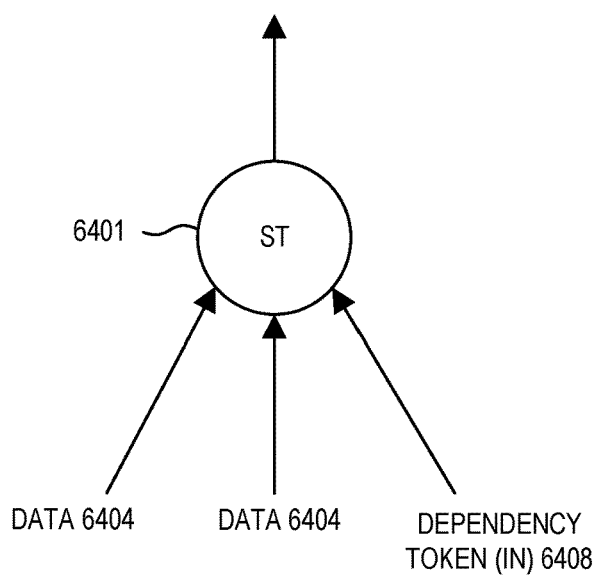
FIG. 64 is a block diagram illustrating a spatial dependency flow for a store operation according to embodiments of the disclosure.

FIG. 64 is a block diagram 6400 illustrating a spatial dependency flow for a store operation 6401, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 6401 may receive an address 6402 (of memory) and data 6404 received from the acceleration hardware 6202. The store operation 6401 may also receive an incoming dependency token 6408, and in response to the availability of these three items, the store operation 6401 may generate an outgoing dependency token 6412. The incoming dependency token, which may, for example, be an initial dependency token of a program, may be provided in a compiler-supplied configuration for the program, or may be provided by execution of memory-mapped input/output (I/O). Alternatively, if the program has already been running, the incoming dependency token 6408 may be received from the acceleration hardware 6202, e.g., in association with a preceding memory operation from which the store operation 6401 depends. The outgoing dependency token 6412 may be generated based on the address 6402 and data 6404 being required by a program-subsequent memory operation.

Figure 65:
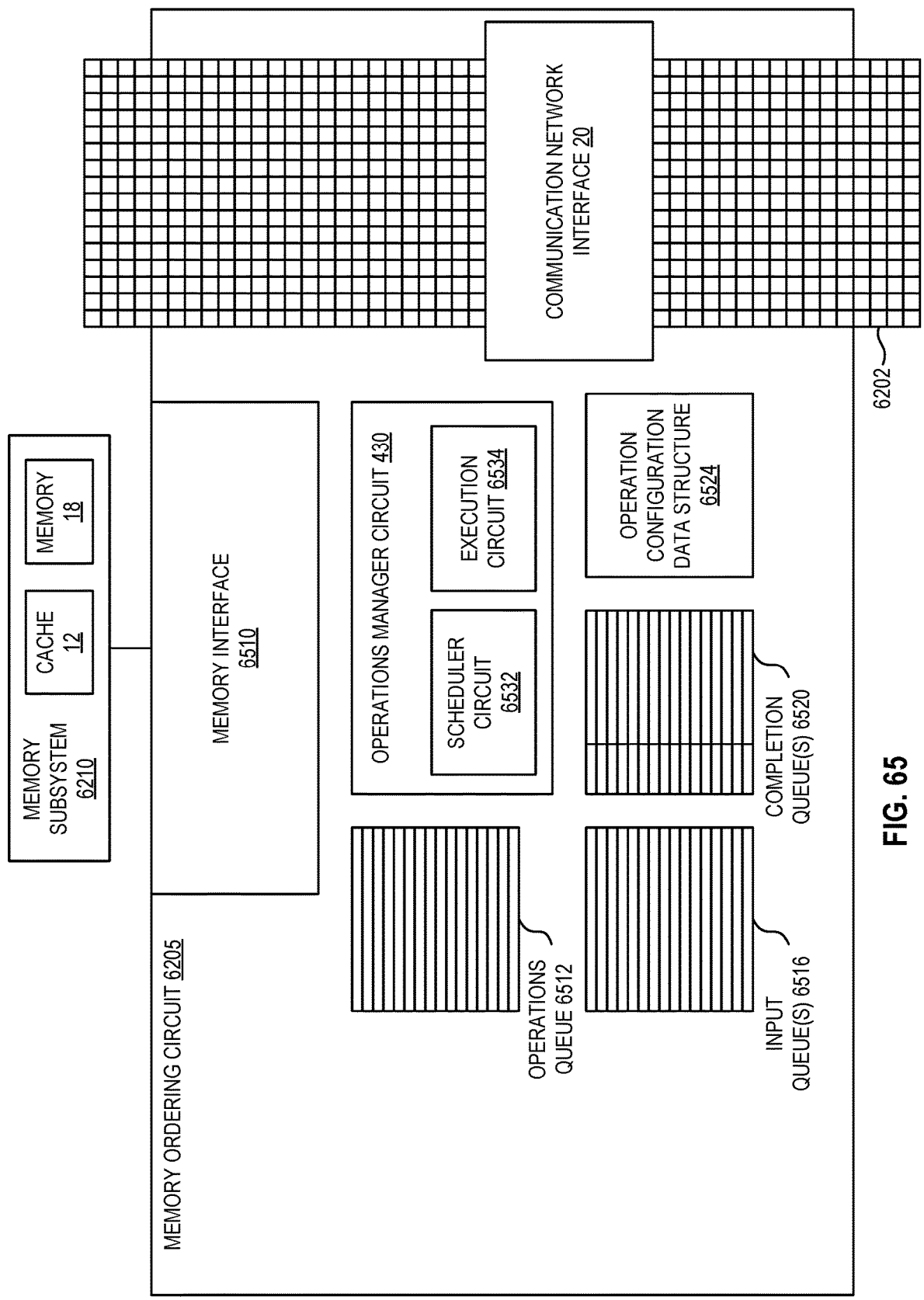
FIG. 65 is a detailed block diagram of the memory ordering circuit of FIG. 62 according to embodiments of the disclosure.

FIG. 65 is a detailed block diagram of the memory ordering circuit 6205 of FIG. 62A, according to an embodiment of the present disclosure. The memory ordering circuit 6205 may be coupled to an out-of-order memory subsystem 6210, which as discussed, may include cache 12 and memory 18, and associated out-of-order memory controller(s). The memory ordering circuit 6205 may include, or be coupled to, a communications network interface 20 that may be either an inter-tile or an intra-tile network interface, and may be a circuit switched network interface (as illustrated), and thus include circuit-switched interconnects. Alternatively, or additionally, the communications network interface 20 may include packet-switched interconnects.

The memory ordering circuit 6205 may further include, but not be limited to, a memory interface 6510, an operations queue 6512, input queue(s) 6516, a completion queue 6520, an operation configuration data structure 6524, and an operations manager circuit 6530 that may further include a scheduler circuit 6532 and an execution circuit 6534. In one embodiment, the memory interface 6510 may be circuit-switched, and in another embodiment, the memory interface 6510 may be packet-switched, or both may exist simultaneously. The operations queue 6512 may buffer memory operations (with corresponding arguments) that are being processed for request, and may, therefore, correspond to addresses and data coming into the input queues 6516.

More specifically, the input queues 6516 may be an aggregation of at least the following: a load address queue, a store address queue, a store data queue, and a dependency queue. When implementing the input queue 6516 as aggregated, the memory ordering circuit 6205 may provide for sharing of logical queues, with additional control logic to logically separate the queues, which are individual channels with the memory ordering circuit. This may maximize input queue usage, but may also require additional complexity and space for the logic circuitry to manage the logical separation of the aggregated queue. Alternatively, as will be discussed with reference to FIG. 66, the input queues 6516 may be implemented in a segregated fashion, with a separate hardware queue for each. Whether aggregated (FIG. 65) or disaggregated (FIG. 66), implementation for purposes of this disclosure is substantially the same, with the former using additional logic to logically separate the queues within a single, shared hardware queue.

When shared, the input queues 6516 and the completion queue 6520 may be implemented as ring buffers of a fixed size. A ring buffer is an efficient implementation of a circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 6516 may share queue slots. Use of the slots in a queue may be statically allocated.

The completion queue 6520 may be a separate set of queues to buffer data received from memory in response to memory commands issued by load operations. The completion queue 6520 may be used to hold a load operation that has been scheduled but for which data has not yet been received (and thus has not yet completed). The completion queue 6520, may therefore, be used to reorder data and operation flow.

The operations manager circuit 6530, which will be explained in more detail with reference to FIGS. 66 through 30, may provide logic for scheduling and executing queued memory operations when taking into account dependency tokens used to provide correct ordering of the memory operations. The operation manager 6530 may access the operation configuration data structure 6524 to determine which queues are grouped together to form a given memory operation. For example, the operation configuration data structure 6524 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 6530 may interface with the operations queue 6512, the input queue(s) 6516, the completion queue(s) 6520, and the memory subsystem 6210 to initially issue memory operations to the memory subsystem 6210 when successive memory operations become "executable," and to next complete the memory operation with some acknowledgement from the memory subsystem. This acknowledgement may be, for example, data in response to a load operation command or an acknowledgement of data being stored in the memory in response to a store operation command.

Figure 66:
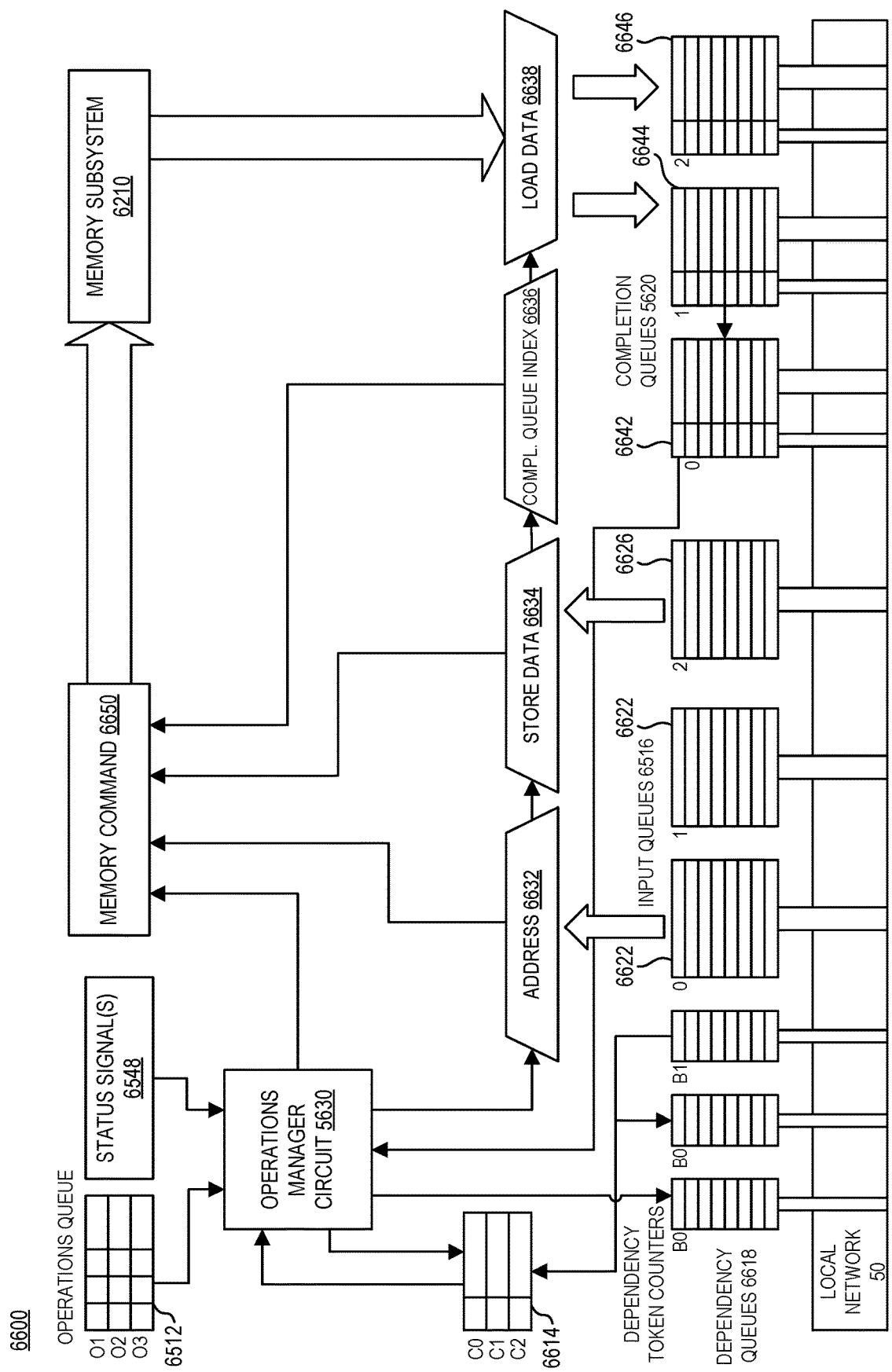
FIG. 66 is a flow diagram of a microarchitecture of the memory ordering circuit of FIG. 62 according to embodiments of the disclosure.

FIG. 66 is a flow diagram of a microarchitecture 6600 of the memory ordering circuit 6205 of FIG. 62A, according to an embodiment of the present disclosure. The memory subsystem 6210 may allow illegal execution of a program in which ordering of memory operations is wrong, due to the semantics of C language (and other object-oriented program languages). The microarchitecture 6600 may enforce the ordering of the memory operations (sequences of loads from and stores to memory) so that results of instructions that the acceleration hardware 6202 executes are properly ordered. A number of local networks 50 are illustrated to represent a portion of the acceleration hardware 6202 coupled to the microarchitecture 6600.

From an architectural perspective, there are at least two goals: first, to run general sequential codes correctly, and second, to obtain high performance in the memory operations performed by the microarchitecture 6600. To ensure program correctness, the compiler expresses the dependency between the store operation and the load operation to an array, p, in some fashion, which are expressed via dependency tokens as will be explained. To improve performance, the microarchitecture 6600 finds and issues as many load commands of an array in parallel as is legal with respect to program order.

In one embodiment, the microarchitecture 6600 may include the operations queue 6512, the input queues 6516, the completion queues 6520, and the operations manager circuit 6530 discussed with reference to FIG. 65, above, where individual queues may be referred to as channels. The microarchitecture 6600 may further include a plurality of dependency token counters 6614 (e.g., one per input queue), a set of dependency queues 6618 (e.g., one each per input queue), an address multiplexer 6632, a store data multiplexer 6634, a completion queue index multiplexer 6636, and a load data multiplexer 6638. The operations manager circuit 6530, in one embodiment, may direct these various multiplexers in generating a memory command 6650 (to be sent to the memory subsystem 6210) and in receipt of responses of load commands back from the memory subsystem 6210, as will be explained.

The input queues 6516, as mentioned, may include a load address queue 6622, a store address queue 6624, and a store data queue 6626. (The small numbers 0, 1, 2 are channel labels and will be referred to later in FIG. 69 and FIG. 72A.) In various embodiments, these input queues may be multiplied to contain additional channels, to handle additional parallelization of memory operation processing. Each dependency queue 6618 may be associated with one of the input queues 6516. More specifically, the dependency queue 6618 labeled B0 may be associated with the load address queue 6622 and the dependency queue labeled B1 may be associated with the store address queue 6624. If additional channels of the input queues 6516 are provided, the dependency queues 6618 may include additional, corresponding channels.

In one embodiment, the completion queues 6520 may include a set of output buffers 6644 and 6646 for receipt of load data from the memory subsystem 6210 and a completion queue 6642 to buffer addresses and data for load operations according to an index maintained by the operations manager circuit 6530. The operations manager circuit 6530 can manage the index to ensure in-order execution of the load operations, and to identify data received into the output buffers 6644 and 6646 that may be moved to scheduled load operations in the completion queue 6642.

More specifically, because the memory subsystem 6210 is out of order, but the acceleration hardware 6202 completes operations in order, the microarchitecture 6600 may re-order memory operations with use of the completion queue 6642. Three different sub-operations may be performed in relation to the completion queue 6642, namely to allocate, enqueue, and dequeue. For allocation, the operations manager circuit 6530 may allocate an index into the completion queue 6642 in an in-order next slot of the completion queue. The operations manager circuit may provide this index to the memory subsystem 6210, which may then know the slot to which to write data for a load operation. To enqueue, the memory subsystem 6210 may write data as an entry to the indexed, in-order next slot in the completion queue 6642 like random access memory (RAM), setting a status bit of the entry to valid. To dequeue, the operations manager circuit 6530 may present the data stored in this in-order next slot to complete the load operation, setting the status bit of the entry to invalid. Invalid entries may then be available for a new allocation.

In one embodiment, the status signals 6548 may refer to statuses of the input queues 6516, the completion queues 6520, the dependency queues 6618, and the dependency token counters 6614. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 6614 may be a compact representation of a queue and track a number of dependency tokens used for any given input queue. If the dependency token counters 6614 saturate, no additional dependency tokens may be generated for new memory operations. Accordingly, the memory ordering circuit 6205 may stall scheduling new memory operations until the dependency token counters 6614 becomes unsaturated.

Figure 67:
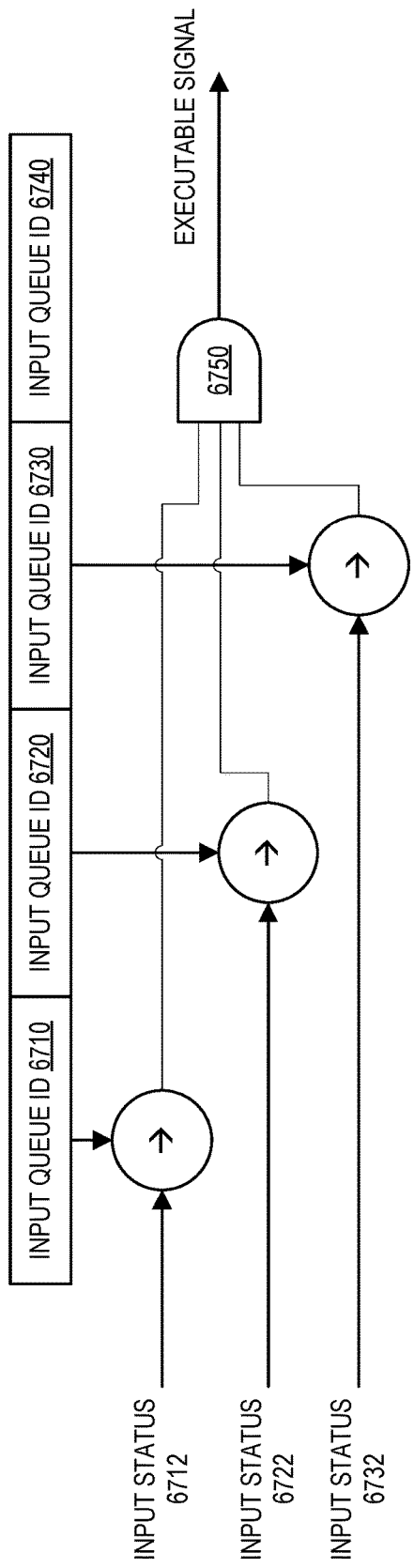
FIG. 67 is a block diagram of an executable determiner circuit according to embodiments of the disclosure.

With additional reference to FIG. 67, FIG. 67 is a block diagram of an executable determiner circuit 6700, according to an embodiment of the present disclosure. The memory ordering circuit 6205 may be set up with several different kinds of memory operations, for example a load and a store:

ldNo[d,x] result.outN, addr.in64, order.in0, order.out0
stNo[d,x] addr.in64, data.inN, order.in0, order.out0

The executable determiner circuit 6700 may be integrated as a part of the scheduler circuit 6532 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 6710 (indicative of a channel of the input queue 6516), an output queue identifier 6720 (indicative of a channel of the completion queues 6520), a dependency queue identifier 6730 (e.g., what dependency queue or counter should be referenced), and an operation type indicator 6740 (e.g., load operation or store operation). A field (e.g., of a memory request) may be included, e.g., in the above format, that stores a bit or bits to indicate to use the hazard checking hardware.

These memory arguments may be queued within the operations queue 6512, and used to schedule issuance of memory operations in association with incoming addresses and data from memory and the acceleration hardware 6202. (See FIG. 68.) Incoming status signals 6548 may be logically combined with these identifiers and then the results may be added (e.g., through an AND gate 6750) to output an executable signal, e.g., which is asserted when the memory operation is executable. The incoming status signals 6548 may include an input status 6712 for the input queue identifier 6710, an output status 6722 for the output queue identifier 6720, and a control status 6732 (related to dependency tokens) for the dependency queue identifier 6730.

For a load operation, and by way of example, the memory ordering circuit 6205 may issue a load command when the load operation has an address (input status) and room to buffer the load result in the completion queue 6642 (output status). Similarly, the memory ordering circuit 6205 may issue a store command for a store operation when the store operation has both an address and data value (input status). Accordingly, the status signals 6548 may communicate a level of emptiness (or fullness) of the queues to which the status signals pertain. The operation type may then dictate whether the logic results in an executable signal depending on what address and data should be available.

To implement dependency ordering, the scheduler circuit 6532 may extend memory operations to include dependency tokens as underlined above in the example load and store operations. The control status 6732 may indicate whether a dependency token is available within the dependency queue identified by the dependency queue identifier 6730, which could be one of the dependency queues 6618 (for an incoming memory operation) or a dependency token counter 6614 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 66, the operations manager circuit 6530 may direct the address multiplexer 6632 to select an address argument that is buffered within either the load address queue 6622 or the store address queue 6624, depending on whether a load operation or a store operation is currently being scheduled for execution. If it is a store operation, the operations manager circuit 6530 may also direct the store data multiplexer 6634 to select corresponding data from the store data queue 6626. The operations manager circuit 6530 may also direct the completion queue index multiplexer 6636 to retrieve a load operation entry, indexed according to queue status and/or program order, within the completion queues 6520, to complete a load operation. The operations manager circuit 6530 may also direct the load data multiplexer 6638 to select data received from the memory subsystem 6210 into the completion queues 6520 for a load operation that is awaiting completion. In this way, the operations manager circuit 6530 may direct selection of inputs that go into forming the memory command 6650, e.g., a load command or a store command, or that the execution circuit 6534 is waiting for to complete a memory operation.

Figure 68:
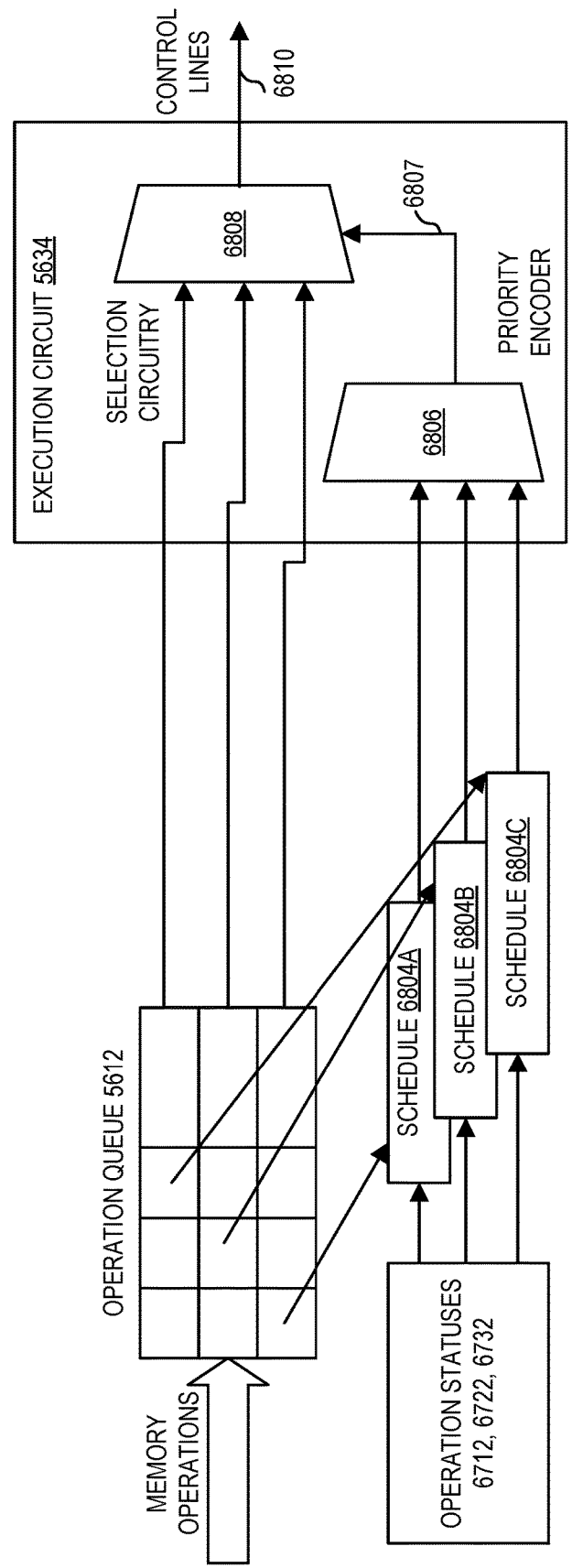
FIG. 68 is a block diagram of a priority encoder according to embodiments of the disclosure.

FIG. 68 is a block diagram the execution circuit 6534 that may include a priority encoder 6806 and selection circuitry 6808 and which generates output control line(s) 6810, according to one embodiment of the present disclosure. In one embodiment, the execution circuit 6534 may access queued memory operations (in the operations queue 6512) that have been determined to be executable (FIG. 67). The execution circuit 6534 may also receive the schedules 6804A, 6804B, 6804C for multiple of the queued memory operations that have been queued and also indicated as ready to issue to memory. The priority encoder 6806 may thus receive an identity of the executable memory operations that have been scheduled and execute certain rules (or follow particular logic) to select the memory operation from those coming in that has priority to be executed first. The priority encoder 6806 may output a selector signal 6807 that identifies the scheduled memory operation that has a highest priority, and has thus been selected.

The priority encoder 6806, for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 6804A, 6804B, and 6804C, respectively. The priority encoder 6806 may be configured to output the selector signal 6807 to the selection circuitry 6808 indicating the memory operation zero as the memory operation that has highest priority. The selection circuitry 6808 may be a multiplexer in one embodiment, and be configured to output its selection (e.g., of memory operation zero) onto the control lines 6810, as a control signal, in response to the selector signal from the priority encoder 6806 (and indicative of selection of memory operation of highest priority). This control signal may go to the multiplexers 6632, 6634, 6636, and/or 6638, as discussed with reference to FIG. 66, to populate the memory command 6650 that is next to issue (be sent) to the memory subsystem 6210. The transmittal of the memory command may be understood to be issuance of a memory operation to the memory subsystem 6210.

FIG. 69 is a block diagram of an exemplary load operation 6900, both logical and in binary form, according to an embodiment of the present disclosure. Referring back to FIG. 67, the logical representation of the load operation 6900 may include channel zero ("0") (corresponding to the load address queue 6622) as the input queue identifier 6710 and completion channel one ("1") (corresponding to the output buffer 6644) as the output queue identifier 6720. The dependency queue identifier 6730 may include two identifiers, channel B0 (corresponding to the first of the dependency queues 6618) for incoming dependency tokens and counter C0 for outgoing dependency tokens. The operation type 6740 has an indication of "Load," which could be a numerical indicator as well, to indicate the memory operation is a load operation. Below the logical representation of the logical memory operation is a binary representation for exemplary purposes, e.g., where a load is indicated by "00." The load operation of FIG. 69 may be extended to include other configurations such as a store operation (FIG. 71A) or other type of memory operations, such as a fence.

An example of memory ordering by the memory ordering circuit 6205 will be illustrated with a simplified example for purposes of explanation with relation to FIGS. 70A-70B, 71A-71B, and 72A-72G. For this example, the following code includes an array, p, which is accessed by indices i and i+2:

for(i) {
  temp=p[i];
  p[i+2]=temp;
}

Figure 70A:
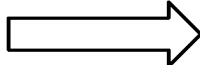
FIG. 70A is flow diagram illustrating logical execution of an example code according to embodiments of the disclosure.
Figure 70B:
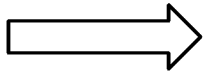
FIG. 70B is the flow diagram of FIG. 70A, illustrating memory-level parallelism in an unfolded version of the example code according to embodiments of the disclosure.

Assume, for this example, that array p contains 0, 1, 2, 3, 4, 5, 6, and at the end of loop execution, array p will contain 0, 1, 0, 1, 0, 1, 0. This code may be transformed by unrolling the loop, as illustrated in FIGS. 70A and 70B. True address dependencies are annotated by arrows in FIG. 70A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The micro-architecture 6600 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 70B, safe reorderings are noted by the arrows on the left of the unfolded code.

The way the microarchitecture may perform this reordering is discussed with reference to FIGS. 71A-71B and 72A-72G. Note that this approach is not as optimal as possible because the microarchitecture 6600 may not send a memory command to memory every cycle. However, with minimal hardware, the microarchitecture supports dependency flows by executing memory operations when operands (e.g., address and data, for a store, or address for a load) and dependency tokens are available.

FIG. 71A is a block diagram of exemplary memory arguments for a load operation 7102 and for a store operation 7104, according to an embodiment of the present disclosure. These, or similar, memory arguments were discussed with relation to FIG. 69 and will not be repeated here. Note, however, that the store operation 7104 has no indicator for the output queue identifier because no data is being output to the acceleration hardware 6202. Instead, the store address in channel 1 and the data in channel 2 of the input queues 6516, as identified in the input queue identifier memory argument, are to be scheduled for transmission to the memory subsystem 6210 in a memory command to complete the store operation 7104. Furthermore, the input channels and output channels of the dependency queues are both implemented with counters. Because the load operations and the store operations as displayed in FIGS. 70A and 70B are interdependent, the counters may be cycled between the load operations and the store operations within the flow of the code.

Figure 71B:
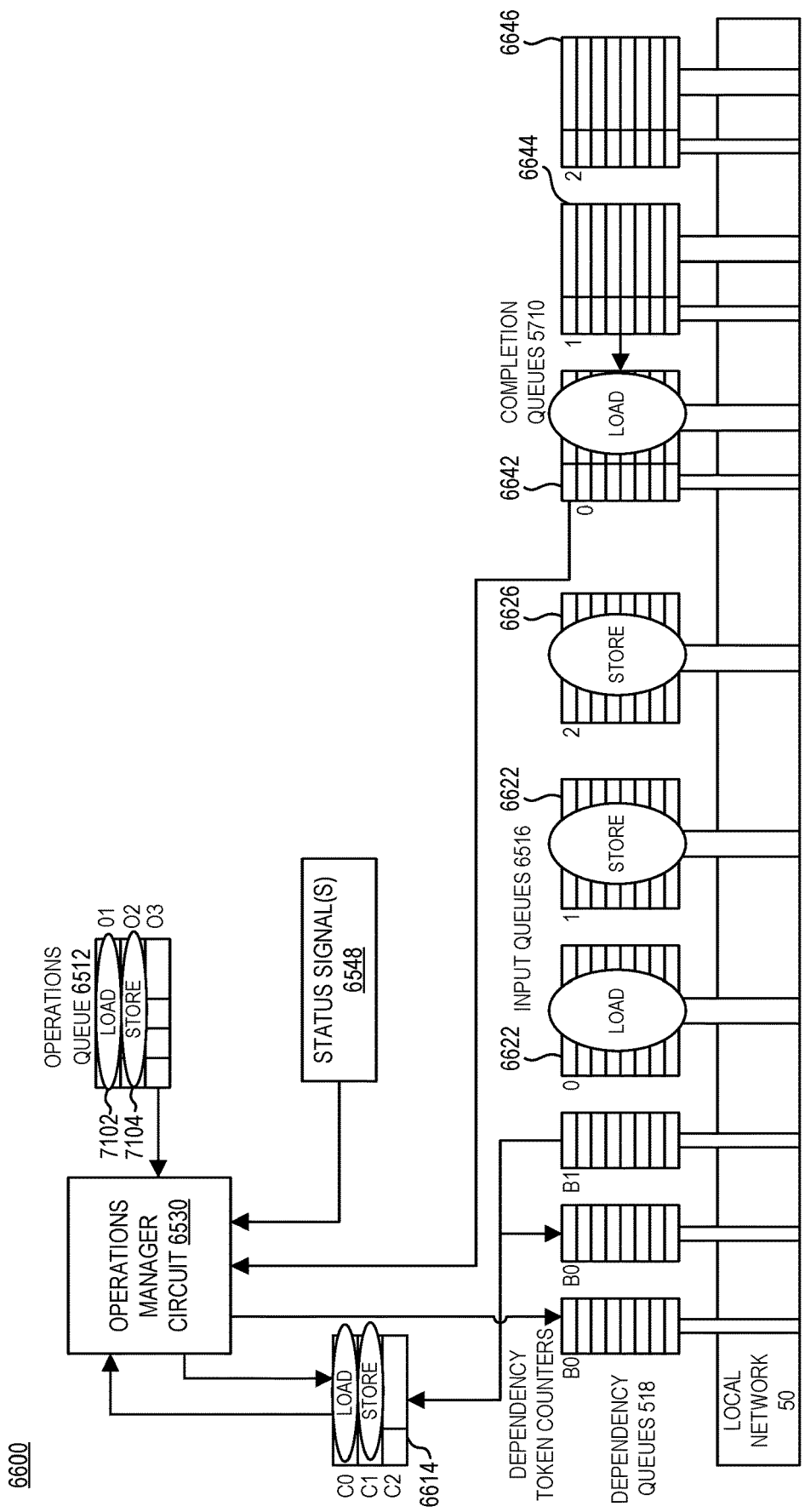
FIG. 71B is a block diagram illustrating flow of load operations and the store operations, such as those of FIG. 71A, through the microarchitecture of the memory ordering circuit of FIG. 66 according to embodiments of the disclosure.

FIG. 71B is a block diagram illustrating flow of the load operations and store operations, such as the load operation 7102 and the store 7104 operation of FIG. 70A, through the microarchitecture 6600 of the memory ordering circuit of FIG. 66, according to an embodiment of the present disclosure. For simplicity of explanation, not all of the components are displayed, but reference may be made back to the additional components displayed in FIG. 66. Various ovals indicating "Load" for the load operation 7102 and "Store" for the store operation 7104 are overlaid on some of the components of the microarchitecture 6600 as indication of how various channels of the queues are being used as the memory operations are queued and ordered through the microarchitecture 6600.

FIGS. 72A, 72B, 72C, 72D, 72E, 72F, 72G, and 72H are block diagrams illustrating functional flow of load operations and store operations for the exemplary program of FIGS. 70A and 70B through queues of the microarchitecture of FIG. 71B, according to an embodiment of the present disclosure. Each figure may correspond to a next cycle of processing by the microarchitecture 6600. Values that are italicized are incoming values (into the queues) and values that are bolded are outgoing values (out of the queues). All other values with normal fonts are retained values already existing in the queues.

Figure 72A:
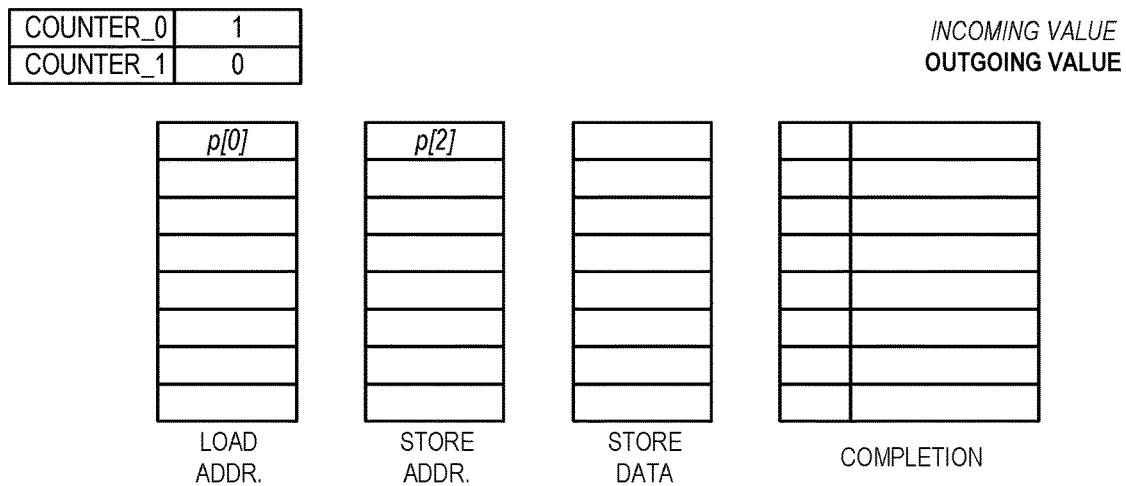
FIGS. 72A, 72B, 72C, 72D, 72E, 72F, 72G, and 72H are block diagrams illustrating functional flow of load operations and store operations for an exemplary program through queues of the microarchitecture of FIG. 72B according to embodiments of the disclosure.

In FIG. 72A, the address p[0] is incoming into the load address queue 6622, and the address p[2] is incoming into the store address queue 6624, starting the control flow process. Note that counter C0, for dependency input for the load address queue, is "1" and counter C1, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 72B.

Figure 72B:
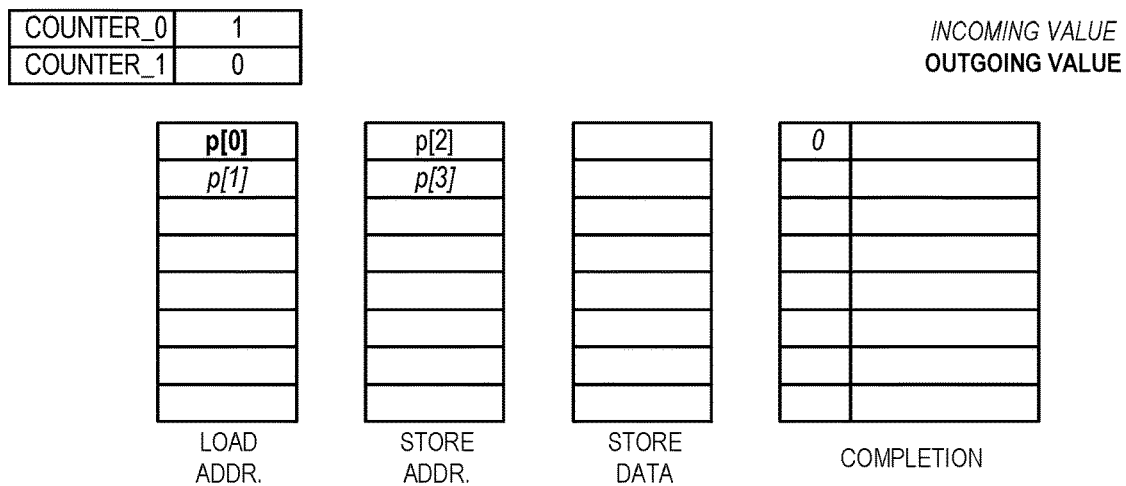

In FIG. 72B, address p[0] is bolded to indicate it is outgoing in this cycle. A new address p[1] is incoming into the load address queue and a new address p[3] is incoming into the store address queue. A zero ("0")-valued bit in the completion queue 6642 is also incoming, which indicates any data present for that indexed entry is invalid. As mentioned, the values for the counters C0 and C1 are now indicated as incoming, and are thus now active this cycle.

Figure 72C:
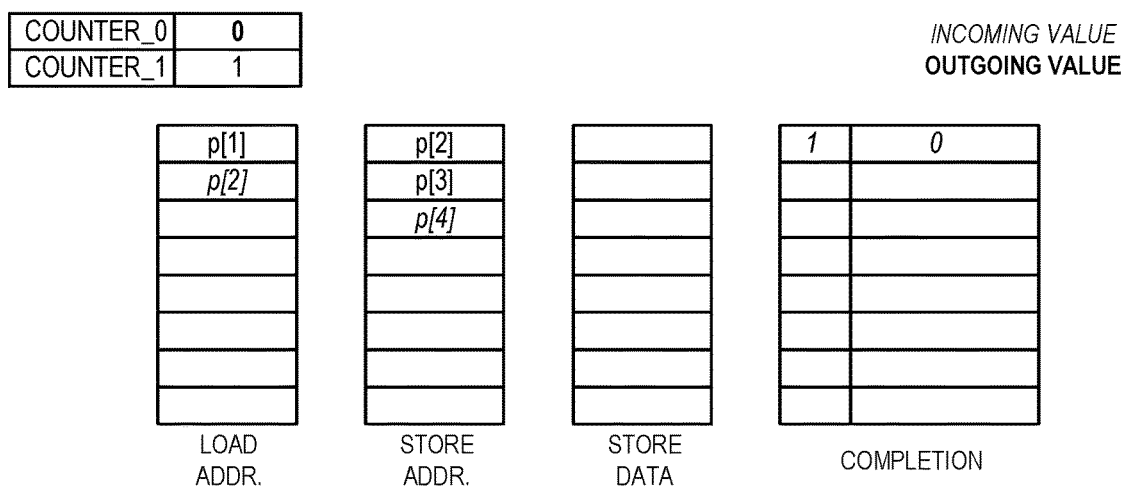

In FIG. 72C, the outgoing address p[0] has now left the load address queue and a new address p[2] is incoming into the load address queue. And, the data ("0") is incoming into the completion queue for address p[0]. The validity bit is set to "1" to indicate that the data in the completion queue is valid. Furthermore, a new address p[4] is incoming into the store address queue. The value for counter C0 is indicated as outgoing and the value for counter C1 is indicated as incoming. The value of "1" for C1 indicates an incoming dependency for store operation to address p[4].

Note that the address p[2] for the newest load operation is dependent on the value that first needs to be stored by the store operation for address p[2], which is at the top of the store address queue. Later, the indexed entry in the completion queue for the load operation from address p[2] may remain buffered until the data from the store operation to the address p[2] is completed (see FIGS. 72F-72H).

Figure 72D:
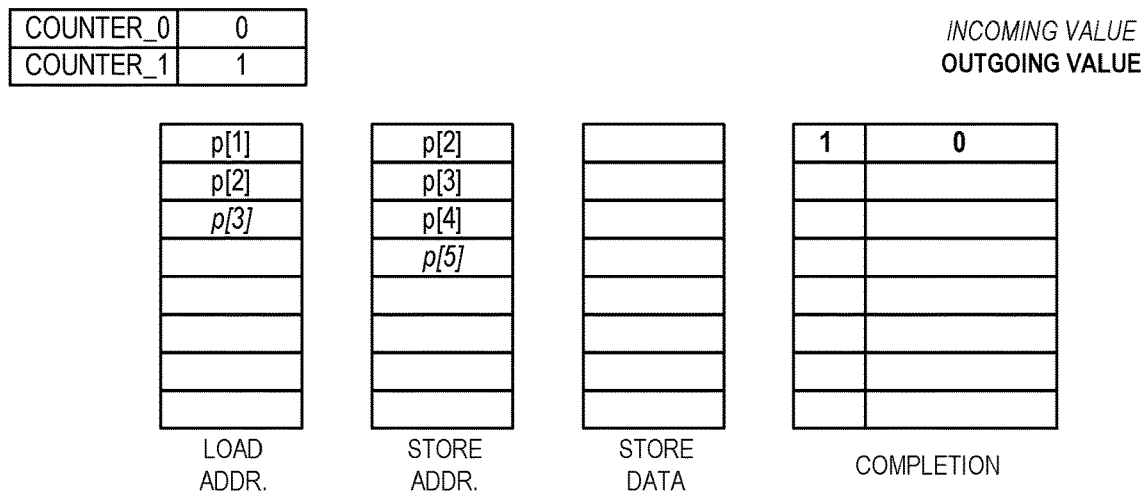

In FIG. 72D, the data ("0") is outgoing from the completion queue for address p[0], which is therefore being sent out to the acceleration hardware 6202. Furthermore, a new address p[3] is incoming into the load address queue and a new address p[5] is incoming into the store address queue. The values for the counters C0 and C1 remain unchanged.

Figure 72E:
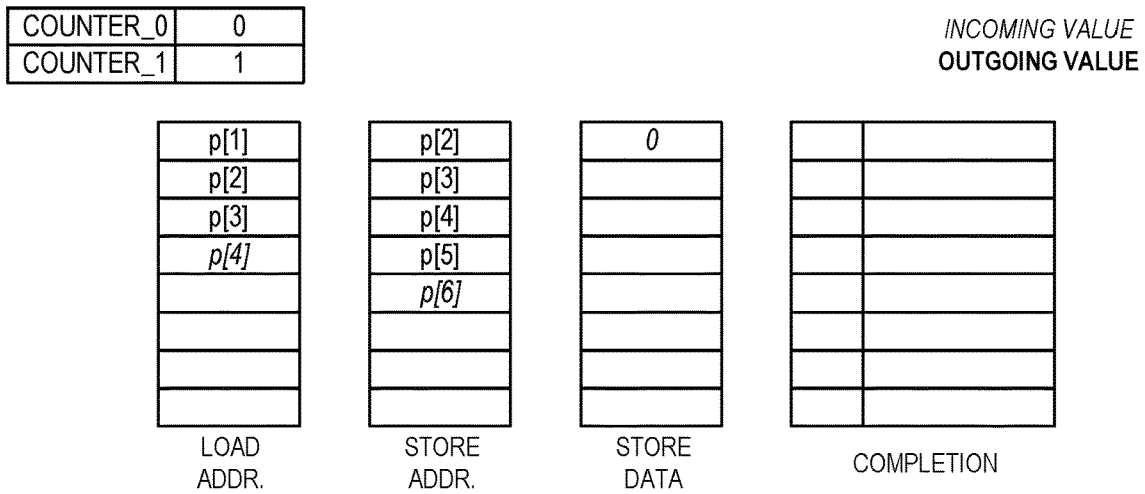

In FIG. 72E, the value ("0") for the address p[2] is incoming into the store data queue, while a new address p[4] comes into the load address queue and a new address p[6] comes into the store address queue. The counter values for C0 and C1 remain unchanged.

Figure 72F:
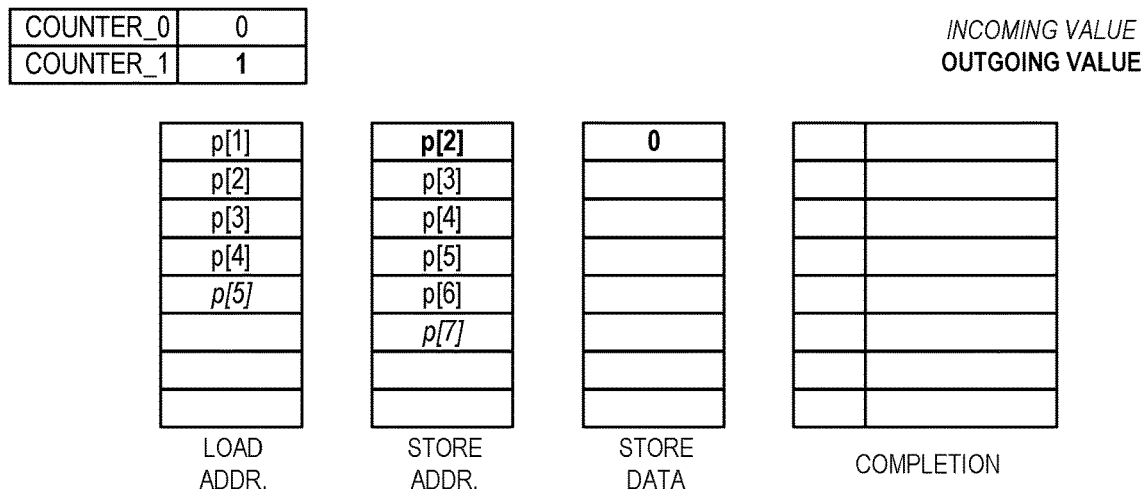

In FIG. 72F, the value ("0") for the address p[2] in the store data queue, and the address p[2] in the store address queue are both outgoing values. Likewise, the value for the counter C1 is indicated as outgoing, while the value ("0") for counter C0 remain unchanged. Furthermore, a new address p[5] is incoming into the load address queue and a new address p[7] is incoming into the store address queue.

Figure 72G:
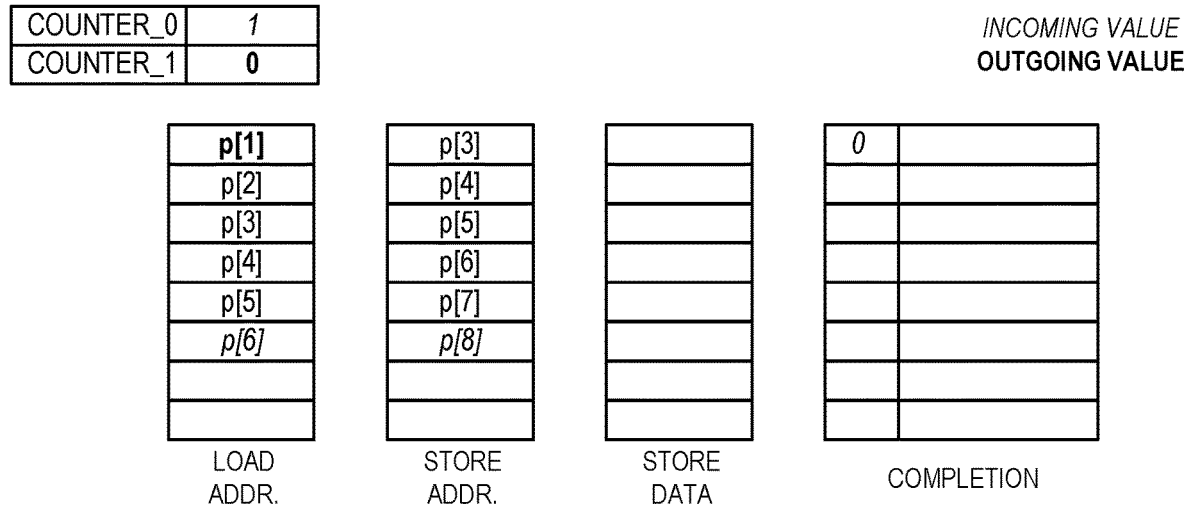

In FIG. 72G, the value ("0") is incoming to indicate the indexed value within the completion queue 6642 is invalid. The address p[1] is bolded to indicate it is outgoing from the load address queue while a new address p[6] is incoming into the load address queue. A new address p[8] is also incoming into the store address queue. The value of counter C0 is incoming as a "1," corresponding to an incoming dependency for the load operation of address p[6] and an outgoing dependency for the store operation of address p[8]. The value of counter C1 is now "0," and is indicated as outgoing.

Figure 72H:
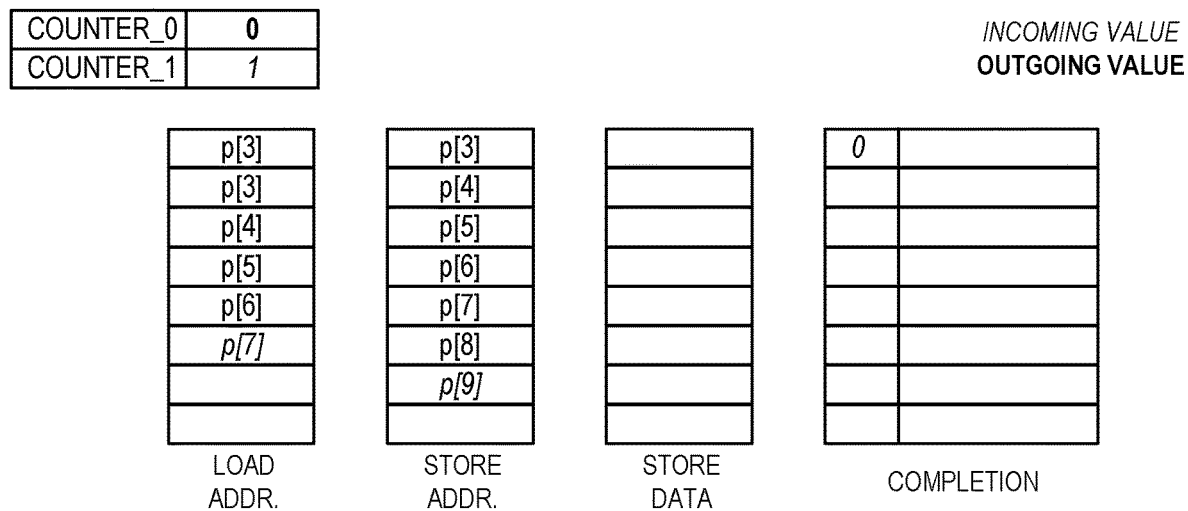

In FIG. 72H, a data value of "1" is incoming into the completion queue 6642 while the validity bit is also incoming as a "1," meaning that the buffered data is valid. This is the data needed to complete the load operation for p[2].

Recall that this data had to first be stored to address p[2], which happened in FIG. 72F. The value of "0" for counter C0 is outgoing, and a value of "1," for counter C1 is incoming. Furthermore, a new address p[7] is incoming into the load address queue and a new address p[9] is incoming into the store address queue.

In the present embodiment, the process of executing the code of FIGS. 70A and 70B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

Figure 73:
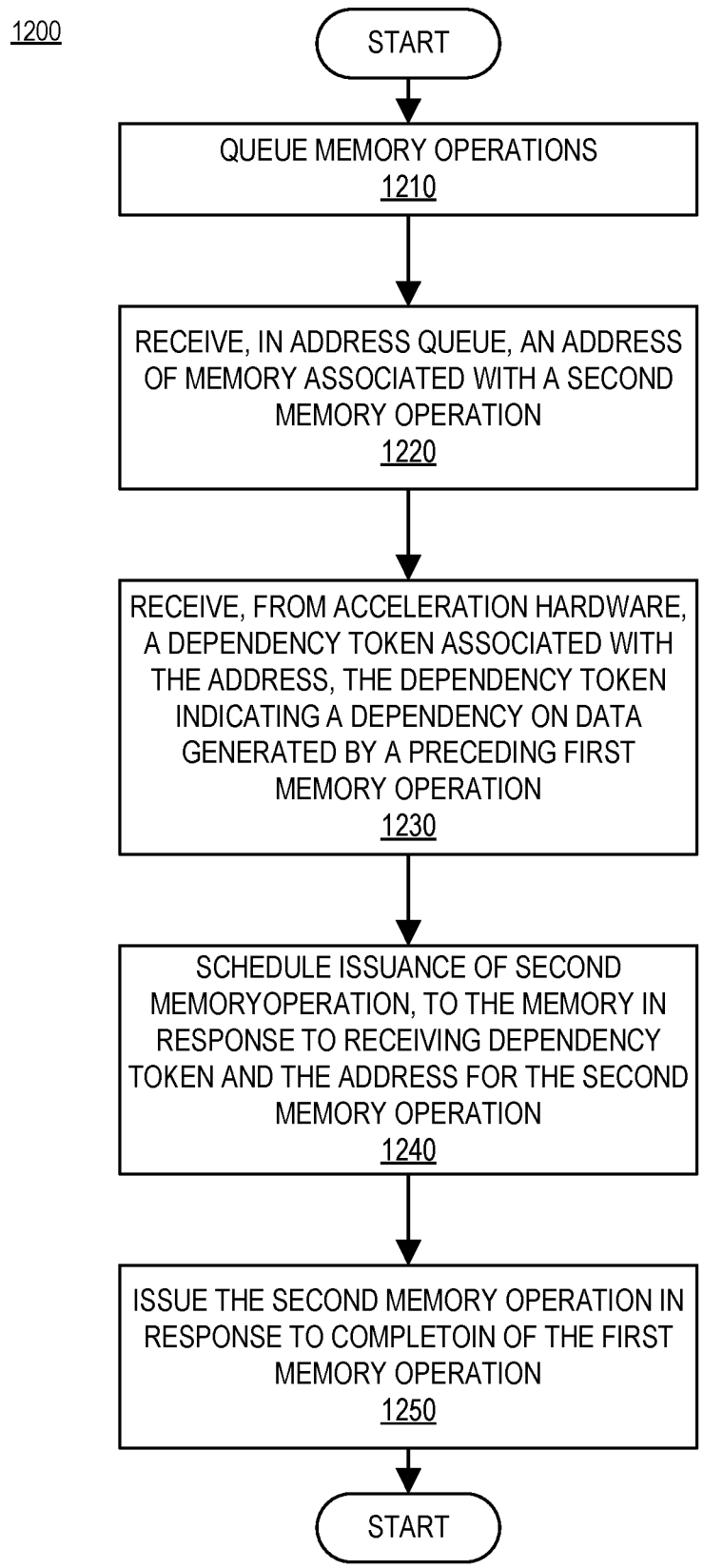
FIG. 73 is a flow chart of a method for ordering memory operations between a acceleration hardware and an out-of-order memory subsystem according to embodiments of the disclosure.

FIG. 73 is a flow chart of a method 7300 for ordering memory operations between acceleration hardware and an out-of-order memory subsystem, according to an embodiment of the present disclosure. The method 7300 may be performed by a system that may include hardware (e.g., circuitry, dedicated logic, and/or programmable logic), software (e.g., instructions executable on a computer system to perform hardware simulation), or a combination thereof. In an illustrative example, the method 7300 may be performed by the memory ordering circuit 6205 and various subcomponents of the memory ordering circuit 6205.

More specifically, referring to FIG. 73, the method 7300 may start with the memory ordering circuit queuing memory operations in an operations queue of the memory ordering circuit (7310). Memory operation and control arguments may make up the memory operations, as queued, where the memory operation and control arguments are mapped to certain queues within the memory ordering circuit as discussed previously. The memory ordering circuit may work to issue the memory operations to a memory in association with acceleration hardware, to ensure the memory operations complete in program order. The method 7300 may continue with the memory ordering circuit receiving, in set of input queues, from the acceleration hardware, an address of the memory associated with a second memory operation of the memory operations (7320). In one embodiment, a load address queue of the set of input queues is the channel to receive the address. In another embodiment, a store address queue of the set of input queues is the channel to receive the address. The method 7300 may continue with the memory ordering circuit receiving, from the acceleration hardware, a dependency token associated with the address, wherein the dependency token indicates a dependency on data generated by a first memory operation, of the memory operations, which precedes the second memory operation (7330). In one embodiment, a channel of a dependency queue is to receive the dependency token. The first memory operation may be either a load operation or a store operation.

The method 7300 may continue with the memory ordering circuit scheduling issuance of the second memory operation to the memory in response to receiving the dependency token and the address associated with the dependency token (7340). For example, when the load address queue receives the address for an address argument of a load operation and the dependency queue receives the dependency token for a control argument of the load operation, the memory ordering circuit may schedule issuance of the second memory operation as a load operation. The method 7300 may continue with the memory ordering circuit issuing the second memory operation (e.g., in a command) to the memory in response to completion of the first memory operation (7350). For example, if the first memory operation is a store, completion may be verified by acknowledgement that the data in a store data queue of the set of input queues has been written to the address in the memory. Similarly, if the first memory operation is a load operation, completion may be verified by receipt of data from the memory for the load operation.

7. Summary

Supercomputing at the ExaFLOP scale may be a challenge in high-performance computing, a challenge which is not likely to be met by conventional von Neumann architectures. To achieve ExaFLOPs, embodiments of a CSA provide a heterogeneous spatial array that targets direct execution of (e.g., compiler-produced) dataflow graphs. In addition to laying out the architectural principles of embodiments of a CSA, the above also describes and evaluates embodiments of a CSA which showed performance and energy of larger than 10× over existing products. Compiler-generated code may have significant performance and energy gains over roadmap architectures. As a heterogeneous, parametric architecture, embodiments of a CSA may be readily adapted to all computing uses. For example, a mobile version of CSA might be tuned to 32-bits, while a machine-learning focused array might feature significant numbers of vectorized 8-bit multiplication units. The main advantages of embodiments of a CSA are high performance and extreme energy efficiency, characteristics relevant to all forms of computing ranging from supercomputing and data-center to the internet-of-things.

In one embodiment, a processor includes a spatial array of processing elements; and a packet switched communications network to route data within the spatial array between processing elements according to a dataflow graph to perform a first dataflow operation of the dataflow graph, wherein the packet switched communications network further comprises a plurality of network dataflow endpoint circuits to perform a second dataflow operation of the dataflow graph. A network dataflow endpoint circuit of the plurality of network dataflow endpoint circuits may include a network ingress buffer to receive input data from the packet switched communications network; and a spatial array egress buffer to output resultant data to the spatial array of processing elements according to the second dataflow operation on the input data. The spatial array egress buffer may output the resultant data based on a scheduler within the network dataflow endpoint circuit monitoring the packet switched communications network. The spatial array egress buffer may output the resultant data based on the scheduler within the network dataflow endpoint circuit monitoring a selected channel of multiple network virtual channels of the packet switched communications network. A network dataflow endpoint circuit of the plurality of network dataflow endpoint circuits may include a spatial array ingress buffer to receive control data from the spatial array that causes a network ingress buffer of the network dataflow endpoint circuit that received input data from the packet switched communications network to output resultant data to the spatial array of processing elements according to the second dataflow operation on the input data and the control data. A network dataflow endpoint circuit of the plurality of network dataflow endpoint circuits may stall an output of resultant data of the second dataflow operation from a spatial array egress buffer of the network dataflow endpoint circuit when a backpressure signal from a downstream processing element of the spatial array of processing elements indicates that storage in the downstream processing element is not available for the output of the network dataflow endpoint circuit. A network dataflow endpoint circuit of the plurality of network dataflow endpoint circuits may send a backpressure signal to stall a source from sending input data on the packet switched communications network into a network ingress buffer of the network dataflow endpoint circuit when the network ingress buffer is not available. The spatial array of processing elements may include a plurality of processing elements; and an interconnect network between the plurality of processing elements to receive an input of the dataflow graph comprising a plurality of nodes, wherein the dataflow graph is to be overlaid into the interconnect network, the plurality of processing elements, and the plurality of network dataflow endpoint circuits with each node represented as a dataflow operator in either of the plurality of processing elements and the plurality of network dataflow endpoint circuits, and the plurality of processing elements and the plurality of network dataflow endpoint circuits are to perform an operation by an incoming operand set arriving at each of the dataflow operators of the plurality of processing elements and the plurality of network dataflow endpoint circuits. The spatial array of processing elements may include a circuit switched network to transport the data within the spatial array between processing elements according to the dataflow graph.

In another embodiment, a method includes providing a spatial array of processing elements; routing, with a packet switched communications network, data within the spatial array between processing elements according to a dataflow graph; performing a first dataflow operation of the dataflow graph with the processing elements; and performing a second dataflow operation of the dataflow graph with a plurality of network dataflow endpoint circuits of the packet switched communications network. The performing the second dataflow operation may include receiving input data from the packet switched communications network with a network ingress buffer of a network dataflow endpoint circuit of the plurality of network dataflow endpoint circuits; and outputting resultant data from a spatial array egress buffer of the network dataflow endpoint circuit to the spatial array of processing elements according to the second dataflow operation on the input data. The outputting may include outputting the resultant data based on a scheduler within the network dataflow endpoint circuit monitoring the packet switched communications network. The outputting may include outputting the resultant data based on the scheduler within the network dataflow endpoint circuit monitoring a selected channel of multiple network virtual channels of the packet switched communications network. The performing the second dataflow operation may include receiving control data, with a spatial array ingress buffer of a network dataflow endpoint circuit of the plurality of network dataflow endpoint circuits, from the spatial array; and configuring the network dataflow endpoint circuit to cause a network ingress buffer of the network dataflow endpoint circuit that received input data from the packet switched communications network to output resultant data to the spatial array of processing elements according to the second dataflow operation on the input data and the control data. The performing the second dataflow operation may include stalling an output of the second dataflow operation from a spatial array egress buffer of a network dataflow endpoint circuit of the plurality of network dataflow endpoint circuits when a backpressure signal from a downstream processing element of the spatial array of processing elements indicates that storage in the downstream processing element is not available for the output of the network dataflow endpoint circuit. The performing the second dataflow operation may include sending a backpressure signal from a network dataflow endpoint circuit of the plurality of network dataflow endpoint circuits to stall a source from sending input data on the packet switched communications network into a network ingress buffer of the network dataflow endpoint circuit when the network ingress buffer is not available. The routing, performing the first dataflow operation, and performing the second dataflow operation may include receiving an input of a dataflow graph comprising a plurality of nodes; overlaying the dataflow graph into the spatial array of processing elements and the plurality of network dataflow endpoint circuits with each node represented as a dataflow operator in either of the processing elements and the plurality of network dataflow endpoint circuits; and performing the first dataflow operation with the processing elements and performing the second dataflow operation with the plurality of network dataflow endpoint circuits when an incoming operand set arrives at each of the dataflow operators of the processing elements and the plurality of network dataflow endpoint circuits. The method may include transporting the data within the spatial array between processing elements according to the dataflow graph with a circuit switched network of the spatial array.

In yet another embodiment, a non-transitory machine readable medium that stores code that when executed by a machine causes the machine to perform a method including providing a spatial array of processing elements; routing, with a packet switched communications network, data within the spatial array between processing elements according to a dataflow graph; performing a first dataflow operation of the dataflow graph with the processing elements; and performing a second dataflow operation of the dataflow graph with a plurality of network dataflow endpoint circuits of the packet switched communications network. The performing the second dataflow operation may include receiving input data from the packet switched communications network with a network ingress buffer of a network dataflow endpoint circuit of the plurality of network dataflow endpoint circuits; and outputting resultant data from a spatial array egress buffer of the network dataflow endpoint circuit to the spatial array of processing elements according to the second dataflow operation on the input data. The outputting may include outputting the resultant data based on a scheduler within the network dataflow endpoint circuit monitoring the packet switched communications network. The outputting may include outputting the resultant data based on the scheduler within the network dataflow endpoint circuit monitoring a selected channel of multiple network virtual channels of the packet switched communications network. The performing the second dataflow operation may include receiving control data, with a spatial array ingress buffer of a network dataflow endpoint circuit of the plurality of network dataflow endpoint circuits, from the spatial array; and configuring the network dataflow endpoint circuit to cause a network ingress buffer of the network dataflow endpoint circuit that received input data from the packet switched communications network to output resultant data to the spatial array of processing elements according to the second dataflow operation on the input data and the control data. The performing the second dataflow operation may include stalling an output of the second dataflow operation from a spatial array egress buffer of a network dataflow endpoint circuit of the plurality of network dataflow endpoint circuits when a backpressure signal from a downstream processing element of the spatial array of processing elements indicates that storage in the downstream processing element is not available for the output of the network dataflow endpoint circuit. The performing the second dataflow operation may include sending a backpressure signal from a network dataflow endpoint circuit of the plurality of network dataflow endpoint circuits to stall a source from sending input data on the packet switched communications network into a network ingress buffer of the network dataflow endpoint circuit when the network ingress buffer is not available. The routing, performing the first dataflow operation, and performing the second dataflow operation may include receiving an input of a dataflow graph comprising a plurality of nodes; overlaying the dataflow graph into the spatial array of processing elements and the plurality of network dataflow endpoint circuits with each node represented as a dataflow operator in either of the processing elements and the plurality of network dataflow endpoint circuits; and performing the first dataflow operation with the processing elements and performing the second dataflow operation with the plurality of network dataflow endpoint circuits when an incoming operand set arrives at each of the dataflow operators of the processing elements and the plurality of network dataflow endpoint circuits. The method may include transporting the data within the spatial array between processing elements according to the dataflow graph with a circuit switched network of the spatial array.

In another embodiment, a processor includes a spatial array of processing elements; and a packet switched communications network to route data within the spatial array between processing elements according to a dataflow graph to perform a first dataflow operation of the dataflow graph, wherein the packet switched communications network further comprises means to perform a second dataflow operation of the dataflow graph.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements are to perform a second operation by a respective, incoming operand set arriving at each of the dataflow operators of the plurality of processing elements. A processing element of the plurality of processing elements may stall execution when a backpressure signal from a downstream processing element indicates that storage in the downstream processing element is not available for an output of the processing element. The processor may include a flow control path network to carry the backpressure signal according to the dataflow graph. A dataflow token may cause an output from a dataflow operator receiving the dataflow token to be sent to an input buffer of a particular processing element of the plurality of processing elements. The second operation may include a memory access and the plurality of processing elements comprises a memory-accessing dataflow operator that is not to perform the memory access until receiving a memory dependency token from a logically previous dataflow operator. The plurality of processing elements may include a first type of processing element and a second, different type of processing element.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements by a respective, incoming operand set arriving at each of the dataflow operators of the plurality of processing elements. The method may include stalling execution by a processing element of the plurality of processing elements when a backpressure signal from a downstream processing element indicates that storage in the downstream processing element is not available for an output of the processing element. The method may include sending the backpressure signal on a flow control path network according to the dataflow graph. A dataflow token may cause an output from a dataflow operator receiving the dataflow token to be sent to an input buffer of a particular processing element of the plurality of processing elements. The method may include not performing a memory access until receiving a memory dependency token from a logically previous dataflow operator, wherein the second operation comprises the memory access and the plurality of processing elements comprises a memory-accessing dataflow operator. The method may include providing a first type of processing element and a second, different type of processing element of the plurality of processing elements.

In yet another embodiment, an apparatus includes a data path network between a plurality of processing elements; and a flow control path network between the plurality of processing elements, wherein the data path network and the flow control path network are to receive an input of a dataflow graph comprising a plurality of nodes, the dataflow graph is to be overlaid into the data path network, the flow control path network, and the plurality of processing elements with each node represented as a dataflow operator in the plurality of processing elements, and the plurality of processing elements are to perform a second operation by a respective, incoming operand set arriving at each of the dataflow operators of the plurality of processing elements. The flow control path network may carry backpressure signals to a plurality of dataflow operators according to the dataflow graph. A dataflow token sent on the data path network to a dataflow operator may cause an output from the dataflow operator to be sent to an input buffer of a particular processing element of the plurality of processing elements on the data path network. The data path network may be a static, circuit switched network to carry the respective, input operand set to each of the dataflow operators according to the dataflow graph. The flow control path network may transmit a backpressure signal according to the dataflow graph from a downstream processing element to indicate that storage in the downstream processing element is not available for an output of the processing element. At least one data path of the data path network and at least one flow control path of the flow control path network may form a channelized circuit with backpressure control. The flow control path network may pipeline at least two of the plurality of processing elements in series.

In another embodiment, a method includes receiving an input of a dataflow graph comprising a plurality of nodes; and overlaying the dataflow graph into a plurality of processing elements of a processor, a data path network between the plurality of processing elements, and a flow control path network between the plurality of processing elements with each node represented as a dataflow operator in the plurality of processing elements. The method may include carrying backpressure signals with the flow control path network to a plurality of dataflow operators according to the dataflow graph. The method may include sending a dataflow token on the data path network to a dataflow operator to cause an output from the dataflow operator to be sent to an input buffer of a particular processing element of the plurality of processing elements on the data path network. The method may include setting a plurality of switches of the data path network and/or a plurality of switches of the flow control path network to carry the respective, input operand set to each of the dataflow operators according to the dataflow graph, wherein the data path network is a static, circuit switched network. The method may include transmitting a backpressure signal with the flow control path network according to the dataflow graph from a downstream processing element to indicate that storage in the downstream processing element is not available for an output of the processing element. The method may include forming a channelized circuit with backpressure control with at least one data path of the data path network and at least one flow control path of the flow control path network.

In yet another embodiment, a processor includes a core with a decoder to decode an instruction into a decoded instruction and an execution unit to execute the decoded instruction to perform a first operation; a plurality of processing elements; and a network means between the plurality of processing elements to receive an input of a dataflow graph comprising a plurality of nodes, wherein the dataflow graph is to be overlaid into the network means and the plurality of processing elements with each node represented as a dataflow operator in the plurality of processing elements, and the plurality of processing elements are to perform a second operation by a respective, incoming operand set arriving at each of the dataflow operators of the plurality of processing elements.

In another embodiment, an apparatus includes a data path means between a plurality of processing elements; and a flow control path means between the plurality of processing elements, wherein the data path means and the flow control path means are to receive an input of a dataflow graph comprising a plurality of nodes, the dataflow graph is to be overlaid into the data path means, the flow control path means, and the plurality of processing elements with each node represented as a dataflow operator in the plurality of processing elements, and the plurality of processing elements are to perform a second operation by a respective, incoming operand set arriving at each of the dataflow operators of the plurality of processing elements.

In one embodiment, a processor includes a core with a decoder to decode an instruction into a decoded instruction and an execution unit to execute the decoded instruction to perform a first operation; and an array of processing elements to receive an input of a dataflow graph comprising a plurality of nodes, wherein the dataflow graph is to be overlaid into the array of processing elements with each node represented as a dataflow operator in the array of processing elements, and the array of processing elements is to perform a second operation when an incoming operand set arrives at the array of processing elements. The array of processing element may not perform the second operation until the incoming operand set arrives at the array of processing elements and storage in the array of processing elements is available for output of the second operation. The array of processing elements may include a network (or channel(s)) to carry dataflow tokens and control tokens to a plurality of dataflow operators. The second operation may include a memory access and the array of processing elements may include a memory-accessing dataflow operator that is not to perform the memory access until receiving a memory dependency token from a logically previous dataflow operator. Each processing element may perform only one or two operations of the dataflow graph.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing elements may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing element may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In another embodiment, a processor includes a core with a decoder to decode an instruction into a decoded instruction and an execution unit to execute the decoded instruction to perform a first operation; and means to receive an input of a dataflow graph comprising a plurality of nodes, wherein the dataflow graph is to be overlaid into the means with each node represented as a dataflow operator in the means, and the means is to perform a second operation when an incoming operand set arrives at the means.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements is to perform a second operation when an incoming operand set arrives at the plurality of processing elements. The processor may further comprise a plurality of configuration controllers, each configuration controller is coupled to a respective subset of the plurality of processing elements, and each configuration controller is to load configuration information from storage and cause coupling of the respective subset of the plurality of processing elements according to the configuration information. The processor may include a plurality of configuration caches, and each configuration controller is coupled to a respective configuration cache to fetch the configuration information for the respective subset of the plurality of processing elements. The first operation performed by the execution unit may prefetch configuration information into each of the plurality of configuration caches. Each of the plurality of configuration controllers may include a reconfiguration circuit to cause a reconfiguration for at least one processing element of the respective subset of the plurality of processing elements on receipt of a configuration error message from the at least one processing element. Each of the plurality of configuration controllers may a reconfiguration circuit to cause a reconfiguration for the respective subset of the plurality of processing elements on receipt of a reconfiguration request message, and disable communication with the respective subset of the plurality of processing elements until the reconfiguration is complete. The processor may include a plurality of exception aggregators, and each exception aggregator is coupled to a respective subset of the plurality of processing elements to collect exceptions from the respective subset of the plurality of processing elements and forward the exceptions to the core for servicing. The processor may include a plurality of extraction controllers, each extraction controller is coupled to a respective subset of the plurality of processing elements, and each extraction controller is to cause state data from the respective subset of the plurality of processing elements to be saved to memory.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In another embodiment, a processor includes a core with a decoder to decode an instruction into a decoded instruction and an execution unit to execute the decoded instruction to perform a first operation; a plurality of processing elements; and means between the plurality of processing elements to receive an input of a dataflow graph comprising a plurality of nodes, wherein the dataflow graph is to be overlaid into the m and the plurality of processing elements with each node represented as a dataflow operator in the plurality of processing elements, and the plurality of processing elements is to perform a second operation when an incoming operand set arrives at the plurality of processing elements.

In one embodiment, an apparatus (e.g., a processor) includes: a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a translation lookaside buffer manager circuit comprising a higher level translation lookaside buffer than the plurality of translation lookaside buffers, the translation lookaside buffer manager circuit to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The translation lookaside buffer manager circuit may simultaneously, with the first page walk, perform a second page walk in the cache memory, wherein the second page walk is for a miss of an input of a virtual address into a second translation lookaside buffer and into the higher level translation lookaside buffer to determine a physical address mapped to the virtual address, store a mapping of the virtual address to the physical address from the second page walk in the higher level translation lookaside buffer to cause the higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the cache memory. The translation lookaside buffer manager circuit may insert an indicator in the higher level translation lookaside buffer for the miss of the input of the virtual address in the first translation lookaside buffer and the higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in the higher level translation lookaside buffer, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in the higher level translation lookaside buffer, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, a method includes overlaying an input of a dataflow graph comprising a plurality of nodes into a spatial array of processing elements comprising a communications network with each node represented as a dataflow operator in the spatial array of processing elements; coupling a plurality of request address file circuits to the spatial array of processing elements and a cache memory with each request address file circuit of the plurality of request address file circuits accessing data in the cache memory in response to a request for data access from the spatial array of processing elements; providing an output of a physical address for an input of a virtual address into a translation lookaside buffer of a plurality of translation lookaside buffers comprising a translation lookaside buffer in each of the plurality of request address file circuits; coupling a translation lookaside buffer manager circuit comprising a higher level translation lookaside buffer than the plurality of translation lookaside buffers to the plurality of request address file circuits and the cache memory; and performing a first page walk in the cache memory for a miss of an input of a virtual address into a first translation lookaside buffer and into the higher level translation lookaside buffer with the translation lookaside buffer manager circuit to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The method may include simultaneously, with the first page walk, performing a second page walk in the cache memory with the translation lookaside buffer manager circuit, wherein the second page walk is for a miss of an input of a virtual address into a second translation lookaside buffer and into the higher level translation lookaside buffer to determine a physical address mapped to the virtual address, and storing a mapping of the virtual address to the physical address from the second page walk in the higher level translation lookaside buffer to cause the higher level translation lookaside buffer to send the physical address to the second translation lookaside buffer in a second request address file circuit. The method may include causing the first request address file circuit to perform a data access for the request for data access from the spatial array of processing elements on the physical address in the cache memory in response to receipt of the physical address in the first translation lookaside buffer. The method may include inserting, with the translation lookaside buffer manager circuit, an indicator in the higher level translation lookaside buffer for the miss of the input of the virtual address in the first translation lookaside buffer and the higher level translation lookaside buffer to prevent an additional page walk for the input of the virtual address during the first page walk. The method may include receiving, with the translation lookaside buffer manager circuit, a shootdown message from a requesting entity for a mapping of a physical address to a virtual address, invalidating the mapping in the higher level translation lookaside buffer, and sending shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The method may include receiving, with the translation lookaside buffer manager circuit, a shootdown message from a requesting entity for a mapping of a physical address to a virtual address, invalidate the mapping in the higher level translation lookaside buffer, and sending shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, an apparatus includes a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a translation lookaside buffer manager circuit to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The translation lookaside buffer manager circuit may simultaneously, with the first page walk, perform a second page walk in the plurality of cache memory banks, wherein the second page walk is for a miss of an input of a virtual address into a second translation lookaside buffer and into a second higher level translation lookaside buffer to determine a physical address mapped to the virtual address, store a mapping of the virtual address to the physical address from the second page walk in the second higher level translation lookaside buffer to cause the second higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the plurality of cache memory banks. The translation lookaside buffer manager circuit may insert an indicator in the first higher level translation lookaside buffer for the miss of the input of the virtual address in the first translation lookaside buffer and the first higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in a higher level translation lookaside buffer storing the mapping, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in a higher level translation lookaside buffer storing the mapping, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In yet another embodiment, a method includes: overlaying an input of a dataflow graph comprising a plurality of nodes into a spatial array of processing elements comprising a communications network with each node represented as a dataflow operator in the spatial array of processing elements; coupling a plurality of request address file circuits to the spatial array of processing elements and a plurality of cache memory banks with each request address file circuit of the plurality of request address file circuits accessing data in the plurality of cache memory banks in response to a request for data access from the spatial array of processing elements; providing an output of a physical address for an input of a virtual address into a translation lookaside buffer of a plurality of translation lookaside buffers comprising a translation lookaside buffer in each of the plurality of request address file circuits; providing an output of a physical address for an input of a virtual address into a higher level, than the plurality of translation lookaside buffers, translation lookaside buffer of a plurality of higher level translation lookaside buffers comprising a higher level translation lookaside buffer in each of the plurality of cache memory banks; coupling a translation lookaside buffer manager circuit to the plurality of request address file circuits and the plurality of cache memory banks; and performing a first page walk in the plurality of cache memory banks for a miss of an input of a virtual address into a first translation lookaside buffer and into a first higher level translation lookaside buffer with the translation lookaside buffer manager circuit to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The method may include simultaneously, with the first page walk, performing a second page walk in the plurality of cache memory banks with the translation lookaside buffer manager circuit, wherein the second page walk is for a miss of an input of a virtual address into a second translation lookaside buffer and into a second higher level translation lookaside buffer to determine a physical address mapped to the virtual address, and storing a mapping of the virtual address to the physical address from the second page walk in the second higher level translation lookaside buffer to cause the second higher level translation lookaside buffer to send the physical address to the second translation lookaside buffer in a second request address file circuit. The method may include causing the first request address file circuit to perform a data access for the request for data access from the spatial array of processing elements on the physical address in the plurality of cache memory banks in response to receipt of the physical address in the first translation lookaside buffer. The method may include inserting, with the translation lookaside buffer manager circuit, an indicator in the first higher level translation lookaside buffer for the miss of the input of the virtual address in the first translation lookaside buffer and the first higher level translation lookaside buffer to prevent an additional page walk for the input of the virtual address during the first page walk. The method may include receiving, with the translation lookaside buffer manager circuit, a shootdown message from a requesting entity for a mapping of a physical address to a virtual address, invalidating the mapping in a higher level translation lookaside buffer storing the mapping, and sending shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The method may include receiving, with the translation lookaside buffer manager circuit, a shootdown message from a requesting entity for a mapping of a physical address to a virtual address, invalidate the mapping in a higher level translation lookaside buffer storing the mapping, and sending shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, a system includes a core with a decoder to decode an instruction into a decoded instruction and an execution unit to execute the decoded instruction to perform a first operation; a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform a second operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a translation lookaside buffer manager circuit comprising a higher level translation lookaside buffer than the plurality of translation lookaside buffers, the translation lookaside buffer manager circuit to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The translation lookaside buffer manager circuit may simultaneously, with the first page walk, perform a second page walk in the cache memory, wherein the second page walk is for a miss of an input of a virtual address into a second translation lookaside buffer and into the higher level translation lookaside buffer to determine a physical address mapped to the virtual address, store a mapping of the virtual address to the physical address from the second page walk in the higher level translation lookaside buffer to cause the higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the cache memory. The translation lookaside buffer manager circuit may insert an indicator in the higher level translation lookaside buffer for the miss of the input of the virtual address in the first translation lookaside buffer and the higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in the higher level translation lookaside buffer, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in the higher level translation lookaside buffer, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In yet another embodiment, a system includes a core with a decoder to decode an instruction into a decoded instruction and an execution unit to execute the decoded instruction to perform a first operation; a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform a second operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a translation lookaside buffer manager circuit to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The translation lookaside buffer manager circuit may simultaneously, with the first page walk, perform a second page walk in the plurality of cache memory banks, wherein the second page walk is for a miss of an input of a virtual address into a second translation lookaside buffer and into a second higher level translation lookaside buffer to determine a physical address mapped to the virtual address, store a mapping of the virtual address to the physical address from the second page walk in the second higher level translation lookaside buffer to cause the second higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the plurality of cache memory banks. The translation lookaside buffer manager circuit may insert an indicator in the first higher level translation lookaside buffer for the miss of the input of the virtual address in the first translation lookaside buffer and the first higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in a higher level translation lookaside buffer storing the mapping, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in a higher level translation lookaside buffer storing the mapping, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, an apparatus (e.g., a processor) includes: a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a means comprising a higher level translation lookaside buffer than the plurality of translation lookaside buffers, the means to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit.

In yet another embodiment, an apparatus includes a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a means to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit.

In another embodiment, an apparatus comprises a data storage device that stores code that when executed by a hardware processor causes the hardware processor to perform any method disclosed herein. An apparatus may be as described in the detailed description. A method may be as described in the detailed description.

In yet another embodiment, a non-transitory machine readable medium that stores code that when executed by a machine causes the machine to perform a method comprising any method disclosed herein.

An instruction set (e.g., for execution by a core) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 74A:
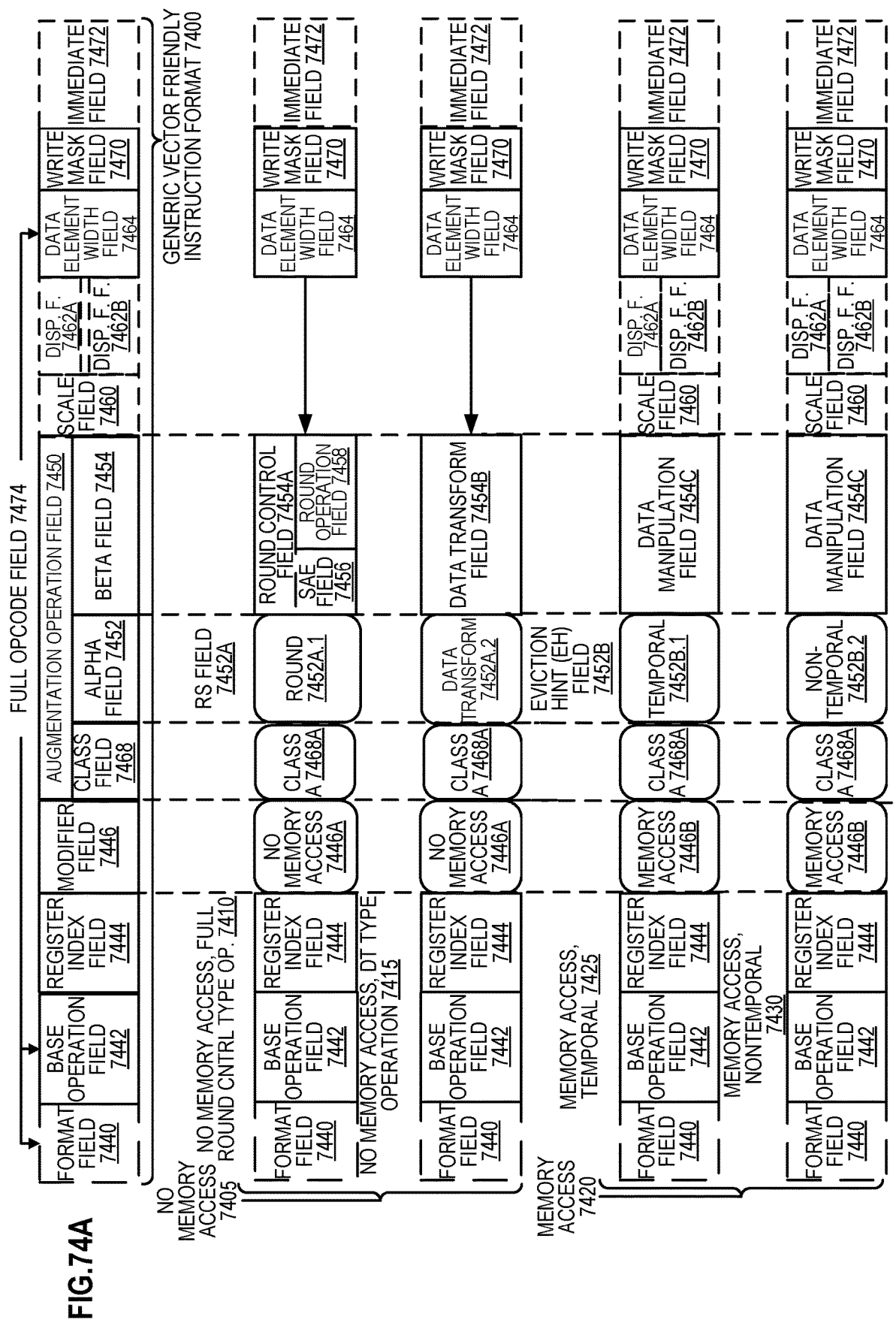
FIG. 74A is a block diagram illustrating a generic vector friendly instruction format and class A instruction templates thereof according to embodiments of the disclosure.
Figure 74B:
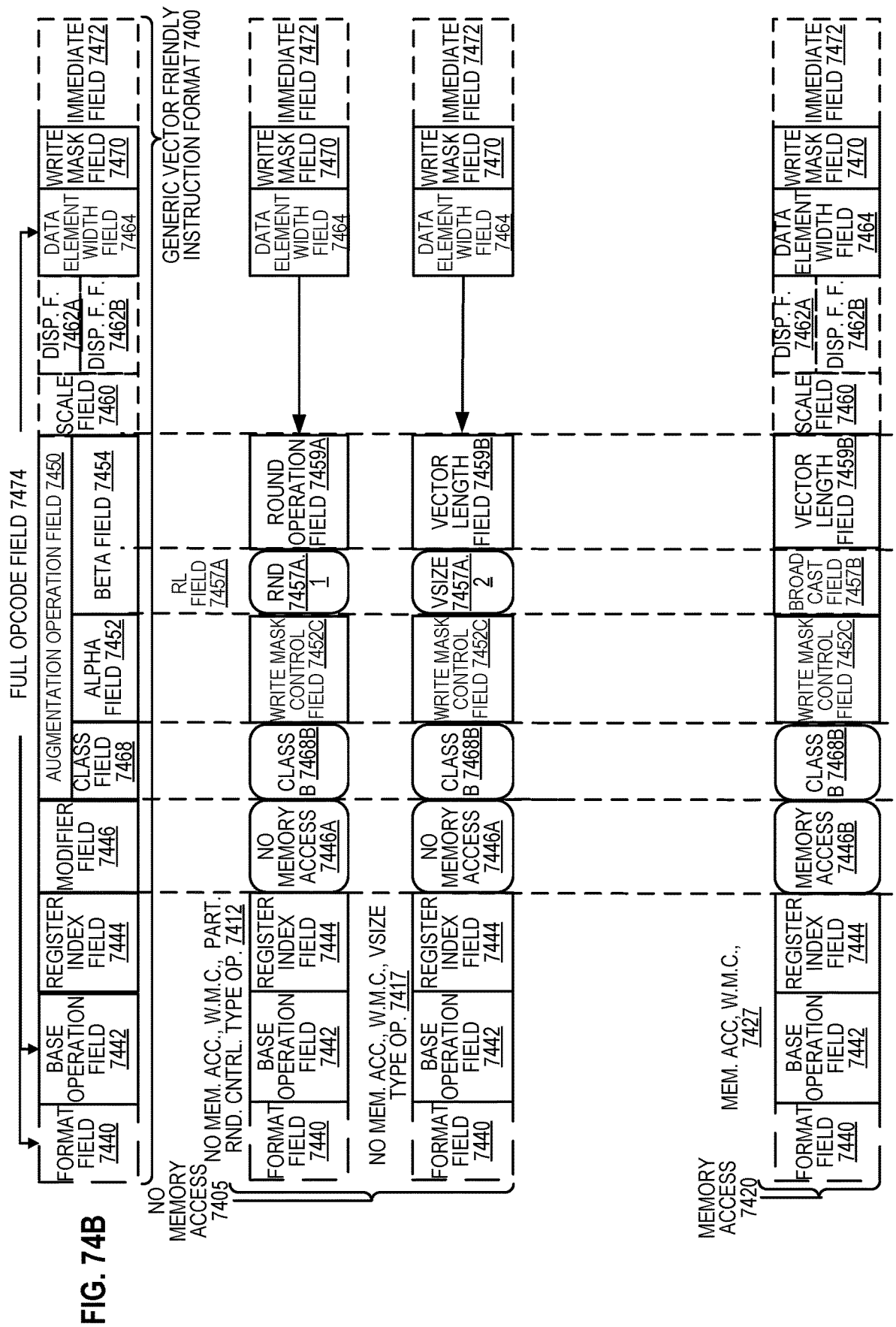
FIG. 74B is a block diagram illustrating the generic vector friendly instruction format and class B instruction templates thereof according to embodiments of the disclosure.

FIGS. 74A-74B are block diagrams illustrating a generic vector friendly instruction format and instruction templates thereof according to embodiments of the disclosure. FIG. 74A is a block diagram illustrating a generic vector friendly instruction format and class A instruction templates thereof according to embodiments of the disclosure; while FIG. 74B is a block diagram illustrating the generic vector friendly instruction format and class B instruction templates thereof according to embodiments of the disclosure. Specifically, a generic vector friendly instruction format 7400 for which are defined class A and class B instruction templates, both of which include no memory access 7405 instruction templates and memory access 7420 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 74A include: 1) within the no memory access 7405 instruction templates there is shown a no memory access, full round control type operation 7410 instruction template and a no memory access, data transform type operation 7415 instruction template; and 2) within the memory access 7420 instruction templates there is shown a memory access, temporal 7425 instruction template and a memory access, non-temporal 7430 instruction template. The class B instruction templates in FIG. 74B include: 1) within the no memory access 7405 instruction templates there is shown a no memory access, write mask control, partial round control type operation 7412 instruction template and a no memory access, write mask control, vsize type operation 7417 instruction template; and 2) within the memory access 7420 instruction templates there is shown a memory access, write mask control 7427 instruction template.

The generic vector friendly instruction format 7400 includes the following fields listed below in the order illustrated in FIGS. 74A-74B.

Format field 7440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 7442—its content distinguishes different base operations.

Register index field 7444—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 7446—its content distinguishes occurrences of instructions in the generic vector instruction format that specify memory access from those that do not; that is, between no memory access 7405 instruction templates and memory access 7420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 7450—its content distinguishes which one of a variety of different operations to be performed in addition to the base operation. This field is context specific. In one embodiment of the disclosure, this field is divided into a class field 7468, an alpha field 7452, and a beta field 7454. The augmentation operation field 7450 allows common groups of operations to be performed in a single instruction rather than 2, 3, or 4 instructions.

Scale field 7460—its content allows for the scaling of the index field's content for memory address generation (e.g., for address generation that uses $2^{scale}$*index+base).

Displacement Field 7462A—its content is used as part of memory address generation (e.g., for address generation that uses $2^{scale}$*index+base+displacement).

Displacement Factor Field 7462B (note that the juxtaposition of displacement field 7462A directly over displacement factor field 7462B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 7474 (described later herein) and the data manipulation field 7454C. The displacement field 7462A and the displacement factor field 7462B are optional in the sense that they are not used for the no memory access 7405 instruction templates and/or different embodiments may implement only one or none of the two.

Data element width field 7464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 7470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 7470 allows for partial vector operations, including loads, stores, arithmetic, logical, etc. While embodiments of the disclosure are described in which the write mask field's 7470 content selects one of a number of write mask registers that contains the write mask to be used (and thus the write mask field's 7470 content indirectly identifies that masking to be performed), alternative embodiments instead or additional allow the mask write field's 7470 content to directly specify the masking to be performed.

Immediate field 7472—its content allows for the specification of an immediate. This field is optional in the sense that is it not present in an implementation of the generic vector friendly format that does not support immediate and it is not present in instructions that do not use an immediate.

Class field 7468—its content distinguishes between different classes of instructions. With reference to FIGS. 74A-B, the contents of this field select between class A and class B instructions. In FIGS. 74A-B, rounded corner squares are used to indicate a specific value is present in a field (e.g., class A 7468A and class B 7468B for the class field 7468 respectively in FIGS. 74A-B).

Instruction Templates of Class A

In the case of the non-memory access 7405 instruction templates of class A, the alpha field 7452 is interpreted as an RS field 7452A, whose content distinguishes which one of the different augmentation operation types are to be performed (e.g., round 7452A.1 and data transform 7452A.2 are respectively specified for the no memory access, round type operation 7410 and the no memory access, data transform type operation 7415 instruction templates), while the beta field 7454 distinguishes which of the operations of the specified type is to be performed. In the no memory access

7405 instruction templates, the scale field 7460, the displacement field 7462A, and the displacement scale filed 7462B are not present.

No-Memory Access Instruction Templates—Full Round Control Type Operation

In the no memory access full round control type operation 7410 instruction template, the beta field 7454 is interpreted as a round control field 7454A, whose content(s) provide static rounding. While in the described embodiments of the disclosure the round control field 7454A includes a suppress all floating point exceptions (SAE) field 7456 and a round operation control field 7458, alternative embodiments may support may encode both these concepts into the same field or only have one or the other of these concepts/fields (e.g., may have only the round operation control field 7458).

SAE field 7456—its content distinguishes whether or not to disable the exception event reporting; when the SAE field's 7456 content indicates suppression is enabled, a given instruction does not report any kind of floating-point exception flag and does not raise any floating point exception handler.

Round operation control field 7458—its content distinguishes which one of a group of rounding operations to perform (e.g., Round-up, Round-down, Round-towards-zero and Round-to-nearest). Thus, the round operation control field 7458 allows for the changing of the rounding mode on a per instruction basis. In one embodiment of the disclosure where a processor includes a control register for specifying rounding modes, the round operation control field's 7450 content overrides that register value.

No Memory Access Instruction Templates—Data Transform Type Operation

In the no memory access data transform type operation 7415 instruction template, the beta field 7454 is interpreted as a data transform field 7454B, whose content distinguishes which one of a number of data transforms is to be performed (e.g., no data transform, swizzle, broadcast).

In the case of a memory access 7420 instruction template of class A, the alpha field 7452 is interpreted as an eviction hint field 7452B, whose content distinguishes which one of the eviction hints is to be used (in FIG. 74A, temporal 7452B.1 and non-temporal 7452B.2 are respectively specified for the memory access, temporal 7425 instruction template and the memory access, non-temporal 7430 instruction template), while the beta field 7454 is interpreted as a data manipulation field 7454C, whose content distinguishes which one of a number of data manipulation operations (also known as primitives) is to be performed (e.g., no manipulation; broadcast; up conversion of a source; and down conversion of a destination). The memory access 7420 instruction templates include the scale field 7460, and optionally the displacement field 7462A or the displacement scale field 7462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 7452 is interpreted as a write mask control (Z) field 7452C, whose content distinguishes whether the write masking controlled by the write mask field 7470 should be a merging or a zeroing.

In the case of the non-memory access 7405 instruction templates of class B, part of the beta field 7454 is interpreted as an RL field 7457A, whose content distinguishes which one of the different augmentation operation types are to be performed (e.g., round 7457A.1 and vector length (VSIZE) 7457A.2 are respectively specified for the no memory access, write mask control, partial round control type operation 7412 instruction template and the no memory access, write mask control, VSIZE type operation 7417 instruction template), while the rest of the beta field 7454 distinguishes which of the operations of the specified type is to be performed. In the no memory access 7405 instruction templates, the scale field 7460, the displacement field 7462A, and the displacement scale filed 7462B are not present.

In the no memory access, write mask control, partial round control type operation 7410 instruction template, the rest of the beta field 7454 is interpreted as a round operation field 7459A and exception event reporting is disabled (a given instruction does not report any kind of floating-point exception flag and does not raise any floating point exception handler).

Round operation control field 7459A—just as round operation control field 7458, its content distinguishes which one of a group of rounding operations to perform (e.g., Round-up, Round-down, Round-towards-zero and Round-to-nearest). Thus, the round operation control field 7459A allows for the changing of the rounding mode on a per instruction basis. In one embodiment of the disclosure where a processor includes a control register for specifying rounding modes, the round operation control field's 7450 content overrides that register value.

In the no memory access, write mask control, VSIZE type operation 7417 instruction template, the rest of the beta field 7454 is interpreted as a vector length field 7459B, whose content distinguishes which one of a number of data vector lengths is to be performed on (e.g., 128, 256, or 512 byte).

In the case of a memory access 7420 instruction template of class B, part of the beta field 7454 is interpreted as a broadcast field 7457B, whose content distinguishes whether or not the broadcast type data manipulation operation is to be performed, while the rest of the beta field 7454 is interpreted the vector length field 7459B. The memory access 7420 instruction templates include the scale field 7460, and optionally the displacement field 7462A or the displacement scale field 7462B.

With regard to the generic vector friendly instruction format 7400, a full opcode field 7474 is shown including the format field 7440, the base operation field 7442, and the data element width field 7464. While one embodiment is shown where the full opcode field 7474 includes all of these fields, the full opcode field 7474 includes less than all of these fields in embodiments that do not support all of them. The full opcode field 7474 provides the operation code (opcode).

The augmentation operation field 7450, the data element width field 7464, and the write mask field 7470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support a different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 75 is a block diagram illustrating an exemplary specific vector friendly instruction format according to embodiments of the disclosure. FIG. 75 shows a specific vector friendly instruction format 7500 that is specific in the sense that it specifies the location, size, interpretation, and order of the fields, as well as values for some of those fields. The specific vector friendly instruction format 7500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 74 into which the fields from FIG. 75 map are illustrated.

It should be understood that, although embodiments of the disclosure are described with reference to the specific vector friendly instruction format 7500 in the context of the generic vector friendly instruction format 7400 for illustrative purposes, the disclosure is not limited to the specific vector friendly instruction format 7500 except where claimed. For example, the generic vector friendly instruction format 7400 contemplates a variety of possible sizes for the various fields, while the specific vector friendly instruction format 7500 is shown as having fields of specific sizes. By way of specific example, while the data element width field 7464 is illustrated as a one bit field in the specific vector friendly instruction format 7500, the disclosure is not so limited (that is, the generic vector friendly instruction format 7400 contemplates other sizes of the data element width field 7464).

The generic vector friendly instruction format 7400 includes the following fields listed below in the order illustrated in FIG. 75A.

EVEX Prefix (Bytes 0-3) 7502—is encoded in a four-byte form.

Format Field 7440 (EVEX Byte 0, bits [7:0])—the first byte (EVEX Byte 0) is the format field 7440 and it contains 0x62 (the unique value used for distinguishing the vector friendly instruction format in one embodiment of the disclosure).

The second-fourth bytes (EVEX Bytes 1-3) include a number of bit fields providing specific capability.

REX field 7505 (EVEX Byte 1, bits [7-5])—consists of a EVEX.R bit field (EVEX Byte 1, bit [7]-R), EVEX.X bit field (EVEX byte 1, bit [6]-X), and 7457BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1311B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 7410—this is the first part of the REX' field 7410 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 7515 (EVEX byte 1, bits [3:0]-mmmm)—its content encodes an implied leading opcode byte (0F, 0F 38, or 0F 3).

Data element width field 7464 (EVEX byte 2, bit [7]-W)—is represented by the notation EVEX.W. EVEX.W is used to define the granularity (size) of the datatype (either 32-bit data elements or 64-bit data elements).

EVEX.vvvv 7520 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1311b. Thus, EVEX.vvvv field 7520 encodes the 4 low-order bits of the first source register specifier stored in inverted (1s complement) form. Depending on the instruction, an extra different EVEX bit field is used to extend the specifier size to 32 registers.

EVEX.U 7468 Class field (EVEX byte 2, bit [2]-U)—If EVEX.U=0, it indicates class A or EVEX.U0; if EVEX.U=1, it indicates class B or EVEX.U1.

Prefix encoding field 7525 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 7452 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 7454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 7410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 7470 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 7530 (Byte 4) is also known as the opcode byte. Part of the opcode is specified in this field.

MOD R/M Field 7540 (Byte 5) includes MOD field 7542, Reg field 7544, and R/M field 7546. As previously described, the MOD field's 7542 content distinguishes between memory access and non-memory access operations. The role of Reg field 7544 can be summarized to two situations: encoding either the destination register operand or a source register operand, or be treated as an opcode extension and not used to encode any instruction operand. The role of R/M field 7546 may include the following: encoding the instruction operand that references a memory address, or encoding either the destination register operand or a source register operand.

Scale, Index, Base (SIB) Byte (Byte 6)—As previously described, the scale field's 5450 content is used for memory address generation. SIB.xxx 7554 and SIB.bbb 7556—the contents of these fields have been previously referred to with regard to the register indexes Xxxx and Bbbb.

Displacement field 7462A (Bytes 7-10)—when MOD field 7542 contains 10, bytes 7-10 are the displacement field 7462A, and it works the same as the legacy 32-bit displacement (disp32) and works at byte granularity.

Displacement factor field 7462B (Byte 7)—when MOD field 7542 contains 01, byte 7 is the displacement factor field 7462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 7462B is a reinterpretation of disp8; when using displacement factor field 7462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 7462B substitutes the legacy x86 instruction set 8-bit displacement. Thus, the displacement factor field 7462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 7472 operates as previously described.

Full Opcode Field

FIG. 75B is a block diagram illustrating the fields of the specific vector friendly instruction format 7500 that make up the full opcode field 7474 according to one embodiment of the disclosure. Specifically, the full opcode field 7474 includes the format field 7440, the base operation field 7442, and the data element width (W) field 7464. The base operation field 7442 includes the prefix encoding field 7525, the opcode map field 7515, and the real opcode field 7530.

Register Index Field

FIG. 75C is a block diagram illustrating the fields of the specific vector friendly instruction format 7500 that make up the register index field 7444 according to one embodiment of the disclosure. Specifically, the register index field 7444 includes the REX field 7505, the REX' field 7510, the MODR/M.reg field 7544, the MODR/M.r/m field 7546, the VVVV field 7520, xxx field 7554, and the bbb field 7556.

Augmentation Operation Field

Figure 75D:
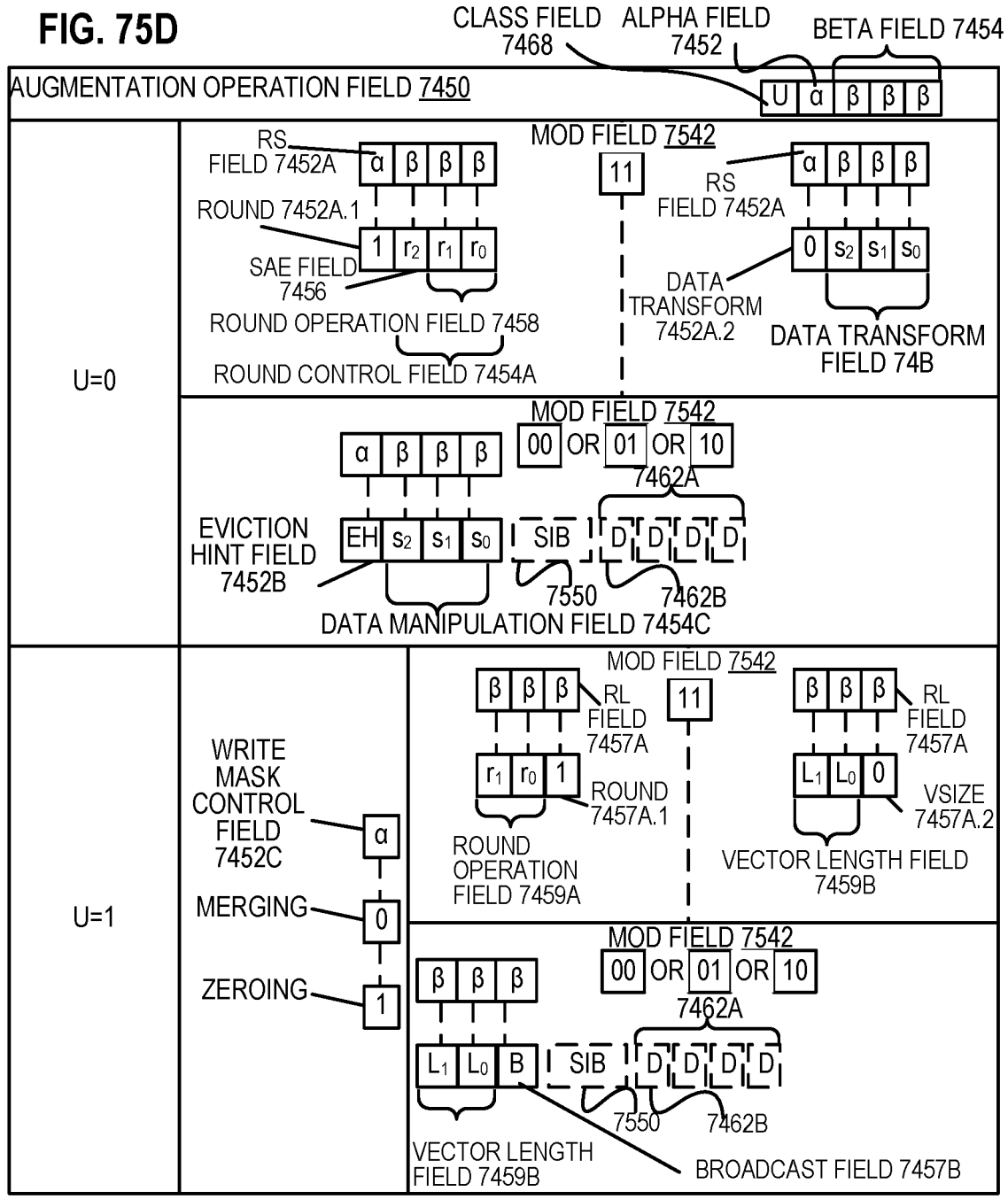
FIG. 75D is a block diagram illustrating the fields of the specific vector friendly instruction format in FIG. 75A that make up the augmentation operation field 7450 according to one embodiment of the disclosure.

FIG. 75D is a block diagram illustrating the fields of the specific vector friendly instruction format 7500 that make up the augmentation operation field 7450 according to one embodiment of the disclosure. When the class (U) field 7468 contains 0, it signifies EVEX.U0 (class A 7468A); when it contains 1, it signifies EVEX.U1 (class B 7468B). When U=0 and the MOD field 7542 contains 11 (signifying a no memory access operation), the alpha field 7452 (EVEX byte 3, bit [7]-EH) is interpreted as the rs field 7452A. When the rs field 7452A contains a 1 (round 7452A.1), the beta field 7454 (EVEX byte 3, bits [6:4]-SSS) is interpreted as the round control field 7454A. The round control field 7454A includes a one bit SAE field 7456 and a two bit round operation field 7458. When the rs field 7452A contains a 0 (data transform 7452A.2), the beta field 7454 (EVEX byte 3, bits [6:4]-SSS) is interpreted as a three bit data transform field 7454B. When U=0 and the MOD field 7542 contains 00, 01, or 10 (signifying a memory access operation), the alpha field 7452 (EVEX byte 3, bit [7]-EH) is interpreted as the eviction hint (EH) field 7452B and the beta field 7454 (EVEX byte 3, bits [6:4]-SSS) is interpreted as a three bit data manipulation field 7454C.

When U=1, the alpha field 7452 (EVEX byte 3, bit [7]-EH) is interpreted as the write mask control (Z) field 7452C. When U=1 and the MOD field 7542 contains 11 (signifying a no memory access operation), part of the beta field 7454 (EVEX byte 3, bit [4]-$S_0$) is interpreted as the RL field 7457A; when it contains a 1 (round 7457A.1) the rest of the beta field 7454 (EVEX byte 3, bit [6-5]-$S_{2-1}$) is interpreted as the round operation field 7459A, while when the RL field 7457A contains a 0 (VSIZE 7457.A2) the rest of the beta field 7454 (EVEX byte 3, bit [6-5]-$S_{2-1}$) is interpreted as the vector length field 7459B (EVEX byte 3, bit [6-5]-$L_{1-0}$). When U=1 and the MOD field 7542 contains 00, 01, or 10 (signifying a memory access operation), the beta field 7454 (EVEX byte 3, bits [6:4]-SSS) is interpreted as the vector length field 7459B (EVEX byte 3, bit [6-5]-$L_{1-0}$) and the broadcast field 7457B (EVEX byte 3, bit [4]-B).

Exemplary Register Architecture

Figure 76:
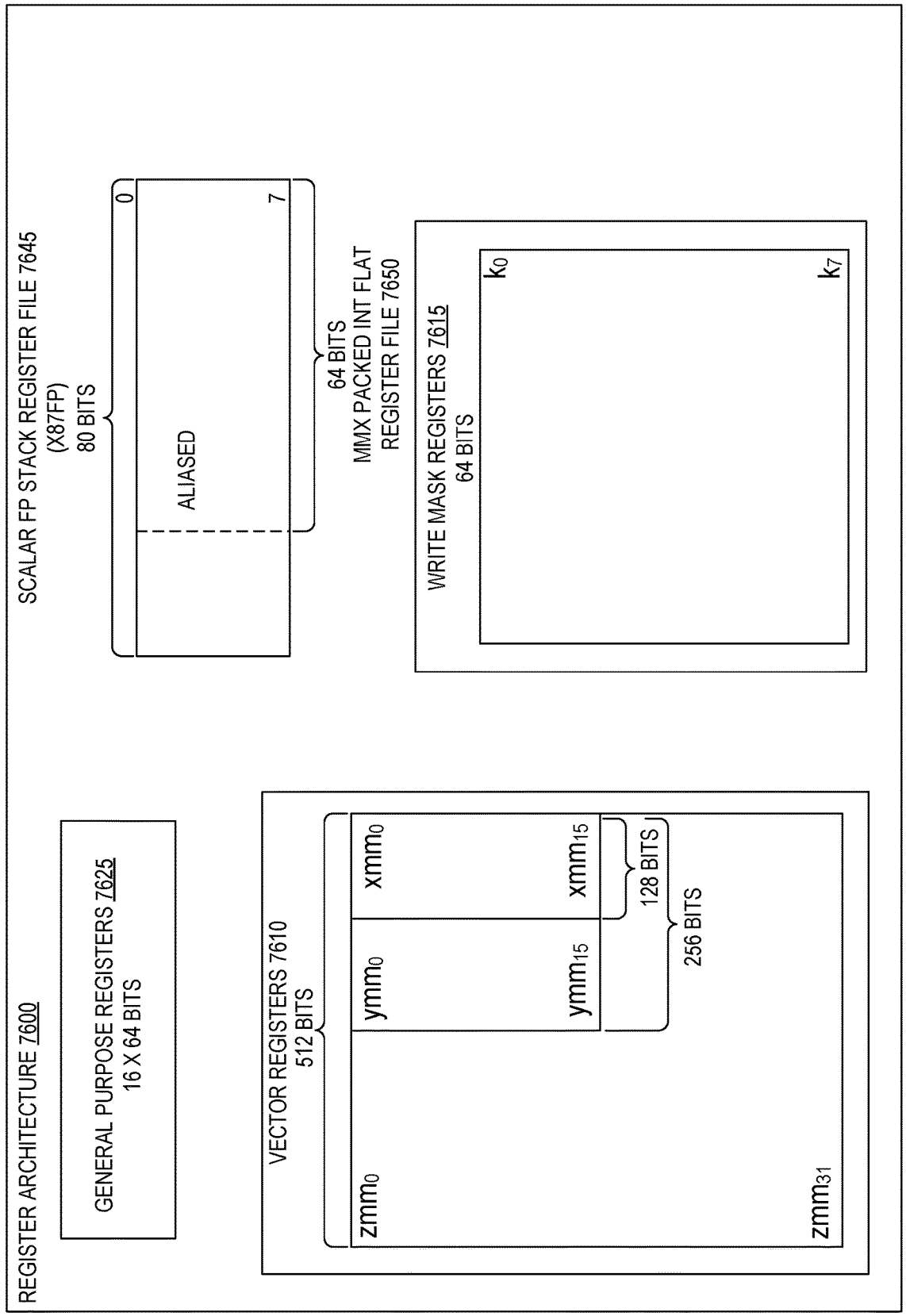
FIG. 76 is a block diagram of a register architecture according to one embodiment of the disclosure

FIG. 76 is a block diagram of a register architecture 7600 according to one embodiment of the disclosure. In the embodiment illustrated, there are 32 vector registers 7610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 7500 operates on these overlaid register file as illustrated in the below tables.

| Adjustable Vector Length | Class | Operations | Registers |
| --- | --- | --- | --- |
| Instruction Templates that do not include the vector length field 7459B | A (FIG. 74A; U = 0) | 5410, 7415, 7425, 7430 | zmm registers (the vector length is 64 byte) |
| | B (FIG. 74B; U = 1) | 5412 | zmm registers (the vector length is 64 byte) |
| Instruction templates that do include the vector length field 7459B | B (FIG. 74B; U = 1) | 5417, 7427 | zmm, ymm, or xmm registers (the vector length is 64 byte, 32 byte, or 16 byte) depending on the vector length field 7459B |

In other words, the vector length field 7459B selects between a maximum length and one or more other shorter lengths, where each such shorter length is half the length of the preceding length; and instructions templates without the vector length field 7459B operate on the maximum vector length. Further, in one embodiment, the class B instruction templates of the specific vector friendly instruction format 7500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 7615—in the embodiment illustrated, there are 8 write mask registers (k0 through k7), each 64 bits in size. In an alternate embodiment, the write mask registers 7615 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 7625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 7645, on which is aliased the MMX packed integer flat register file 7650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 77A is a block diagram illustrating both an exemplary in-order pipeline and an exemplary register renaming, out-of-order issue/execution pipeline according to embodiments of the disclosure. FIG. 77B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 77A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 77A, a processor pipeline 7700 includes a fetch stage 7702, a length decode stage 7704, a decode stage 7706, an allocation stage 7708, a renaming stage 7710, a scheduling (also known as a dispatch or issue) stage 7712, a register read/memory read stage 7714, an execute stage 7716, a write back/memory write stage 7718, an exception handling stage 7722, and a commit stage 7724.

FIG. 77B shows processor core 7790 including a front end unit 7730 coupled to an execution engine unit 7750, and both are coupled to a memory unit 7770. The core 7790 may be a reduced instruction set computing (RISC) core, a complex instruction set computing (CISC) core, a very long instruction word (VLIW) core, or a hybrid or alternative core type. As yet another option, the core 7790 may be a special-purpose core, such as, for example, a network or communication core, compression engine, coprocessor core, general purpose computing graphics processing unit (GPGPU) core, graphics core, or the like.

The front end unit 7730 includes a branch prediction unit 7732 coupled to an instruction cache unit 7734, which is coupled to an instruction translation lookaside buffer (TLB) 7736, which is coupled to an instruction fetch unit 7738, which is coupled to a decode unit 7740. The decode unit 7740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 7740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 7790 includes a microcode ROM or other medium that stores microcode for certain macro-instructions (e.g., in decode unit 7740 or otherwise within the front end unit 7730). The decode unit 7740 is coupled to a rename/allocator unit 7752 in the execution engine unit 7750.

The execution engine unit 7750 includes the rename/allocator unit 7752 coupled to a retirement unit 7754 and a set of one or more scheduler unit(s) 7756. The scheduler unit(s) 7756 represents any number of different schedulers, including reservations stations, central instruction window, etc. The scheduler unit(s) 7756 is coupled to the physical register file(s) unit(s) 7758. Each of the physical register file(s) units 7758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 7758 comprises a vector registers unit, a write mask registers unit, and a scalar registers unit. These register units may provide architectural vector registers, vector mask registers, and general purpose registers. The physical register file(s) unit(s) 7758 is overlapped by the retirement unit 7754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 7754 and the physical register file(s) unit(s) 7758 are coupled to the execution cluster(s) 7760. The execution cluster(s) 7760 includes a set of one or more execution units 7762 and a set of one or more memory access units 7764. The execution units 7762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 7756, physical register file(s) unit(s) 7758, and execution cluster(s) 7760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 7764). It should also be understood that where separate pipelines are used, one or more of these pipelines may be out-of-order issue/execution and the rest in-order.

The set of memory access units 7764 is coupled to the memory unit 7770, which includes a data TLB unit 7772 coupled to a data cache unit 7774 coupled to a level 2 (L2) cache unit 7776. In one exemplary embodiment, the memory access units 7764 may include a load unit, a store address unit, and a store data unit, each of which is coupled to the data TLB unit 7772 in the memory unit 7770. The instruction cache unit 7734 is further coupled to a level 2 (L2) cache unit 7776 in the memory unit 7770. The L2 cache unit 7776 is coupled to one or more other levels of cache and eventually to a main memory.

By way of example, the exemplary register renaming, out-of-order issue/execution core architecture may implement the pipeline 7700 as follows: 1) the instruction fetch 7738 performs the fetch and length decoding stages 7702 and 7704; 2) the decode unit 7740 performs the decode stage 7706; 3) the rename/allocator unit 7752 performs the allocation stage 7708 and renaming stage 7710; 4) the scheduler unit(s) 7756 performs the schedule stage 7712; 5) the physical register file(s) unit(s) 7758 and the memory unit 7770 perform the register read/memory read stage 7714; the execution cluster 7760 perform the execute stage 7716; 6) the memory unit 7770 and the physical register file(s) unit(s) 7758 perform the write back/memory write stage 7718; 7) various units may be involved in the exception handling stage 7722; and 8) the retirement unit 7754 and the physical register file(s) unit(s) 7758 perform the commit stage 7724.

The core 7790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 7790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 7734/7774 and a shared L2 cache unit 7776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 78B:
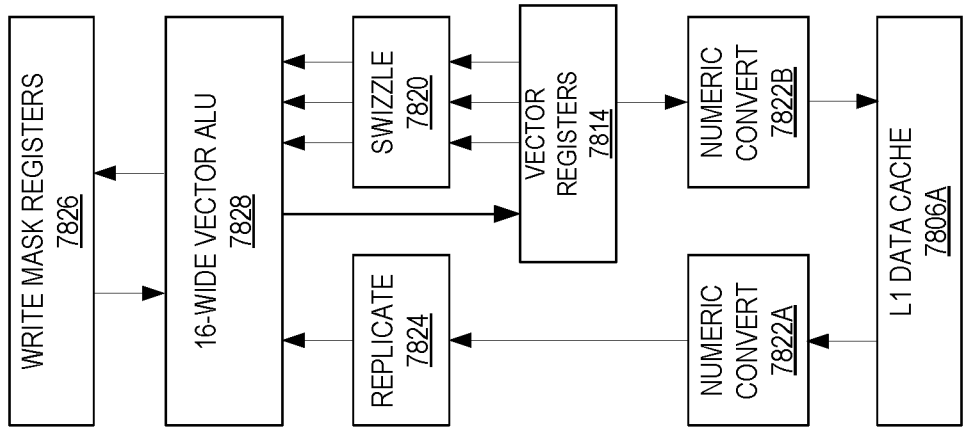
FIG. 78B is an expanded view of part of the processor core in FIG. 78A according to embodiments of the disclosure.
Figure 78A:
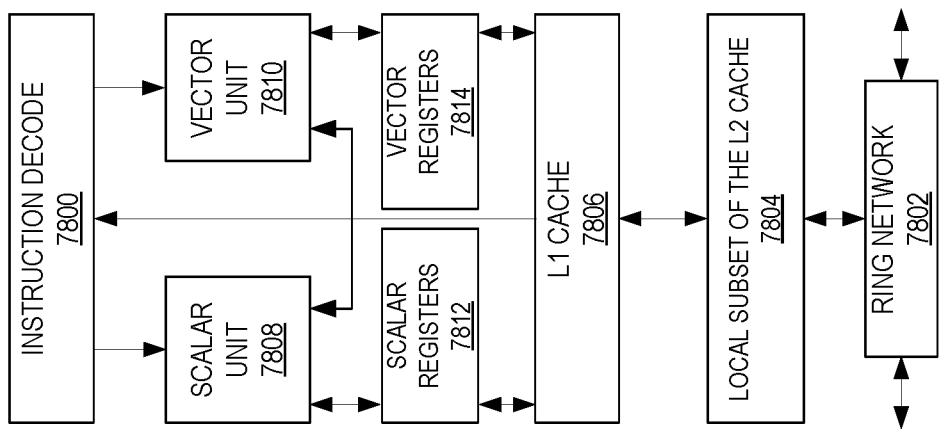
FIG. 78A is a block diagram of a single processor core, along with its connection to the on-die interconnect network and with its local subset of the Level 2 (L2) cache, according to embodiments of the disclosure.

FIGS. 78A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 78A is a block diagram of a single processor core, along with its connection to the on-die interconnect network 7802 and with its local subset of the Level 2 (L2) cache 7804, according to embodiments of the disclosure. In one embodiment, an instruction decode unit 7800 supports the x86 instruction set with a packed data instruction set extension. An L1 cache 7806 allows low-latency accesses to cache memory into the scalar and vector units. While in one embodiment (to simplify the design), a scalar unit 7808 and a vector unit 7810 use separate register sets (respectively, scalar registers 7812 and vector registers 7814) and data transferred between them is written to memory and then read back in from a level 1 (L1) cache 7806, alternative embodiments of the disclosure may use a different approach (e.g., use a single register set or include a communication path that allow data to be transferred between the two register files without being written and read back).

The local subset of the L2 cache 7804 is part of a global L2 cache that is divided into separate local subsets, one per processor core. Each processor core has a direct access path to its own local subset of the L2 cache 7804. Data read by a processor core is stored in its L2 cache subset 7804 and can be accessed quickly, in parallel with other processor cores accessing their own local L2 cache subsets. Data written by a processor core is stored in its own L2 cache subset 7804 and is flushed from other subsets, if necessary. The ring network ensures coherency for shared data. The ring network is bi-directional to allow agents such as processor cores, hf caches and other logic blocks to communicate with each other within the chip. Each ring data-path is 1012-bits wide per direction.

FIG. 78B is an expanded view of part of the processor core in FIG. 78A according to embodiments of the disclosure. FIG. 78B includes an L1 data cache 7806A part of the L1 cache 7804, as well as more detail regarding the vector unit 7810 and the vector registers 7814. Specifically, the vector unit 7810 is a 16-wide vector processing unit (VPU) (see the 16-wide ALU 7828), which executes one or more of integer, single-precision float, and double-precision float instructions. The VPU supports swizzling the register inputs with swizzle unit 7820, numeric conversion with numeric convert units 7822A-B, and replication with replication unit 7824 on the memory input. Write mask registers 7826 allow predicating resulting vector writes.

Figure 79:
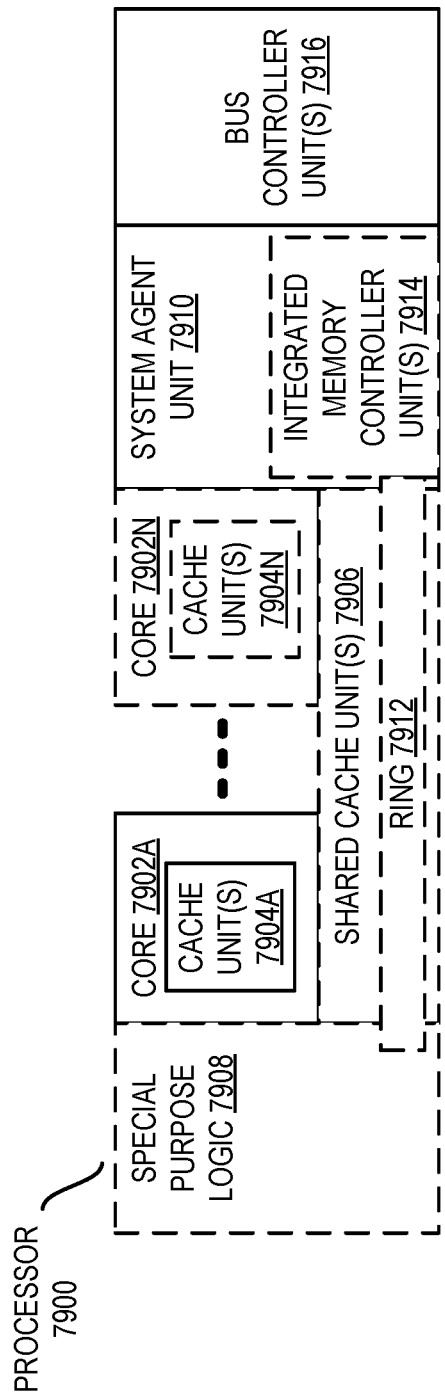
FIG. 79 is a block diagram of a processor that may have more than one core, may have an integrated memory controller, and may have integrated graphics according to embodiments of the disclosure.

FIG. 79 is a block diagram of a processor 7900 that may have more than one core, may have an integrated memory controller, and may have integrated graphics according to embodiments of the disclosure. The solid lined boxes in FIG. 79 illustrate a processor 7900 with a single core 7902A, a system agent 7910, a set of one or more bus controller units 7916, while the optional addition of the dashed lined boxes illustrates an alternative processor 7900 with multiple cores 7902A-N, a set of one or more integrated memory controller unit(s) 7914 in the system agent unit 7910, and special purpose logic 7908.

Thus, different implementations of the processor 7900 may include: 1) a CPU with the special purpose logic 7908 being integrated graphics and/or scientific (throughput) logic (which may include one or more cores), and the cores 7902A-N being one or more general purpose cores (e.g., general purpose in-order cores, general purpose out-of-order cores, a combination of the two); 2) a coprocessor with the cores 7902A-N being a large number of special purpose cores intended primarily for graphics and/or scientific (throughput); and 3) a coprocessor with the cores 7902A-N being a large number of general purpose in-order cores. Thus, the processor 7900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 7900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 7906, and external memory (not shown) coupled to the set of integrated memory controller units 7914. The set of shared cache units 7906 may include one or more mid-level caches, such as level 2 (L2), level 3 (L3), level 4 (L4), or other levels of cache, a last level cache (LLC), and/or combinations thereof. While in one embodiment a ring based interconnect unit 7912 interconnects the integrated graphics logic 7908, the set of shared cache units 7906, and the system agent unit 7910/integrated memory controller unit(s) 7914, alternative embodiments may use any number of well-known techniques for interconnecting such units. In one embodiment, coherency is maintained between one or more cache units 7906 and cores 7902-A-N.

In some embodiments, one or more of the cores 7902A-N are capable of multi-threading. The system agent 7910 includes those components coordinating and operating cores 7902A-N. The system agent unit 7910 may include for example a power control unit (PCU) and a display unit. The PCU may be or include logic and components needed for regulating the power state of the cores 7902A-N and the integrated graphics logic 7908. The display unit is for driving one or more externally connected displays.

The cores 7902A-N may be homogenous or heterogeneous in terms of architecture instruction set; that is, two or more of the cores 7902A-N may be capable of execution the same instruction set, while others may be capable of executing only a subset of that instruction set or a different instruction set.

Exemplary Computer Architectures

FIGS. 80-83 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 80:
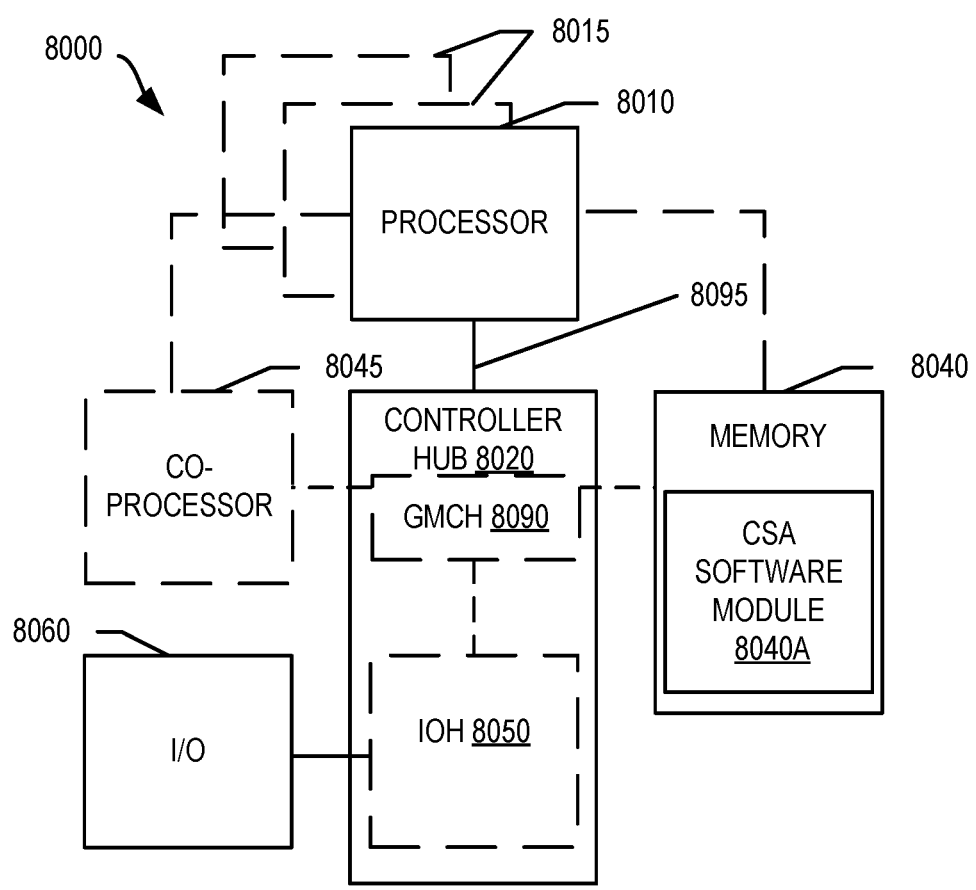
FIG. 80 is a block diagram of a system in accordance with one embodiment of the present disclosure.

Referring now to FIG. 80, shown is a block diagram of a system 8000 in accordance with one embodiment of the present disclosure. The system 8000 may include one or more processors 8010, 8015, which are coupled to a controller hub 8020. In one embodiment the controller hub 8020 includes a graphics memory controller hub (GMCH) 8090 and an Input/Output Hub (IOH) 8050 (which may be on separate chips); the GMCH 8090 includes memory and graphics controllers to which are coupled memory 8040 and a coprocessor 8045; the IOH 8050 is couples input/output (I/O) devices 8060 to the GMCH 8090. Alternatively, one or both of the memory and graphics controllers are integrated within the processor (as described herein), the memory 8040 and the coprocessor 8045 are coupled directly to the processor 8010, and the controller hub 8020 in a single chip with the IOH 8050. Memory 8040 may include a CSA software module 8040A, for example, to store code that when executed causes a processor to perform any method of this disclosure.

The optional nature of additional processors 8015 is denoted in FIG. 80 with broken lines. Each processor 8010, 8015 may include one or more of the processing cores described herein and may be some version of the processor 7900.

The memory 8040 may be, for example, dynamic random access memory (DRAM), phase change memory (PCM), or a combination of the two. For at least one embodiment, the controller hub 8020 communicates with the processor(s) 8010, 8015 via a multi-drop bus, such as a frontside bus (FSB), point-to-point interface such as QuickPath Interconnect (QPI), or similar connection 8095.

In one embodiment, the coprocessor 8045 is a special-purpose processor, such as, for example, a high-throughput MIC processor, a network or communication processor, compression engine, graphics processor, GPGPU, embedded processor, or the like. In one embodiment, controller hub 8020 may include an integrated graphics accelerator.

There can be a variety of differences between the physical resources 8010, 8015 in terms of a spectrum of metrics of merit including architectural, microarchitectural, thermal, power consumption characteristics, and the like.

In one embodiment, the processor 8010 executes instructions that control data processing operations of a general type. Embedded within the instructions may be coprocessor instructions. The processor 8010 recognizes these coprocessor instructions as being of a type that should be executed by the attached coprocessor 8045. Accordingly, the processor 8010 issues these coprocessor instructions (or control signals representing coprocessor instructions) on a coprocessor bus or other interconnect, to coprocessor 8045. Coprocessor(s) 8045 accept and execute the received coprocessor instructions.

Figure 81:
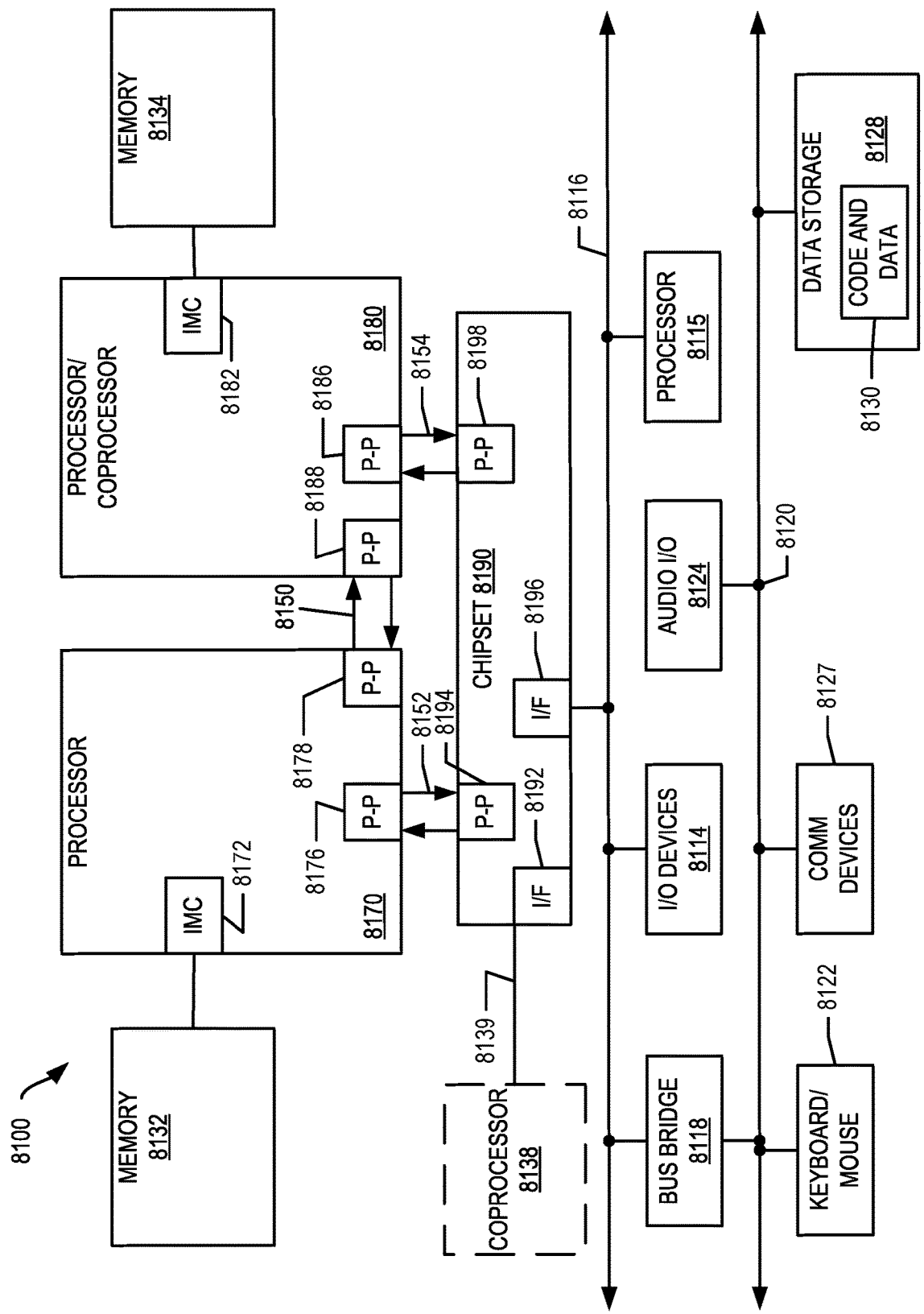
FIG. 81 is a block diagram of a more specific exemplary system in accordance with an embodiment of the present disclosure.

Referring now to FIG. 81, shown is a block diagram of a first more specific exemplary system 8100 in accordance with an embodiment of the present disclosure. As shown in FIG. 81, multiprocessor system 8100 is a point-to-point interconnect system, and includes a first processor 8170 and a second processor 8180 coupled via a point-to-point interconnect 8150. Each of processors 8170 and 8180 may be some version of the processor 7900. In one embodiment of the disclosure, processors 8170 and 8180 are respectively processors 8010 and 8015, while coprocessor 8138 is coprocessor 8045. In another embodiment, processors 8170 and 8180 are respectively processor 8010 coprocessor 8045.

Processors 8170 and 8180 are shown including integrated memory controller (IMC) units 8172 and 8182, respectively. Processor 8170 also includes as part of its bus controller units point-to-point (P-P) interfaces 8176 and 8178; similarly, second processor 8180 includes P-P interfaces 8186 and 8188. Processors 8170, 8180 may exchange information via a point-to-point (P-P) interface 8150 using P-P interface circuits 8178, 8188. As shown in FIG. 81, IMCs 8172 and 8182 couple the processors to respective memories, namely a memory 8132 and a memory 8134, which may be portions of main memory locally attached to the respective processors.

Processors 8170, 8180 may each exchange information with a chipset 8190 via individual P-P interfaces 8152, 8154 using point to point interface circuits 8176, 8194, 8186, 8198. Chipset 8190 may optionally exchange information with the coprocessor 8138 via a high-performance interface 8139. In one embodiment, the coprocessor 8138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 8190 may be coupled to a first bus 8116 via an interface 8196. In one embodiment, first bus 8116 may be a Peripheral Component Interconnect (PCI) bus, or a bus such as a PCI Express bus or another third generation I/O interconnect bus, although the scope of the present disclosure is not so limited.

As shown in FIG. 81, various I/O devices 8114 may be coupled to first bus 8116, along with a bus bridge 8118 which couples first bus 8116 to a second bus 8120. In one embodiment, one or more additional processor(s) 8115, such as coprocessors, high-throughput MIC processors, GPGPU's, accelerators (such as, e.g., graphics accelerators or digital signal processing (DSP) units), field programmable gate arrays, or any other processor, are coupled to first bus 8116. In one embodiment, second bus 8120 may be a low pin count (LPC) bus. Various devices may be coupled to a second bus 8120 including, for example, a keyboard and/or mouse 8122, communication devices 8127 and a storage unit 8128 such as a disk drive or other mass storage device which may include instructions/code and data 8130, in one embodiment. Further, an audio I/O 8124 may be coupled to the second bus 8120. Note that other architectures are possible. For example, instead of the point-to-point architecture of FIG. 81, a system may implement a multi-drop bus or other such architecture.

Figure 82:
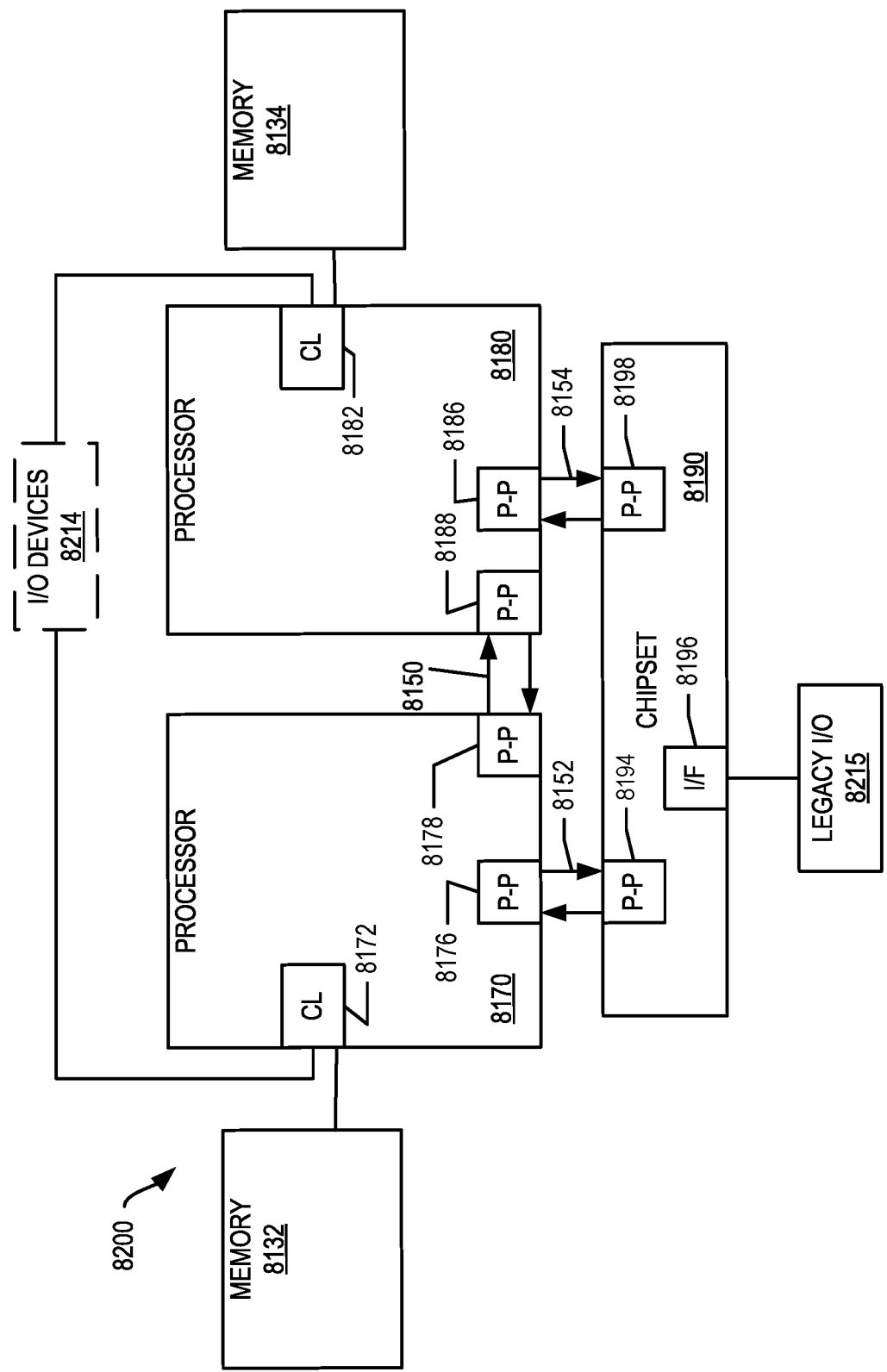
FIG. 82, shown is a block diagram of a second more specific exemplary system in accordance with an embodiment of the present disclosure.

Referring now to FIG. 82, shown is a block diagram of a second more specific exemplary system 8200 in accordance with an embodiment of the present disclosure Like elements in FIGS. 81 and 82 bear like reference numerals, and certain aspects of FIG. 81 have been omitted from FIG. 82 in order to avoid obscuring other aspects of FIG. 82.

FIG. 82 illustrates that the processors 8170, 8180 may include integrated memory and I/O control logic ("CL") 8172 and 8182, respectively. Thus, the CL 8172, 8182 include integrated memory controller units and include I/O control logic. FIG. 82 illustrates that not only are the memories 8132, 8134 coupled to the CL 8172, 8182, but also that I/O devices 8214 are also coupled to the control logic 8172, 8182. Legacy I/O devices 8215 are coupled to the chipset 8190.

Figure 83:
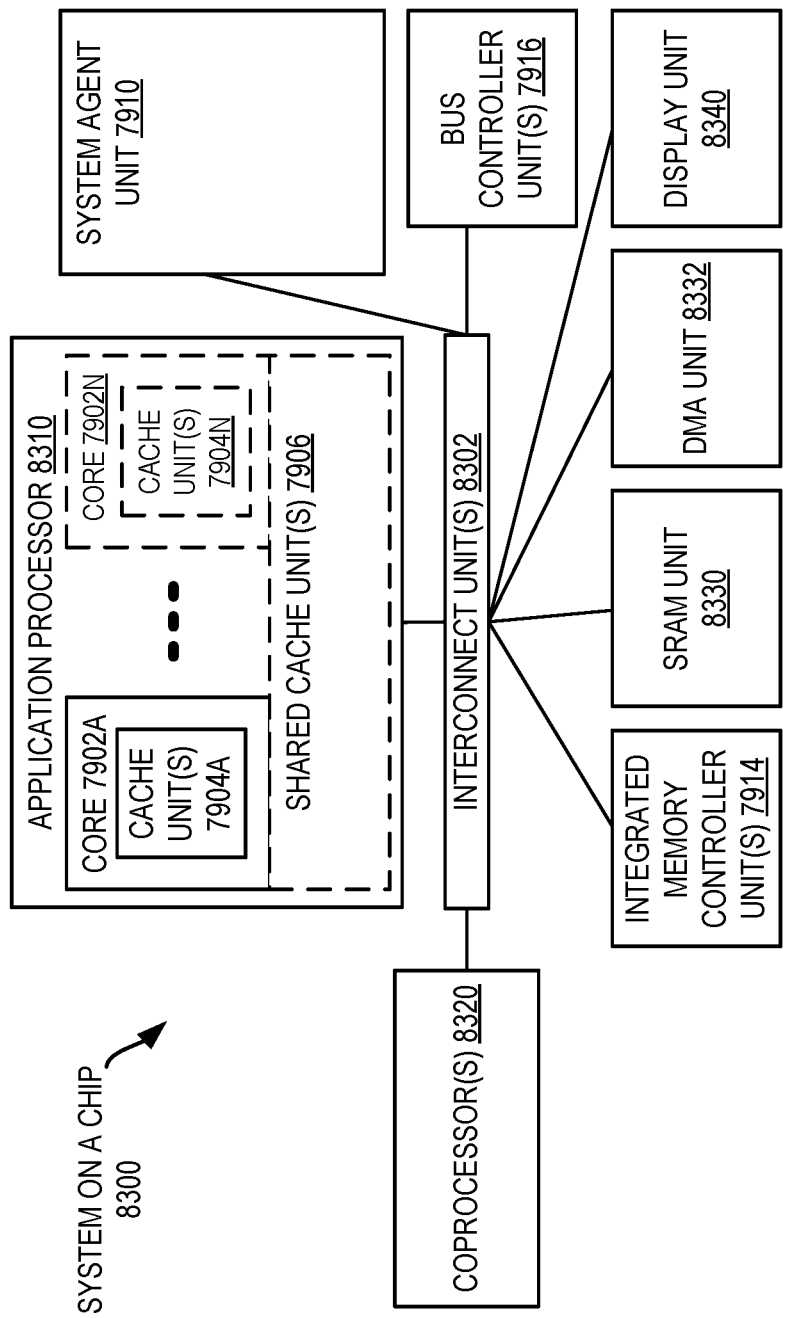
FIG. 83, shown is a block diagram of a system on a chip (SoC) in accordance with an embodiment of the present disclosure.

Referring now to FIG. 83, shown is a block diagram of a SoC 8300 in accordance with an embodiment of the present disclosure. Similar elements in FIG. 79 bear like reference numerals. Also, dashed lined boxes are optional features on more advanced SoCs. In FIG. 83, an interconnect unit(s) 8302 is coupled to: an application processor 8310 which includes a set of one or more cores 202A-N and shared cache unit(s) 7906; a system agent unit 7910; a bus controller unit(s) 7916; an integrated memory controller unit(s) 7914; a set or one or more coprocessors 8320 which may include integrated graphics logic, an image processor, an audio processor, and a video processor; an static random access memory (SRAM) unit 8330; a direct memory access (DMA) unit 8332; and a display unit 8340 for coupling to one or more external displays. In one embodiment, the coprocessor(s) 8320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 8130 illustrated in FIG. 81, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 84:
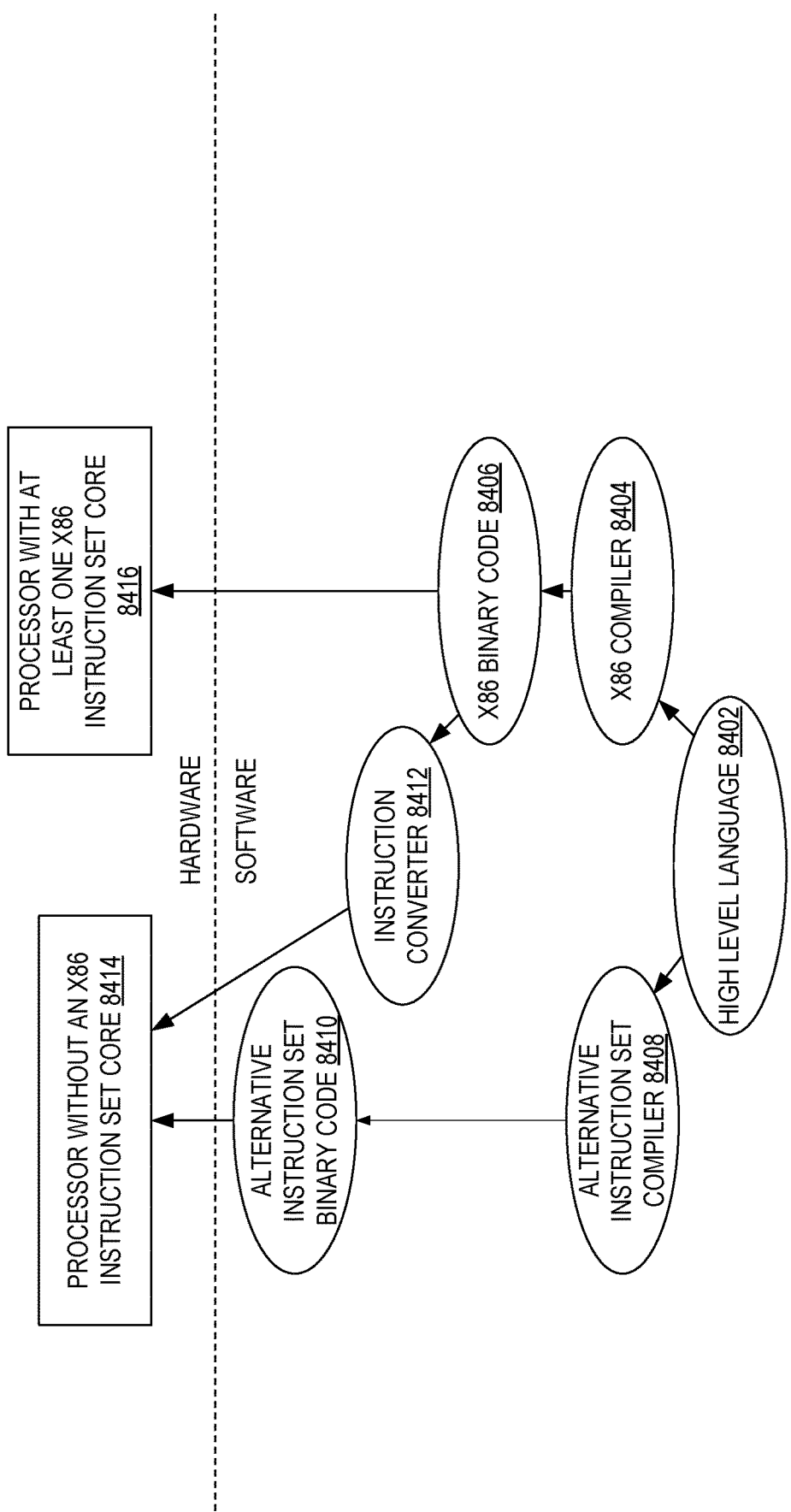
FIG. 84 is a block diagram contrasting the use of a software instruction converter to convert binary instructions in a source instruction set to binary instructions in a target instruction set according to embodiments of the disclosure.

FIG. 84 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 84 shows a program in a high level language 8402 may be compiled using an x86 compiler 8404 to generate x86 binary code 8406 that may be natively executed by a processor with at least one x86 instruction set core 8416. The processor with at least one x86 instruction set core 8416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 8404 represents a compiler that is operable to generate x86 binary code 8406 (e.g., object code) that can, with or without additional linkage processing, be executed on the processor with at least one x86 instruction set core 8416. Similarly, FIG. 84 shows the program in the high level language 8402 may be compiled using an alternative instruction set compiler 8408 to generate alternative instruction set binary code

8410 that may be natively executed by a processor without at least one x86 instruction set core 8414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 8412 is used to convert the x86 binary code 8406 into code that may be natively executed by the processor without an x86 instruction set core 8414. This converted code is not likely to be the same as the alternative instruction set binary code 8410 because an instruction converter capable of this is difficult to make; however, the converted code will accomplish the general operation and be made up of instructions from the alternative instruction set. Thus, the instruction converter 8412 represents software, firmware, hardware, or a combination thereof that, through emulation, simulation or any other process, allows a processor or other electronic device that does not have an x86 instruction set processor or core to execute the x86 binary code 8406.

What is claimed is:

1. An apparatus comprising:
   a spatial array of processing elements;
   a cache;
   a first memory interface circuit comprising a first port into the cache, a first plurality of input queues to store data for memory requests from the spatial array of processing elements, and a first memory operation register;
   a second memory interface circuit comprising a second port into the cache, a second plurality of input queues to store data for memory requests from the spatial array of processing elements, and a second memory operation register; and
   an allocator circuit to:
      set respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements, and
      set respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements.

2. The apparatus of claim 1, wherein the respective first values set in the first memory operation register and the second memory operation register causes a first completion buffer of the first memory interface circuit to receive a completion indication from the cache for memory requests from the first processing element, a first completion buffer of the second memory interface circuit to receive a completion indication from the cache for memory requests from the second processing element, and a second completion buffer of the first memory interface circuit to receive a completion indication from the cache for memory requests from the third processing element.

3. The apparatus of claim 2, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the allocator circuit assigns a largest number of buffer slots of the unified completion buffer to the one of the first processing element or the third processing element that issues a largest number of memory requests for a dataflow graph.

4. The apparatus of claim 2, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the allocator circuit assigns a largest number of buffer slots of the unified completion buffer to the one of the first processing element or the third processing element that has a longest latency for memory requests for a dataflow graph.

5. The apparatus of claim 1, wherein the second allocation mode allocates input queues based on issuance by the first processing element of a largest number of memory requests for a dataflow graph, the second processing element of a next largest number of memory requests for the dataflow graph, and the third processing element of a smaller number of memory requests for the dataflow graph than the next largest number of memory requests.

6. The apparatus of claim 1, wherein the allocator circuit allocates a next input queue of the first memory interface circuit or the second memory interface circuit in program order to the one of the first memory interface circuit or the second memory interface circuit with a fewest number of memory requests assigned to its input queues for a dataflow graph.

7. The apparatus of claim 1, wherein the allocator circuit switches from the first allocation mode to the second allocation mode in runtime for a dataflow graph.

8. The apparatus of claim 1, wherein the first memory interface circuit, when in the first allocation mode, sends a first backpressure value to stall the first processing element from issuing an additional memory request when the first input queue of the first memory interface circuit is not available for data for the additional memory request, the second memory interface circuit, when in the first allocation mode, sends a second backpressure value to stall the second processing element from issuing an additional memory request when the first input queue of the second memory interface circuit is not available for data for the additional memory request, and the first memory interface circuit, when in the first allocation mode, sends a third backpressure value to stall the third processing element from issuing an additional memory request when the second input queue of the first memory interface circuit is not available for data for the additional memory request.

9. A method comprising:
coupling a spatial array of processing elements to a first memory interface circuit comprising a first port into a cache, a first plurality of input queues to store data for memory requests from the spatial array of processing elements, and a first memory operation register, and to a second memory interface circuit comprising a second port into the cache, a second plurality of input queues to store data for memory requests from the spatial array of processing elements, and a second memory operation register;
setting respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements; and
setting respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements.

10. The method of claim 9, wherein setting the respective first values in the first memory operation register and the second memory operation register causes a first completion buffer of the first memory interface circuit to receive a completion indication from the cache for memory requests from the first processing element, a first completion buffer of the second memory interface circuit to receive a completion indication from the cache for memory requests from the second processing element, and a second completion buffer of the first memory interface circuit to receive a completion indication from the cache for memory requests from the third processing element.

11. The method of claim 10, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that issues a largest number of memory requests for a dataflow graph.

12. The method of claim 10, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that has a longest latency for memory requests for a dataflow graph.

13. The method of claim 9, wherein the second allocation mode allocates input queues based on issuance by the first processing element of a largest number of memory requests for a dataflow graph, the second processing element of a next largest number of memory requests for the dataflow graph, and the third processing element of a smaller number of memory requests for the dataflow graph than the next largest number of memory requests.

14. The method of claim 9, wherein the setting of the respective first values or the respective second values comprises allocating a next input queue of the first memory interface circuit or the second memory interface circuit in program order to the one of the first memory interface circuit or the second memory interface circuit with a fewest number of memory requests assigned to its input queues for a dataflow graph.

15. The method of claim 9, wherein the method comprises switching from the first allocation mode to the second allocation mode in runtime for a dataflow graph.

16. The method of claim 9, wherein the first memory interface circuit, when in the first allocation mode, sends a first backpressure value to stall the first processing element from issuing an additional memory request when the first input queue of the first memory interface circuit is not available for data for the additional memory request, the second memory interface circuit, when in the first allocation mode, sends a second backpressure value to stall the second processing element from issuing an additional memory request when the first input queue of the second memory interface circuit is not available for data for the additional memory request, and the first memory interface circuit, when in the first allocation mode, sends a third backpressure value to stall the third processing element from issuing an additional memory request when the second input queue of the first memory interface circuit is not available for data for the additional memory request.

17. A non-transitory machine readable medium that stores code that when executed by a machine causes the machine to perform a method comprising:
coupling a spatial array of processing elements to a first memory interface circuit comprising a first port into a cache, a first plurality of input queues to store data for memory requests from the spatial array of processing elements, and a first memory operation register, and to a second memory interface circuit comprising a second port into the cache, a second plurality of input queues to store data for memory requests from the spatial array of processing elements, and a second memory operation register;
setting respective first values into the first memory operation register and the second memory operation register according to a first allocation mode to couple the first port to a first input queue of the first plurality of input queues that stores data for memory requests from a first processing element of the spatial array of processing elements, couple the second port to a first input queue of the second plurality of input queues that stores data for memory requests from a second processing element of the spatial array of processing elements, and couple the first port to a second input queue of the first plurality of input queues that stores data for memory requests from a third processing element of the spatial array of processing elements; and setting respective second values into the first memory operation register and the second memory operation register according to a second allocation mode to couple the first port to the first input queue of the first plurality of input queues that stores data for memory requests from the first processing element of the spatial array of processing elements, couple the second port to the first input queue of the second plurality of input queues that stores data for memory requests from the second processing element of the spatial array of processing elements, and couple the second port to a second input queue of the second plurality of input queues that stores data for memory requests from the third processing element of the spatial array of processing elements.

18. The non-transitory machine readable medium of claim 17, wherein setting the respective first values in the first memory operation register and the second memory operation register causes a first completion buffer of the first memory interface circuit to receive a completion indication from the cache for memory requests from the first processing element, a first completion buffer of the second memory interface circuit to receive a completion indication from the cache for memory requests from the second processing element, and a second completion buffer of the first memory interface circuit to receive a completion indication from the cache for memory requests from the third processing element.

19. The non-transitory machine readable medium of claim 18, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that issues a largest number of memory requests for a dataflow graph.

20. The non-transitory machine readable medium of claim 18, wherein the first completion buffer of the first memory interface circuit is a first proper subset of slots of a unified completion buffer of the first memory interface circuit, the second completion buffer of the first memory interface circuit is a second proper subset of slots of the unified completion buffer of the first memory interface circuit, and the setting of the respective first values or the respective second values comprises assigning a largest number of buffer slots of the unified completion buffer to the one of the first processing element or the third processing element that has a longest latency for memory requests for a dataflow graph.

21. The non-transitory machine readable medium of claim 17, wherein the second allocation mode allocates input queues based on issuance by the first processing element of a largest number of memory requests for a dataflow graph, the second processing element of a next largest number of memory requests for the dataflow graph, and the third processing element of a smaller number of memory requests for the dataflow graph than the next largest number of memory requests.

22. The non-transitory machine readable medium of claim 17, wherein the setting of the respective first values or the respective second values comprises allocating a next input queue of the first memory interface circuit or the second memory interface circuit in program order to the one of the first memory interface circuit or the second memory interface circuit with a fewest number of memory requests assigned to its input queues for a dataflow graph.

23. The non-transitory machine readable medium of claim 17, wherein the method comprises switching from the first allocation mode to the second allocation mode in runtime for a dataflow graph.

24. The non-transitory machine readable medium of claim 17, wherein the first memory interface circuit, when in the first allocation mode, sends a first backpressure value to stall the first processing element from issuing an additional memory request when the first input queue of the first memory interface circuit is not available for data for the additional memory request, the second memory interface circuit, when in the first allocation mode, sends a second backpressure value to stall the second processing element from issuing an additional memory request when the first input queue of the second memory interface circuit is not available for data for the additional memory request, and the first memory interface circuit, when in the first allocation mode, sends a third backpressure value to stall the third processing element from issuing an additional memory request when the second input queue of the first memory interface circuit is not available for data for the additional memory request.

* * * * *